US012581069B2

(12) United States Patent
Koo et al.

(10) Patent No.: US 12,581,069 B2
(45) Date of Patent: **\*Mar. 17, 2026**

(54) METHOD FOR ENCODING/DECODING VIDEO SIGNAL, AND APPARATUS THEREFOR

(71) Applicant: LG ELECTRONICS INC., Seoul (KR)

(72) Inventors: Moonmo Koo, Seoul (KR); Mehdi Salhifar, Seoul (KR); Seunghwan Kim, Seoul (KR); Jaehyun Lim, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/935,098

(22) Filed: Nov. 1, 2024

(65) Prior Publication Data

US 2025/0063160 A1      Feb. 20, 2025

Related U.S. Application Data

(63) Continuation of application No. 18/518,829, filed on Nov. 24, 2023, now Pat. No. 12,166,977, which is a
(Continued)

(51) Int. Cl.
H04L 43/16      (2022.01)
H04N 19/11      (2014.01)
(Continued)

(52) U.S. Cl.
CPC ........... H04N 19/11 (2014.11); H04N 19/176 (2014.11); H04N 19/61 (2014.11); H04N 19/70 (2014.11)

(58) Field of Classification Search
CPC ...... H04N 19/11; H04N 19/61; H04N 19/176; H04N 19/70
See application file for complete search history.

(56) References Cited

U.S. PATENT DOCUMENTS

| 5,491,515 | A | * | 2/1996 | Suzuki | ................. | H04N 19/423 348/401.1 |
| 6,028,967 | A | * | 2/2000 | Kim | ....................... | H04N 19/48 382/268 |

(Continued)

FOREIGN PATENT DOCUMENTS

| CA | 3005463 A1 * | 8/2017 | ......... G10L 21/0216 |
| KR | 102631802 B1 | 1/2024 | |

*Primary Examiner* — Philip P. Dang
(74) *Attorney, Agent, or Firm* — Bryan Cave Leighton Paisner LLP

(57)      ABSTRACT

Embodiments of the disclosure provide a method and apparatus for processing a video signal. Particularly, a method for decoding a video signal according to an embodiment of the disclosure may include: determining, among predefined secondary transform sets based on intra-prediction modes of a current block, a secondary transform set applied to the current block; obtaining a first syntax element indicating a secondary transform matrix applied to the current block in the determined secondary transform set; deriving a secondary inverse-transformed block by performing a secondary inverse transform on a left top region of the current block by using the secondary transform matrix specified by the first syntax element; and deriving a residual block of the current block by performing a primary inverse transform on the secondary inverse-transformed block using a primary transform matrix of the current block.

9 Claims, 23 Drawing Sheets

TRANSFORM AND QUANTIZATION UNIT (120/130)

Residual → Primary transform unit(121) → Secondary transform unit(122) → QUANTIZATION UNIT(130) → Quant. coeff.

INVERSE QUANTIZATION AND INVERSE TRANSFORM UNIT (140/150)

Decoded residual ← Inverse Primary transform unit(152) ← Inverse Secondary transform unit(151) ← INVERSE QUANTIZATION UNIT(140)

Related U.S. Application Data continuation of application No. 17/558,086, filed on Dec. 21, 2021, now Pat. No. 11,882,273, which is a continuation of application No. 16/897,681, filed on Jun. 10, 2020, now Pat. No. 11,245,894, which is a continuation of application No. PCT/KR2019/011514, filed on Sep. 5, 2019.

(60) Provisional application No. 62/731,075, filed on Sep. 13, 2018, provisional application No. 62/731,078, filed on Sep. 13, 2018, provisional application No. 62/731,073, filed on Sep. 13, 2018, provisional application No. 62/727,550, filed on Sep. 5, 2018.

(51) Int. Cl.
| | | |
|---|---|---|
| *H04N 19/176* | (2014.01) | |
| *H04N 19/61* | (2014.01) | |
| *H04N 19/70* | (2014.01) | |

(56) References Cited

U.S. PATENT DOCUMENTS

| | | | | |
|---|---|---|---|---|
| 6,263,021 | B1 * | 7/2001 | Sethuraman | H04N 19/61 |
| | | | | 375/E7.242 |
| 6,295,320 | B1 * | 9/2001 | Lim | H04N 21/426 |
| | | | | 375/E7.184 |
| 6,456,658 | B2 * | 9/2002 | Kamikura | H04N 19/105 |
| | | | | 375/E7.133 |
| 6,577,251 | B1 * | 6/2003 | Yip | H04N 19/61 |
| | | | | 341/61 |
| 6,934,331 | B2 * | 8/2005 | Kamikura | H04N 19/105 |
| | | | | 375/E7.211 |
| 7,239,755 | B1 * | 7/2007 | Kim | H04N 19/182 |
| | | | | 382/268 |
| 7,720,299 | B2 * | 5/2010 | Hou | G06F 17/147 |
| | | | | 382/250 |
| 7,860,160 | B2 * | 12/2010 | Shimazaki | H04N 19/61 |
| | | | | 375/240.03 |
| 7,900,124 | B2 * | 3/2011 | Conway | G11B 20/10287 |
| | | | | 714/795 |
| 8,462,853 | B2 * | 6/2013 | Jeon | H04N 19/52 |
| | | | | 375/240.12 |
| 8,467,619 | B2 * | 6/2013 | Yoshida | H04N 19/34 |
| | | | | 382/248 |
| 9,177,562 | B2 * | 11/2015 | Jeong | G10L 19/00 |
| 9,496,886 | B2 * | 11/2016 | Chang | H04J 14/0227 |
| 9,661,338 | B2 * | 5/2017 | Karczewicz | H04N 19/176 |
| 9,813,715 | B2 * | 11/2017 | Rosewarne | H04N 19/98 |
| 9,998,746 | B2 * | 6/2018 | Wu | H04N 19/61 |
| 10,356,413 | B1 * | 7/2019 | Sim | H04N 19/198 |
| 10,390,044 | B2 * | 8/2019 | Karczewicz | H04N 19/61 |
| 10,405,000 | B2 * | 9/2019 | Kao | H04N 19/129 |
| 10,491,922 | B2 * | 11/2019 | Zhao | H04N 19/12 |
| 10,520,916 | B1 * | 12/2019 | Gros | G05B 13/042 |
| 2002/0196849 | A1 * | 12/2002 | Kamikura | H04N 19/46 |
| | | | | 375/E7.172 |
| 2005/0084011 | A1 * | 4/2005 | Song | H04N 19/136 |
| | | | | 375/E7.161 |
| 2005/0111543 | A1 * | 5/2005 | Seo | H04N 19/36 |
| | | | | 375/240.2 |
| 2005/0281332 | A1 * | 12/2005 | Lai | H04N 19/436 |
| | | | | 375/240.18 |
| 2008/0071846 | A1 * | 3/2008 | Sadafale | H03H 17/0416 |
| | | | | 708/313 |
| 2009/0222261 | A1 * | 9/2009 | Jung | G10L 19/24 |
| | | | | 704/219 |
| 2010/0177819 | A1 * | 7/2010 | Jeon | H04N 19/61 |
| | | | | 375/240.2 |
| 2011/0116539 | A1 * | 5/2011 | He | G06F 17/147 |
| | | | | 375/240.2 |
| 2014/0133546 | A1 * | 5/2014 | Bandoh | H04N 19/15 |
| | | | | 375/240.02 |
| 2019/0246142 | A1 * | 8/2019 | Zhao | H04N 19/132 |
| 2019/0313126 | A1 * | 10/2019 | Lin | H04N 19/615 |
| 2020/0213626 | A1 * | 7/2020 | Ikai | H04N 19/176 |

* cited by examiner

[FIG. 1]
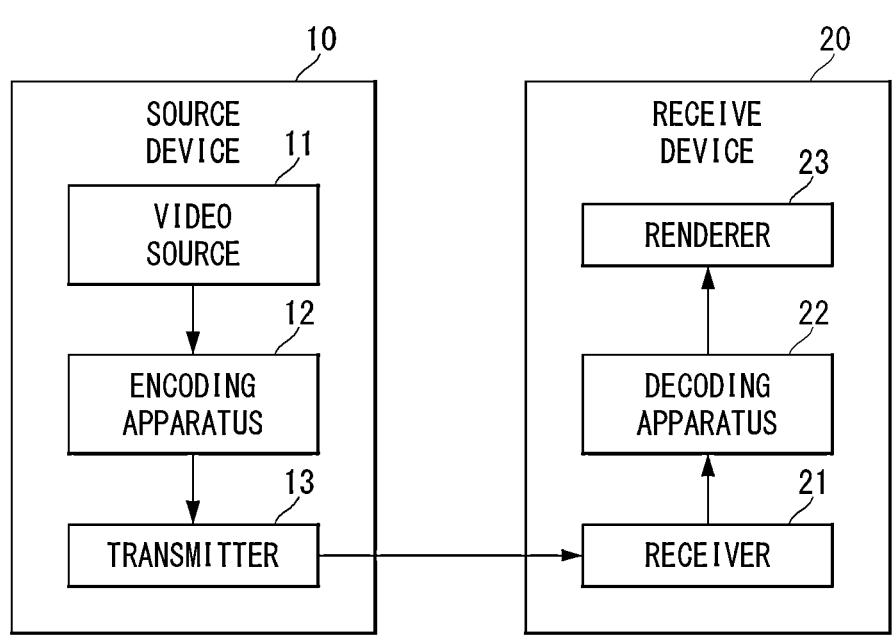

[FIG. 2]
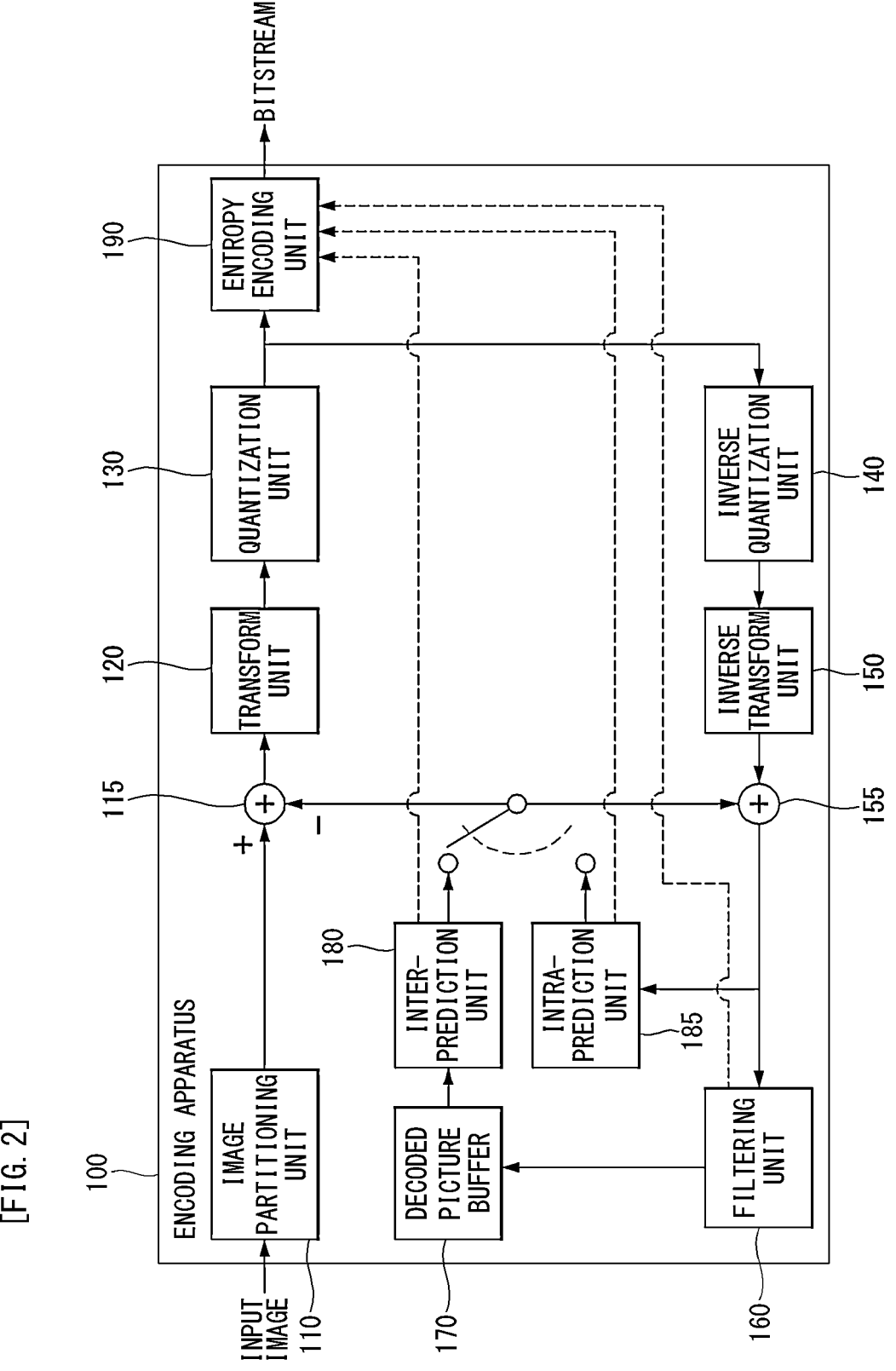

[FIG. 3]
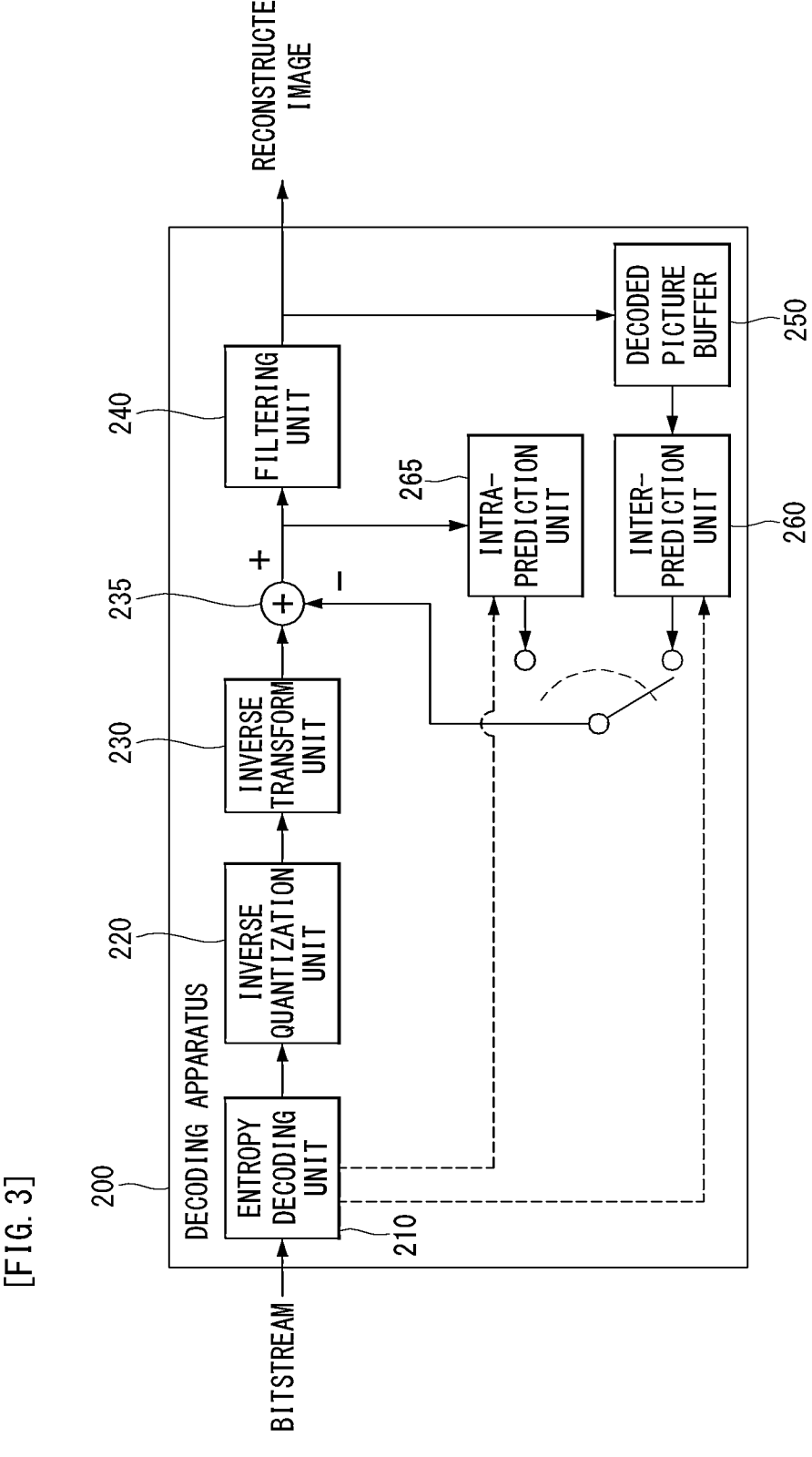

[FIG. 4]
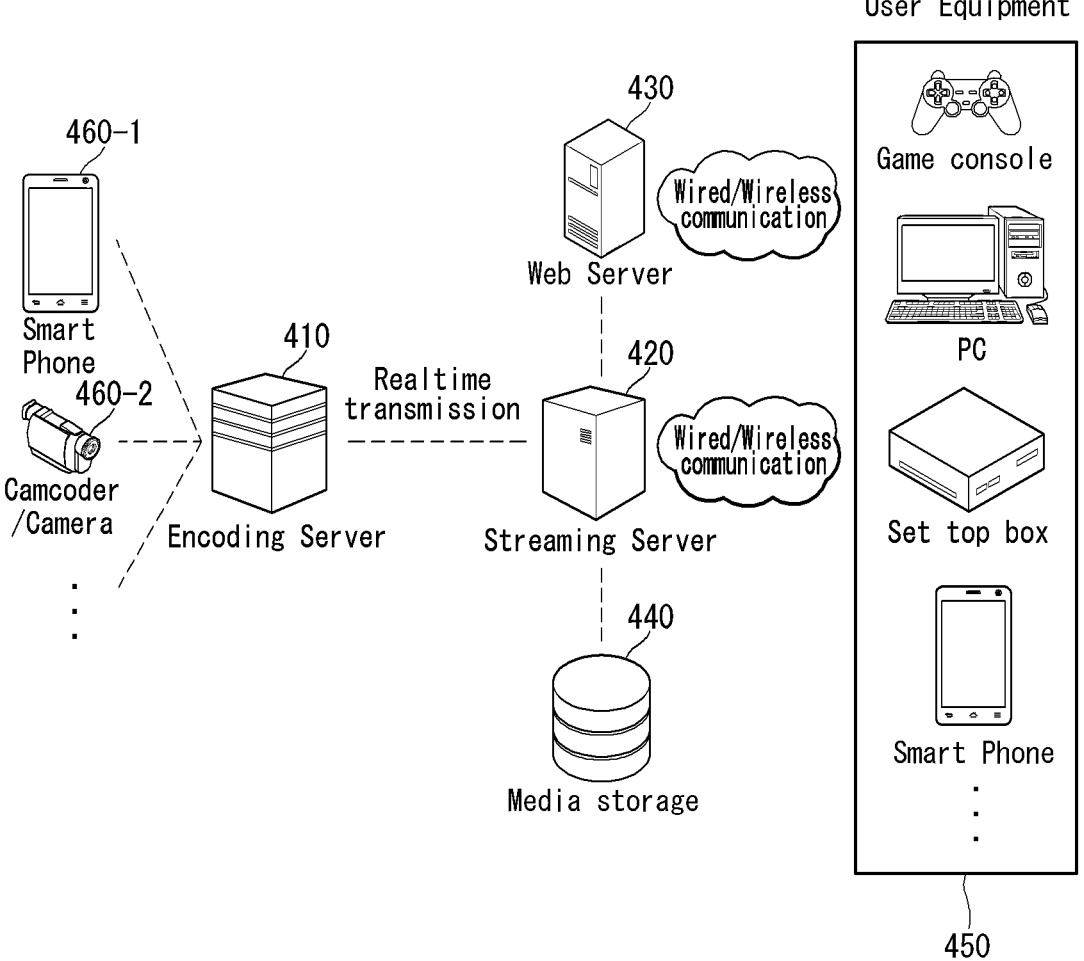
[FIG. 5A]
| Block A | | A0 | A1 | | B0 | B1 |
|---------|---|----|----| |----|----|
| | | | | | B2 | B3 |
| | | A2 | A3 | | | |

[FIG. 5B]
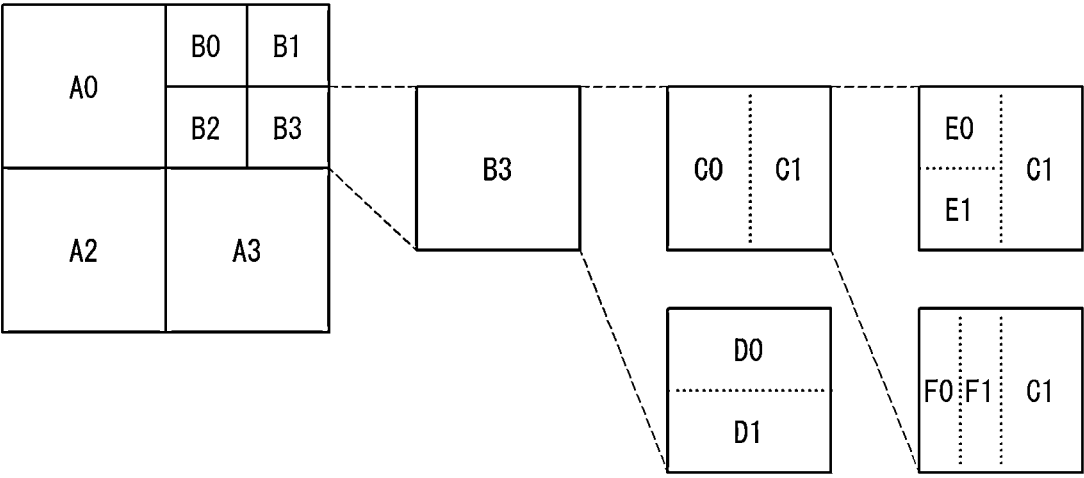
[FIG. 5C]
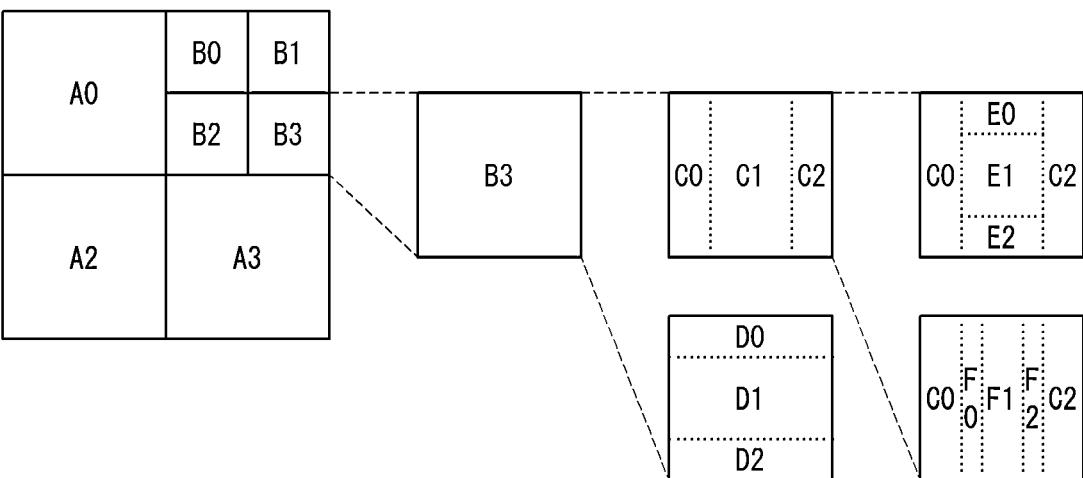
[FIG. 5D]
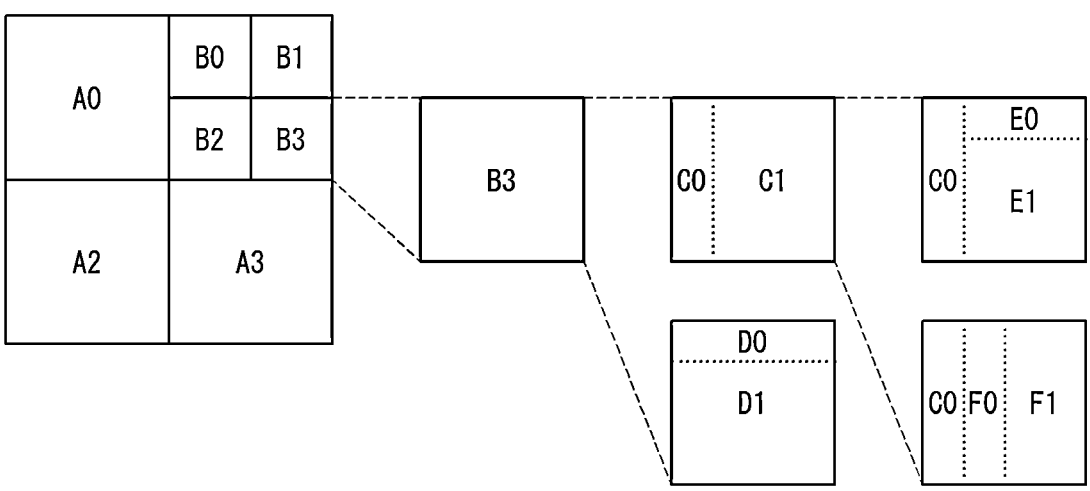

[FIG. 6]

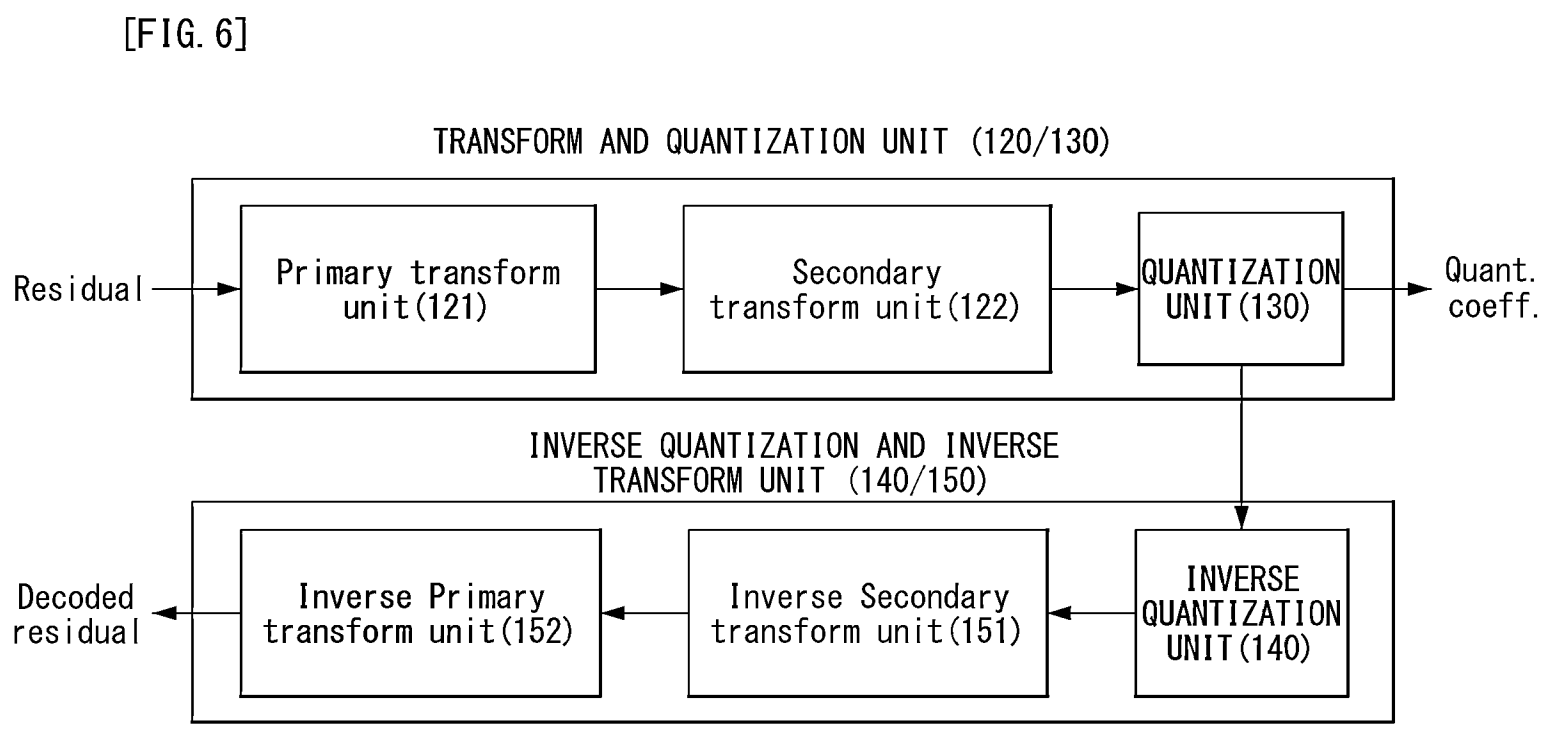

TRANSFORM AND QUANTIZATION UNIT (120/130)

Residual → Primary transform unit(121) → Secondary transform unit(122) → QUANTIZATION UNIT (130) → Quant. coeff.

INVERSE QUANTIZATION AND INVERSE TRANSFORM UNIT (140/150)

INVERSE QUANTIZATION UNIT (140) → Inverse Secondary transform unit(151) → Inverse Primary transform unit(152) → Decoded residual

[FIG. 7]
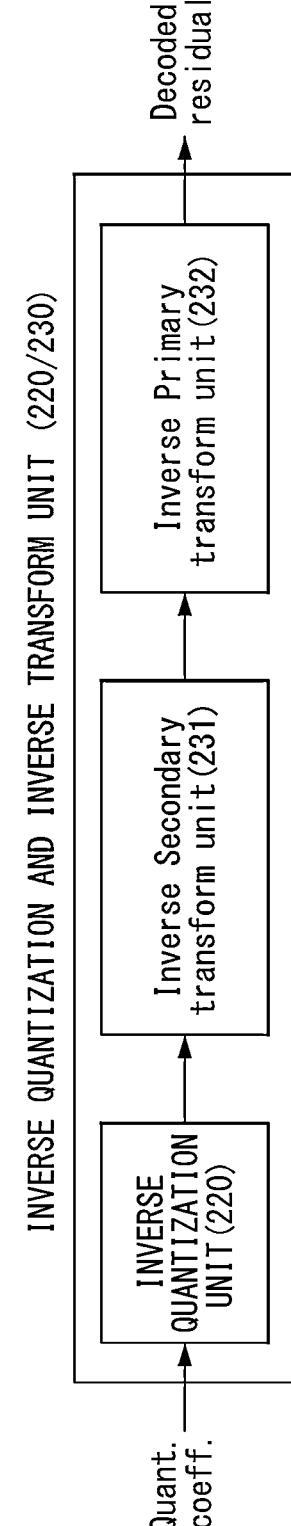
INVERSE QUANTIZATION AND INVERSE TRANSFORM UNIT (220/230)
Quant. coeff.
INVERSE QUANTIZATION UNIT(220)
Inverse Secondary transform unit(231)
Inverse Primary transform unit(232)
Decoded residual

[FIG. 8]
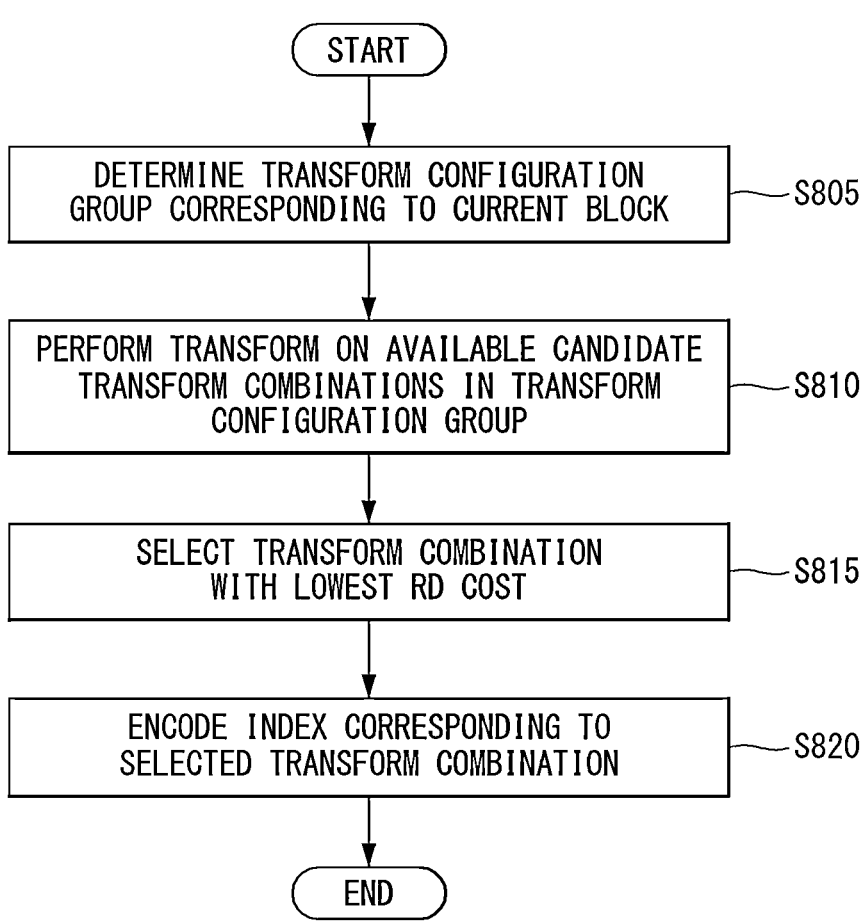

[FIG. 9]
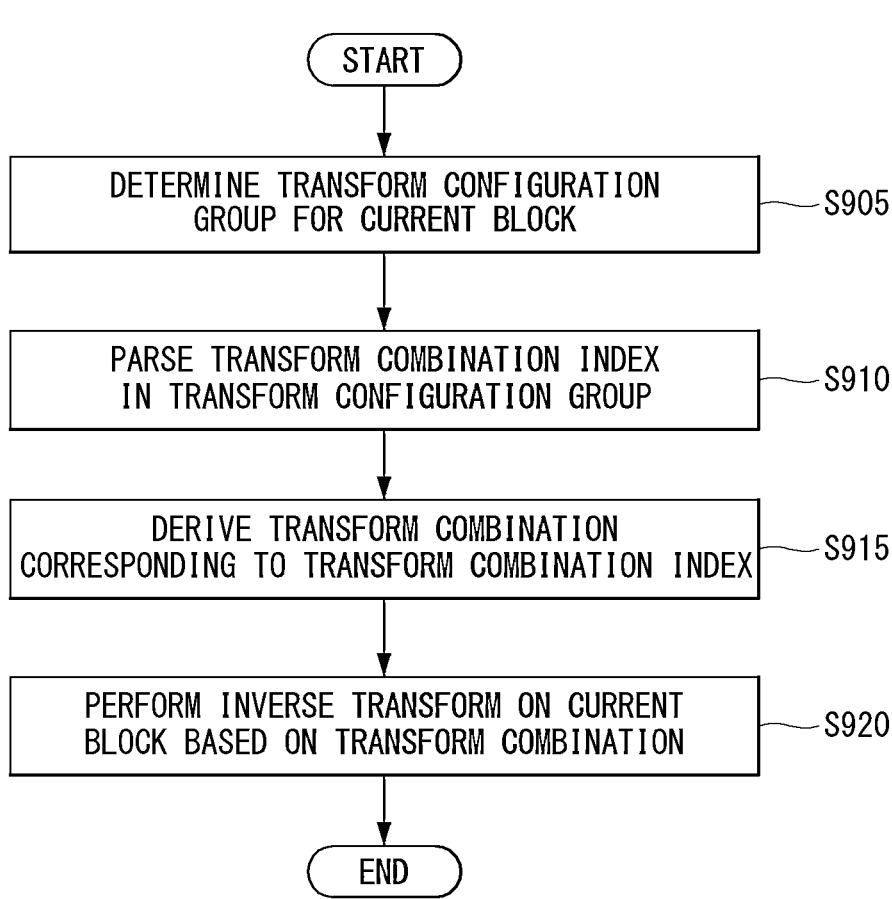

[FIG. 10]
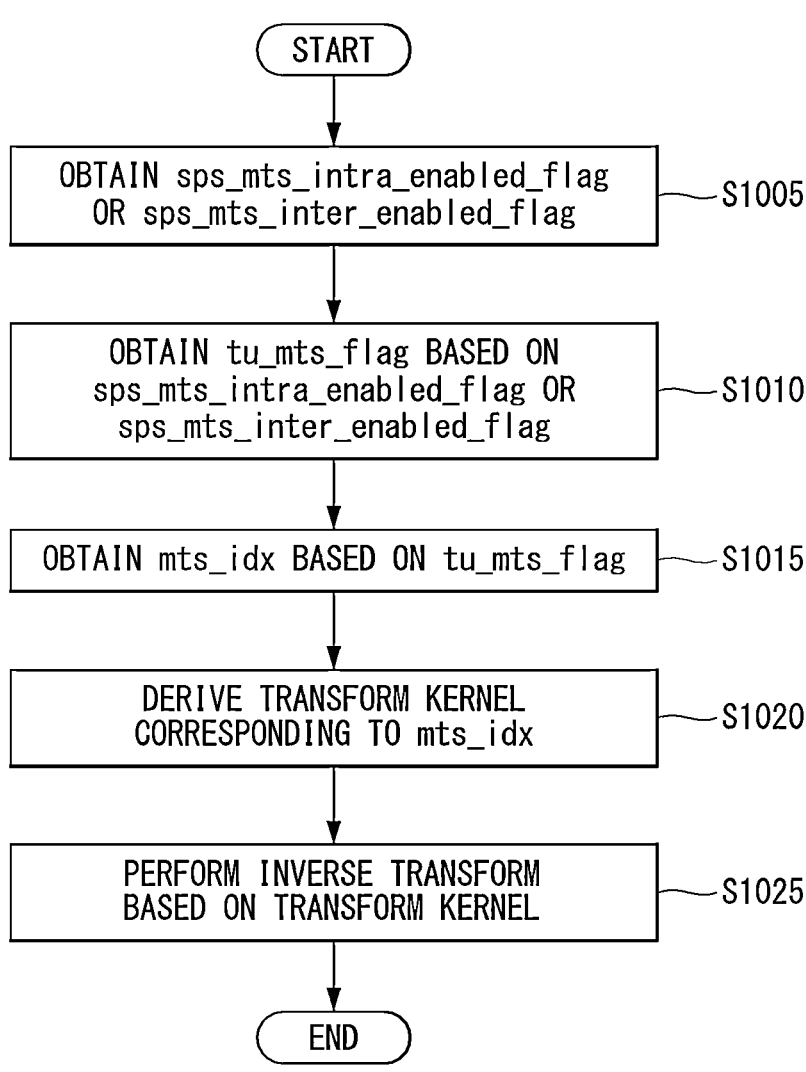

[FIG. 11]
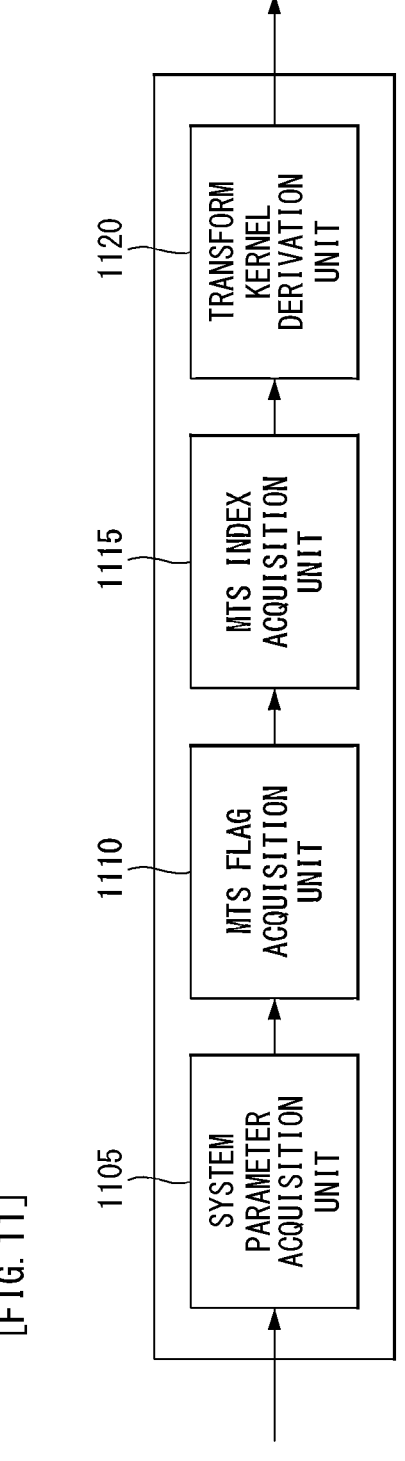

[FIG. 12]
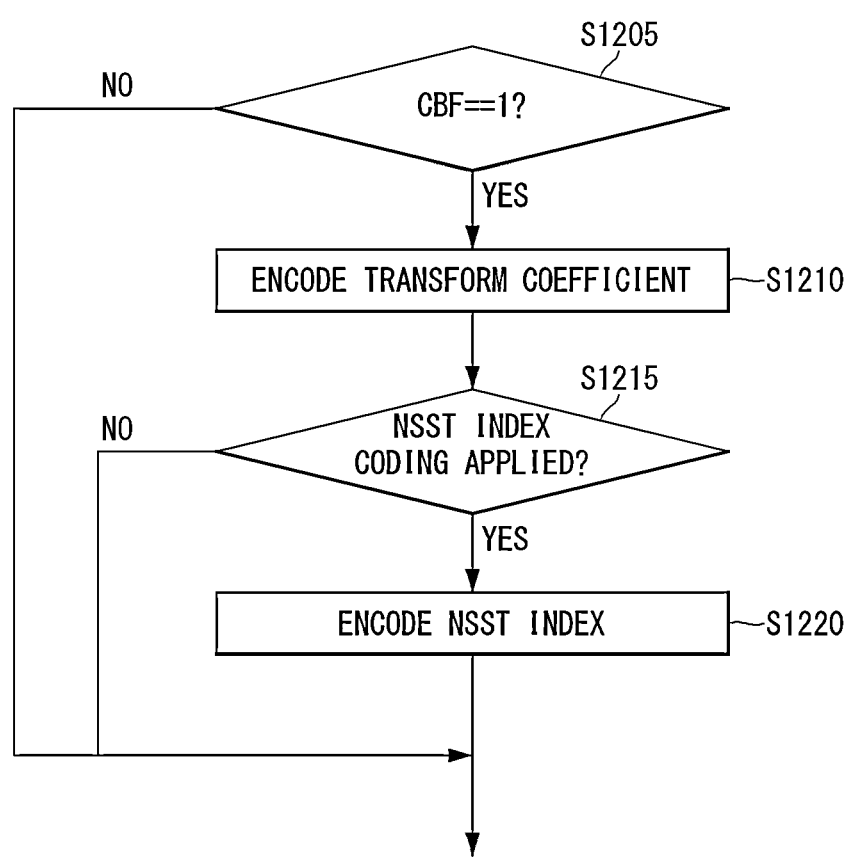

[FIG. 13]
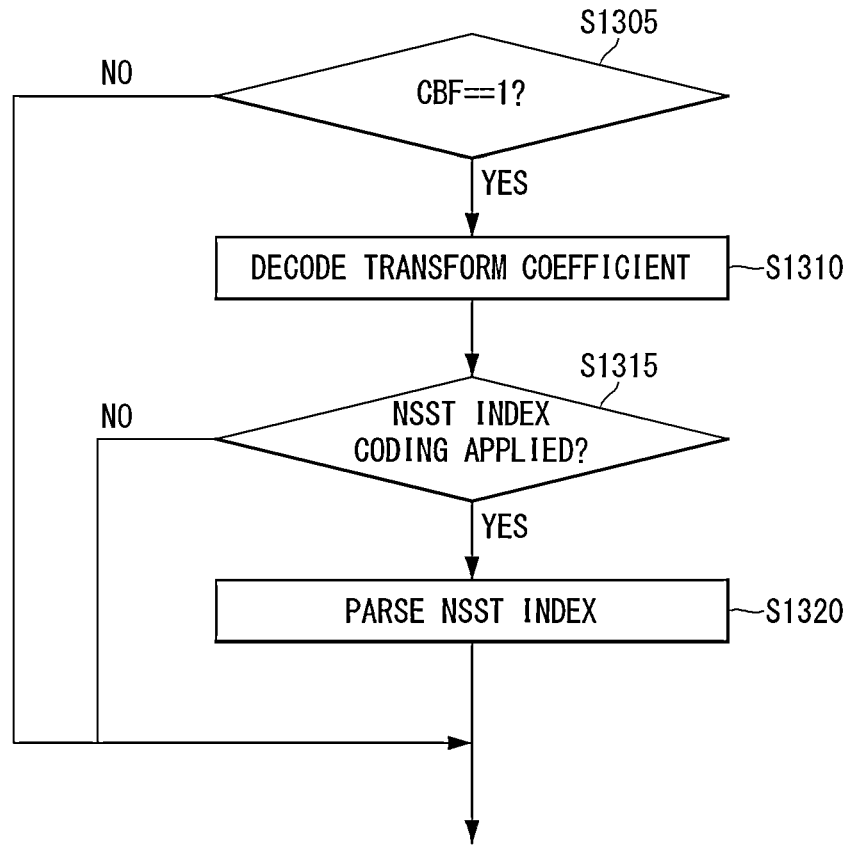
[FIG. 14]
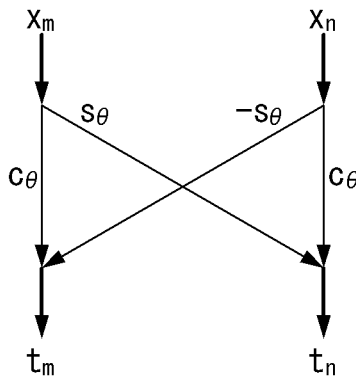

[FIG. 15]
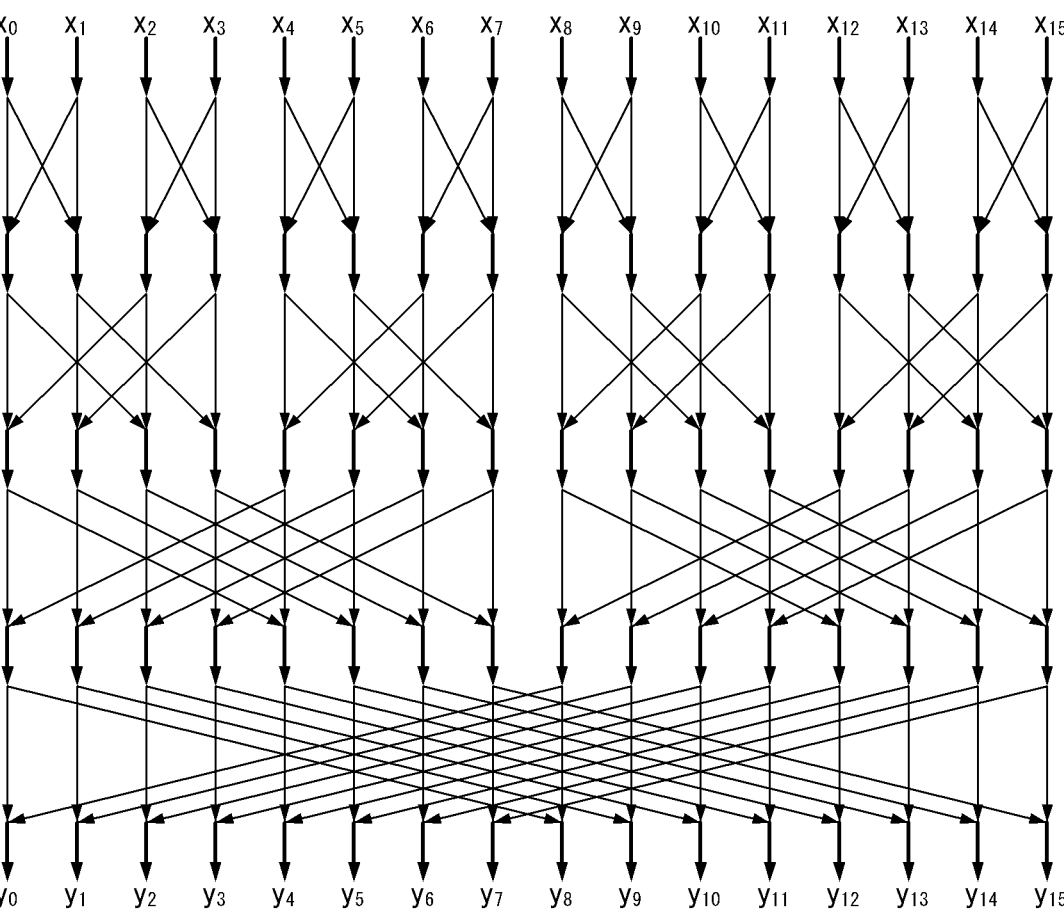
[FIG. 16]
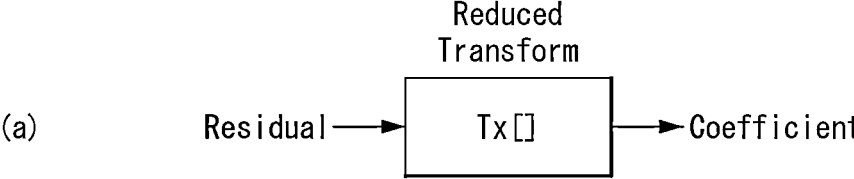
(a)     Residual →  Reduced Transform  Tx[] → Coefficient
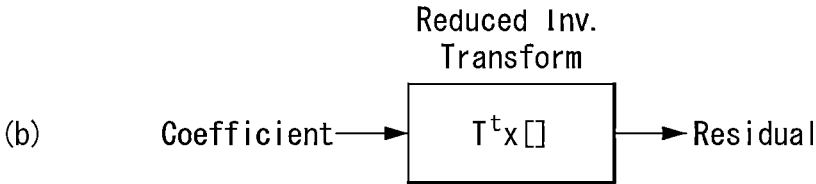
(b)     Coefficient →  Reduced Inv. Transform  T$^t$x[] → Residual

[FIG. 17]
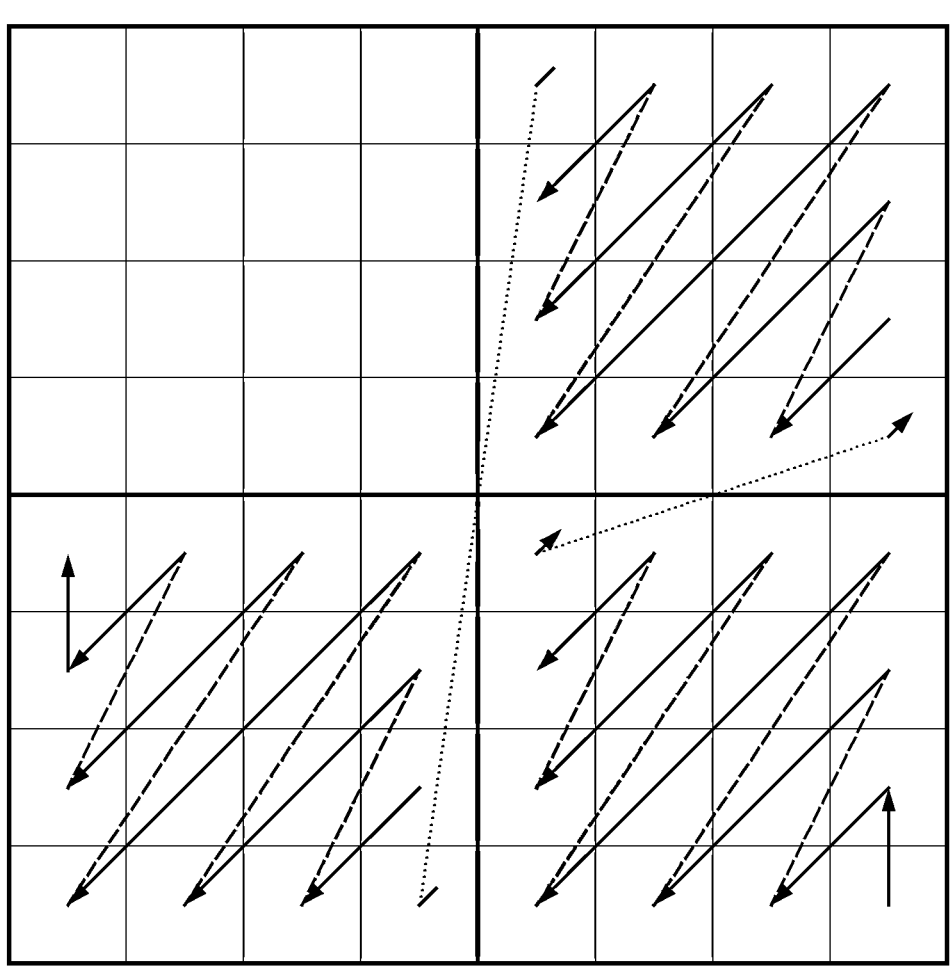

[FIG. 18]
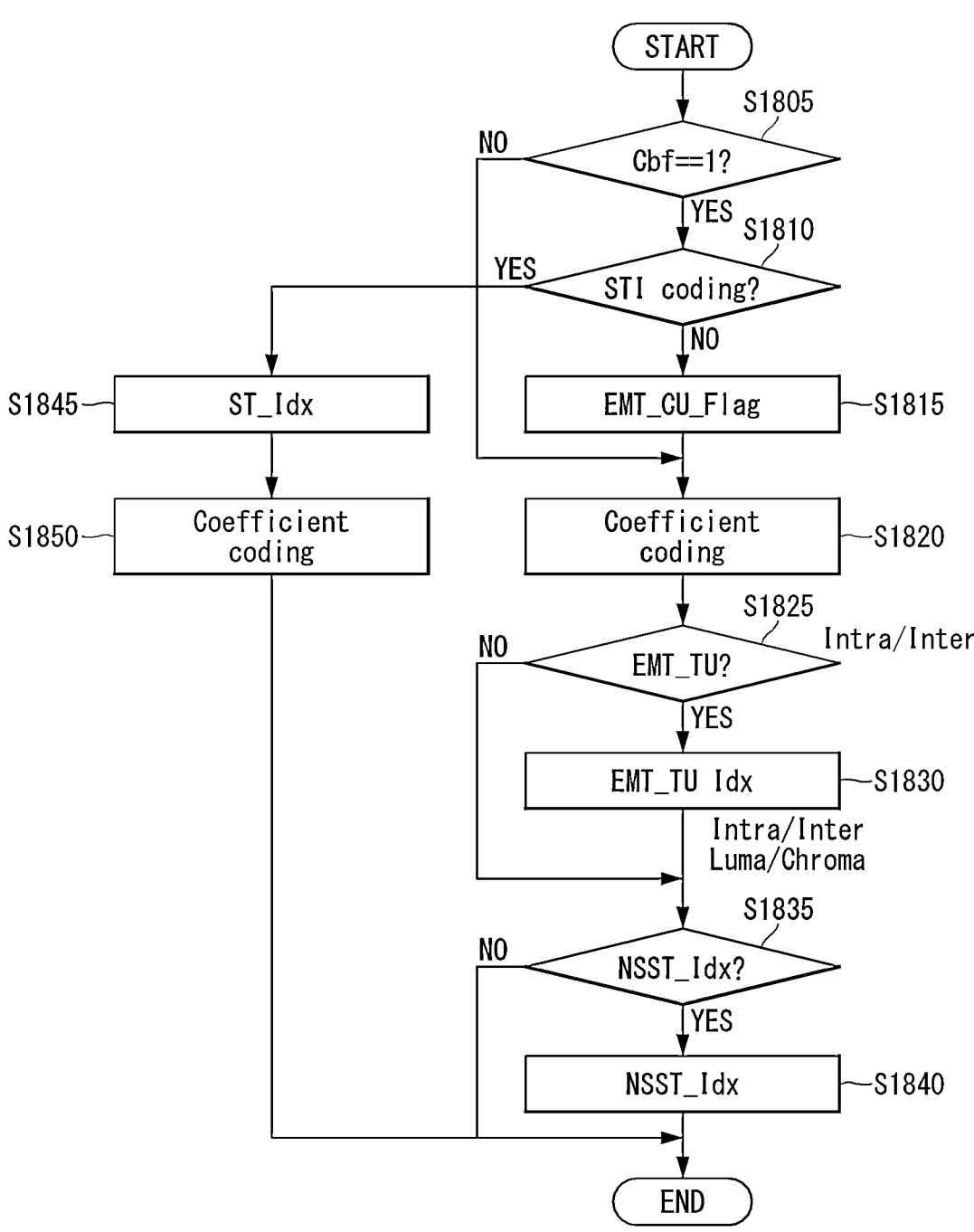

[FIG. 19]
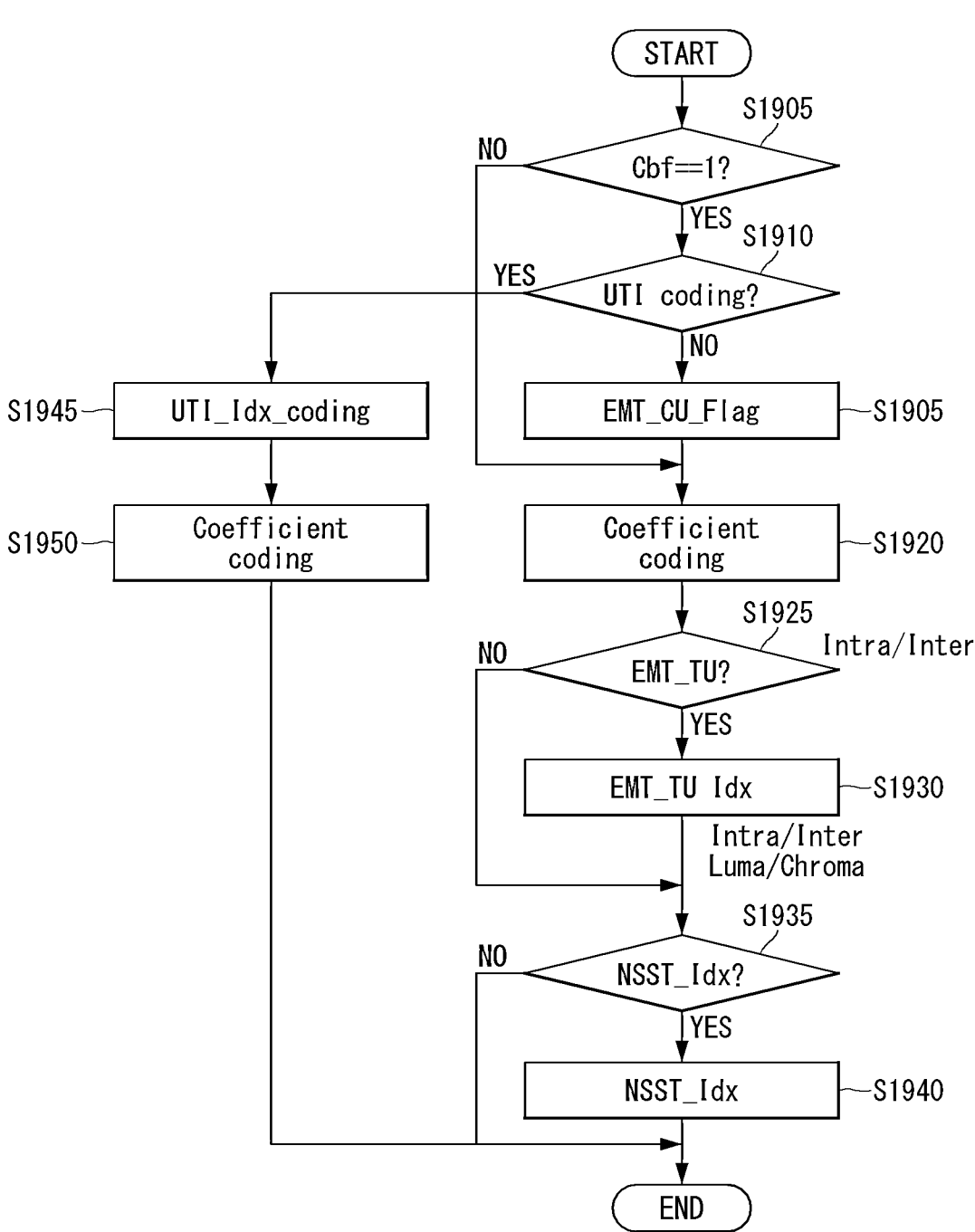

[FIG. 20]
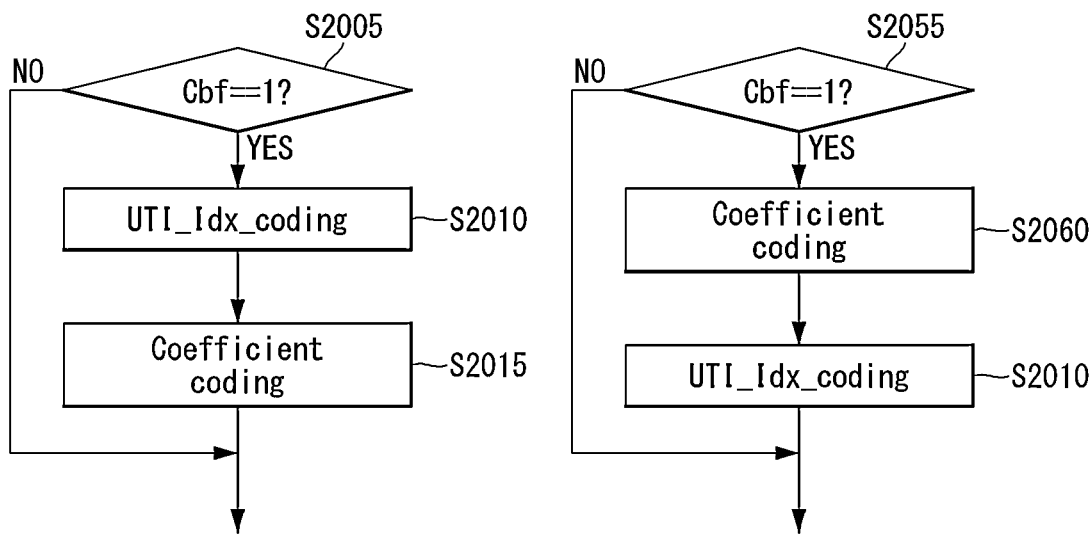
[FIG. 21]
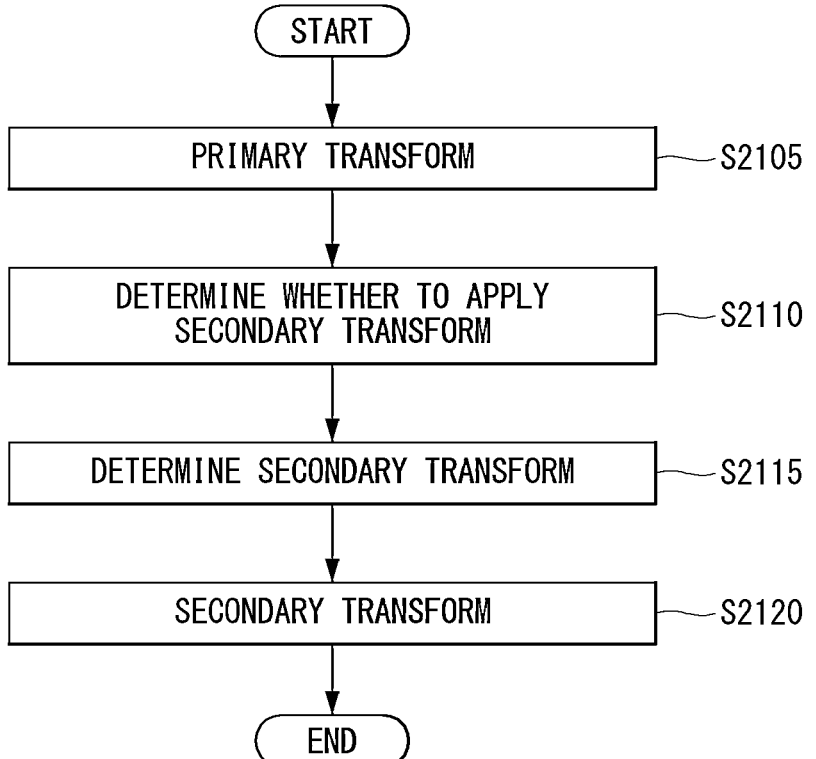

[FIG. 22]
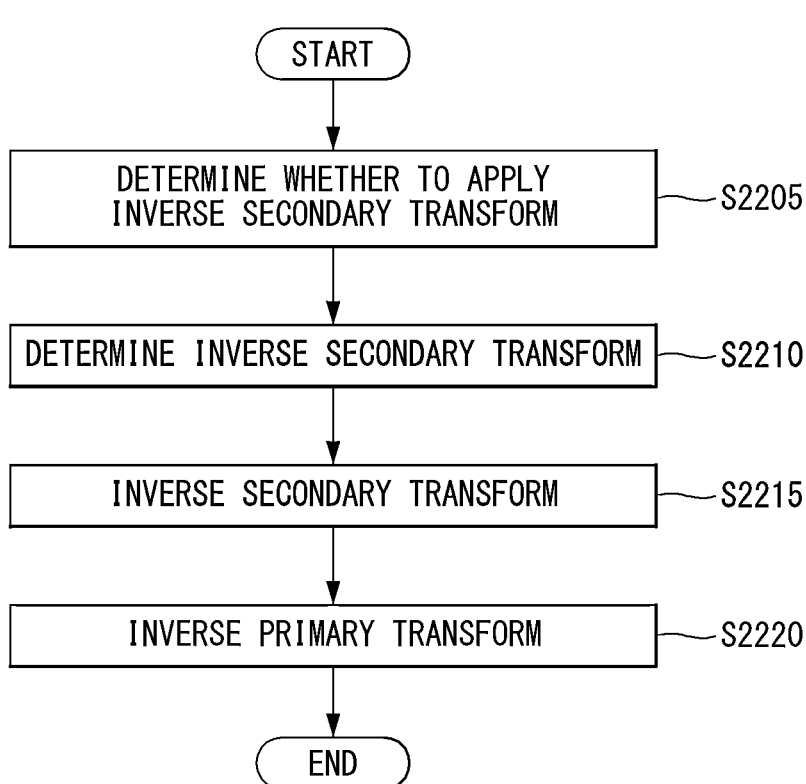

Figure 24:
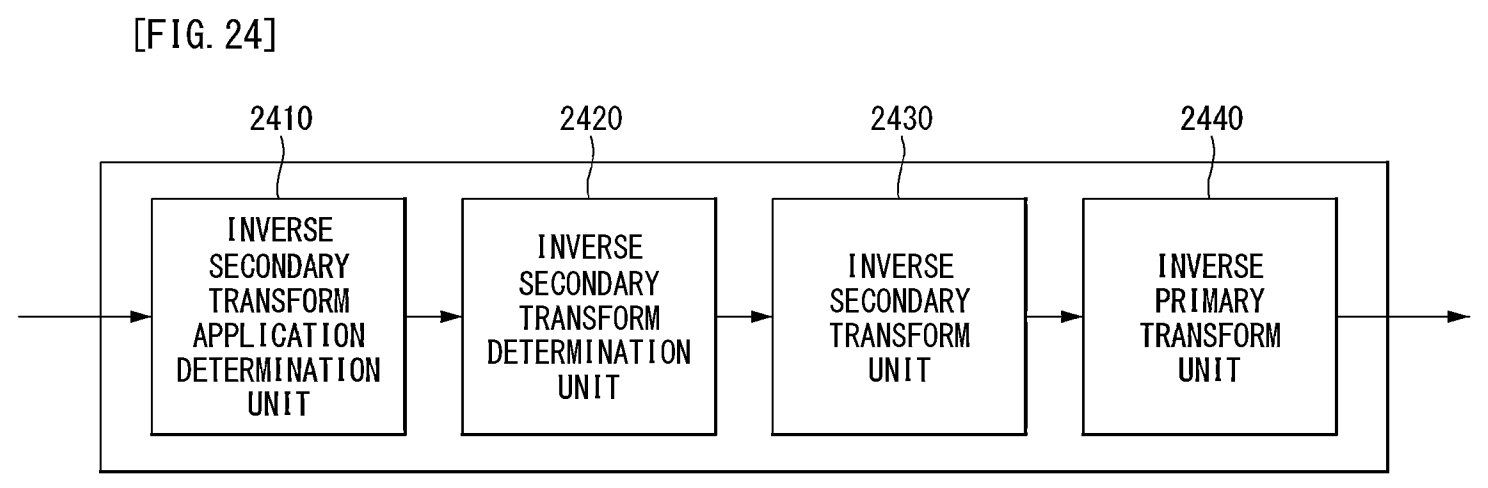

2410 — INVERSE SECONDARY TRANSFORM APPLICATION DETERMINATION UNIT

2420 — INVERSE SECONDARY TRANSFORM DETERMINATION UNIT

2430 — INVERSE SECONDARY TRANSFORM UNIT

2440 — INVERSE PRIMARY TRANSFORM UNIT

[FIG. 25]
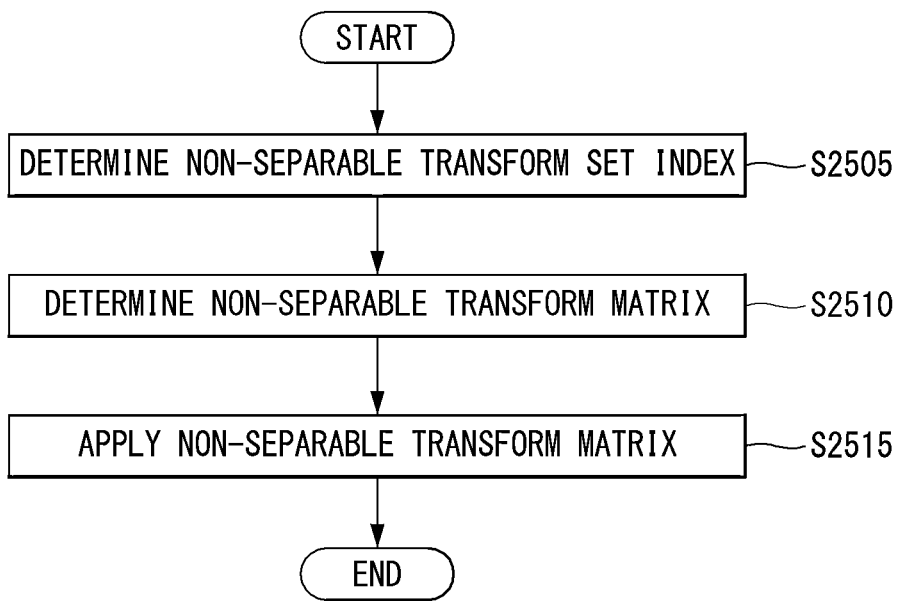
[FIG. 26]
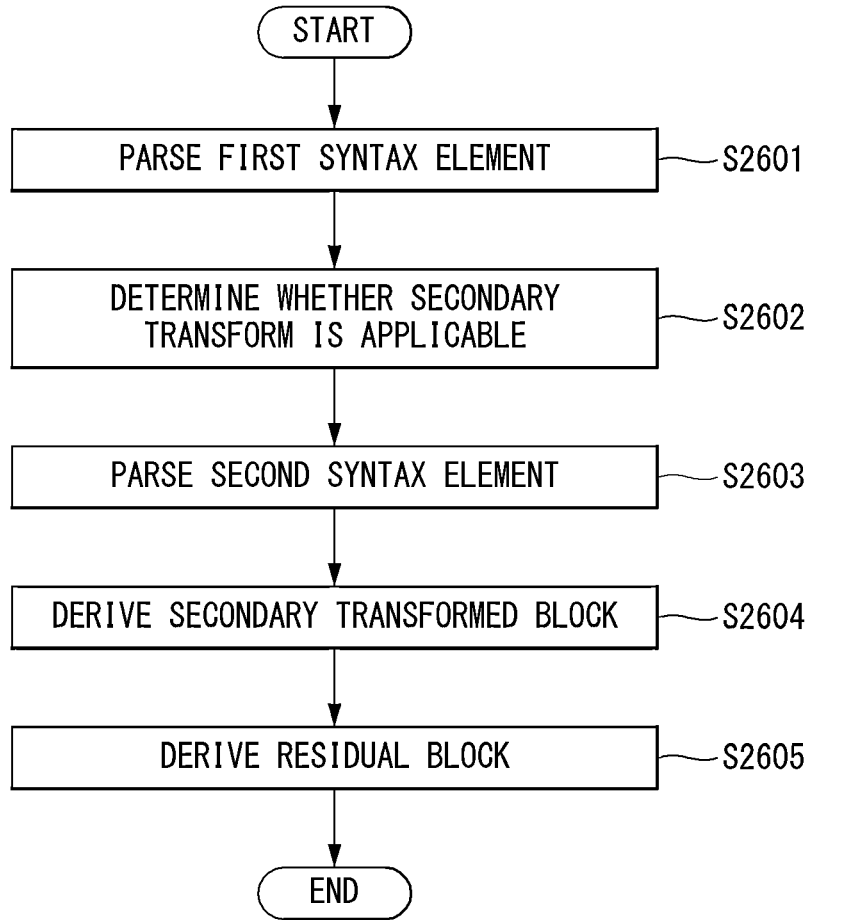

[FIG. 27]
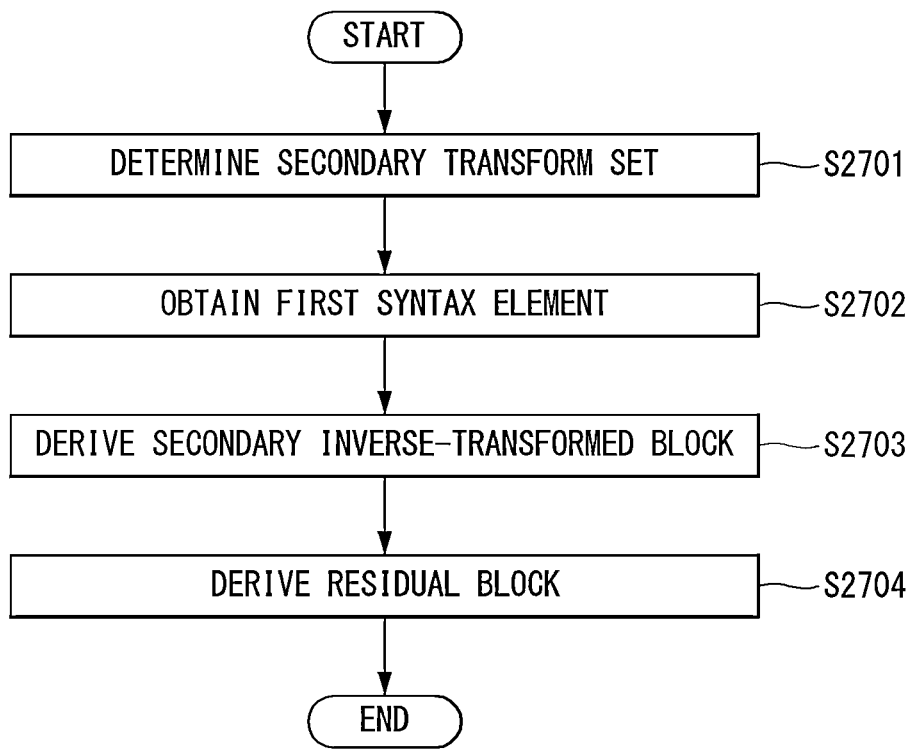
START
DETERMINE SECONDARY TRANSFORM SET —— S2701
OBTAIN FIRST SYNTAX ELEMENT —— S2702
DERIVE SECONDARY INVERSE-TRANSFORMED BLOCK —— S2703
DERIVE RESIDUAL BLOCK —— S2704
END
[FIG. 28]
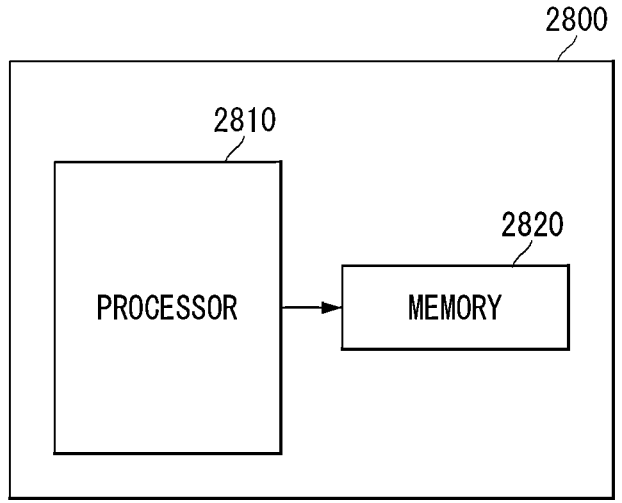
2800
2810
PROCESSOR
2820
MEMORY

METHOD FOR ENCODING/DECODING VIDEO SIGNAL, AND APPARATUS THEREFOR

CROSS-REFERENCE TO RELATED APPLICATIONS

Pursuant to 35 U.S.C. § 119 (e), this application is a Continuation application of U.S. patent application Ser. No. 18/518,829, filed Nov. 24, 2023, which is a Continuation application of U.S. patent application Ser. No. 17/558,086, filed Dec. 21, 2021, now patented as U.S. Pat. No. 11,882, 273, issued Jan. 23, 2024, which is a Continuation application of U.S. patent application Ser. No. 16/897,681, filed Jun. 10, 2020, now patented as U.S. Pat. No. 11,245,894, issued Feb. 8, 2022, which is a Continuation application of National Stage filing under 35 U.S.C. 371 of International Application No. PCT/KR2019/011514, filed on Sep. 5, 2019, which claims the benefit of U.S. Patent Applications No. 62/727,550 filed on Sep. 5, 2018, No. 62/731,073 filed on Sep. 13, 2018, No. 62/731,078 filed on Sep. 13, 2018, and No. 62/731,075 filed on Sep. 13, 2018, the contents of which are all hereby incorporated by reference herein in their entirety.

TECHNICAL FIELD

The present disclosure relates to a method and apparatus for processing image signals, and particularly, to a method and apparatus for encoding or decoding image signals by performing a transform.

BACKGROUND ART

Compression coding refers to a signal processing technique for transmitting digitalized information through a communication line or storing the same in an appropriate form in a storage medium. Media such as video, images and audio can be objects of compression coding and, particularly, a technique of performing compression coding on images is called video image compression.

Next-generation video content will have features of a high spatial resolution, a high frame rate and high dimensionality of scene representation. To process such content, memory storage, a memory access rate and processing power will significantly increase.

Therefore, it is necessary to design a coding tool for processing next-generation video content more efficiently. Particularly, video codec standards after the high efficiency video coding (HEVC) standard require an efficient transform technique for transforming a spatial domain video signal into a frequency domain signal along with a prediction technique with higher accuracy.

DISCLOSURE

Technical Problem

Embodiments of the present disclosure provide an image signal processing method and apparatus which apply an appropriate transform to a current block.

The technical problems solved by the present disclosure are not limited to the above technical problems and other technical problems which are not described herein will become apparent to those skilled in the art from the following description.

Technical Solution

In an aspect of the disclosure, a method for decoding a video signal may include: determining, among predefined secondary transform sets based on intra-prediction modes of a current block, a secondary transform set applied to the current block; obtaining a first syntax element indicating a secondary transform matrix applied to the current block in the determined secondary transform set; deriving a secondary inverse-transformed block by performing a secondary inverse transform on a left top region of the current block by using the secondary transform matrix specified by the first syntax element; and deriving a residual block of the current block by performing a primary inverse transform on the secondary inverse-transformed block using a primary transform matrix of the current block.

Preferably, each of the pre-determined secondary transform sets may include two secondary transform matrices.

Preferably, the deriving of the secondary inverse-transformed block may include determining an input length and an output length of the secondary inverse transform on the basis of a width and a height of the current block.

Preferably, if the width and the height of the current block are equal to 4, the input length of the non-separable transform may be equal to 8 and the output length may be equal to 16.

Preferably, the method may further include: parsing a second syntax element indicating a primary transform matrix applied to a primary transform of the current block; and determining whether a secondary transform is applicable to the current block on the basis of the second syntax element.

Preferably, the determining of whether the secondary transform is applicable may be performed by determining that a secondary transform is applicable to the current block if the second syntax element indicates a predefined specific transform type.

Preferably, the predefined specific transform type may be defined as DCT2.

In another aspect of the disclosure, an apparatus for decoding a video signal includes: a memory for storing the video signal; and a processor coupled to the memory, and the processor may be configured to: determine, among predefined secondary transform sets based on intra-prediction modes of a current block, a secondary transform set applied to the current block; obtain a first syntax element indicating a secondary transform matrix applied to the current block in the determined secondary transform set; derive a secondary inverse-transformed block by performing a secondary inverse transform on a left top region of the current block by using the secondary transform matrix specified by the first syntax element; and derive a residual block of the current block by performing a primary inverse transform on the secondary inverse-transformed block using a primary transform matrix of the current block.

Advantageous Effects

According to embodiments of the present disclosure, it is possible to improve transform efficiency by determining and applying a transform suitable for a current block.

In addition, according to embodiments of the present disclosure, by efficiently designing a transform used for a primary transform and secondary transform, computational complexity may be improved and compression performance may be increased.

Furthermore, according to embodiments of the present disclosure, by restricting a transform kernel of a primary transform to which a secondary transform is applied, computational complexity may be remarkably improved.

The effects of the present disclosure are not limited to the above-described effects and other effects which are not described herein will become apparent to those skilled in the art from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 1 shows an example of a video coding system as an embodiment to which the present disclosure is applied.

FIG. 2 is a schematic block diagram of an encoding apparatus which encodes video/image signals as an embodiment to which the present disclosure is applied.

FIG. 3 is a schematic block diagram of a decoding apparatus which decodes image signals as an embodiment to which the present disclosure is applied.

FIG. 4 is a configuration diagram of a content streaming system an embodiment to which the present disclosure is applied.

FIG. 5*a* is a diagram for describing a block segmentation structure according to QT (Quad Tree), FIG. 5*b* is a diagram for describing a block segmentation structure according to BT (Binary Tree), FIG. 5*c* is a diagram for describing a block segmentation structure according to TT (Ternary Tree) and FIG. 5*d* is a diagram for describing a block segmentation structure according to AT.

FIGS. 6 and 7 show embodiments to which the present disclosure is applied, FIG. 6 is a schematic block diagram of a transform and quantization unit, and an inverse quantization and inverse transform unit in an encoding apparatus and FIG. 7 is a schematic block diagram of an inverse quantization and inverse transform unit in a decoding apparatus.

FIG. 8 is a flowchart showing a process in which adaptive multiple transform (AMT) is performed.

FIG. 9 is a flowchart showing a decoding process in which AMT is performed.

FIG. 10 is a flowchart showing an inverse transform process on the basis of MTS according to an embodiment of the present disclosure.

FIG. 11 is a block diagram of an apparatus for performing decoding on the basis of MTS according to an embodiment of the present disclosure.

FIGS. 12 and 13 are flowcharts showing encoding/decoding to which secondary transform is applied as an embodiment to which present disclosure is applied.

FIGS. 14 and 15 show an embodiment to which the present disclosure is applied, FIG. 14 is a diagram for describing Givens rotation and FIG. 15 shows a configuration of one round in 4×4 non-separable secondary transform (NSST) composed of Givens rotation layers and permutations.

FIG. 16 shows operation of reduced secondary transform (RST) as an embodiment to which the present disclosure is applied.

FIG. 17 is a diagram showing a process of performing reverse scanning from the sixty-fourth coefficient to the seventeenth coefficient in reverse scan order as an embodiment to which the present disclosure is applied.

FIG. 18 is an exemplary flowchart showing encoding using a single transform indicator (STI) as an embodiment to which the present disclosure is applied.

FIG. 19 is an exemplary flowchart showing encoding using a unified transform indicator (UTI) as an embodiment to which the present disclosure is applied.

FIG. 20 illustrates two exemplary flowcharts showing encoding using a UTI as an embodiment to which the present disclosure is applied.

FIG. 21 is an exemplary flowchart showing encoding for performing transform as an embodiment to which the present disclosure is applied.

FIG. 22 is an exemplary flowchart showing decoding for performing transform as an embodiment to which the present disclosure is applied.

FIG. 23 is a detailed block diagram showing an example of a transform unit 120 in an encoding apparatus 100 as an embodiment to which the present disclosure is applied.

FIG. 24 is a detailed block diagram showing an example of an inverse transform unit 230 in a decoding apparatus 200 as an embodiment to which the present disclosure is applied.

FIG. 25 is a flowchart for processing a video signal as an embodiment to which the present disclosure is applied.

FIG. 26 is an exemplary block diagram of an apparatus for processing a video signal as an embodiment to which the present disclosure is applied.

FIG. 27 is a flowchart showing a method of transforming a video signal according to an embodiment to which the disclosure is applied.

FIG. 28 is an exemplary block diagram of an apparatus for processing a video signal as an embodiment to which the disclosure is applied.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Further, the processing unit may be interpreted into the meaning including a unit for a luma component and a unit for a chroma component. For example, the processing unit may correspond to a block, a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 shows an example of a video coding system as an embodiment to which the present disclosure is applied.

The video coding system may include a source device 10 and a receive device 20. The source device 10 can transmit encoded video/image information or data to the receive device 20 in the form of a file or streaming through a digital storage medium or a network.

The source device 10 may include a video source 11, an encoding apparatus 12, and a transmitter 13. The receive device 20 may include a receiver, a decoding apparatus 22 and a renderer 23. The encoding apparatus 12 may be called a video/image encoding apparatus and the decoding apparatus 20 may be called a video/image decoding apparatus. The transmitter 13 may be included in the encoding apparatus 12. The receiver 21 may be included in the decoding apparatus 22. The renderer 23 may include a display and the display may be configured as a separate device or an external component.

The video source can acquire a video/image through video/image capturing, combining or generating process. The video source may include a video/image capture device and/or a video/image generation device. The video/image capture device may include, for example, one or more cameras, a video/image archive including previously captured videos/images, and the like. The video/image generation device may include, for example, a computer, a tablet, a smartphone, and the like and (electronically) generate a video/image. For example, a virtual video/image can be generated through a computer or the like and, in this case, a video/image capture process may be replaced with a related data generation process.

The encoding apparatus 12 can encode an input video/image. The encoding apparatus 12 can perform a series of procedures such as prediction, transform and quantization for compression and coding efficiency. Encoded data (encoded video/image information) can be output in the form of a bitstream.

The transmitter 13 can transmit encoded video/image information or data output in the form of a bitstream to the receiver of the receive device in the form of a file or streaming through a digital storage medium or a network. The digital storage medium may include various storage media such as a USB, an SD, a CD, a DVD, Blueray, an HDD, and an SSD. The transmitter 13 may include an element for generating a media file through a predetermined file format and an element for transmission through a broadcast/communication network. The receiver 21 can extract a bitstream and transmit the bitstream to the decoding apparatus 22.

The decoding apparatus 22 can decode a video/image by performing a series of procedures such as inverse quantization, inverse transform and prediction corresponding to operation of the encoding apparatus 12.

The renderer 23 can render the decoded video/image. The rendered video/image can be display through a display.

FIG. 2 is a schematic block diagram of an encoding apparatus which encodes a video/image signal as an embodiment to which the present disclosure is applied. The encoding apparatus 100 may correspond to the encoding apparatus 12 of FIG. 1.

An image partitioning unit 110 can divide an input image (or a picture or a frame) input to the encoding apparatus 100 into one or more processing units. For example, the processing unit may be called a coding unit (CU). In this case, the coding unit can be recursively segmented from a coding tree unit (CTU) or a largest coding unit (LCU) according to a quad-tree binary-tree (QTBT) structure. For example, a single coding unit can be segmented into a plurality of coding units with a deeper depth on the basis of the quad-tree structure and/or the binary tree structure. In this case, the quad-tree structure may be applied first and then the binary tree structure may be applied. Alternatively, the binary tree structure may be applied first. A coding procedure according to the present disclosure can be performed on the basis of a final coding unit that is no longer segmented. In this case, a largest coding unit may be directly used as the final coding unit or the coding unit may be recursively segmented into coding units with a deeper depth and a coding unit having an optimal size may be used as the final coding unit as necessary on the basis of coding efficiency according to image characteristics. Here, the coding procedure may include procedures such as prediction, transform and reconstruction which will be described later. Alternatively, the processing unit may further include a prediction unit (PU) or a transform unit (TU). In this case, the prediction unit and the transform unit can be segmented or partitioned from the aforementioned final coding unit. The prediction unit may be a unit of sample prediction and the transform unit may be a unit of deriving a transform coefficient and/or a unit of deriving a residual signal from a transform coefficient.

A unit may be interchangeably used with the term "block" or "area". Generally, an M×N block represents a set of samples or transform coefficients in M columns and N rows. A sample can generally represent a pixel or a pixel value and may represent only a pixel/pixel value of a luma component or only a pixel/pixel value of a chroma component. The sample can be used as a term corresponding to a picture (image), a pixel or a pel.

The encoding apparatus 100 may generate a residual signal (a residual block or a residual sample array) by subtracting a predicted signal (a predicted block or a predicted sample array) output from an inter-prediction unit 180 or an intra-prediction unit 185 from an input video signal (an original block or an original sample array), and the generated residual signal is transmitted to the transform unit 120. In this case, a unit which subtracts the predicted signal (predicted block or predicted sample array) from the input video signal (original block or original sample array) in the encoder 100 may be called a subtractor 115, as shown. A predictor can perform prediction on a processing target block (hereinafter referred to as a current block) and generate a predicted block including predicted samples with respect to the current block. The predictor can determine whether intra-prediction or inter-prediction is applied to the current block or units of CU. The predictor can generate various types of information about prediction, such as prediction mode information, and transmit the information to an entropy encoding unit 190 as described later in description of each prediction mode. Information about prediction can be encoded in the entropy encoding unit 190 and output in the form of a bitstream.

The intra-prediction unit 185 can predict a current block with reference to samples in a current picture. Referred samples may neighbor the current block or may be separated therefrom according to a prediction mode. In intra-prediction, prediction modes may include a plurality of nondirectional modes and a plurality of directional modes. The nondirectional modes may include a DC mode and a planar mode, for example. The directional modes may include, for example, 33 directional prediction modes or 65 directional prediction modes according to a degree of minuteness of prediction direction. However, this is exemplary and a number of directional prediction modes equal to or greater than 65 or equal to or less than 33 may be used according to settings. The intra-prediction unit 185 may determine a prediction mode to be applied to the current block using a prediction mode applied to neighbor blocks.

The inter-prediction unit 180 can derive a predicted block with respect to the current block on the basis of a reference block (reference sample array) specified by a motion vector on a reference picture. Here, to reduce the quantity of motion information transmitted in an inter-prediction mode, motion information can be predicted in units of block, subblock or sample on the basis of correlation of motion information between a neighboring block and the current block. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU) and the reference picture including the temporal neighboring block may be called a collocated picture (colPic). For example, the inter-prediction unit 180 may form a motion information candidate list on the basis of neighboring blocks and generate information indicating which candidate is used to derive a motion vector and/or a reference picture index of the current block. Inter-prediction can be performed on the basis of various prediction modes, and in the case of a skip mode and a merge mode, the inter-prediction unit 180 can use motion information of a neighboring block as motion information of the current block. In the case of the skip mode, a residual signal may not be transmitted differently from the merge mode. In the case of a motion vector prediction (MVP) mode, the motion vector of the current block can be indicated by using a motion vector of a neighboring block as a motion vector predictor and signaling a motion vector difference.

A predicted signal generated through the inter-prediction unit 180 or the intra-prediction unit 185 can be used to generate a reconstructed signal or a residual signal.

The transform unit 120 can generate transform coefficients by applying a transform technique to a residual signal.

For example, the transform technique may include at least one of DCT (Discrete Cosine Transform), DST (Discrete Sine Transform), KLT (Karhunen-Loeve Transform), GBT (Graph-Based Transform) and CNT (Conditionally Non-linear Transform). Here, GBT refers to transform obtained from a graph representing information on relationship between pixels. CNT refers to transform obtained on the basis of a predicted signal generated using all previously reconstructed pixels. Further, the transform process may be applied to square pixel blocks having the same size or applied to non-square blocks having variable sizes.

A quantization unit 130 may quantize transform coefficients and transmit the quantized transform coefficients to the entropy encoding unit 190, and the entropy encoding unit 190 may encode a quantized signal (information about the quantized transform coefficients) and output the encoded signal as a bitstream. The information about the quantized transform coefficients may be called residual information. The quantization unit 130 may rearrange the quantized transform coefficients in the form of a block into the form of a one-dimensional vector on the basis of a coefficient scan order and generate information about the quantized transform coefficients on the basis of the quantized transform coefficients in the form of a one-dimensional vector. The entropy encoding unit 190 can execute various encoding methods such as exponential Golomb, CAVLC (context-adaptive variable length coding) and CABAC (context-adaptive binary arithmetic coding), for example. The entropy encoding unit 190 may encode information necessary for video/image reconstruction (e.g., values of syntax elements and the like) along with or separately from the quantized transform coefficients. Encoded information (e.g., video/image information) may be transmitted or stored in the form of a bitstream in network abstraction layer (NAL) unit. The bitstream may be transmitted through a network or stored in a digital storage medium. Here, the network may include a broadcast network and/or a communication network and the digital storage medium may include various storage media such as a USB, an SD, a CD, a DVD, Blueray, an HDD and an SSD. A transmitter (not shown) which transmits the signal output from the entropy encoding unit 190 and/or a storage (not shown) which stores the signal may be configured as internal/external elements of the encoding apparatus 100, and the transmitter may be a component of the entropy encoding unit 190.

The quantized transform coefficients output from the quantization unit 130 can be used to generate a predicted signal. For example, a residual signal can be reconstructed by applying inverse quantization and inverse transform to the quantized transform coefficients through an inverse quantization unit 140 and an inverse transform unit 150 in the loop. An adder 155 can add the reconstructed residual signal to the predicted signal output from the inter-prediction unit 180 or the intra-prediction unit 185 such that a reconstructed signal (reconstructed picture, reconstructed block or reconstructed sample array) can be generated. When there is no residual with respect to a processing target block as in a case in which the skip mode is applied, a predicted block can be used as a reconstructed block. The adder 155 may also be called a reconstruction unit or a reconstructed block generator. The generated reconstructed signal can be used for intra-prediction of the next processing target block in the current picture or used for inter-prediction of the next picture through filtering which will be described later.

A filtering unit 160 can improve subjective/objective picture quality by applying filtering to the reconstructed signal. For example, the filtering unit 160 can generate a modified reconstructed picture by applying various filtering methods to the reconstructed picture and transmit the modified reconstructed picture to a decoded picture buffer 170. The various filtering methods may include, for example, deblocking filtering, sample adaptive offset, adaptive loop filtering, and bilateral filtering. The filtering unit 160 can generate various types of information about filtering and transmit the information to the entropy encoding unit 190 as will be described later in description of each filtering method. Information about filtering may be encoded in the entropy encoding unit 190 and output in the form of a bitstream.

The modified reconstructed picture transmitted to the decoded picture buffer 170 can be used as a reference picture in the inter-prediction unit 180. Accordingly, the encoding apparatus can avoid mismatch between the encoding apparatus 100 and the decoding apparatus and improve encoding efficiency when inter-prediction is applied.

The decoded picture buffer 170 can store the modified reconstructed picture such that the modified reconstructed picture is used as a reference picture in the inter-prediction unit 180.

FIG. 3 is a schematic block diagram of a decoding apparatus which performs decoding of a video signal as an embodiment to which the present disclosure is applied. The decoding apparatus 200 of FIG. 3 corresponds to the decoding apparatus 22 of FIG. 1.

Referring to FIG. 3, the decoding apparatus 200 may include an entropy decoding unit 210, an inverse quantization unit 220, an inverse transform unit 230, an adder 235, a filtering unit 240, a decoded picture buffer (DPB) 250, an inter-prediction unit 260, and an intra-prediction unit 265. The inter-prediction unit 260 and the intra-prediction unit 265 may be collectively called a predictor. That is, the predictor can include the inter-prediction unit 180 and the intra-prediction unit 185. The inverse quantization unit 220 and the inverse transform unit 230 may be collectively called a residual processor. That is, the residual processor can include the inverse quantization unit 220 and the inverse transform unit 230. The aforementioned entropy decoding unit 210, inverse quantization unit 220, inverse transform unit 230, adder 235, filtering unit 240, inter-prediction unit 260 and intra-prediction unit 265 may be configured as a single hardware component (e.g., a decoder or a processor) according to an embodiment. Further, the decoded picture buffer 250 may be configured as a single hardware component (e.g., a memory or a digital storage medium) according to an embodiment.

When a bitstream including video/image information is input, the decoding apparatus 200 can reconstruct an image through a process corresponding to the process of processing the video/image information in the encoding apparatus 100 of FIG. 2. For example, the decoding apparatus 200 can perform decoding using a processing unit applied in the encoding apparatus 100. Accordingly, a processing unit of decoding may be a coding unit, for example, and the coding unit can be segmented from a coding tree unit or a largest coding unit according to a quad tree structure and/or a binary tree structure. In addition, a reconstructed video signal decoded and output by the decoding apparatus 200 can be reproduced through a reproduction apparatus.

The decoding apparatus 200 can receive a signal output from the encoding apparatus 100 of FIG. 2 in the form of a bitstream, and the received signal can be decoded through the entropy decoding unit 210. For example, the entropy decoding unit 210 can parse the bitstream to derive information (e.g., video/image information) necessary for image reconstruction (or picture reconstruction). For example, the entropy decoding unit 210 can decode information in the bitstream on the basis of a coding method such as exponential Golomb, CAVLC or CABAC and output syntax element values necessary for image reconstruction and quantized values of transform coefficients with respect to residual. More specifically, the CABAC entropy decoding method receives a bin corresponding to each syntax element in the bitstream, determines a context model using decoding target syntax element information and decoding information of neighboring and decoding target blocks or information on symbols/bins decoded in a previous stage, predicts bin generation probability according to the determined context model and performs arithmetic decoding of bins to generate a symbol corresponding to each syntax element value. Here, the CABAC entropy decoding method dan update the context model using information on symbols/bins decoded for the next symbol/bin context model after the context model is determined. Information about prediction among the information decoded in the entropy decoding unit 210 can be provided to the predictor (inter-prediction unit 260 and the intra-prediction unit 265) and residual values on which entropy decoding has been performed in the entropy decoding unit 210, that is, quantized transform coefficients, and related parameter information can be input to the inverse quantization unit 220. Further, information about filtering among the information decoded in the entropy decoding unit 210 can be provided to the filtering unit 240. Meanwhile, a receiver (not shown) which receives a signal output from the encoding apparatus 100 may be additionally configured as an internal/external element of the decoding apparatus 200 or the receiver may be a component of the entropy decoding unit 210.

The inverse quantization unit 220 can inversely quantize the quantized transform coefficients to output transform coefficients. The inverse quantization unit 220 can rearrange the quantized transform coefficients in the form of a two-dimensional block. In this case, rearrangement can be performed on the basis of the coefficient scan order in the encoding apparatus 100. The inverse quantization unit 220 can perform inverse quantization on the quantized transform coefficients using a quantization parameter (e.g., quantization step size information) and acquire transform coefficients.

The inverse transform unit 230 inversely transforms the transform coefficients to obtain a residual signal (residual block or residual sample array).

The predictor can perform prediction on a current block and generate a predicted block including predicted samples with respect to the current block. The predictor can determine whether intra-prediction or inter-prediction is applied to the current block on the basis of the information about prediction output from the entropy decoding unit 210 and determine a specific intra/inter-prediction mode.

The intra-prediction unit 265 can predict the current block with reference to samples in a current picture. The referred samples may neighbor the current block or may be separated from the current block according to a prediction mode. In intra-prediction, prediction modes may include a plurality of nondirectional modes and a plurality of directional modes. The intra-prediction 265 may determine a prediction mode applied to the current block using a prediction mode applied to neighboring blocks.

The inter-prediction unit 260 can derive a predicted block with respect to the current block on the basis of a reference block (reference sample array) specified by a motion vector on a reference picture. Here, to reduce the amount of motion information transmitted in the inter-prediction mode, the motion information can be predicted in units of block, subblock or sample on the basis of correlation of the motion information between a neighboring block and the current block. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. For example, the inter-prediction unit 260 may form a motion information candidate list on the basis of neighboring blocks and derive the motion vector and/or the reference picture index of the current block on the basis of received candidate selection information. Inter-prediction can be performed on the basis of various prediction modes and the information about prediction may include information indicating the inter-prediction mode for the current block.

The adder 235 can generate a reconstructed signal (reconstructed picture, reconstructed block or reconstructed sample array) by adding the obtained residual signal to the predicted signal (predicted block or predicted sample array) output from the inter-prediction unit 260 or the intra-prediction unit 265. When there is no residual with respect to the processing target block as in a case in which the skip mode is applied, the predicted block may be used as a reconstructed block.

The adder 235 may also called a reconstruction unit or a reconstructed block generator. The generated reconstructed signal can be used for intra-prediction of the next processing target block in the current picture or used for inter-prediction of the next picture through filtering which will be described later.

The filtering unit 240 can improve subjective/objective picture quality by applying filtering to the reconstructed signal. For example, the filtering unit 240 can generate a modified reconstructed picture by applying various filtering methods to the reconstructed picture and transmit the modified reconstructed picture to a decoded picture buffer 250. The various filtering methods may include, for example, deblocking filtering, sample adaptive offset (SAO), adaptive loop filtering (ALF), and bilateral filtering.

The modified reconstructed picture transmitted to the decoded picture buffer 250 can be used as a reference picture by the inter-prediction unit 260.

In the present description, embodiments described in the filtering unit 160, the inter-prediction unit 180 and the intra-prediction unit 185 of the encoding apparatus 100 can be applied to the filtering unit 240, the inter-prediction unit 260 and the intra-prediction unit 265 of the decoding apparatus equally or in a corresponding manner.

FIG. 4 is a configuration diagram of a content streaming system as an embodiment to which the present disclosure is applied.

The content streaming system to which the present disclosure is applied may include an encoding server 410, a streaming server 420, a web server 430, a media storage 440, a user equipment 450, and multimedia input devices 460.

The encoding server 410 serves to compress content input from multimedia input devices such as a smartphone, a camera and a camcorder into digital data to generate a bitstream and transmit the bitstream to the streaming server 420. As another example, when the multimedia input devices 460 such as a smartphone, a camera and a camcorder directly generate bitstreams, the encoding server 410 may be omitted.

The bitstream may be generated by an encoding method or a bitstream generation method to which the present disclosure is applied and the streaming server 420 can temporarily store the bitstream in the process of transmitting or receiving the bitstream.

The streaming server 420 transmits multimedia data to the user equipment 450 on the basis of a user request through the web server 430 and the web server 430 serves as a medium that informs a user of services. When the user sends a request for a desired service to the web server 430, the web server 430 delivers the request to the streaming server 420 and the streaming server 420 transmits multimedia data to the user. Here, the content streaming system may include an additional control server, and in this case, the control server serves to control commands/responses between devices in the content streaming system.

The streaming server 420 may receive content from the media storage 440 and/or the encoding server 410. For example, when content is received from the encoding server 410, the streaming server 420 can receive the content in real time. In this case, the streaming server 420 may store bitstreams for a predetermined time in order to provide a smooth streaming service.

Examples of the user equipment 450 may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

FIG. 5 shows embodiments to which the present disclosure is applicable, FIG. 5a is a diagram for describing a block segmentation structure according to QT (Quad Tree), FIG. 5b is a diagram for describing a block segmentation structure according to BT (Binary Tree) and FIG. 5c is a diagram for describing a block segmentation structure according to TT (Ternary Tree).

In video coding, a single block can be segmented on the basis of QT. Further, a single subblock segmented according to QT can be further recursively segmented using QT. A leaf block that is no longer segmented according to QT can be segmented using at least one of BT, TT and AT. BT may have two types of segmentation: horizontal BT (2N×N, 2N×N); and vertical BT (N×2N, N×2N). TT may have two types of segmentation: horizontal TT (2N×1/2N, 2N×N, 2N×1/2N); and vertical TT (1/2N×2N, N×2N, 1/2N×2N). AT may have four types of segmentation: horizontal-up AT (2N×1/2N, 2N×3/2N); horizontal-down AT (2N×3/2N, 2N×1/2N); vertical-left AT (1/2N×2N, 3/2N×2N); and vertical-right AT (3/2N×2N, 1/2N×2N). Each type of BT, TT and AT can be further recursively segmented using BT, TT and AT.

FIG. 5a shows an example of QT segmentation. A block A can be segmented into four subblocks A0, A1, A2 and A3 according to QT. The subblock A1 can be further segmented into four subblocks B0, B1, B2 and B3 according to QT.

FIG. 5b shows an example of BT segmentation. The block B3 that is no longer segmented according to QT can be segmented into vertical BT (C0 and C1) or horizontal BT (D0 and D1). Each subblock such as the block C0 can be further recursively segmented into horizontal BT (E0 and E1) or vertical BT (F0 and F1).

FIG. 5c shows an example of TT segmentation. The block B3 that is no longer segmented according to QT can be segmented into vertical TT (C0, C1 and C2) or horizontal TT (D0, D1 and D2). Each subblock such as the block C1 can be further recursively segmented into horizontal TT (E0, E1 and E2) or vertical TT (F0, F1 and F2).

FIG. 5d shows an example of AT segmentation. The block B3 that is no longer segmented according to QT can be segmented into vertical AT (C0 and C1) or horizontal AT (D0 and D1). Each subblock such as the block C1 can be further recursively segmented into horizontal AT (E0 and E1) or vertical TT (F0 and F1).

Meanwhile, BT, TT and AT segmentation may be used in a combined manner. For example, a subblock segmented according to BT may be segmented according to TT or AT. Further, a subblock segmented according to TT may be segmented according to BT or AT. A subblock segmented according to AT may be segmented according to BT or TT. For example, each subblock may be segmented into vertical BT after horizontal BT segmentation or each subblock may be segmented into horizontal BT after vertical BT segmentation. In this case, finally segmented shapes are identical although segmentation orders are different.

Further, when a block is segmented, a block search order can be defined in various manners. In general, search is performed from left to right and top to bottom, and block search may mean the order of determining whether each segmented subblock will be additionally segmented, an encoding order of subblocks when the subblocks are no longer segmented, or a search order when a subblock refers to information of neighboring other blocks.

Transform may be performed on processing units (or transform blocks) segmented according to the segmentation structures as shown in FIGS. 5a to 5d, and particularly, segmentation may be performed in a row direction and a column direction and a transform matrix may be applied. According to an embodiment of the present disclosure, different transform types may be used according to the length of a processing unit (or transform block) in the row direction or column direction.

Transform is applied to residual blocks in order to decorrelate the residual blocks as much as possible, concentrate coefficients on a low frequency and generate a zero tail at the end of a block. A transform part in JEM software includes two principal functions (core transform and secondary transform). Core transform is composed of discrete cosine transform (DCT) and discrete sine transform (DST) transform families applied to all rows and columns of a residual block. Thereafter, secondary transform may be additionally applied to a top left corner of the output of core transform. Similarly, inverse transform may be applied in the order of inverse secondary transform and inverse core transform. First, inverse secondary transform can be applied to a left top corner of a coefficient block. Then, inverse core transform is applied to rows and columns of the output of inverse secondary transform. Core transform or inverse transform may be referred to as primary transform or inverse transform.

FIGS. 6 and 7 show embodiments to which the present disclosure is applied, FIG. 6 is a schematic block diagram of a transform and quantization unit 120/130, and an inverse quantization and inverse transform unit 140/150 in the encoding apparatus 100 and FIG. 7 is a schematic block diagram of an inverse quantization and inverse transform unit 220/230 in the decoding apparatus 200.

Referring to FIG. 6, the transform and quantization unit 120/130 may include a primary transform unit 121, a secondary transform unit 122 and a quantization unit 130. The inverse quantization and inverse transform unit 140/150 may include an inverse quantization unit 140, an inverse secondary transform unit 151 and an inverse primary transform unit 152.

Referring to FIG. 7, the inverse quantization and inverse transform unit 220/230 may include an inverse quantization unit 220, an inverse secondary transform unit 231 and an inverse primary transform unit 232.

In the present disclosure, transform may be performed through a plurality of stages. For example, two states of primary transform and secondary transform may be applied as shown in FIG. 6 or more than two transform stages may be used according to algorithms. Here, primary transform may be referred to core transform.

The primary transform unit 121 can apply primary transform to a residual signal. Here, primary transform may be predefined as a table in an encoder and/or a decoder.

The secondary transform unit 122 can apply secondary transform to a primarily transformed signal. Here, secondary transform may be predefined as a table in the encoder and/or the decoder.

In an embodiment, non-separable secondary transform (NSST) may be conditionally applied as secondary transform. For example, NSST is applied only to intra-prediction blocks and may have a transform set applicable per prediction mode group.

Here, a prediction mode group can be set on the basis of symmetry with respect to a prediction direction. For example, prediction mode 52 and prediction mode 16 are symmetrical on the basis of prediction mode 34 (diagonal direction), and thus one group can be generated and the same transform set can be applied thereto. Here, when transform for prediction mode 52 is applied, input data is transposed and then transform is applied because a transform set of prediction mode 52 is the same as that of prediction mode 16.

In the case of the planar mode and the DC mode, there is no symmetry with respect to directions and thus they have respective transform sets and a corresponding transform set may be composed of two transforms. Each transform set may be composed of three transforms for the remaining directional modes.

The quantization unit 130 can perform quantization on a secondarily transformed signal.

The inverse quantization and inverse transform unit 140/150 performs the reverse of the aforementioned procedure and redundant description is omitted.

FIG. 7 is a schematic block diagram of the inverse quantization and inverse transform unit 220/230 in the decoding apparatus 200.

Referring to FIG. 7, the inverse quantization and inverse transform unit 220/230 may include the inverse quantization unit 220, the inverse secondary transform unit 231 and the inverse primary transform unit 232.

The inverse quantization unit 220 obtains transform coefficients from an entropy-decoded signal using quantization step size information.

The inverse secondary transform unit 231 performs inverse secondary transform on the transform coefficients. Here, inverse secondary transform refers to inverse transform of secondary transform described in FIG. 6.

The inverse primary transform unit 232 performs inverse primary transform on the inversely secondarily transformed signal (or block) and obtains a residual signal. Here, inverse primary transform refers to inverse transform of primary transform described in FIG. 6.

In addition to DCT-2 and 4×4 DST-4 applied to HEVC, adaptive multiple transform or explicit multiple transform) (AMT or EMT) is used for residual coding for inter- and intra-coded blocks. A plurality of transforms selected from DCT/DST families is used in addition to transforms in HEVC. Transform matrices newly introduced in JEM are DST-7, DCT-8, DST-1, and DCT-5. The following table 1 shows basic functions of selected DST/DCT.

TABLE 1

| Transform Type | Basis function $T_i(j)$, i, j = 0, 1, . . . , N−1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br><br> where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right),$ <br><br> where $\omega_0 = \begin{cases} \sqrt{\dfrac{2}{N}} & i = 0 \\ 1 & i \neq 0 \end{cases}, \quad \omega_1 = \begin{cases} \sqrt{\dfrac{2}{N}} & j = 0 \\ 1 & j \neq 0 \end{cases},$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |

TABLE 1-continued

| Transform Type | Basis function $T_i(j)$, i, j = 0, 1, . . . , N−1 |
|---|---|
| DST-VII | $T_i(j) = \sqrt{\dfrac{4}{2N+1}} \cdot \sin\left(\dfrac{\pi \cdot (2i+1) \cdot (j+1)}{2N+1}\right)$ |

EMT can be applied to CUs having a width and height equal to or less than 64 and whether EMT is applied can be controlled by a CU level flag. When the CU level flag is 0, DCT-2 is applied to CUs in order to encode residue. Two additional flags are signaled in order to identify horizontal and vertical transforms to be used for a luma coding block in a CU to which EMT is applied. As in HEVC, residual of a block can be coded in a transform skip mode in JEM. For intra-residual coding, a mode-dependent transform candidate selection process is used due to other residual statistics of other intra-prediction modes. Three transform subsets are defined as shown in the following table 2 and a transform subset is selected on the basis of an intra-prediction mode as shown in Table 3.

TABLE 2

| Transform Set | Transform Candidates |
|---|---|
| 0 | DST-VII, DCT-VIII |
| 1 | DST-VII, DST-I |
| 2 | DST-VII, DCT-VIII |

Along with the subset concept, a transform subset is initially confirmed on the basis of Table 2 by using the intra-prediction mode of a CU having a CU-level EMT_CU_flag of 1. Thereafter, for each of horizontal EMT_TU_horizontal_flag) and vertical (EMT_TU_vertical_flag) transforms, one of two transform candidates in the confirmed transform subset is selected on the basis of explicit signaling using flags according to Table 3.

TABLE 3

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

TABLE 4

| Configuration Group | | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |

TABLE 4-continued

| Configuration Group | | Horizontal (row) transform | Vertical (column) transform | 35 intra Prediction modes | 67 intra Prediction modes |
|---|---|---|---|---|---|
| Group 1 | 0 | DST7 | DST7 | 1, 3, 5, 7, 13, 15, 17, 19, | 1, 3, 5, 7, 9, 11, 13, 23, 25, |
| (G1) | 1 | DST1 | DST7 | 21, 23, 29, 31, 33 | 27, 29, 31, 33, 35, 37, 39, |
| | 2 | DST7 | DST1 | | 41, 43, 45, 55, 57, 59, 61, |
| | 3 | DST1 | DST1 | | 63, 65 |
| Group 2 | 0 | DST7 | DST7 | 2, 4, 6, 14, 16, 18, 20, | 2, 4, 6, 8, 10, 12, 24, 26, |
| (G2) | 1 | DCT8 | DST7 | 22, 30, 32, 34 | 28, 30, 32, 34, 36, 38, 40, |
| | 2 | DST7 | DCT8 | | 42, 44, 56, 58, 60, 64, 66 |
| | 3 | DCT8 | DCT8 | | |
| Group 3 | 0 | DST7 | DST7 | 8, 9, 10, 11, 12 | 14, 15, 16, 17, 18, 19, 20, |
| (G3) | 1 | DCT5 | DST7 | (Neighboring angles to | 21, 22 (Neighboring angles |
| | 2 | DST7 | DCT8 | horizontal directions) | to horizontal directions) |
| | 3 | DCT5 | DCT8 | | |
| Group 4 | 0 | DST7 | DST7 | 24, 25, 26, 27, 28 | 46, 47, 48, 49, 50, 51, 52, |
| (G4) | 1 | DCT8 | DST7 | (Neighboring angles to | 53, 54 (Neighboring angles |
| | 2 | DST7 | DCT5 | vertical directions) | to vertical directions) |
| | 3 | DCT8 | DCT5 | | |
| Group 5 | 0 | DCT8 | DCT8 | Inter prediction | Inter prediction |
| (G5) | 1 | DST7 | DCT8 | | |
| | 2 | DCT8 | DST7 | | |
| | 3 | DST7 | DST7 | | |

Table 4 shows a transform configuration group to which adaptive multiple transform (AMT) is applied as an embodiment to which the present disclosure is applied.

Referring to Table 4, transform configuration groups are determined on the basis of a prediction mode and the number of groups may be 6 (G0 to G5). In addition, G0 to G4 correspond to a case in which intra-prediction is applied and G5 represents transform combinations (or transform set or transform combination set) applied to a residual block generated according to inter-prediction.

One transform combination may be composed of horizontal transform (or row transform) applied to rows of a corresponding 2D block and vertical transform (or column transform) applied to columns thereof.

Here, each of the transform configuration groups may have four transform combination candidates. The four transform combination candidates may be selected or determined using transform combination indexes 0 to 3 and a transform combination index may be encoded and transmitted from an encoder to a decoder.

In an embodiment, residual data (or residual signal) obtained through intra-prediction may have different statistical characteristics according to intra-prediction modes. Accordingly, transforms other than normal cosine transform may be applied for respective intra-predictions as shown in Table 4. In the present description, a transform type may be represented as DCT-Type 2, DCT-II or DCT-2, for example.

Referring to Table 4, a case in which 35 intra-prediction modes are used and a case in which 67 intra-prediction modes are used are shown. A plurality of transform combinations may be applied for each transform configuration group classified in each intra-prediction mode column. For example, a plurality of transform combinations may be composed of four combinations (of transforms in the row direction and transforms in the column direction). As a specific example, DST-7 and DCT-5 can be applied to group 0 in both the row (horizontal) direction and the column (vertical) direction and thus a total of four groups can be applied.

Since a total of four transform kernel combinations can be applied to each intra-prediction mode, a transform combination index for selecting one therefrom can be transmitted per transform unit. In the present description, a transform combination index may be referred to as an AMT index and may be represented by amt_idx.

Furthermore, a case in which DCT-2 is optimal for both the row direction and the column direction may be generated due to characteristics of a residual signal in addition to the transform kernels shown in Table 4. Accordingly, transform can be adaptively applied by defining an AMT flag for each coding unit. Here, DCT-2 can be applied to both the row direction and the column direction when the AMT flag is 0 and one of four combinations can be selected or determined through an AMT index when the AMT flag is 1.

In an embodiment, if the number of transform coefficients is less than 3 for one transform unit when the AMT flag is 0, the transform kernels of Table 4 is not applied and DST-7 may be applied to both the row direction and the column direction.

In an embodiment, if transform coefficient values are previously parsed and thus the number of transform coefficients is less than 3, an AMT index is not parsed and DST-7 is applied and thus the amount of transmission of additional information can be reduced.

In an embodiment, AMT can be applied only when both the width and height of a transform unit are equal to or less than 32.

In an embodiment, Table 4 can be preset through off-line training.

In an embodiment, the AMT index can be defined as one index that can indicate a combination of horizontal transform and vertical transform. Alternatively, the AMT index can be defined as separate horizontal transform index and vertical transform index.

FIG. 8 is a flowchart showing a process of performing adaptive multiple transform (AMT).

Although an embodiment with respect to separable transform that is separately applied in the horizontal direction and the vertical direction is basically described in the present description, a transform combination may be composed of non-separable transforms.

Alternatively, a transform combination may be configured as a mixture of separable transforms and non-separable transforms. In this case, row/column-wise transform selection or selection in the horizontal/vertical direction is unnecessary when separable transform is used and the transform combinations of Table 4 can be used only when separable transform is selected.

In addition, methods proposed in the present description can be applied irrespective of primary transform and secondary transform. That is, the methods can be applied to both the transforms. Here, primary transform can refer to transform for initially transforming a residual block and secondary transform can refer to transform for applying transform to a block generated as a result of primary transform.

First, the encoding apparatus 100 can determine a transform group corresponding to a current block (S805). Here, the transform group may refer to a transform group of Table 4 but the present disclosure is not limited thereto and the transform group may be composed of other transform combinations.

The encoding apparatus 100 can perform transform on available candidate transform combinations in the transform group (S810). As a result of transform, the encoding apparatus 100 can determine or select a transform combination with a lowest rate distortion (RD) cost (S815). The encoding apparatus 100 can encode a transform combination index corresponding to the selected transform combination (S820).

FIG. 9 is a flowchart showing a decoding process of performing AMT.

First, the decoding apparatus 200 can determine a transform group for the current block (S905). The decoding apparatus 200 can parse a transform combination index, and the transform combination index can correspond to one of a plurality of transform combinations in the transform group (S910). The decoding apparatus 200 can derive a transform combination corresponding to the transform combination index (S915). Here, although the transform combination may refer to a transform combination shown in Table 4, the present disclosure is not limited thereto. That is, the transform combination may be configured as other transform combinations.

The decoding apparatus 200 can perform inverse transform on the current block on the basis of the transform combination (S920). When the transform combination is composed of row transform and column transform, row transform may be applied and then column transform may be applied. However, the present disclosure is not limited thereto, and row transform may be applied after column transform is applied, and when the transform combination is composed of non-separable transforms, a non-separable transform can be immediately applied.

In another embodiment, the process of determining a transform group and the process of parsing a transform combination index may be simultaneously performed.

In the embodiment of the present disclosure, the aforementioned term "AMT" may be redefined as "multiple transform set or multiple transform selection (MTS)". MTS related syntaxes and semantics described below are summarized in Versatile Video coding (VVC) JVET-K1001-v4.

In an embodiment of the present disclosure, two MTS candidates can be used for directional modes and four MTS candidates can be used for nondirectional modes as follows.
A) Nondirectional Modes (DC and Planar)
DST-7 is used for horizontal and vertical transforms when MTS index is 0.
DST-7 is used for vertical transform and DCT-8 is used for horizontal transforms when MTS index is 1.
DCT-8 is used for vertical transform and DST-7 is used for horizontal transforms when MTS index is 2.

DCT-8 is used for horizontal and vertical transforms when MTS index is 3.
B) Modes Belonging to Horizontal Group Modes DST-7 is used for horizontal and vertical transforms when MTS index is 0.
DCT-8 is used for vertical transform and DST-7 is used for horizontal transforms when MTS index is 1.
C) Modes Belonging to Vertical Group Modes
DST-7 is used for horizontal and vertical transforms when MTS index is 0.
DST-7 is used for vertical transform and DCT-8 is used for horizontal transforms when MTS index is 1.
Here (In VTM 2.0 in which 67 modes are used), horizontal group modes include intra-prediction modes 2 to 34 and vertical modes include intra-prediction modes 35 to 66.

In another embodiment of the present disclosure, three MTS candidates are used for all intra-prediction modes.
DST-7 is used for horizontal and vertical transforms when MTS index is 0.
DST-7 is used for vertical transform and DCT-8 is used for horizontal transforms when MTS index is 1.
DCT-8 is used for vertical transform and DST-7 is used for horizontal transforms when MTS index is 2.

In another embodiment of the present disclosure, two MTS candidates are used for directional prediction modes and three MTS candidates are used for nondirectional modes.
A) Nondirectional Modes (DC and Planar)
DST-7 is used for horizontal and vertical transforms when MTS index is 0.
DST-7 is used for vertical transform and DCT-8 is used for horizontal transforms when MTS index is 1.
DCT-8 is used for vertical transform and DST-7 is used for horizontal transforms when MTS index is 2.
B) Prediction Modes Corresponding to Horizontal Group Modes
DST-7 is used for horizontal and vertical transforms when MTS index is 0.
DCT-8 is used for vertical transform and DST-7 is used for horizontal transforms when MTS index is 1.
C) Prediction Modes Corresponding to Vertical Group Modes
DST-7 is used for horizontal and vertical transforms when MTS index is 0.
DST-7 is used for vertical transform and DCT-8 is used for horizontal transforms when MTS index is 1.

In another embodiment of the present disclosure, one MTS candidate (e.g., DST-7) can be used for all intra-modes. In this case, encoding time can be reduced by 40% with some minor coding loss. In addition, one flag may be used to indicate between DCT-2 and DST-7.

FIG. 10 is a flowchart showing an inverse transform process on the basis of MTS according to an embodiment of the present disclosure.

The decoding apparatus 200 to which the present disclosure is applied can obtain sps_mts_intra_enabled_flag or sps_mts_inter_enabled_flag (S1005). Here, sps_mts_intra_enabled_flag indicates whether cu_mts_flag is present in a residual coding syntax of an intra-coding unit. For example, cu_mts_flag is not present in the residual coding syntax of the intra-coding unit if sps_mts_intra_enabled_flag=0 and cu_mts_flag is present in the residual coding syntax of the intra-coding unit if, sps_mts_intra_enabled_flag=1. In addition, sps_mts_inter_enabled_flag indicates whether cu_mts_flag is present in a residual coding syntax of an inter-coding unit. For example, cu_mts_flag is not present in the residual coding syntax of the inter-coding unit if sps_mts_inter_enabled_flag=0 and cu_mts_flag is present in the residual coding syntax of the inter-coding unit if sps_mts_inter_enabled_flag=1.

The decoding apparatus 200 can obtain cu_mts_flag on the basis of sps_mts_intra_enabled_flag or sps_mts_inter_enabled_flag (S1010). For example, the decoding apparatus 200 can obtain cu_mts_flag when sps_mts_intra_enabled_flag=1 or sps_mts_inter_enabled_flag=1. Here, cu_mts_flag indicates whether MTS is applied to a residual sample of a luma transform block. For example, MTS is not applied to the residual sample of the luma transform block if cu_mts_flag=0 and MTS is applied to the residual sample of the luma transform block if cu_mts_flag=1.

The decoding apparatus 200 can obtain mts_idx on the basis of cu_mts_flag (S1015). For example, when cu_mts_flag=1, the decoding apparatus 200 can obtain mts_idx. Here, mts_idx indicates which transform kernel is applied to luma residual samples of a current transform block in the horizontal direction and/or the vertical direction.

For example, at least one of embodiments described in the present description can be applied to mts_idx.

The decoding apparatus 200 can derive a transform kernel corresponding to mts_idx (S1020). For example, the transform kernel corresponding to mts_idx can be separately defined as horizontal transform and vertical transform.

For example, when MTS is applied to the current block (i.e., cu_mts_flag=1), the decoding apparatus 200 can configure MTS candidates on the basis of the intra-prediction mode of the current block. In this case, the decoding flowchart of FIG. 10 may further include a step of configuring MTS candidates. Then, the decoding apparatus 200 can determine an MTS candidate to be applied to the current block from among the configured MTS candidates using mts_idx.

As another example, different transform kernels can be applied to horizontal transform and vertical transform. However, the present disclosure is not limited thereto and the same transform kernel may be applied to the horizontal transform and vertical transform.

The decoding apparatus 200 can perform inverse transform on the basis of the transform kernel (S1025).

Furthermore, in the specification, MTS may be represented as AMT or EMT and mts_idx may be represented as AMT_idx, EMT_idx, AMT_TU_idx EMT_TU_idx, or the like but the present disclosure is not limited thereto.

The present disclosure is described by being divided into a case in which the MTS is applied and a case in which the MTS is not applied based on the MTS flag, but is not limited to such an expression. For example, whether or not the MTS is applied may mean whether to use other transform types (or transform kernels) other than a predefined specific transform type (which may be referred to as a basic transform type, a default transform type, etc.). If the MTS is applied, other transform types (e.g., any one transform type or a combined transform type of two or more transform types among a plurality of transform types) other than a basic transform type may be used for a transform. Further, if the MTS is not applied, the basic transform type may be used for the transform. In an embodiment, the basic transform type may be configured (or defined) as DCT2.

As an example, when a MTS flag syntax indicating whether or not the MTS is applied to a current transform block and the MTS are applied, a MTS index syntax indicating a transform type applied to the current transform block may also be individually transmitted from an encoder to a decoder. As another example, when whether or not the MTS is applied to a current transform block and the MTS are applied, a syntax (e.g., MTS index) including all of transform types applied to the current transform block may also be transmitted from an encoder to a decoder. That is, in the latter example, a syntax (or syntax element) indicating a transform type applied to the current transform block (or unit) may be transmitted from the encoder to the decoder within all of transform type groups (or transform type sets) including the above-described basic transform type.

Accordingly, in spite of the expression, a syntax (MTS index) indicating a transform type applied to the current transform block may include information about whether or not the MTS is applied. In other words, in the latter example, only the MTS index may be signalled without the MTS flag, and in this case, it may be understood that DCT2 is included in the MTS. However, in the present disclosure, it may be described that the application of DCT2 means that the MTS is not applied. Nevertheless, the technical range with respect to the MTS is not limited to the corresponding definition.

FIG. 11 is a block diagram of an apparatus that performs decoding on the basis of MTS according to an embodiment of the present disclosure.

The decoding apparatus 200 to which the present disclosure is applied may include a sequence parameter acquisition unit 1105, an MTS flag acquisition unit 1110, an MTS index acquisition unit 1115, and a transform kernel derivation unit 1120.

The sequent parameter acquisition unit 1105 can acquire sps_mts_intra_enabled_flag or sps_mts_inter_enabled_flag. Here, sps_mts_intra_enabled_flag indicates whether cu_mts_flag is present in a residual coding syntax of an intra-coding unit and sps_mts_inter_enabled_flag indicates whether cu_mts_flag is present in a residual coding syntax of an inter-coding unit. Description with reference to FIG. 10 may be applied to a specific example.

The MTS flag acquisition unit 1110 can acquire cu_mts_flag on the basis of sps_mts_intra_enabled_flag or sps_mts_inter_enabled_flag. For example, the MTS flag acquisition unit 1110 can acquire cu_mts_flag when sps_mts_intra_enabled_flag=1 or sps_mts_inter_enabled_flag=1. Here, cu_mts_flag indicates whether MTS is applied to a residual sample of a luma transform block. Description with reference to FIG. 10 may be applied to a specific example.

The MTS index acquisition unit 1115 can acquire mts_idx on the basis of cu_mts_flag. For example, the MTS index acquisition unit 1115 can acquire mts_idx when cu_mts_flag=1. Here, mts_idx indicates which transform kernel is applied to luma residual samples of the current transform block in the horizontal direction and/or the vertical direction. Description with reference to FIG. 10 may be applied to a specific example.

The transform kernel derivation unit 1120 can derive a transform kernel corresponding to mts_idx. Then, the decoding apparatus 200 can perform inverse transform on the basis of the derived transform kernel.

Mode-dependent non-separable secondary transform (MDNSST) is introduced. To maintain low complexity, MDNSST is applied to only low-frequency coefficients after primary transform. Further, non-separable transform chiefly applied to low-frequency coefficients may be called LFNST (low frequency non-separable transform). If both the width (W) and height (H) of a transform coefficient block are equal to or greater than 8, 8×8 non-separable secondary transform is applied to an 8×8 left top region of the transform coefficient block. 4×4 non-separable secondary transform is applied if the width or height is less than 8, and the 4×4 non-separable secondary transform can be performed on left top min (8, W)×min (8, H) of the transform coefficient block. Here, min (A, B) is a function of outputting a smaller value between A and B. Further, W×H is the block size, W represents the width and H represents the height.

A total of 35×3 non-separable secondary transforms may be present for block sizes 4×4 and 8×8. Here, 35 is the number of transform sets specified by intra-prediction modes and 3 is the number of NSST candidates for each prediction mode. Mapping from intra-prediction modes to transform sets may be defined in the following table 5.

TABLE 5

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| intra mode | 51 | 52 | 53 | 54 | 55 | 56 | 57 | 58 | 59 | 60 | 61 | 62 | 63 | 64 | 65 | 66 | 67(LM) |
| set | 17 | 16 | 15 | 14 | 13 | 12 | 11 | 10 | 9 | 8 | 7 | 6 | 5 | 4 | 3 | 2 | NULL |

In order to indicate a transform kernel among transform sets, an NSST index (NSST idx) can be coded. When NSST is not applied, NSST index equal to 0 is signalled.

FIGS. 12 and 13 are flowcharts showing encoding/decoding to which secondary transform is applied as an embodiment to which present disclosure is applied.

In JEM, secondary transform (MDNSST) is not applied for a block coded with transform skip mode. When the MDNSST index is signalled for a CU and not equal to zero, MDNSST is not used for a block of a component that is coded with transform skip mode in the CU. The overall coding structure including coefficient coding and NSST index coding is shown in FIGS. 12 and 13. A CBF flag is encoded to determine whether coefficient coding and NSST coding are performed. In FIGS. 12 and 13, the CBF flag can represent a luma block cbg flag (cbf_luma flag) or a chroma block cbf flag (cbf_cb flag or cbf_cr flag). When the CBF flag is 1, transform coefficients are coded.

Referring to FIG. 12, the encoding apparatus 100 checks whether CBF is 1 (S1205). If CBF is 0, the encoding apparatus 100 does not perform transform coefficient encoding and NSST index encoding. If CBF is 1, the encoding apparatus 100 performs encoding on transform coefficients (S1210). Thereafter, the encoding apparatus 100 determines whether to perform NSST index coding (S1215) and performs NSST index coding (S1220). When NSST index coding is not applied, the encoding apparatus 100 can end the transform procedure without applying NSST and perform the subsequent step (e.g., quantization).

Referring to FIG. 13, the decoding apparatus 200 checks whether CBF is 1 (S1305). If CBF is 0, the decoding apparatus 200 does not perform transform coefficient decoding and NSST index decoding. If CBF is 1, the decoding apparatus 200 performs decoding on transform coefficients (S1310). Thereafter, the decoding apparatus 200 determines whether to perform NSST index coding (S1315) and parse an NSST index (S1320).

NSST can be applied to an 8×8 or 4×4 left top region instead of being applied to the entire block (TU in the case of HEVC) to which primary transform has been applied. For example, 8×8 NSST can be applied when a block size is 8×8 or more and 4×4 NSST can be applied when a block size is less than 8×8. Further, when 8×8 NSST is applied, 4×4 NSST can be applied per 4×4 block. Both 8×8 NSST and 4×4 NSST can be determined according to the above-described transform set configuration, and 8×8 NSST may have 64 pieces of input data and 64 pieces of output data and 4×4 NSST may have 16 inputs and 16 outputs because they are non-separable transforms.

FIGS. 14 and 15 show an embodiment to which the present disclosure is applied, FIG. 14 is a diagram for describing Givens rotation and FIG. 15 shows a configuration of one round in 4×4 NSST composed of Givens rotation layers and permutations.

Both 8×8 NSST and 4×4 NSST can be configured as hierarchical combinations of Givens rotations. A matrix corresponding to one Givens rotation is represented as Equation 1 and a matrix product is represented as FIG. 14.

$$R_\theta = \begin{bmatrix} \cos\theta & -\sin\theta \\ \sin\theta & \cos\theta \end{bmatrix} \qquad \text{[Equation 1]}$$

In FIG. 14, $t_m$ and $t_n$ output according to Givens rotation can be calculated as represented by Equation 2.

$$t_m = x_m\cos\theta - x_n\sin\theta \qquad \text{[Equation 2]}$$
$$t_n = x_m\sin\theta + x_n\cos\theta$$

Since Givens rotation rotates two pieces of data as shown in FIG. 14, 32 or 8 Givens rotations are required to process 64 (in the case of 8×8 NSST) or 16 (in the case of 4×4 NSST) pieces of data. Accordingly, a group of 32 or 8 Givens rotations can form a Givens rotation layer. As shown in FIG. 15, output data for one Givens rotation layer is transmitted as input data for the next Givens rotation layer through permutation (shuffling). A pattern permuted as shown in FIG. 15 is regularly defined, and in the case of 4×3 NSST, four Givens rotation layers and corresponding permutations form one round. 4×4 NSST is performed by two rounds and 8×8 NSST is performed by four rounds. Although different rounds use the same permutation pattern, applied Givens rotation angles are different. Accordingly, angle data for all Givens rotations constituting each permutation needs to be stored.

As a final step, one more permutation is finally performed on data output through Givens rotation layers, and information about corresponding permutation is separately stored for each permutation. Corresponding permutation is performed at the end of forward NSST and corresponding reverse permutation is initially applied in inverse NSST.

Reverse NSST reversely performs Givens rotation layers and permutations applied to forward NSST and performs rotation by taking a negative value for each Given rotation angle.

RST (Reduced Secondary Transform)

FIG. 16 shows operation of RST as an embodiment to which the present disclosure is applied.

When an orthogonal matrix representing a transform is N×N, a reduced transform (RT) leaves only R of N transform basic vectors (R<N). A matrix with respect to forward RT that generates transform coefficients can be defined by Equation 3.

$$T_{RXN} = \begin{bmatrix} t_{11} & \cdots & t_{1N} \\ \vdots & \ddots & \vdots \\ t_{R1} & \cdots & t_{RN} \end{bmatrix} \qquad \text{[Equation 3]}$$

Since a matrix with respect to reverse RT is a transpose matrix of a forward RT matrix, application of forward RT and reverse RT is schematized as shown in FIGS. 14a and 14b.

RT applied to an 8×8 left top block of a transform coefficient block to which primary transform has been applied can be referred to as 8×8 RST. When R is set to 16 in Mathematical expression 3, forward 8×8 RST has a form of 16×64 matrix and reverse 8×8 RST has a form of 64×16 matrix. Further, the transform set configuration as shown in Table 5 can be applied to 8×8 RST. That is, 8×8 RST can be determined on the basis of transform sets according to intra-prediction modes as shown in Table 5. Since one transform set is composed of two or three transforms according to an intra-prediction mode, one of a maximum of four transforms including a case in which secondary transform is not applied can be selected (one transform can correspond to an anisotropic matrix). When indices 0, 1, 2 and 3 are assigned to the four transforms, a transform to be applied can be designated by signaling a syntax element corresponding to an NSST index for each transform coefficient block. For example, the index 9 can assigned to an anisotropic matrix, that is, a case in which secondary transform is not applied. Consequently, 8×8 NSST can be designated according to JEM NSST and 8×8 RST can be designated according to RST configuration for an 8×8 left top block through the NSST index.

FIG. 17 is a diagram showing a process of performing reverse scanning from the sixty-fourth coefficient to the seventeenth coefficient in reverse scan order as an embodiment to which the present disclosure is applied.

When 8×8 RST as represented by Mathematical expression 3 is applied, 16 valid transform coefficients are generated and thus 64 pieces of input data constituting an 8×8 region are reduced to 16 pieces of output data and only a quarter region is filled with valid transform coefficients according to the viewpoint of two-dimensional region. Accordingly, the 16 pieces of output data obtained by applying forward 8×8 RST fill a left top region of FIG. 17.

In FIG. 17, a 4×4 left top region becomes a region of interest (ROI) filled with valid transform coefficients and the remaining region is vacant. The vacant region may be filled with 0 as a default value. If non-zero valid transform coefficients are discovered in regions other than the ROI of FIG. 17, 8×8 RST has not been definitely applied and thus corresponding coding may be omitted for corresponding NSST index. On the other hand, if non-zero valid transform coefficients are not discovered in regions other than the ROI of FIG. 17 (8×8 RST is applied or regions other than the ROI are filled with 0), the NSST index may be coded because 8×8 RST might be applied. Such conditional NSST index coding requires checking presence or absence of a non-zero transform coefficient and thus can be performed after the residual coding process.

FIG. 18 is an exemplary flowchart showing encoding using a single transform indicator as an embodiment to which the present disclosure is applied.

In an embodiment of the present disclosure, the single transform indicator (STI) is introduced. A single transform can be applied when the STI is enabled (STI coding==1) instead of sequentially used two transforms (primary transform and secondary transform). Here, the single transform may be any type of transform. For example, the single transform may be a separable transform or a non-separable transform. The single transform may be a transform approximated from a non-separable transform. A single transform index (ST_idx in FIG. 18) can be signaled when the STI has been enabled. Here, the single transform index can indicate a transform to be applied form among available transform candidates.

Referring to FIG. 18, the encoding apparatus 100 determines whether CBF is 1 (S1805). When CBF is 1, the encoding apparatus 100 determines whether STI coding is applied (S1810). When STI coding is applied, the encoding apparatus 100 encodes an STI index STI_idx (S1845) and performs coding on transform coefficient (S1850). When STI coding is not applied, the encoding apparatus 100 encodes a flag EMT_CU_Flag indicating whether EMT (or MTS) is applied at a CU level (S1815). Thereafter, the encoding apparatus 100 performs coding on the transform coefficients (S1820). Then, the encoding apparatus 100 determines whether EMT is applied to a transform unit (TU) (S1825). When EMT is applied to the TU, the encoding apparatus 100 encodes a primary transform index EMT_TU Idx applied to the TU (S1830). Subsequently, the encoding apparatus 100 determines whether NSST is applied (S1835). When NSST is applied, the encoding apparatus 100 encodes an index NSST_Idx indicating NSST to be applied (S1840).

In an example, if single transform coding conditions are satisfied/enabled (e.g., STI_coding==1), the single transform index ST_Idx may be implicitly derived instead of being signaled. ST_idx can be implicitly determined on the basis of a block size and an intra-prediction mode. Here, ST_Idx can indicate a transform (or transform kernel) applied to the current transform block.

The STI can be enabled if one or more of the following conditions are satisfied (STI_coding==1).

1) The block size corresponds to a predetermined value such as 4 or 8.
2) Block width==Block height (square block)
3) The intra-prediction mode is one of predetermined modes such as DC and planar modes.

In another example, the STI coding flag can be signaled in order to indicate whether the single transform is applied. The STI coding flag can be signaled on the basis of an STI coding value and CBF. For example, the STI coding flag can be signaled when CBF is 1 and STI coding is enabled. Furthermore, the STI coding flag can be conditionally signaled in consideration of a block size, a block shape (square block or non-square block) or an intra-prediction mode.

To use information acquired during coefficient coding, ST_idx may be determined after coefficient coding. In an example, ST_idx can be implicitly determined on the basis of a block size, an intra-prediction mode and the number of non-zero coefficients. In another example, ST_idx can be conditionally encoded/decoded on the basis of a block size, a block shape, an intra-prediction mode and/or the number of non-zero coefficients. In another example, ST_idx signaling may be omitted depending on a distribution of non-zero coefficients (i.e., positions of non-zero coefficients). Particularly, when non-zero coefficients are discovered in a region other than a 4×4 left top region, ST_idx signaling can be omitted.

FIG. 19 is an exemplary flowchart showing encoding using a unified transform indicator (UTI) as an embodiment to which the present disclosure is applied.

In an embodiment of the present disclosure, the unified transform indicator is introduced. The UTI includes a primary transform indicator and a secondary transform indicator.

Referring to FIG. 19, the encoding apparatus 100 determines whether CBF is 1 (S1905). When CBF is 1, the encoding apparatus 100 determines whether UTI coding is applied (S1910). When UTI coding is applied, the encoding apparatus 100 encodes a UTI index UTI_idx (S1945) and performs coding on transform coefficient (S1950). When UTI coding is not applied, the encoding apparatus 100 encodes the flag EMT_CU_Flag indicating whether EMT (or MTS) is applied at the CU level (S1915). Thereafter, the encoding apparatus 100 performs coding on the transform coefficients (S1920). Then, the encoding apparatus 100 determines whether EMT is applied to a transform unit (TU) (S1925). When EMT is applied to the TU, the encoding apparatus 100 encodes a primary transform index EMT_TU Idx applied to the TU (S1930). Subsequently, the encoding apparatus 100 determines whether NSST is applied (S1935). When NSST is applied, the encoding apparatus 100 encodes an index NSST_Idx indicating NSST to be applied (S1940).

The UTI may be coded for each predetermined unit (CTU or CU).

The UTI coding mode may be dependent on the following conditions.

1) Block size
2) Block shape
3) Intra-prediction mode

How to derive/extract a core transform index from the UTI is defined in advance. How to derive/extract a secondary transform index from the UTI is defined in advance.

A syntax structure for the UTI can be optionally used. The UTI can depend on a CU (TU) size. For example, a smaller CU (TU) may have a UTI index in a narrower range. In an example, the UTI can indicate only the core transform index if a predefined condition (e.g., a block size is less than a predefined threshold value) is satisfied.

TABLE 6

| UTI-Index | Binalization (FLC) | Core Transform Idx | Secondary Transform Idx |
|---|---|---|---|
| 0 | 00000 | 0 | 0 |
| 1 | 00001 | 0 | 1 |
| 2 | 00010 | 0 | 2 |
| 3 | 00011 | 0 | 3 |
| 4 | 00100 | 1 | 0 |
| 5 | 00101 | 1 | 1 |
| 6 | 00110 | 1 | 2 |

TABLE 6-continued

| UTI-Index | Binalization (FLC) | Core Transform Idx | Secondary Transform Idx |
|---|---|---|---|
| 7 | 00111 | 1 | 3 |
| . . . | . . . | . . . | . . . |
| 31 | 11111 | 5 | 3 |

In another example, UTI index may be considered as the core transform index when secondary transform is not indicated to be used (e.g., secondary transform index==0 or secondary transform is already predetermined). In the same manner, UTI index may be considered as a secondary transform index when the core transform index is considered to be known. Specifically, considering the intra prediction mode and the block size, a predetermined core transform may be used FIG. 20 illustrates two exemplary flowcharts showing encoding using the UTI as an embodiment to which the present disclosure is applied.

In another example, the transform coding structure may use UTI index coding as shown in FIG. 20. Here, the UTI index may be coded earlier than coefficient coding or later than coefficient coding.

Referring to the left flowchart of FIG. 20, the encoding apparatus 100 checks whether CBF is 1 (S2005). When CBF is 1, the encoding apparatus 100 codes the UTI index UTI_idx (S2010) and performs coding on transform coefficients (S2015).

Referring to the right flowchart of FIG. 20, the encoding apparatus 100 checks whether CBF is 1 (S2055). When CBF is 1, the encoding apparatus 100 performs coding on the transform coefficients (S2060) and codes the UTI index UTI_idx (S2065).

In another embodiment of the present disclosure, data hiding and implicit coding methods for transform indicators are introduced. Here, transform indicators may include ST_idx, UTI_idx, EMT_CU_Flag, EMT_TU_Flag, NSST_Idx and any sort of transform related index which may be used to indicate a transform kernel. The above-mentioned transform indicator may not be signaled but the corresponding information may be inserted in a coefficient coding process (it can be extracted during a coefficient coding process). The coefficient coding process may include the following parts.

Last_position_x, Last_position_y
Group flag
Significance map
Greather_than_1 flag
Greather_than_2 flag
Remaining level coding
Sign coding For example, transform indicator information may be inserted in one or more of above-mentioned coefficient coding processes. In order to insert transform indicator information, the followings may be considered jointly.

Pattern of Sing Coding
The absolute value of remaining level
The number of Greather_than_1 flag
The values of Last_position_X and Last_position_Y The above-mentioned data hiding method may be considered conditionally. For example, the data hiding method may be dependent on the number of non-zero coefficients.

In another example, NSST_idx and EMT_idx may be dependent. For example, NSST_idx may not be zero when EMT_CU_Flag is equal to zero (or one). In this case, NSST_idx-1 may be signaled instead of NSST_idx.

In another embodiment of the present disclosure, NSST transform set mapping based on intra-prediction mode is introduced as shown in the following table 7. Although NSST is described below as an example of non-separable transform, another known terminology (e.g., LFNST) may be used for non-separable transform. For example, NSST set and NSST index may be replaced with LFNST set and LFNST index. Further, RST described in this specification may also be replaced with LFNST as an example of non-separable transform (e.g., LFNST) using a non-square transform matrix having a reduced input length and/or a reduced output length in a square non-separable transform matrix applied to an at least a region (4×4 or 8×8 left top region or a region other than a 4×4 right bottom region in an 8×8 block) of a transform block.

TABLE 7

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 0 | 2 | 2 | 2 | 2 | 2 | 2 | 2 | 2 | 2 | 2 | 2 | 18 | 18 | 18 | 16 |
| intra mode | 17 | 18 | 19 | 20 | 21 | 22 | 23 | 24 | 25 | 26 | 27 | 28 | 29 | 30 | 31 | 32 | 33 |
| NSST Set | 18 | 18 | 18 | 18 | 18 | 18 | 18 | 34 | 34 | 34 | 34 | 34 | 34 | 34 | 34 | 34 | 34 |
| intra mode | 34 | 35 | 36 | 37 | 38 | 39 | 40 | 41 | 42 | 43 | 44 | 45 | 46 | 47 | 48 | 49 | 50 |
| NSST Set | 34 | 34 | 34 | 34 | 34 | 34 | 34 | 34 | 34 | 34 | 34 | 18 | 18 | 18 | 18 | 18 | 18 |
| intra mode | 51 | 52 | 53 | 54 | 55 | 56 | 57 | 58 | 59 | 60 | 61 | 62 | 63 | 64 | 65 | 66 | |
| NSST Set | 18 | 18 | 18 | 18 | 18 | 2 | 2 | 2 | 2 | 2 | 2 | 2 | 2 | 2 | 2 | 2 | |

The NSST Set number may be rearranged from 0 to 3 as shown in Table 8.

TABLE 8

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 0 | 1 | 1 | 1 | 1 | 1 | 1 | 1 | 1 | 1 | 1 | 1 | 2 | 2 | 2 | 2 |
| intra mode | 17 | 18 | 19 | 20 | 21 | 22 | 23 | 24 | 25 | 26 | 27 | 28 | 29 | 30 | 31 | 32 | 33 |
| NSST Set | 2 | 2 | 2 | 2 | 2 | 2 | 2 | 3 | 3 | 3 | 3 | 3 | 3 | 3 | 3 | 3 | 3 |
| intra mode | 34 | 35 | 36 | 37 | 38 | 39 | 40 | 41 | 42 | 43 | 44 | 45 | 46 | 47 | 48 | 49 | 50 |
| NSST Set | 3 | 3 | 3 | 3 | 3 | 3 | 3 | 3 | 3 | 3 | 3 | 2 | 2 | 2 | 2 | 2 | 2 |
| intra mode | 51 | 52 | 53 | 54 | 55 | 56 | 57 | 58 | 59 | 60 | 61 | 62 | 63 | 64 | 65 | 66 | |
| NSST Set | 2 | 2 | 2 | 2 | 2 | 1 | 1 | 1 | 1 | 1 | 1 | 1 | 1 | 1 | 1 | 1 | |

In the NSST transform set, only four transform sets (instead of 35) are used so that the required memory space can be reduced.

In addition, various numbers of transform kernels per transform set may be used as follows.

Case A: Two available transform kernels for each transform set are used so that the NSST index range is from 0 to 2. For example, when the NSST index is 0, secondary transform (inverse secondary transform based on a decoder) may not be applied. When the NSST index is 1 or 2, secondary transform may be applied. The transform set may include two transform kernels to which an index 1 or 2 may be mapped.

TABLE 9

| NSST Set | 0 (DC, Planar) | 1 | 2 | 3 |
|---|---|---|---|---|
| # of transform kernels | 2 | 2 | 2 | 2 |

Referring to Table 9, two transform kernels are used for each of non-separable transform (NSST or LFNST) sets 0 to 3.

Case B: Two available transform kernels are used for transform set 0 and one is used for others. Available NSST indices for transform set 0 (DC and Planar) are 0 to 2. However, NSST indices for other modes (transform sets 1, 2 and 3) are 0 to 1.

TABLE 10

| NSST Set | 0 (DC, Planar) | 1 | 2 | 3 |
|---|---|---|---|---|
| # of transform kernels | 2 | 1 | 1 | 1 |

Referring to Table 10, two non-separable transform kernels are set for a non-separable transform (NSST) set corresponding to index 0 and one non-separable transform kernel is set for each of non-separable transform (NSST) sets corresponding to indices 1, 2 and 3.

Case C: One transform kernel is used per transform kernel and the NSST index range is 0 to 1.

TABLE 11

| NSST Set | 0 (DC, Planar) | 1 | 2 | 3 |
| --- | --- | --- | --- | --- |
| # of transform kernels | 1 | 1 | 1 | 1 |

FIG. 21 is an exemplary flowchart showing encoding for performing transform as an embodiment to which the present disclosure is applied.

The encoding apparatus 100 performs primary transform on a residual block (S2105). The primary transform may be referred to as core transform. As an embodiment, the encoding apparatus 100 may perform the primary transform using the above-mentioned MTS. Further, the encoding apparatus 100 may transmit an MTS index indicating a specific MTS from among MTS candidates to the decoding apparatus 200. Here, the MTS candidates may be configured on the basis of the intra-prediction mode of the current block.

The encoding apparatus 100 determines whether to apply secondary transform (S2110). For example, the encoding apparatus 100 may determine whether to apply the secondary transform on the basis of transform coefficients of the primarily transformed residual block. For example, the secondary transform may be NSST or RST.

The encoding apparatus 100 determines the secondary transform (S2115). Here, the encoding apparatus 100 may determine the secondary transform on the basis of an NSST (or RST) transform set designated according to the intra-prediction mode.

For example, the encoding apparatus 100 may determine a region to which the secondary transform will be applied on the basis of the size of the current block prior to step S2115.

The encoding apparatus 100 performs the secondary transform determined in step S2115 (S2120).

FIG. 22 is an exemplary flowchart showing decoding for performing transform as an embodiment to which the present disclosure is applied.

The decoding apparatus 200 determines whether to apply inverse secondary transform (S2205). For example, the inverse secondary transform may be NSST or RST. For example, the decoding apparatus 200 may determine whether to apply the inverse secondary transform on the basis of a secondary transform flag received from the encoding apparatus 100.

The decoding apparatus 200 determines the inverse secondary transform (S2210). Here, the decoding apparatus 200 may determine the inverse secondary transform applied to the current block on the basis of the NSST (or RST) transform set designated according to the aforementioned intra-prediction mode.

Further, for example, the decoding apparatus 200 may determine a region to which the inverse secondary transform will be applied on the basis of the size of the current block prior to step S2210.

The decoding apparatus 200 performs inverse secondary transform on an inversely quantized residual block using the inverse secondary transform determined in step S2210 (S2215).

The decoding apparatus performs inverse primary transform on the inversely secondarily transformed residual block (S2220). The inverse primary transform may be called inverse core transform. In an embodiment, the decoding apparatus 200 may perform the inverse primary transform using the aforementioned MTS. Further, as an example, the decoding apparatus 200 may determine whether MTS is applied to the current block prior to step S2220. In this case, the decoding flowchart of FIG. 22 may further include a step of determining whether MTS is applied.

For example, when MTS is applied to the current block (i.e., cu_mts_flag=1), the decoding apparatus 200 may configure MTS candidates on the basis of the intra-prediction mode of the current block. In this case, the decoding flowchart of FIG. 22 may further include a step of configuring MTS candidates. In addition, the decoding apparatus 200 may determine inverse primary transform applied to the current block using mtx_idx indicating a specific MTS from among the configured MTS candidates.

Figure 23:
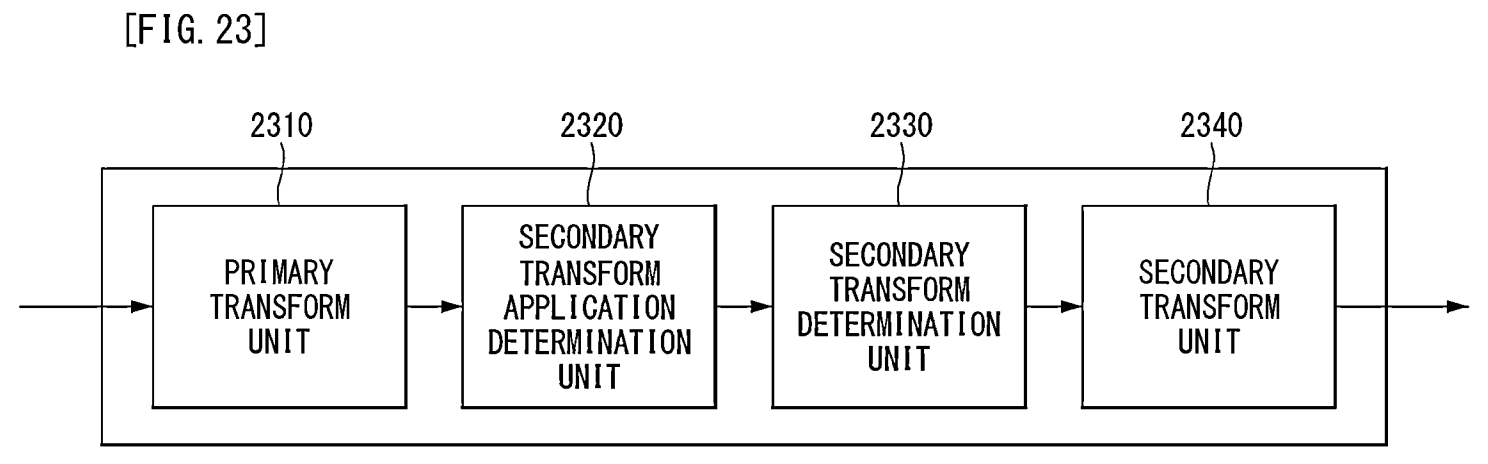

FIG. 23 is a detailed block diagram of the transform unit 120 in the encoding apparatus 100 as an embodiment to which the present disclosure is applied.

The encoding apparatus 100 to which an embodiment of the present disclosure is applied may include a primary transform unit 2310, a secondary transform application determination unit 2320, a secondary transform determination unit 2330, and a secondary transform unit 2340.

The primary transform unit 2310 can perform primary transform on a residual block. The primary transform may be referred to as core transform. As an embodiment, the primary transform unit 2310 may perform the primary transform using the above-mentioned MTS. Further, the primary transform unit 2310 may transmit an MTS index indicating a specific MTS from among MTS candidates to the decoding apparatus 200. Here, the MTS candidates may be configured on the basis of the intra-prediction mode of the current block.

The secondary transform application determination unit 2320 can determine whether to apply secondary transform. For example, the secondary transform application determination unit 2320 may determine whether to apply the secondary transform on the basis of transform coefficients of the primarily transformed residual block. For example, the secondary transform may be NSST or RST.

The secondary transform determination unit 2330 determines the secondary transform. Here, the secondary transform determination unit 2330 may determine the secondary transform on the basis of an NSST (or RST) transform set designated according to the intra-prediction mode as described above.

For example, the secondary transform determination unit 2330 may determine a region to which the secondary transform will be applied on the basis of the size of the current block.

The secondary transform unit 2340 can perform the determined secondary transform.

FIG. 24 is a detailed block diagram of the inverse transform unit 230 in the decoding apparatus 200 as an embodiment to which the present disclosure is applied.

The decoding apparatus 200 to which the present disclosure is applied includes an inverse secondary transform application determination unit 2410, an inverse secondary transform determination unit 2420, an inverse secondary transform unit 2430, and an inverse primary transform unit 2440.

The inverse secondary transform application determination unit 2410 can determine whether to apply inverse secondary transform. For example, the inverse secondary transform may be NSST or RST. For example, the inverse secondary transform application determination unit 2410 may determine whether to apply the inverse secondary transform on the basis of a secondary transform flag received from the encoding apparatus 100.

The inverse secondary transform determination unit 2420 can determine the inverse secondary transform. Here, the inverse secondary transform determination unit 2420 may determine the inverse secondary transform applied to the current block on the basis of the NSST (or RST) transform set designated according to the intra-prediction mode.

Further, for example, the inverse secondary transform determination unit 2420 may determine a region to which the inverse secondary transform will be applied on the basis of the size of the current block.

The inverse secondary transform unit 2430 can perform inverse secondary transform on an inversely quantized residual block using the determined inverse secondary transform.

The inverse primary transform unit 2440 can perform inverse primary transform on the inversely secondarily transformed residual block. In an embodiment, the inverse primary transform unit 2440 may perform the inverse primary transform using the aforementioned MTS. Further, as an example, the inverse primary transform unit 2440 may determine whether MTS is applied to the current block.

For example, when MTS is applied to the current block (i.e., cu_mts_flag=1), the inverse primary transform unit 2440 may configure MTS candidates on the basis of the intra-prediction mode of the current block. In addition, the inverse primary transform unit 2440 may determine inverse primary transform applied to the current block using mtx_idx indicating a specific MTS from among the configured MTS candidates.

FIG. 25 is a flowchart for processing a video signal as an embodiment to which the present disclosure is applied. The process of the flowchart of FIG. 25 can be executed by the decoding apparatus 200 or the inverse transform unit 230.

First, the decoding apparatus 200 can determine whether reverse non-separable transform is applied to the current block on the basis of a non-separable transform index and the width and height of the current block. For example, if the non-separable transform index is not 0 and the width and height of the current block are equal to or greater than 4, the decoding apparatus 200 can determine that the non-separable transform is applied. If the non-separable transform index is 0 or the width or the height of the current block is less than 4, the decoding apparatus 200 can omit the reverse non-separable transform and perform inverse primary transform.

In step S2505, the decoding apparatus 200 determines a non-separable transform set index indicating a non-separable transform set used for non-separable transform of the current block from among non-separable transform sets predefined on the basis of the intra-prediction mode of the current block. A non-separable transform set index can be set such that it is allocated to each of four transform sets configured according to the range of the intra-prediction mode, as shown in Table 7 or Table 8. That is, the non-separable transform set index can be determined as a first index value when the intra-prediction mode is 0 and 1, determined as a second index value when the intra-predic-tion mode is 2 to 12 or 56 to 66, determined as a third index value when the intra-prediction mode is 13 to 23 or 45 to 55, and determined as a fourth index value when the intra-prediction mode is 24 to 44, as shown in Table 7 or Table 8.

Here, each of the predefined non-separable transform sets may include two transform kernels, as shown in Table 9. Further, each of the predefined non-separable transform sets may include one or two transform kernels, as shown in Table 10 or 11.

In step S2510, the decoding apparatus 200 determines, as a non-separable transform matrix, a transform kernel indi-cated by the non-separable transform index for the current block from among transform kernels included in the non-separable transform set indicated by the non-separable trans-form set index. For example, two non-separable transform kernels may be configured for each non-separable transform set index value and the decoding apparatus 200 may deter-mine a non-separable transform matrix on the basis of the transform kernel indicated by the non-separable transform index between two transform matrix kernels corresponding to the non-separable transform set index.

In step S2515, the decoding apparatus 200 applies the non-separable transform matrix to a left top region of the current block determined on the basis of the width and height of the current block. For example, non-separable transform may be applied to an 8×8 left top region of the current block if both the width and height of the current block are equal to or greater than 8 and non-separable transform may be applied to a 4×4 region of the current block if the width or height of the current block is less than 8. The size of non-separable transform may also be set to 8×8 or 4×4 in response to a region to which non-separable transform will be applied.

Furthermore, the decoding apparatus 200 may apply horizontal transform and vertical transform to the current block to which non-separable transform has been applied. Here, the horizontal transform and vertical transform may be determined on the basis of an MTS index for selection of the prediction mode and transform matrix applied to the current block.

Hereinafter, a method of combining and applying a pri-mary transform and a secondary transform is described. That is, an embodiment of the present disclosure proposes a method of efficiently designing a transform used in the primary transform and the secondary transform. In this instance, the methods illustrated in FIGS. 1 to 25 can be applied, and the redundant description is omitted.

As described above, the primary transform represents a transform that is first applied to a residual block based on an encoder. If the secondary transform is applied, the encoder may perform the secondary transform on the primary trans-formed residual block. If the secondary transform is applied, a secondary inverse transform may be performed before a primary inverse transform based on a decoder. The decoder may perform the primary inverse transform on a secondary inverse transformed transform coefficient block to derive a residual block.

In addition, as described above, a non-separable transform may be used as the secondary transform, and the secondary transform may be applied only to coefficients of a low frequency of a top-left specific region in order to maintain low complexity. The secondary transform applied to these coefficients of the low frequency may be referred to as a non-separable secondary transform (NSST), a low fre-quency non-separable transform (LFNST), or a reduced secondary transform (RST). The primary transform may be referred to as a core transform.

In an embodiment of the present disclosure, a primary transform candidate used in the primary transform and a secondary transform kernel used in the secondary transform may be predefined as various combinations. In the present disclosure, the primary transform candidate used in the primary transform may be referred to as a MTS candidate, but is not limited to the name. For example, the primary transform candidate may be a combination of transform kernels (or transform types) respectively applied to horizon-tal and vertical directions, and the transform kernel may be one of DCT2, DST7 and/or DCT8. In other words, the primary transform candidate may be at least one combina-tion of DCT2, DST7 and/or DCT8. The following descrip-tion is given with detailed examples.

Combination A

In a combination A, as illustrated in the following Table 12, a primary transform candidate and a secondary transform kernel may be defined according to an intra prediction mode.

TABLE 12

| | Primary transform | Secondary Transform |
|---|---|---|
| Case 1 | 2 MTS candidates for angular mode | 2 transform kernels for angular mode |
| | 4 MTS candidates for non-angular | 2 transform kernels for non-angular mode |
| Case 2 | 2 MTS candidates for angular mode | 1 transform kernels for angular mode |
| | 4 MTS candidates for non-angular | 2 transform kernels for non-angular mode |
| Case 3 | 2 MTS candidates for angular mode | 1 transform kernels for angular mode |
| | 4 MTS candidates for non-angular | 1 transform kernels for non-angular mode |

Referring to the above Table 12, as an example (Case 1), two primary transform candidates may be used if the intra prediction mode has the directionality, and four primary transform candidates may be used if the intra prediction mode does not have the directionality (e.g., DC mode, planar mode). In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), two primary transform candidates may be used if the intra prediction mode has the directionality, and four primary transform candidates may be used if the intra prediction mode does not have the directionality. In this instance, a secondary transform candidate may include one transform kernel if the intra prediction mode has the directionality, and a secondary transform candidate may include two transform kernels if the intra prediction mode does not have the directionality.

Further, as an example (Case 3), two primary transform candidates may be used if the intra prediction mode has the directionality, and four primary transform candidates may be used if the intra prediction mode does not have the directionality. In this instance, a secondary transform candidate may include one transform kernel irrespective of the directionality of the intra prediction mode.

Combination B

In a combination B, as illustrated in the following Table 13, a primary transform candidate and a secondary transform kernel may be defined according to an intra prediction mode.

Referring to the above Table 13, as an example (Case 1), three primary transform candidates may be used irrespective of directionality of the intra prediction mode. In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), three primary transform candidates may be used irrespective of the directionality of the intra prediction mode. In this instance, a secondary transform candidate may include one transform kernel if the intra prediction mode has the directionality, and a secondary transform candidate may include two transform kernels if the intra prediction mode does not have the directionality.

Further, as an example (Case 3), three primary transform candidates may be used irrespective of the directionality of the intra prediction mode. In this instance, a secondary transform candidate may include one transform kernel irrespective of the directionality of the intra prediction mode.

Combination C

In a combination C, as illustrated in the following Table 14, a primary transform candidate and a secondary transform kernel may be defined according to an intra prediction mode.

TABLE 13

| | Primary transform | Secondary Transform |
|---|---|---|
| Case 1 | 3 MTS candidates for angular mode | 2 transform kernels for angular mode |
| | 3 MTS candidates for non-angular | 2 transform kernels for non-angular mode |
| Case 2 | 3 MTS candidates for angular mode | 1 transform kernels for angular mode |
| | 3 MTS candidates for non-angular | 2 transform kernels for non-angular mode |
| Case 3 | 3 MTS candidates for angular mode | 1 transform kernels for angular mode |
| | 3 MTS candidates for non-angular | 1 transform kernels for non-angular mode |

TABLE 14

| | Primary transform | Secondary Transform |
|---|---|---|
| Case 1 | 2 MTS candidates for angular mode | 2 transform kernels for angular mode |
| | 3 MTS candidates for non-angular | 2 transform kernels for non-angular mode |
| Case 2 | 2 MTS candidates for angular mode | 1 transform kernels for angular mode |
| | 3 MTS candidates for non-angular | 2 transform kernels for non-angular mode |
| Case 3 | 2 MTS candidates for angular mode | 1 transform kernels for angular mode |
| | 3 MTS candidates for non-angular | 1 transform kernels for non-angular mode |

Referring to the above Table 14, as an example (Case 1), two primary transform candidates may be used if the intra prediction mode has the directionality, and three primary transform candidates may be used if the intra prediction mode does not have the directionality (e.g., DC mode, planar mode). In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), two primary transform candidates may be used if the intra prediction mode has the directionality, and three primary transform candidates may be used if the intra prediction mode does not have the directionality. In this instance, a secondary transform candidate may include one transform kernel if the intra prediction mode has the directionality, and a secondary transform candidate may include two transform kernels if the intra prediction mode does not have the directionality.

Further, as an example (Case 3), two primary transform candidates may be used if the intra prediction mode has the directionality, and three primary transform candidates may be used if the intra prediction mode does not have the directionality. In this instance, a secondary transform candidate may include one transform kernel irrespective of the directionality of the intra prediction mode.

The above description was given focusing on the case of using the plurality of primary transform candidates. The following describes combinations of a primary transform and a secondary transform in case of using a fixed primary transform candidate, by way of example.

Combination D

In a combination D, as illustrated in the following Table 15, a primary transform candidate and a secondary transform kernel may be defined according to an intra prediction mode.

Referring to the above Table 15, as an embodiment, one primary transform candidate may be fixedly used irrespective of the intra prediction mode. For example, the fixed primary transform candidate may be at least one combination of DCT2, DST7 and/or DCT8.

As an example (Case 1), one primary transform candidate may be fixedly used irrespective of the intra prediction mode. In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), one primary transform candidate may be fixedly used irrespective of the intra prediction mode. In this instance, a secondary transform candidate may include one transform kernel if the intra prediction mode has the directionality, and a secondary transform candidate may include two transform kernels if the intra prediction mode does not have the directionality.

Further, as an example (Case 3), one primary transform candidate may be fixedly used irrespective of the intra prediction mode. In this instance, a secondary transform candidate may include one transform kernel irrespective of the directionality of the intra prediction mode.

Combination E

In a combination E, as illustrated in the following Table 16, a primary transform candidate and a secondary transform kernel may be defined according to an intra prediction mode.

TABLE 15

| | Primary transform | Secondary Transform |
|---|---|---|
| Case 1 | 1 fixed MTS candidate for all modes | 2 transform kernels for angular mode |
| | | 2 transform kernels for non-angular mode |
| Case 2 | 1 fixed MTS candidate for all modes | 1 transform kernels for angular mode |
| | | 2 transform kernels for non-angular mode |
| Case 3 | 1 fixed MTS candidate for all modes | 1 transform kernels for angular mode |
| | | 1 transform kernels for non-angular mode |

TABLE 16

| | Primary transform (DCT2 applied) | Secondary Transform |
|---|---|---|
| Case 1 | DCT2 is applied | 2 transform kernels for angular mode 2 transform kernels for non-angular mode |
| Case 2 | DCT2 is applied | 1 transform kernels for angular mode 2 transform kernels for non-angular mode |
| Case 3 | DCT2 is applied | 1 transform kernels for angular mode 1 transform kernels for non-angular mode |

Referring to the above Table 16, as long as DCT2 is applied as the primary transform, a secondary transform may be defined. In other words, if MTS is not applied (i.e., if the DCT2 is applied as the primary transform), the secondary transform can be applied. As illustrated in FIG. 10 above, the present disclosure is described by being divided into a case in which the MTS is applied and a case in which the MTS is not applied, but is not limited to such an expression. For example, whether or not the MTS is applied may mean whether to use other transform types (or transform kernels) other than a predefined specific transform type (which may be referred to as a basic transform type, a default transform type, etc.). If the MTS is applied, other transform types (e.g., any one transform type or a combined transform type of two or more transform types among a plurality of transform types) other than a basic transform type may be used for a transform. Further, if the MTS is not applied, the basic transform type may be used for the transform. In an embodiment, the basic transform type may be configured (or defined) as DCT2.

As an example (Case 1), when the DCT2 is applied to the primary transform, the secondary transform can be applied. In this instance, a secondary transform candidate may include two transform kernels irrespective of the directionality of the intra prediction mode. That is, as described above, a plurality of secondary transform kernel sets may be predefined according to the intra prediction mode, and each of the plurality of predefined secondary transform kernel sets may include two transform kernels.

Further, as an example (Case 2), when the DCT2 is applied to the primary transform, the secondary transform can be applied. In this instance, a secondary transform candidate may include one transform kernel if the intra prediction mode has the directionality, and a secondary transform candidate may include two transform kernels if the intra prediction mode does not have the directionality.

Further, as an example (Case 3), when the DCT2 is applied to the primary transform, the secondary transform can be applied. In this instance, a secondary transform candidate may include one transform kernel irrespective of the directionality of the intra prediction mode.

FIG. 26 is a flow chart illustrating a method for transforming a video signal according to an embodiment to which the present disclosure is applied.

Referring to FIG. 26, the present disclosure is described based on a decoder for the convenience of the explanation, but is not limited thereto. A transform method for a video signal according to an embodiment of the disclosure can be substantially equally applied to even an encoder. The flow chart illustrated in FIG. 26 may be performed by a decoding device 200 or an inverse transform unit 230.

The decoding device 200 parses a first syntax element indicating a primary transform kernel applied to a primary transform of a current block in S2601.

The decoding device 200 determines whether a secondary transform is applicable to the current block based on the first syntax element in S2602.

If the secondary transform is applicable to the current block, the decoding device 200 parses a second syntax element indicating a secondary transform kernel applied to a secondary transform of the current block in S2603.

The decoding device 200 derives a secondary inverse-transformed block, by performing a secondary inverse-transform for a top-left specific region of the current block using a secondary transform kernel indicated by the second syntax element in S2604.

The decoding device 200 derives a residual block of the current block, by performing a primary inverse-transform for the secondary inverse-transformed block using a primary transform kernel indicated by the first syntax element in S2605.

As described above, the step S2602 may be performed by determining that the secondary transform is applicable to the current block if the first syntax element indicates a predefined first transform kernel. In this instance, the first transform kernel may be defined as DCT2.

Further, as described above, the decoding device 200 may determine a secondary transform kernel set used for a secondary transform of the current block among predefined secondary transform kernel sets based on an intra prediction mode of the current block. The second syntax element may indicate a secondary transform kernel applied to the secondary transform of the current block in the determined secondary transform kernel set.

Further, as described above, each of the predefined secondary transform kernel sets may include two transform kernels.

In an embodiment of the disclosure, an example of a syntax structure in which a multiple transform set (MTS) is used will be described.

For example, the following table 17 shows an example of a syntax structure of a sequence parameter set.

TABLE 17

| | Descriptor |
|---|---|
| seq_parameter_set_rbsp( ) { | |
| sps_seq_parameter_set_id | ue(v) |
| chroma_format_idc | ue(v) |
| if( chroma_format_idc  = =  3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| max_mtt_hierarchy_depth_inter_slices | ue(v) |
| max_mtt_hierarchy_depth_intra_slices | ue(v) |
| sps_cclm_enabled_flag | ue(1) |

TABLE 17-continued

| | Descriptor |
|---|---|
| sps_mts_intra_enabled_flag | ue(1) |
| sps_mts_inter_enabled_flag | ue(1) |
| rbsp_trailing_bits( ) | |
| } | |

Referring to FIG. 17, whether the MTS according to an embodiment of the disclosure can be used may be signaled through a sequence parameter set syntax. Here, sps_mts_intra_enabled_flag indicates whether an MTS flag or an MTS index is present in a lower level syntax (e.g., residual coding syntax or transform unit syntax) with respect to an intra-coding unit. In addition, sps_mts_inter_enabled_flag indicates whether an MTS flag or an MTS index is present in a lower level syntax with respect to an inter-coding unit.

As another example, the following table 18 shows an example of a transform unit syntax structure.

TABLE 18

| | Descriptor |
|---|---|
| transform_unit( x0, y0, tbWidth, tbHeight, treeType ) { | |
|   if( treeType = = SINGLE_TREE  ‖  treeType = = DUAL_TREE_LUMA ) | |
|     tu_cbf_luma[ x0 ][ y0 ] | ae(v) |
|   if( treeType = = SINGLE_TREE  ‖  treeType = = DUAL_TREE_CHROMA ) { | |
|     tu_cbf_cb[ x0 ][ y0 ] | ae(v) |
|     tu_cbf_cr[ x0 ][ y0 ] | ae(v) |
|   } | |
|   if( ( ( ( CuPredMode[ x0 ][ y0 ]  = =  MODE_INTRA )  &&  sps_mts_intra_enabled_flag ) ‖ | |
|     ( ( CuPredMode[ x0 ][ y0 ]  = =  MODE_INTER )  &&  sps_mts_inter_enabled_flag ) ) | |
|     && tu_cbf luma[ x0 ][ y0 ]  &&  treeType  ! =  DUAL_TREE_CHROMA | |
|     && ( tbWidth <= 32 )  &&  ( tbHeight <= 32 )   ) | |
|     cu_mts_flag[ x0 ][ y0 ] | ae(v) |
|   if( tu_cbf_luma[ x0 ][ y0 ] ) | |
|     residual_coding( x0, y0, log2( tbWidth ), log2( tbHeight), 0 ) | |
|   if( tu_cbf_cb[ x0 ][ y0 ] ) | |
|     residual_coding( x0, y0, log2( tbWidth / 2 ), log2( tbHeight / 2 ), 1 ) | |
|   if( tu_cbf_cr[ x0 ][ y0 ] ) | |
|     residual_coding( x0, y0, log2( tbWidth / 2 ), log2( tbHeight /2 ), 2 ) | |
| } | |

Referring to Table 18, cu_mts_flag indicates whether the MTS is applied to a residual sample of a luma transform block. For example, the MTS is not applied to the residual sample of the luma transform block if cu_mts_flag=0 and the MTS is applied to the residual sample of the luma transform block if cu_mts_flag=1.

As described above, a case in which the MTS is applied and a case in which the MTS is not applied are separately described on the basis of the MTS flag in the disclosure, but the disclosure is not limited thereto. For example, whether the MTS is applied may be the same meaning as whether a transform type (or transform kernel) other than a predefined specific transform type (which may be referred to as a basic transform type, a default transform type, or the like) is used. A transform type (e.g., any one of a plurality of transform types or a combination of two or more thereof) other than the default transform type may be used for a transform if the MTS is applied and the default transform type may be used for a transform if the MTS is not applied. In an embodiment, the default transform type may be set (or defined) as DCT2.

As an example, an MTS flag syntax indicating whether the MTS is applied to a current transform block and an MTS index syntax indicating a transform type applied to the current block when the MTS is applied may be individually transmitted from an encoder to a decoder. As another example, a syntax (e.g., MTS index) including both whether the MTS is applied to the current transform block and a transform type applied to the current block when the MTS is applied may be transmitted from the encoder to the decoder. That is, in the latter example, a syntax (or syntax element) indicating a transform type applied to the current transform block (or unit) in a transform type group (or transform type set) including the aforementioned default transform type may be transmitted from the encoder to the decoder.

Accordingly, the syntax (MTS index) indicating the transform type applied to the current transform block may include information about whether the MTS is applied irrespective of the representation thereof. In other words, although the MTS can be regarded as including DCT2 because only the MTS index can be signaled without the MTS flag in the latter example, a case in which DCT2 is applied can be described as a case in which MTS is not applied in the disclosure and the technical scope with respect to the MTS is not limited to the definition.

Furthermore, as another example, the following table 19 shows an example of a residual unit syntax structure.

TABLE 19

| | Descriptor |
|---|---|

```
residual_coding( x0, y0, log2TbWidth, log2TbHeight, cIdx ) {
    if( transform_skip_enabled_flag   &&   ( cIdx ! = 0 || cu_mts_flag[ x0 ][ y0 ] = = 0)   &&
        ( log2TbWidth <= 2 )   &&   ( log2TbHeight <= 2 ) )
        transform_skip_flag[ x0 ][ y0 ][ cIdx ]                                              ae(v)
    last_sig_coeff_x_prefix                                                                  ae(v)
    last_sig_coeff_y_prefix                                                                  ae(v)
    if( last_sig_coeff_x_prefix > 3 )
        last_sig_coeff_x_suffix                                                              ae(v)
    if( last_sig_coeff_y_prefix > 3 )
        last_sig_coeff_y_suffix                                                              ae(v)
    log2SbSize = ( Min( log2TbWidth, log2TbHeight ) < 2   ?   1   :   2 )
    numSbCoeff = 1 <<( log2SbSize << 1)
    lastScanPos = numSbCoeff
    lastSubBlock = ( 1 << ( log2TbWidth + log2TbHeight − 2 * log2SbSize ) ) − 1
    do {
        if( lastScanPos = = 0 ) {
            lastScanPos = numSbCoeff
            lastSubBlock− −
        }
        lastScanPos− −
        xS = DiagScanOrder[ log2TbWidth − log2SbSize ][ log2TbHeight − log2SbSize ]
                [ lastSubBlock ][ 0 ]
        yS = DiagScanOrder[ log2TbWidth − log2SbSize ][ log2TbHeight − log2SbSize ]
                [ lastSubBlock ][ 1 ]
        xC = ( xS << log2SbSize ) +
        DiagScanOrder[ log2SbSize ][ log2SbSize ][ lastScanPos ][ 0 ]
        yC = ( yS << log2SbSize ) +
        DiagScanOrder[ log2SbSize ][ log2SbSize ][ lastScanPos ][ 1 ]
    } while( ( xC  !=  LastSignificantCoeffX )   ||   (yC  !=  LastSignificantCoeffY ) )
    QState =0
    for( i =lastSubBlock; i >= 0; i− − ) {
        startQStateSb = QState
        xS = DiagScanOrder[ log2TbWidth − log2SbSize ][ log2TbHeight − log2SbSize ]
                [ lastSubBlock ][ 0 ]
        yS = DiagScanOrder[ log2TbWidth − log2SbSize ][ log2TbHeight − log2SbSize ]
                [ lastSubBlock ][ 1 ]
        inferSbDcSigCoeffFlag = 0
        if( ( i < lastSubBlock ) && ( i > 0 ) ) {
            coded_sub_block_flag[ xS ][ yS ]                                                 ae(v)
            inferSbDcSigCoeffFlag = 1
        }
        firstSigScanPosSb = numSbCoeff
        lastSigScanPosSb = −1
        for( n = ( i   = =   lastSubBlock) ? lastScanPos − 1 : numSbCoeff − 1; n   >=   0; n− − )
{
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( coded_sub_block_flag[ xS ][ yS ] && ( n > 0   ||   !inferSbDcSigCoeffFlag ) )
{
                sig_coeff_flag[ xC ][ yC ]                                                   ae(v)
            }
            if( sig_coeff_flag[ xC ][ yC ] ) {
                par_level_flag[ n ]                                                         ae(v)
                rem_abs_gt1_flag[ n ]                                                       ae(v)
                if( lastSigScanPosSb = = −1 )
                    lastSigScanPosSb = n
                firstSigScanPosSb = n
            }
            AbsLevelPass1[ xC ][ yC ] =
                sig_coeff_flag[ xC ][ yC ] + par_level_flag[ n ] + 2 * rem_abs_gt1_flag[ n ]
            if( dep_quant_enabled_flag )
                QState = QStateTransTable[ QState ][ par_level_flag[ n ] ]
        }
        for( n = numSbCoeff − 1; n >= 0; n− − ) {
            if( rem_abs_gt1_flag[ n ] )
                rem_abs_gt2_flag[ n ]                                                       ae(v)
        }
        for( n = numSbCoeff − 1; n >= 0; n− − ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( rem_abs_gt2_flag[ n ] )
                abs_remainder[ n ]                                                          ae(v)
            AbsLevel[ xC ][ yC ] = AbsLevelPass1[ xC ][ yC ] +
                    2 * ( rem_abs_gt2_flag[ n ] + abs_remainder[ n ] )
        }
        if( dep_quant_enabled_flag   ||   !sign_data_hiding_enabled_flag )
            signHidden = 0
        else
```

TABLE 19-continued

|  | Descriptor |
|---|---|

```
    signHidden = ( lastSigScanPosSb − firstSigScanPosSb > 3 ? 1 : 0 )
  for( n = numSbCoeff − 1; n    >=    0; n− − ) {
    xC = ( xS << log2SbSize ) + DiagScanOrder[ log2SbSize ][ log2SbSize ][ n ][ 0 ]
    yC = ( yS << log2SbSize ) + DiagScanOrder[ log2SbSize ][ log2SbSize ][ n ][ 1 ]
    if( sig_coeff flag[ xC ][ yC ] &&
      ( !signHidden   ||   ( n   !=   firstSigScanPosSb ) ) )
      coeff_sign_flag[ n ]                                                    ae(v)
  }
  if( dep_quant_enabled_flag )   {
    QState = startQStateSb
    for( n = numSbCoeff − 1; n    >=    0; n− − ) {
      xC = ( xS << log2SbSize ) +
      DiagScanOrder[ log2SbSize ][ log2SbSize ][ n ][ 0 ]
      yC = ( yS << log2SbSize ) +
      DiagScanOrder[ log2SbSize ][ log2SbSize ][ n ][ 1 ]
      if( sig_coeff flag[ xC ][ yC ] )
        TransCoeffLevel[ x0 ][ y0 ][ cIdx ][ xC ][ yC ] =
          ( 2 * AbsLevel[ xC ][ yC ]   −   ( QState > 1 ? 1 : 0 ) ) *
          ( 1   −   2 * coeff_sign_flag[ n ] )
      QState = QStateTransTable[ QState ][ par_level_flag[ n ] ]
  } else {
    sumAbsLevel = 0
    for( n = numSbCoeff − 1; n    >=    0; n− − ) {
      xC = ( xS << log2SbSize ) +
          DiagScanOrder[ log2SbSize ][ log2SbSize ][ n ][ 0 ]
      yC = ( yS << log2SbSize ) +
          DiagScanOrder[ log2SbSize ][ log2SbSize ][ n ][ 1 ]
      if( sig_coeff flag[ xC ][ yC ] ) {
        TransCoeffLevel[ x0 ][ y0 ][ cIdx ][ xC ][ yC ] =
          AbsLevel[ xC ][ yC ] * ( 1 − 2 * coeff sign_flag[ n ] )
        if( signHidden ) {
          sumAbsLevel   +=   AbsLevel[ xC ][ yC ]
          if( ( n   = =   firstSigScanPosSb )   &&   ( sumAbsLevel % 2) = = 1 ) )
            TransCoeffLevel[ x0 ][ y0 ][ cIdx ][ xC ][ yC ] =
              --TransCoeffLevel[ x0 ][ y0 ][ cIdx ][ xC ][ yC ]
        }
      }
    }
  }
}
if( cu_mts_flag[ x0 ][ y0 ] && ( cIdx = = 0 ) &&
  !transform_skip_flag[ x0 ][ y0 ][ cIdx ] &&
  ( ( CuPredMode[ x0 ][ y0 ] = = MODE_INTRA && numSigCoeff > 2) ||
  ( CuPredMode[ x0 ][ y0 ] = = MODE_INFER )) ) {
  mts_idx[ x0 ][ y0 ]                                                        ae(v)
}
```

Referring to Table 19, transform_skip_flag and/or mts_idx syntax (or syntax element) can be signaled through a residual syntax. However, this is merely an example and the disclosure is not limited thereto. For example, transform_skip_flag and/or mts_idx syntax may be signaled through a transform unit syntax.

A specific embodiment of the aforementioned secondary transform matrix that can be used for secondary transform will be described below. As described above, the secondary transform may be referred to as a non-separable secondary transform (NSST), a low frequency non-separable transform (LFNST) or a reduced secondary transform (RST)

As described above, four transform sets (or secondary transform sets) may be used for memory efficiency enhance-ment in application of the secondary transform in an embodiment of the disclosure. As an embodiment, an encoder/decoder can allocate indices 0, 1, 2 and 3 to the four transform sets.

Furthermore, each transform set may include a predefined number of transform kernels as described above. As an embodiment, the four transform sets used for the secondary transform may be predefined in the encoder and the decoder and each transform set may include one or two transform matrices (or transform types or transform kernels).

The following table 20 shows an example of transform applicable to an 8×8 region.

TABLE 20

```
const int g_aiNsst8x8[4][2][16][64] = {
  { //0
    {
      {−110, 42, 13, 0, 2, 1, 1, 0, 44, −18, −5, 0, −1, 0, 0, 0, 8, −3, −1, 0, 0, 0, 0, 0, 2, 0, 0, 0, 0, 0, 0, 2, −1,
0, 0, 0, 0, 0, 0, 1, 0, 0, 0, 0, 0, 0, 0, 1, 0, 0, 0, 0, 0, 0, 0, 0, 0, 0, 0, 0, 0, 0, 0 },
      {−45, −91, 53, 6, 8, 1, 3, 0, −32, 36, −8, −2, −1, 0, 0, 0, 26, 10, −11, −2, −1, 0, −1, 0, −1, −1,
1, 0, 0, 0, 0, 0, 5, 2, −2, 0, 0, 0, 0, 0, 0, 0, 0, 0, 0, 0, 0, 2, 1, −1, 0, 0, 0, 0, 0, 0, 0, 0, 0, 0, 0, 0, 0 },
      {−19, 50, −10, −8, 0, −1, 0, 0, −97, 8, 29, 0, 3, 0, 1, 0, 48, −24, −8, 3, −1, 0, 0, 0, 3, 2, −2,
```

TABLE 20-continued 0, 0, 0, 0, 0, 7, −3, 0, 0, 0, 0, 0, 0, 1, 0, −1, 0, 0, 0, 0, 0, 2, −1, 0, 0, 0, 0, 0, 0, 0, 0, 0, 0, 0, 0, 0, 0, 0 },
{31, 41, 87, −49, 2, −9, 2, −3, 14, 22, −38, 10, −1, 1, −1, 0, 11, −27, −12, 11, 1, 1, 0, 1, −11, 4, 5, −1,
0, 0, 0, 0, 0, −3, −3, 1, 0, 0, 0, 0, −2, 0, 1, 0, 0, 0, 0, 0, 0, −1, −1, 1, 0, 0, 0, 0, −1, 0, 0, 0, 0, 0, 0, 0 },
{−11, 11, −38, 11, 0, 2, −1, 1, 13, 103, −26, −19, −3, −3, −1, −1, −14, −39, 29, 4, 0, 1, 0, 0, 3, −9, −1,
3, 0, 0, 0, 0, −1, −3, 2, −1, 0, 0, 0, 0, −2, 0, 1, 0, 0, 0, 0, 0, 0, −1, 1, 0, 0, 0, 0, 0, −1, 0, 0, 0, 0, 0, 0 },
{17, −10, −31, 10, 0, 2, 0, 1, 42, 0, −7, −2, −2, 0, −1, 0, 98, −9, −16, −1, −3, −1, −1, 0, −53, 11, 13, −1,
2, 0, 1, 0, 3, −1, 1, 0, 0, 0, 0, 0, −9, 1, 2, 0, 0, 0, 0, 0, 2, 0, 0, 0, 0, 0, 0, 0, −3, 0, 1, 0, 0, 0, 0, 0 },
{7, −4, 22, −4, 0, −1, 0, 0, 34, 22, 102, −37, −4, −6, 0, −2, −4, −26, −30, 18, 2, 2, 0, 1, 5, 4, −14,
3, 1, 0, 0, 0, −7, 2, 0, 0, 0, 0, 0, 1, 0, −3, 1, 0, 0, 0, 0, 0, −1, 0, −1, 0, 0, 0, 0, 0, −1, 0, 0, 0, 0, 0, 0 },
{8, 37, 14, 28, −16, 4, −4, 1, 1, 38, 3, −16, 3, −3, 1, −1, 8, 89, −36, −16, 3, −3, 0, −1, −1, −44, 15, 8, −1,
2, 0, 1, −3, −3, 0, 0, 0, 0, 0, 0, 0, −6, 1, 1, 0, 0, 0, 0, −1, 0, 0, 0, 0, 0, 0, 0, 0, −2, 0, 0, 0, 0, 0, 0 },
{−11, −11, −36, −100, 38, −12, 9, −3, 3, 15, 16, 12, −11, 2, −2, 0, 0, 42, 6, 13, −8, 0, −2, 0, −9, −17,
2, 2, 3, 0, 0, 0, 3, −3, 1, 4, −1, 0, 0, 0, −1, −2, 0, 0, 0, 0, 0, 0, 1, 0, 0, 0, 0, 0, −1, 0, 0, 0, 0, 0, 0 },
{−9, 4, 8, 9, −2, 0, −1, 0, −16, 2, 16, −3, −1, 0, 0, 0, −47, 2, 9, 1, 4, 0, 1, 0, −95, 10, 26, −2,
3, 0, 1, 0, 51, −14, −16, 3, −1, 0, −1, 0, −15, 4, 3, −1, 1, 0, 0, 0, 10, −2, −3, 0, 0, 0, 0, 0, −4, 1, 1, 0, 0, 0, 0, 0 },
{8, 5, 28, 0, −2, −1, 0, 0, 3, −10, 16, −35, 10, −3, 2, −1, 27, 19, 99, −14, −13, −2, −2, −1, −11, −20, −36,
22, 3, 2, 0, 1, −1, 2, −8, 0, 2, 0, 0, 0, −1, −2, −2, 2, 0, 0, 0, 0, 1, 1, −1, 0, 0, 0, 0, 0, −1, 1, 0, 0, 0, 0, 0 },
{−3, −8, −10, −16, −5, 1, 0, 0, −12, −28, −34, −91, 29, −7, 6, −2, −5, −9, −18, 51, −4, 2, −1, 1, 0, −21,
27, 16, −7, 1, −1, 0, 1, 9, −3, −7, 0, 0, 0, 0, 0, −2, 3, 4, −1, 0, 0, 0, 0, 2, −1, −1, 0, 0, 0, 0, 0, −1,
1, 1, 0, 0, 0, 0, 0 },
{1, −10, 4, 6, 0, 0, 0, 0, 4, −13, 16, 36, −12, 3, −2, 1, 3, −39, 11, 1, 5, 0, 1, 0, −1, −98, 48, 9, −4,
3, 0, 1, −4, 20, −11, −5, 0, −1, 0, 0, 1, −6, 2, −1, 1, 0, 0, 0, −1, 5, −2, −1, 0, 0, 0, 0, 0, −2, 1, 0, 0, 0, 0, 0, 0 },
{−8, −13, −8, −40, −106, 29, −14, 6, 2, 5, 7, 19, 28, −9, 3, −2, 2, 2, 7, 2, 22, −6, 2, −1, −3, 3, −3, −1, −8,
2, 0, 0, −2, 0, −1, 2, 4, −1, 0, 0, 0, 0, 0, −1, −1, 0, 0, 0, −1, 0, 0, 1, 2, 0, 0, 0, 0, 0, 0, 0, 0, 0, 0, 0 },
{9, −3, −4, −1, −2, 1, 0, 1, 15, −3, −2, −2, 1, 0, 0, 0, 15, −4, −6, −3, 3, −1, 0, 0, 53, −12, −9, 3, −2, 1, −1,
0, 97, −33, −31, 12, −2, 1, −1, 0, −27, 10, 8, −2, 0, 0, 0, 0, 13, −4, −3, 1, 0, 0, 0, 0, −5, 2, 1, 0, 0, 0, 0, 0 },
{0, 3, 1, 21, −15, 5, −3, 2, −3, 0, −7, 24, −47, 11, −7, 2, 4, 16, 4, 95, 2, −3, 0, 0, −8, −10, −41, 3, 30, −4,
3, 0, 2, −3, −6, −18, 3, 2, 0, 0, −1, 1, 1, 0, 1, 0, 0, 0, 0, 0, −1, −3, 0, 0, 0, 0, −1, 0, 0, 0, 1, 0, 0, 0 },
},
{
{114, −39, −11, −3, −2, −1, −1, 0, −38, 8, 5, 1, 1, 0, 0, 0, −12, 7, 2, 0, 0, 0, 0, −4, 1, 0, 0, 0, 0, 0, −2,
1, 0, 0, 0, 0, 0, 0, −1 , 0, 0, 0, 0, 0, 0, 0, −1, 0, 0, 0, 0, 0, 0, 0, 0, 0, 0, 0, 0, 0, 0, 0 },
{−44, −62, 34, 3, 6, 1, 2, 0, −82, 25, 18, −1, 2, 0, 1, 0, 35, 15, −12, −3, −2, −1, −1, 0, 9, −2, −5,
0, 0, 0, 0, 0, 7, 1, −2, 0, 0, 0, 0, 0, 1, 0, −1, 0, 0, 0, 0, 0, 2, 0, −1, 0, 0, 0, 0, 0, 0, 0, 0, 0, 0, 0 },
{−6, −93, 22, 11, 5, 2, 2, 1, 76, −10, −14, 0, −3, 0, −1, 0, −7, 22, −5, −3, −1, −1, 0, 0, −14, 7, 2, −1,
1, 0, 0, 0, −4, 5, 0, −1, 0, 0, 0, 0, −2, 1, 0, 0, 0, 0, 0, 0, −1, 1, 0, 0, 0, 0, 0, 0, −1, 0, 0, 0, 0, 0, 0, 0 },
{13, 11, 16, −10, 1, −2, 0, −1, 28, 106, −29, −16, −5, −3, −1, −1, 31, −20, −21, 5, 0, 1, 0, 0, −13, −21,
7, 7, 1, 1, 0, 0, −2, −4, 2, 1, 0, 0, 0, 0, −3, −3, 1, 1, 0, 0, 0, 0, 0, −1, −1, 0, 0, 0, 0, 0, 0, 0, 0 },
{−28, −17, −47, 16, 2, 3, 0, 1, −11, 54, 2, −7, −1, −2, 0, −1, −88, 17, 37, −6, 2, −1, 1, 0, 15, −5, 0, −1, −1,
0, 0, 0, 6, −4, −1 , 0, 0, 0, 0, 0, 5, −2, 0, 0, 0, 0, 0, 0, 0, −1, 0, 0, 0, 0, 0, 0, 0, 2, −1 , 0, 0, 0, 0, 0, 0 },
{8, 18, 99, −28, −2, −6, 0, −2, 1, 2, 25, −11, −1, −1, 0, 0, −65, −7, −9, 7, 5, 1, 1, 1, 8, 4, −9,
3, 1, 0, 0, 0, 3, −1, −7, 1, 0, 0, 0, 0, 3, 0, −2, 1, 0, 0, 0, 0, 0, −1, −2, 0, 0, 0, 0, 0, −1, 0, −1, 0, 0, 0, 0, 0 },
{−10, −25, 4, −5, 4, −1, 1, 0, −23, −15, −65, 15, 3, 3, 0, 1, −21, −89, 11, 27, 3, 4, 1, 1, −7, 13, 26, −5, −4,
−1 , −1 , 0, 4, 8, 1, −6, −1 , 0, 0, 0, 1, 4, 2, −1 , 0, 0, 0, 0, 1, 1, 0, −1 , 0, 0, 0, 0, 0, 1, 1, 0, 0, 0, 0, 0 },
{1, 19, 15, −6, 2, −2, 0, 0, −21, −8, −92, 11, 6, 3, 1, 1, −13, 75, −23, −1, 1, −2, 0, −1, 5, 4, 11, −3, −3, −1,
−1, 0, 2, −7, 4, 1, −1, 1, 0, 0, 1, −2, 4, 0, 0, 0, 0, 0, 0, −1, 1, 0, 0, 0, 0, 0, 0, −1, 1, 0, 0, 0, 0, 0, 0 },
{−11, −12, −24, −108, 15, −8, 6, −2, −2, −7, 3, −34, 8, −2, 2, 0, 4, 15, 23, 18, −4, 0, −1, 0, −30, 0, 8, 8, −1,
0, 0, 0, 0, 1, −1 , 5, 0, 0, 0, 0, −1 , −1, −1 , 2, 0, 0, 0, 0, 1 , 0, 0, 2, 0, 0, 0, 0, −1 , 0, 0, 1, 0, 0, 0, 0 },
{−4, 14, 18, 30, −4, 1, −2, 0, −15, 4, 8, 9, −4, 0, −1, 0, −6, 13, 30, −13, −2, −1, 0, 0, −111, 7, 26, −9,
4, 0, 2, 0, −3, 6, −2, −4, 1, 0, 0, 0, 0, −1, −2, 0, 0, 0, 0, 0, 4, 0, −2, 0, 0, 0, 0, 0, −1, 0, 0, 0, 0, 0, 0, 0 },
{9, 6, 27, −8, 1, −2, 1, −1, 11, 17, −11, 30, −5, 3, −2, 1, 32, 10, 94, −6, −11, −2, −2, −1, 32, 38, −9, −29,
−3, −2, −1 , −1 , −1, −7, −17, −1 , 3, 0, 1, 0, −1, 1, −1 , −1 , 0, 0, 0, 0, −1 , −2, −2, 0, 1, 0, 0, 0, 0, 1, −1 , 0, 0, 0, 0, 0 },
{−6, −1, −16, −30, −1, −2, 1, −1, 6, 21, 24, 100, 0, 3, −2, 1, −11, 7, −39, 31, −3, 1, −1, 1, −12, 23, −9, −24,
−1, 1, 0, 0, −1 , 3, 3, −6, 0, 0, 0, 0, 0, −1, 0, −4, 0, 0, 0, 0, 0, 0, 0, 0, 0, 0, −1 , 0, 0, 0, 0, 0, 0 },
{−1, 5, −12, 5, 1, 1, 0, 0, −1, 14, 4, −42, 2, −2, 1, −1, −1, −3, −32, −12, 6, 0, 1,0, −1, 113, 2, −10, −1, −4,
0, −1 , −3, 10, −3, −2, −1, −1 , 0, 0, 0, −1, 2, 3, 0, 0, 0, 0, 0, −2, 0, 0, 0, 0, 0, 0, −1, 1, 0, 1, 0, 0, 0, 0 },
{−3, −4, −4, −14, 2, −1, 1, −1, −5, −25, 15−4, 3−2, 1−6−21−1, −2−57, 5, −1, 2, 0, −24, 4, −92,
19, 30, −2, 4, 0, 2, −8, −3, 33, 3, −2, 0, 0, −1, 3, 3, −2, −4, 1, 0, 0, 1, −2, 2, 3, 1, 0, 0, 0, −1, 1, 0, 0, 0, 0, 0, 0 },
{6, 8, 3, 15, 109, −23, 14, −5, 3, 1, 4, 6, 43, −9, 4, −1, −3, −4, −3, −11, −31, 5, −3, 1, −1, −1, 0, 2, −12,
3, −1, 0, 1, 0, 2, −1, −5, 1, −1, 0, 0, 0, 0, −2, 0, 0, 0, 0, 0, 0, 0, −2, 0, 0, 0, 0, 0, 0, 0, 0, 0, 0, 0 },
{−1, −3, 1, −28, −6, −1, 0, −1, 2, 0, 7, 21, −7, 4, −2, 1, −4, −12, −11, −97, −6, −1, 1, 0, 17, −5, 65, −15, −1,
0, 0, 0, 3, 1, 19, 13, 0, −2, 0, 0, 0, −1, −3, 0, 1, 0, 0, 0, −1, 0, 0, 3, 1, 0, 0, 0, 0, 0, 0, 0, 0, 0, 0, 0 },
}
},
{ //1
{
{98, −54, 2, −4, 0, −1, 0, −1, −57, 13, 12, −1, 2, 0, 1, 0,1, 15, −6, −2, 0, 0, 0, 0, −2, −3, −3,
2, 0, 0, 0, 0, 2, 1, 1, 0, 0, 0, 0, −1, 0, −1, 0, 0, 0, 0, 0, 0, 1, 0, 0, 0, 0, 0, 0, 0, 0, 0, 0, 0, 0, 0 },
{59, 14, −19, 1, −4, 0, −2, 0, 68, −67, 3, 3, 0, 0, 0, 0, −44, −2, 27, −5, 2, −1, 1, 0, −4, 17, −4, −6, 1, −1,
0, 0, −7, 1, −3, 1, 1, 0, 0, 0, −1, 3, 0, 0, 0, 0, 0, 0, −3, 0, 0, 0, 0, 0, 0, 0, 1, 0, 0, 0, 0, 0, 0 },
{−29, 24, −14, 2, −2, 1, −1, 1, −59, −43, 37, 3, 5, 0, 2, 0, −35, 67, 14, −16, 2, −3, 1, −1, 22, 12, −34,
0, 1, 0, 0, 0, 3, −8, −2, 8, −1, 1, 0, 0, 6, −1, −1, 0, −1, 0, 0, 0, 1, −1 , 0, 1, 0, 0, 0, 0, 2, 0, −1, 0, 0, 0, 0, 0 },
{36, 90, −46, 1, −7, 0, −3, 0, −34, −3, −23, 16, −1, 3, −1, 1, 38, −18, 1, 6, −5, 1, −1, 0, 7, −29,
7, 0, 0, 1, 0, 0, −1, −4, 12, −2, 1, 0, 0, 0, −1, −1, 0, −2, 1, 0, 0, 0, −1, −1, 2, 0, 0, 0, 0, 0, 0, −1, 0, −1, 0, 0, 0, 0, 1,
{11, 0, −12, 3, 0, 1, −1, 0, 50, 10, 25, −14, 2, −4, 0, −1, 18, 47, −61, −12, 2, −2, 0, −1, 19, −55, −28,
33, 1 , 4, 0, 2, −6, −12, 27, 8, −6, 2, −1, 0, 1, −2, 2, −4, 1, 0, 0, 0, −3, 0, 3, 1, 0, 0, 0, 0, −1, 0, 0, 0, 0, 0, 0 },
{−17, −33, −20, 10, −3, 3, −1, 1, −4, −58, 49, 8, −1, 2, 0, 1, 70, −13, 18, −21, −3, −2, −1, −1, −27, −21,
18, −7, 9, 0, 2, 0, −4, 26, 11, −10, 2, −3, 1, −1, −5, 6, −9, −4, 2, −1, 1, 0, 0, 5, −1, 0, 1, 0, 0, 0, −1, 1, −2, −1,
0, 0, 0, 0 },
{−11, −2, −14, 10, −1, 2, −1, 1, −22, −16, 12, −10, 1, −2, 1, −1, −64, −17, −35, 26, 3, 4, 1, 1, −3, −29, TABLE 20-continued 61, 24, −11, 3, −2, 1, 0, 32, 28, −34, −7, −1, −1, −1, 1, 6, −12, −10, 6, 0, 1, 0, −1, 5, −1, −2, 1, −1, 0, 0, 1, 0, −2,
−2, 0, 0, 0, 0 },
    {9, 34, −24, 14, −2, 2, −1, 1, 6, 39, 52, −27, −4, −3, 0, −1, −5, −1, −24, −23, 15, −4, 3, −1, −61, 41, −2,
9, 5, −4, 2, −1, 11, 28, −33, 2, −4, 0, 0, 0, 1, −12, −8, 13, −1, 2, 0, 1, 4, 0, 1, 1, −2, 0, −1, 0, −1, −3, −1,
2, 0, 0, 0, 0 },
    {12, 38, 92, −40, 6, −6, 2, −2, −11, −36, −5, −23, 13, −4, 3, −1, 13, 7, −17, 4, 4, −2, 1, 0, −34, −7, −5,
10, 2, 0, 1, 0, −1, 19, 7, 3, −1, −1, 0, 0, 0, 4, −9, −1, −1, 0, 0, 0, 1, 0, −2, 3, 0, 0, 0, 0, 0, 0, −2, 0, −1, 0, 0, 0 },
    {13, 18, 21, 10, −3, 0, −1, 0, 18, 10, 30, −24, −1, −2, 1, −1, 29, 38, 7, 28, −4, 0, −2, 0, 53, 13, 46, −35,
−25, −3, −4, −1, −8, 2, −33, −43, 8, 0, 2, −1, −1, −6−12, 7, 4, 0, 10−2, 0−4−3, 11, 1, 1, 1−2, −1,
1, 1, 1, 1, 0 },
    {3, 11, 11, −19, −4, −1, 0, −1, 16, 49, 7, 37, −3, 3, −2, 1, −22, 35, 45, −30, −29, 1, −4, 0, −21, −28, 5, −28,
17, 7, 1, 1, −3, 33, 30, −18, 6, −8, 0, −1, −2, 17, −27, −18, 5, −2, 2, −1, −1, 0, −8, 5, 2, −1, 1, 0, 0, 0, −5, −4,
0, 0, 0, 0 },
    {6, 15, 28, 4, −1, 2, 0, 1, −7, 13, 52, −25, −8, 0, −2, 0, −21, −64, 12, −43, 9, −1, 1, 1, 51, −22, −5, −10,
29, −1, 5, 0, −9, −16, 6, 12, 12, −6, 2, −2, −2, 11, 6, 1, −2, −3, 1, −1, −2, 1, −3, 0, 0, −1, 0, 0, 1, 2, 1, 0, 0, −1,
0, 0 },
    {5, 5, 11, −6, 2, 1, 2, 0, 4, 7, 10, 14, −9, 0, −2, 0, 16, −9, 21, −21, 12, −2, 4, −1, 17, 44, −2, 55, −15, −10,
−2, −3, 21, −21, 33, −42, −52, 9, −7, 1, −6, −7, −11, −36, 24, 6, 2, 3, 2, 1, 0, 4, 0, −3, 3, −1, −2, 1, −4, −7,
3, 4, 0, 0 },
    {2, 7, 6, 16, −3, 0, −2, 0, 1, 7, 20, −18, −9, 3, 1, 1, 2, 5, 11, 18, −2, 1, −3, −1, −25, 7, 5, −20, −29, 6, −5,
3, 14, −16, 36, 16, 14, 12, 0, 3, 19, 11, 60, −54, −18, −10, −4, −2, −8, −1, −23, −39, 23, 0, 4, 1, −2, 5, −1,
6, 3, −4, 2, −1 },
    {2, 0, 9, −13, −2, 0, 1, 0, 4, −7, 9, 15, 1, 0, 0, 0, −8, 1, 1, −9, −21, 3, −2, 1, −5, −24, 18, −8,
13, 10, 0, 2, 80, −20, −10, −7, 5, −6, −2, −1, −6, −72, 22, 11, −1, 0, 2, 0, 3, 10, 28, −10, 1, −1, 1, −1, −3, 2, −3, −2,
1, −1, 1, −1 },
    {−1, −1, −2, −3, 4, 4, −1, 1, −3, −2, −3, −6, −4, 0, −2, 2, −3, −5, −5, −11, 9, 8, −4, 1, −16, −4, −18, −11, −21,
4, −7, 4, 5, −18, 9, −32, 50, 36, 1, 9, 7, 10, 12, 22, 77, −30, −5, −3, −2, 6, −2, 20, −11, −31, 4, −6, −2, 0, −2,
3, −3, −3, 1, 0 },
    },
    {
    {−81, 49, −4, 4, −1, 1, 0, 1, 74, −33, −6, 0, −1, 0, 0, 0, −23, −4, 11, −1, 2, 0, 1, 0, 6, 7, −4, −1, 0, 0, 0, 0, −3,
−4, 0, 1, 0, 0, 0, 0, 2, 2, 0, −1, 0, 0, 0, 0, −1, −1, 0, 0, 0, 0, 0, 0, 1, 1, 0, 0, 0, 0, 0, 0 },
    {−58, −10, 17, 0, 3, 0, 1, 0, −13, 64, −26, 2, −4, 1, −1, 0, 53, −57, −2, 8, −2, 2, −1, 1, −23, 8, 22, −8, 2, −1,
1, 0, 9, 4, −13, −1, 1, 0, 0, 0, −3, −4, 5, 3, −1, 0, 0, 0, 3, 1, −1, −2, 0, 0, 0, 0, −2, −1, 1, 1, 0, 0, 0, 0 },
    {−55, 11, −12, 4, 0, 1, 0, 1, −43, 12, 29, −6, 4, −2, 1, −1, 12, 51, −47, 4, −3, 1, −1, 0, 29, −54, 9, 16, −5,
4, −2, 1, −8, 13, 16, −14, 2, −1, 1, 0, 5, −4, −11, 4, 2, −1, 0, 0, −1, 1, 5, 0, −2, −1, 0, 0, 2, −1, −2, 0, 0, 0, 0, 0 },
    {44, 47, −31, 8, −4, 2, −2, 1, 30, −19, 6, −3, −2, 0, −1, 0, 38, −30, −19, 8, −2, 2, −1, 1, −15, −37, 48, −5,
1, 0, 1, 0, −15, 42, −13, −17, 6, −4, 2, −1, 3, −15, −8, 15, −3, 2, 0, 0, −2, 5, 8, −8, 0, 0, 0, 0, −1, −2, −4,
3, 1, 0, 1, 0 },
    {−13, 52, −21, −5, −3, 1, −1, 0, −59, −43, 8, 20, 0, 3, 0, 1, 46, 5, 38, −27, 3, −3, 1, −1, −32, 19, −31,
0, 8, −4, 3, −1, 13, 1, −1, 14, −9, 3, −1, 1, 0, −6, 2, −6, 1, 0, −1, 0, 2, 2, 0, 1, 1, 0, 1, 0, −1, 0, −1, 0, 0, 0, 0, 0 },
    {26, 35, 6, −11, 0, −1, 0, −1, 26, 29, −34, 15, −4, 1, −2, 1, 28, −6, −9, −11, −3, 0, −1, 0, 9, −32, −32,
29, 0, 3, −1, 1, 9, −35, 57, −7, −11, 4, −2, 1, −13, 21, −15, −21, 20, −5, 2, −1, 1, −7, −1, 25, −9, −3, 1, −1,
0, 0, 6, −14, −2, 4, −1, 1 },
    {−4, −32, −22, −5, 3, 3, 0, 0, 36, 6, 52, 3, −2, −5, 0, −1, 12, 4, −38, −36, 10, −2, 2, −1, −50, 20, −12,
47, 1, −3, 1, 0, 27, −1, 0, −11, −19, 9, −5, 1, −3, −19, 12, 0, 16, −4, 0, 1, 0, 12, −2, −5, −5, −4, 3, −1, −4, −3, −4,
7, 1, 2, 0, 0 },
    {−16, −46, 15, −7, 0, −2, 1, 0, 5, −24, 4, 8, 3, 3, 0, 1, 1, −4, 30, −15, −1, −3, 0, −1, −27, −11, 7, −2,
12, 1, 2, 0, −13, 54, 26, −17, −2, −8, 1, −2, −8, 22, −63, −4, 8, 2, 3, 0, 5, −13, 11, 32, −11, 2, −3, 1, 3, 2, 1, −23,
2, 2, −1, 1 },
    {5, −11, 12, 3, −1, −3, 0, 0, 34, 20, 2, −14, 6, 1, 1, 0, 32, 30, −5, −11, −3, −7, −1, −2, −15, −28, −49, −21,
21, 2, 5, −1, −21, 20, −12, 65, 4, −10, 2, −2, 10, −6, 4, 0, −39, 12, −3, 1, 1, −10, 10, −7, 15, 6, −4,
2, 1, 2, 0, −1, −3, −8, 1, 0 },
    {8, 54, 5, −4, 2, −1, 0, 0, −21, 46, −18, −8, 3, −2, 0, −1, −65, 4, −26, −5, 4, −2, 1, 0, −38, 25, −7,
17, 9, 2, 2, 1, 6, 42, −6, 11, −5, −3, −2, −1, 6, −5, −26, 3, −7, 1, −2, 1, 4, −9, 5, 7, −1, 1, −1, 1, 2, −1, −2, −4, 2, −1,
0, 0 },
    {−3, −9, −3, 8, −4, 0, −2, 0, −5, −10, −2, 3, −1, 6, 1, 1, −13, −16, 5, 12, −8, 0, −2, 0, −2, −8, 21, 9, −2,
10, 0, 3, 23, 19, 48, 11, −16, −3, −5, 0, 12, −24, 10, −75, −21, 8, −1, 2, −7, −3, −2, −21, 55, 6, 3, 0, −3, 13, −8,
14, 5, −13, 2, −3 },
    {0, −6, 26, −38, 11, −1, 3, −2, 3, 5, −31, 47, −11, −2, −2, 1, −8, 6, 21, −34, 2, 8, −2, 1, 24, −18, −4,
23, 8, −14, 4, −3, −31, 29, −12, −11, −20, 17, −4, 2, 30, −38, 17, 9, 16, −6, −3, 2, −14, 18, 4, −20, −3, −4, 6, −3,
1, 0, −13, 20, 1, 1, −1, −1 },
    {−2, −3, −65, 20, −5, 4, −3, 2, −5, 36, 37, 10, −10, 4, −2, 1, −18, −46, 22, −37, 10, −3, 1, −1, 49, 2, −11,
2, 17, −6, 5, −2, −28, 3, 2, 14, −9, −3, 0, −2, 2, 14, −8, −3, −6, 5, −1, 1, −1, −7, 2, 4, 1, 1, −2, 0, 3, 1, 2, −4, 1, −1,
0, 1 },
    {0, −1, 2, −8, 14, −8, 4, −2, 0, 0, −5, 14, −20, 11, −5, 3, 2, −2, 5, −15, 21, −12, 5, −3, −1, 4, −9, 21, −27,
13, −6, 3, 7, −12, 16, −26, 32, −12, 5, −1, −10, 18, −20, 40, −39, 7, −1, −2, 16, −27, 31, −49, 20, 10, −6,
5, −12, 17, −19, 25, 6, −15, 7, −4 },
    {14, 26, 24, 7, 1, 1, 1, 1, 25, 45, 41, 10, 0, 2, 0, 1, 30, 50, 37, −1, −6, −1, −1, 0, 28, 41, 17, −19, −11,
−2, −3, −1, 17, 16, −8, −28, −4, −1, −1, 0, 4, −2, −21, −19, 4, 2, 1, 0, 1, −4, −10, −2, 10, 2, 1, 0, 1, 1, −4, 3, 4, −1,
0, −1 },
    {1, −4, −4, 5, −4, −1, −1, 0, 2, −1, −2, 3, 2, 4, 1, 1, 0, −5, 3, 7, −9, −1, −2, −1, 21, 5, −3, −1, 0, 7, −1, 3, 32, −15,
−10, 3, −4, −4, −3, 0, 2, −68, −11, 7, 2, 6, 4, 2, 8, −7, 79, 17, −7, 1, −3, −1 , −4, 12, −7, −50, 0, 1, −1, 0 },
    }
  },
  {//2
    {
    {112, −48, 2, −6, 0, −2, 0, −1, −32, 13, 0, 1, 0, 0, 0, 0, −16, 6, 0, 1, 0, 0, 0, 0, −2,
1, 0, 0, 0, 0, 0, 0, 0, 1, 0, 0, 0, 0, 0, 0, −1, 0, 0, 0, 0, 0, 0, 0, −1, 0, 0, 0, 0, 0, 0, 0, 0, 0, 0, 0, 0, 0, 0, 0 },
    {27, −1, −6, 0, −1, 0, −1, 0, 107, −40, −1, −4, 0, −1, 0, −1, −46, 14, 3, 1, 1, 0, 0, 0, −16, TABLE 20-continued 6, 1, 0, 0, 0, 0, 0, −4, 1, 0, 0, 0, 0, 0, 0, −1, 1, 0, 0, 0, 0, 0, 0, −2, 0, 0, 0, 0, 0, 0, 0, 0, 0, 0, 0, 0, 0, 0, 0, 0 },
    {5, −44, 27, −8, 5, −2, 2, −1, 41, 6, −11, 1, −2, 0, −1, 0, 98, −19, −10, −1, −2, 0, −1, 0, −35,
7, 3, 0, 1, 0, 0, 0, −17, 5, 1, 0, 0, 0, 0, 0, −4, 1, 0, 0, 0, 0, 0, 0, 1, 0, 0, 0, 0, 0, 0, −1, 0, 0, 0, 0, 0, 0, 0, 0 },
    {46, 80, −59, 15, −11, 3, −4, 1, 0, −16, 10, −3, 2, 0, 1, 0, 41, −38, 12, −4, 1, −1, 0, 0, −14,
1, 3, 0, 0, 0, 0, 0, −9, 3, 1, −1, 0, 0, 0, 0, −1, 0, 0, 0, 0, 0, 0, 0, −1, −1, 1, 0, 0, 0, 0, 0, 0, 0, 0, 0, 0, 0, 0, 0 },
    {−11, 5, −2, 1, 0, 0, 0, 0, −13, 36, −16, 5, −3, 1, −1, 0, −32, −15, 11, −1, 2, 0, 1, 0, −109,
17, 11, 0, 3, 0, 1, 0, 29, −1, −2, 0, −1, 0, 0, 0, 5, −2, −1, 0, 0, 0, 0, 0, 6, −2, 0, 0, 0, 0, 0, 0, −2,
0, 0, 0, 0, 0, 0, 0, 0 },
    {7, 12, −4, 0, 0, 0, 0, 0, 38, 89, −48, 10, −8, 2, −3, 0, −11, −34, 14, −2, 1, 0, 1, 0, 37, −36, 11, −3,
1, 0, 0, 0, −1, −3, 1, 0, 0, 0, 0, 0, −5, 0, 1, −1, 1, 0, 0, 0, −1, 0, 0, 0, 0, 0, 0, 0, −1, 0, 0, 0, 0, 0, 0, 0 },
    {1, −11, 29, −13, 5, −3, 2, −1, 0, −30, 5, 0, 1, 0, 0, 0, −10, −87, 29, −3, 3, 0, 1, 0, 25, 32, −15, 2, −1, 0, −1,
0, 58, 11, −14, 1, −2, 0, −1, 0, −11, 2, 1, 0, 0, 0, 0, 2, 0, 0, 1, 0, 0, 0, 0, −2, 1, 0, 0, 0, 0, 0, 0 },
    {8, 5, −17, 7, −2, 1, −1, 0, 13, 8, 2, −2, 0, −1, 0, 0, 31, 47, −16, 1, −2, 0, −1, 0, 8, −15,
4, 0, 0, 0, 0, 0, 104, −28, −2, 0, −2, 0, −1, 0, −21, 2, 2, 0, 0, 0, 0, 0, 3, 1, 0, −1, 0, 0, 0, 0, −5,
0, 1, 0, 0, 0, 0, 0, 0 },
    {23, 68, 82, −44, 11, −10, 4, −3, −7, −15, −26, 15, −2, 2, −1, 1, 1, 13, −25, 10, −3, 2, −1, 1, −7, −13,
4, 0, 0, 0, 0, 1, −5, 2, 0, 0, 0, 0, 0, 0, 0, 0, −1, 0, 0, 0, 0, 0, 0, −1, −1, 1, 0, 0, 0, 0, 0, 0, 0, 0, 0, 0, 0, 0 },
    {−4, −15, 3, 2, 0, 1, 0, 0, −3, −25, 30, −10, 3, −2, 1, −1, −7, −30, −12, 3, −1, 1, 0, 0, −18, −105, 31, −1,
3, 0, 1, 0, 11, 23, −2, −2, 1, −1, 0, 0, 16, 6, −7, 1, −1, 0, 0, 0, −1, 4, −1, 0, 0, 0, 0, 0, 0, −1, 0, 0, 0, 0, 0 },
    {−5, −3, 0, −1, 1, 0, 0, 0, −8, −8, 2, 1, 1, 0, 0, 0, −9, −5, 6, −2, 1, 0, 0, 0, −12, −17, 1, 0, 0, 0, 0, 0, −22, −14,
6, 0, 1, 0, 0, 0, −120, 17, 10, 0, 3, 0, 1, 0, 12, 3, −2, 0, −1, 0, 0, 0, 6, 0, −1, 0, 0, 0, 0, 0 },
    {5, 15, 19, −1, −1, 1, 0, 0, 17, 52, 82, −39, 6, −6, 3, −2, −9, −15, −48, 16, 0, 2, 0, 1, −2, 13, −31, 16, −1,
1, 0, 1, −3, −1, 3, 1, −1, 1, −1, 0, −7, −3, 1, 0, 0, 0, 0, 0, −1, 0, −1, 0, 0, 0, 0, −1, −1, 0, 0, 0, 0, 0 },
    {0, −5, 8, −5, 2, −1, 1, −1, 0, −7, 11, −3, 1, 0, 0, 1, −14, 32, −6, 1, −1, 0, 0, −8, −22, −30, 5, 1, 0, 0, 0, −12,
−107, 17, 4, 1, 1, 1, 1, 27, 23, 3, −2, 0, 0, 0, 0, 4, 14, −4, −1, 0, 0, 0, 0, −1, 3, −2, 0, 0, 0, 0, 0 },
    {−3, −9, −13, 11, −2, 2, −1, 1, −4, −12, −17, 3, −2, 1, 0, 0, −11, −35, −72, 15, 0, 2, −1, 1, 10, 28, 60, −21,
3, −3, 1, −1, 0, −36, 47, −7, −2, 0, 0, 0, 1, 4, −11, 5, −1, 0, 0, 0, 8, −1, −2, 0, 0, 0, 0, 0, 1, 2, −1, 0, 0, 0, 0, 0 },
    {5, 4, 40, 57, −70, 29, −12, 5, −2, −3, −11, −3, 7, −2, 1, 0, −1, 0, −11, −48, 45, −17, 6, −3, −1, −3, −3,
11, −5, 1, 0, 0, 1, 1, 2, 14, −12, 3, −1, 0, 0, 2, 2, −1, −1, 1, 0, 0, 1, 0, 0, −1, 1, 0, 0, 0, −1, 0, 0, 0, 0, 0, 0, 0 },
    {−2, 0, 1, 1, 1, 0, 0, 0, −3, 0, 1, 1, 0, 0, 0, 0, −2, −1, 2, 0, 0, 0, 0, 0, −4, −1, −1, 0, 0, 1, 0, 0, −2, −5, −1, −1,
0, 0, 0, 0, −13, −3, 1, 1, 0, 0, 0, 0, −104, 3, 7, 0, 2, 0, 1, 0, −72, 2, 5, 0, 2, 0, 1, 0 },
    },
    {
    {−101, 34, 1, 4, 1, 1, 0, 1, 67, −20, −3, −2, −1, −1, 0, 0, −10,
0, 2, 0, 1, 0, 0, 0, 0, 2, 0, 0, 0, 0, 0, 0, 0, 0, 0, 0, 0, 0, 0, 0, 0, 0, 1, 0, 0, 0, 0, 0, 0, 0, 0, 0, 0, 0, 0, 0, 0, 0, 0, 0, 0, 0,
0, 0, 0, 0 },
    {59, 0, −5, −1, −1, 0, −1, 0, 67, −25, −1, −2, 0, −1, 0, 0, −84, 15, 6, 2, 2, 1, 1, 0, 19, 1, −3, 0, −1, 0, 0, 0, −4,
−1, 0, 0, 0, 0, 0, 0, 1, 1, 0, 0, 0, 0, 0, 0, −3, 0, 0, 0, 0, 0, 0, 0, 1, 0, 0, 0, 0, 0, 0, 0 },
    {33, −25, 6, −2, 1, −1, 1, 0, 71, 7, −9, −1, −2, 0, −1, 0, 56, −20, −2, −1, 0, −1, 0, 0, −75,
11, 6, 1, 2, 0, 1, 0, 13, 3, −2, 0, 0, 0, 0, 0, −6, −1, 0, 0, 0, 0, 0, 0, 2, 0, 0, 0, 0, 0, 0, 0, −3, 0, 0, 0, 0, 0, 0, 0 },
    {−31, −86, 36, −5, 7, −1, 3, 0, 11, 67, −25, 2, −5, 0, −2, 0, −33, −2, 2, 3, 0, 1, 0, 0, 14, −9, 2, −1,
0, 0, 0, 0, 5, 2, −1, 0, 0, 0, 0, 0, −2, −1, 1, 0, 0, 0, 0, 0, 1, 1, −1, 0, 0, 0, 0, 0, 0, 0, 0, 0, 0, 0, 0, 1 },
    {14, −13, 3, 0, 1, 0, 0, 0, 35, 0, −2, −1, 0, 0, 0, 0, 57, 6, −6, 0, −2, 0, −1, 0, 67, −21, −3, −1, −1, −1, 0, 0, −77,
8, 7, 1, 2, 0, 1, 0, 16, 1, −2, 0, −1, 0, 0, 0, −9, 1, 0, 0, 0, 0, 0, 0, 4, 0, 0, 0, 0, 0, 0, 0, 0 },
    {11, 40, −5, 1, −1, 0, −1, 0, 6, 41, −22, 5, −4, 1, −1, 1, −7, −95, 30, −3, 4, 0, 2, 0, 28, 38, −7, −4, 0, −1,
0, −1, −3, 4, −6, 2, 0, 0, 0, 0, −5, −2, 3, 0, 0, 0, 0, 0, 2, −2, 0, 0, 0, 0, 0, 0, 0, 5, 0, 0, 0, 0, 0, 0 },
    {−8, 6, −2, 0, −1, 0, 0, 0, −20, 9, −2, 1, 0, 0, 0, 0, −36, −11, 3, 0, 1, 0, 0, 0, −65, 0, 5, 0, 2, 0, 1, 0, −81,
19, 4, 2, 1, 0, 1, 0, 53, −5, −6, 0, −2, 0, −1, 0, −16, −1, 2, 0, 0, 0, 0, 0, 4, 0, 0, 0, 0, 0, 0, 0 },
    {5, 12, 75, −25, 9, −6, 3, −2, −13, −42, −70, 20, −6, 4, −2, 1, 8, 18, 33, −3, 0, 0, 0, 0, −2, 19, −6, −5, 1, −1,
0, 0, −7, −22, −7, 4, 0, 1, 0, 0, 4, 7, 4, −1, 0, 0, 0, 0, −1, −1, −2, 0, 0, 0, 0, 0, 2, 0, 0, 0, 0, 0, 0, 1 },
    {−12, −48, −16, 4, −1, 1, 0, 0, −4, −30, 32, −8, 4, −2, 1, 0, 1, −8, 0, 1, 1, 0, 1, 0, 6, 85, −18, 1, −3, 0, −1,
1, 0, −17, −59, 5, 2, 1, 1, 0, 0, 11, 13, 0, 0, 0, 0, 0, 0, −3, 1, 0, −1, 0, 0, 0, 0, 2, −1, 0, 0, 0, 0, 0, 1 },
    {−3, 7, −3, 1, −1, 0, 0, 0, −5, 9, −1, 0, 0, 0, 0, 0, −12, 4, −1, 0, 0, 0, 0, 0, −21, −9, −2, 0, 0, 0, 0, 0, −56, −24,
6, −1, 1, 0, 1, 0, −101, 20, 8, 0, 2, 0, 1, 0, 33, 1, −5, 0, −1, 0, −1, 0, −5, 1, 1, 0, 0, 0, 0, 0 },
    {10, 44, −8, 3, −2, 1, −1, 0, 12, 67, −9, 3, −1, 1, −1, 0, 4, 38, −7, 2, −2, 1, −1, 0, −6, −8, −4, 0, −1,
0, 0, 0, 4, −81, 10, 0, 1, 0, 0, 0, 29, 18, 0, −2, 0, −1, 0, 0, −9, 4, 1, −1, 0, 0, 0, 2, 2, −1, 0, 0, 0, 0, 0 },
    {6, 20, 56, −4, 3, −1, 2, −1, 0, −2, 9, −14, 3, −3, 1, −1, −8, −23, −95, 18, −7, 3, −3, 1, 6, 20, 34, 4, −2,
1, 0, 0, −1, −2, 26, −9, 2, −1, 0, 0, −2, −3, −8, 2, 1, 0, 0, 0, 1, 1, 0, 0, 0, 0, 0, 0, −1, 0, 0, 0, 0, 0, 0 },
    {0, −2, 0, 1, 0, 0, 0, 0, −1, 2, −1, 1, −1, 0, 0, 0, −4, 1, 0, 0, 0, 0, 0, 0, −1, −4, 6, −2, 1, 0, 0, 0, 6, 16, 6, 0, 1, −1,
1, 0, 13, 88, −16, −2, −2, 0, −1, 0, 12, −84, −6, −6, −1, 1, 0, 0, −10, 16, 9, −2, 1, 0, 0, 0 },
    {1, 1, −1, 0, 0, 0, 0, 0, 2, 0, −1, 0, 0, 0, 0, 0, 2, 0, 1, 0, 0, 0, 0, 3, 0, −1, 1, −1, 0, 0, 0, −3, −2,
1, 0, 1, 0, 0, 0, 35, −18, 1, 1, 0, 1, 0, 0, 99, 9, −7, −1, −2, −1, −1, 0, −70, −4, 6, 0, 2, 0, 1, 0 },
    {4, 0, 20, 78, −31, 15, −4, 4, −4, −3, −24, −76, 27, −13, 3, −3, 3, 3, 19, 25, −1, 1, 1, 0, −2, −2, −7, 10, −9,
3, −1, 1, 0, 0, −3, −11, 3, −1, 0, 0, 1, 0, 2, 1, 0, 0, 0, 0, 1, 0, 0, 0, 0, 0, 0, 0, 1, 0, 0, 0, 0 },
    {0, 0, 7, −3, 0, 0, 0, 0, 0, −2, 4, 1, 0, 0, 1, 0, −4, 4, −16, 2, −3, 1, −1, −6, −6, −72, 26, −6, 5, −2,
1, 9, 11, 91, −12, 1, 0, 1, 0, −3, −6, −36, −2, 2, −2, 0, −1, 0, 3, 8, 4, −1, 1, 0, 0, 0, −2, 0, −2, 0, 0, 0, 0 },
    }
    },
    {//3
    {
    {114, −34, −10, −3, −2, −1, −1, 0, −27, 29, −2, 0, −1, 0, 0, 0, −22, 3, 6, 0, 1, 0, 0, 0, −2, −2,
1, 0, 0, 0, 0, 0, −3, 0, 1, 0, 0, 0, 0, 0, −1, −1, 0, 0, 0, 0, 0, 0, −1, 0, 0, 0, 0, 0, 0, 0, 0, 0, 0, 0, 0, 0, 0, 0 },
    {7, −39, 14, −1, 3, 0, 1, 0, 98, −10, −30, 1, −5, 0, −2, 0, −32, 50, −2, −5, 0, −1, 0, 0, −15, −4, 12, −1,
1, 0, 0, 0, −4, 1, 0, 1, 0, 0, 0, 0, −3, −1, 2, 0, 0, 0, 0, −1, 0, 0, 0, 0, 0, 0, 0, −1, 0, 0, 0, 0, 0, 0, 0, 0 },
    {30, −14, 5, −4, 1, −1, 0, 0, −1, 4, −69, 13, 7, 2, 2, 1, 1, 64, 7, −50, 5, −5, 1, −2, 1, −24, 52, −2, −11, 1, −2,
0, −1, −5, −2, 11, −1, 0, 0, 0, −4, 4, 1, 0, 0, 0, 0, −1, −1, 1, 0, 0, 0, 0, −2, 2, 0, 0, 0, 0, 0, 0, 0 },
    {−36, −101, 40, 3, 8, 1, 3, 0, −39, 11, −23, 7, −1, 2, 0, 1, 15, −3, −5, −3, 0, 0, 0, 0, 19, −1, −11, 0, −1,
0, 0, 0, 1, 12, −4, −3, 0, −1, 0, 0, 2, 2, 1, −1, 0, 0, 0, 0, 0, 2, 0, −1, 0, 0, 0, 0, 1, 0, 0, 0, 0, 0, 0, 0 },
    {9, −14, −4, 4, 0, 1, 0, 0, 50, −1, 24, −10, 1, −3, 0, −1, −6, −71, 9, 28, −2, 5, −1, 2, 27, 15, −65,
5, 1, 1, 0, 0, −13, 34, 3, −16, 2, −2, 1, −1, 1, −1, 4, −1, 0, 0, 0, 0, −3, 4, 2, −2, 0, 0, 0, 0, 0, 0, 1, 0, 0, 0, 0 }, TABLE 20-continued

```
    {-8, -7, -32, 12, -4, 3, -1, 1, 22, 77, -20, -19, 0, -4, 0, -1, 64, -2, 19, -6, -3, -2, -1, -1, -29, 36, 5, -1,
1, -1 , 0, 0, -11 , -12, 27, -1, 1, 0, 0, 0, 0, -9, -1, 7, -1, 1, 0, 0, -1, -3, 1, 0, 0, 0, 0, 0, -1, -1, -1 , 2, 0, 0, 0, 0 },
    {-17, 2, -13, 2, 1, 1, 0, 0, -15, 17, -3, 4, -3, 1, -1, 1, -63, 3, -45, 6, 5, 2, 2, 1, 15, 53, -2, -47, 2, -6,
1 , -2, -3, -8, 58, -5, -9, 0, -2, 0, 8, -14, -1, 14, -3, 2, -1, 1, -2, 0, 1, 1, -2, 0, 0, 0, 2, -2, -1 , 3, 0, -1 , 0, 0 },
    {-15, -34, -3, -2, 4, -1, 1, 0, 1, 8, 70, -12, -1, -2, 0, -1, -23, -10, 1, 36, -4, 5, -1, 2, -64, -7, 2, 3, 11, -1,
3, 0, 16, -49, -6, 7, 2, 3, 0, 1, -1, 7, -28, 0, 1, 0, 0, 0, 3, 0, -1, 1, 0, 0, 0, 0, 2, -2, -2, -1, 0, 0, 0, 0 },
    {-14, -33, -105, 31, -7, 8, -3, 3, -10, -35, -5, -18, 6, -2, 2, -1, -8, 16, 5, -9, -1, 0, 0, 0, 6, -11, -6, -1,
-2, 0, 0, 0, 10, 12, -10, -5, -1, -1, 0, -1, -2, 10, 6, -5, 0, -2, 0, 0, 1, 1, 4, 0, 0, -1, 0, 0, 0, 1, 1, -1, 0, 0, 0, 0 },
    {4, -18, -10, -10, 3, -1, 1, 0, 24, -5, 29, -9, -3, -1, 0, -1, 12, -34, 3, -24, 4, -2, 1, -1, 63, 3, 62, -9, -19,
0, -4, 0, -5, -25, 4, 48, -7, 4, -1, 2, 0, 7, -28, 6, 9, -1, 1, 0, -5, 3, -3, -2, 2, 1, 0, 0, 1, 1, -2, -1, 0, 0, 0, 0 },
    {-1, -4, 16, 8, -4, 1, 0, 0, -17, -46, -7, -24, 8, -4, 2, -1, -19, 2, 76, -9, -14, -1, -3, -1, -6,
41, 5, 35, 2, 0, 0, 0, -25, -13, 32, 0, 8, 3, 1, 0, 9, -32, -8, 17, -3, 4, -1, 1, -3, 3, -12, 0, 1, 0, 0, 0, 2, -2, -1,
3, 0, 0, 0, 0 },
    {2, 1, -1, 17, -4, 4, -1, 1, 2, -15, -63, 18, 7, 2, 2, 0, -20, -75, -11, -33, 14, 0, 3, 0, -49, 1, 7, -6, -14,
4, -1, 1, 4, -25, -14, 6, -1, -3, 1, 0, 3, 10, -15, -7, 0, -1, -1, 0, 2, 3, 2, -6, 0, -1, 0, 0, 1, 3, 2, -3, -1, 0, -1,
0 },
    {9, -3, 12, -4, -3, 0, 0, 0, 5, -20, -3, -21, 3, -1, 2, -1, 21, -12, 24, -6, 0, 0, 2, 0, -11, -54, -4, -49,
2, 0, 1, -1, 48, 6, 56, -12, -33, 0, -7, 0, -6, -2, 4, 38, -8, 3, -2, 1, 3, 3, -6, 7, -4, -1, 1, 0, -3, 0, -4, 9, 1, -3,
0, 0 },
    {-7, -11, 1, -12, 3, -2, 0, 0, 0, 3, 33, 0, -7, -1, 0, 0, -15, -21, 4, -24, 6, -3, 2, -1, -34, 12, 40, 3, -17,
1, -4, 0, -2, 45, -2, 6, -1, -5, 0, -2, 10, -6, 69, -4, -4, -1, -1, -1, 8, -27, 7, 44, -4, 3, -1, 1, -5, 1, -16,
11, 6, 0, 2, -1 },
    {-2, 5, 4, 14, -3, -2, -1, 0, -8, 1, -7, 3, 2, -1, -2, 0, -4, 8, 4, 19, 0, 0, -1, 0, -23, 2, -11, -1, -11, 0, -5,
0, 4, 53, 11, 70, -9, -12, -3, -4, -14, -2, -20, 12, 66, -5, 9, -2, 5, -16, 9, -29, 12, 11, 1, 3, -3, -2, -7,
2, 1, 5, -1, 0 },
    {-3, -6, -10, -1, 0, 1, -1, 0, -2, -4, 11, 9, 1, 2, 0, 0, 9, -2, -22, -4, 7, 1, 2, 0, -18, -54, -1, -15, -5,
3, 0, 1, -89, 6, 12, 4, -1, -3, 1, -1, 27, -46, -6, 9, 0, 2, 0, 1, -6, 16, -20, -3, 0, 0, 1, 0, 4, -2, 6, -4, -1, -1, 0,
-1 },
    },
    {
    {-109, 30, 6, 4, 2, 1,1, 49, -33, 0, -2, 0, 0, 0, 0, 2, 8, -5, 0, -1, 0, 0, 0, 3, -1, 1, -1,
0, 0, 0, 0, 1, 1, 0, 0, 0, 0, 0, 0, 0, 1, 0, 0, 0, 0, 0, 0, 0, 0, 0, 0, 0, 0, 0, 0, 0, 0, 0, 0, 0, 0, 0, 0, 0 },
    {-35, 24, -3, 2, 0, 0, 0, 0, -91, -5, 20, 1, 4, 0, 2, 0, 59, -42, -11, 3, -1, 1, 0, 0, -4, 17, -9, -3,
0, 0, 0, 0, 8, -4, 3, -1, 0, 0, 0, 0, -1, 3, -1, 1, 0, 0, 0, 0, 3, -1, 0, 0, 0, 0, 0, 0, 0, 1, 0, 0, 0, 0, 0, 0 },
    {39, 90, -39, 3, -8, 1, -3, 0, 2, -50, 38, -5, 5, -1, 2, 0, -26, 7, -13, 6, 0, 1, 0, 0, 10, -2, 3, -4, 1, -1,
0, 0, -5, -1, 1, 1, 0, 0, 0, 0, 2, -1, 0, 0, 0, 0, 0, 0, -2, -1, 0, 0, 0, 0, 0, 0, 0, 0, 0, 0, 0, 0, 0, 0 },
    {-25, 23, -8, 6, -2, 2, -1, 1, -20, 55, 4, -5, 1, -2, 0, -1, -61, -42, 43, 3, 5, 1, 2, 0, 41, -38, -24, 11, -1,
2, -1, 1, -7, 15, -7, -6, 1, -1, 0, 0, 7, -5, 1, 0, -1, 0, 0, 0, -2, 2, -1, 0, 0, 0, 0, 0, 2, -2, 0, 0, 0, 0, 0, 0 },
    {10, -29, -3, 3, 1, 1, 0, 0, 35, -18, 19, -7, 2, -2, 1, -1, -3, -57, -23, 21, -3, 5, -1, 2, 26, 50, -56, -17,
0, -3, 0, -1, -14, 24, 35, -18, -2, -3, 0, -1, 6, -7, 3, 10, -2, 1, 0, 0, -5, 3, 1, -3, 1, 0, 0, 0, 1, -1, 0, 2-3, -1,
0, 0 },
    {-5, -38, 33, -10, 7, -3, 2, -1, -45, -65, -2, 16, -1, 4, 0, 1, -35, 20, -28, -5, 2, -1, 1, 0, 51-30, 1, -7,
-4, 0, -1, 0, -5, 28, -14, 1, -3, -1, -1, 0, 5, 1, 7, -4, 0, -1, 0, 0, -1, 3, -1, 2, -1, 0, 0, 0, 1, 0, 1, -1, 1, 0, 0, 0 },
    {19, 4, 18, 0, -2, 0, 0, 0, 20, -36, 0, -2, 5, -1, 1, 0, 43, -15, 41, 6, -7, 2, -2, 0, -20, -43, -42,
43, 7, 5, 1, 2, 7, 27, -39, -33, 7, -1, 2, -1, -3, 1, 17, -9, -8, -1, -2, 0, 3, 3, -3, 3, -1, 0, 0, 0, -2,
1, 2, 1, 0, 0, 0, 0 },
    {-14, -45, -34, 17, 1, 2, 0, 1, -3, -4, 62, -22, 2, -2, 1, -1, -29, -4, -18, 35, 0, 4, 0, 2, -46, -32, -5, -12,
8, 1, 2, 0, 36, -17, -18, -1, -7, 1, -2, 1, -9, 16, -8, -5, -1, -2, 0, -1, 7, -1, 1, 0, -1, -1, 0, 0, -2, 3, -2, -2,
1, 0, 0, 0 },
    {-1, -30, -47, 16, -4, 3, -2, 1, 16, 2, 33, -24, 1, -4, 1, -2, 47, 4, 16, 1, -3, -2, -1 , 0, 63, -6, 32, 21, -5,
1, -2, 1, -37, 1, -21, 29, 9, 2, 1, 1, 5, 2, -10, -12, 6, 1, 0, 0, -5, 1 , 3, 3, -1, 1, 0, 0, 2, 0, -2, -1 , 3, 1, 1, 0 },
    {13, 5, 49, -17, 8, -5, 2, -2, 23, -18, 13, 24, -5, 3, -1, 1, -8, -68, 4, -1, 8, 0, 2, 0, 3, -2, 26, 4, -8, 2, -2,
1, 1, -50, -27, 37, 2, 3, 0, 1, -3, 18, -32, -11, 6, -1, 0, -1, 1, 1, -1, 0, 1, -1, 0, 0, 1, 4-4-4, 5, 1, 0, 0 },
    {-8, -13, 14, 11, -6, 2, -1, 0, -25, -24, 7, -15, 10, -4, 2, -1, -30, 28, 38, 12, -18, 3, -4, 0, -2, 45, -12,
48, 18, -2, 4, 0, -27, -57, 7, -25, 15, 7, 4, 2, 11, -5, -21, 1, -12, -2, -2, 0, -2, 3, 2, -5, 3, -1, 1, -1, 3, 0, -1,
2, -1, -1, 0, 1 },
    {5, -4, 12, 7, -6, 2, -2, 0, 0, -19, 4, -10, 7, -4, 1, -1, 13, 4, 37, 4, -10, 0, -1, -1, 6, -29, 5, -2, 7, -4, 1, -1,
27, 9, 51, 25, -18, 4, -5, 1, -13, -8, -39, 67, 19, 2, 3, 1, -7, 1, -19, -31, 21, 3, 3, 0, 0, -4, 0, -2, -6, -3, -1,
0 },
    {2, 20, 63, -23, 12, -8, 4, -3, 7, 42, 62, 5, -7, 1, -2, 0, 17, 37, -18, 49, -7, 5, -1, 1, 13, -5, -2,
4, 16, -2, 4, 0, -16, 12, 4, -1, 4, 1, 1, 1, -1, -10, 5, 3, 2, 1, 1, 0, -3, -3, 0, 1, 1, 0, 0, 0, 0, -3, 0, 1, 1, 0, 0, 1 },
    {4, 5, -4, 5, -1, 2, 1, 0, 7, 6, -19, 4, 8, 6, -1, 1, 18, -1, -10, 7, 10, 1, 6, -1, 28, -21, 4, -36,
52, 2, 8, 3, -12, -29, -11, -45, -46, 31, -7, 7, -6, 18, -20, 9, -41, -19, 2, -5, 3, 2, 11, -5, 4, -15, -2, -1,
2, 3, 0, 5, -1, -1, -6, 1 },
    {0, 4, -1, 3, 1, 2, 1, 0, -2, 2, -12, -1, 8, 2, 1, 1, 1, 6, -7, 4, 1, 4, 0, 2, -1, 0, -18, -5, 13, 3, 3, 1, -5, 7, -13,
7, 3, 5, 3, 1, -11, -10, -31, -42, 34, 2, 10, 1, 7, -19, 19, -74, -34, 17, -2, 6, 1, 2, 3, 14, -54, -7, -2, 0 },
    {1, -1, -2, 0, 8, 4, -1, 2, 1, -1, 0, 2, -3, -2, 5, -1, 2, -1, -1, 0, 13, 4, -1, 4, 2, -7, 5, -3, -2, -7, 7, -5,
13, 9, 16, 0, 56, 14, -2, 7, -10, -2, -20, -11, -55, 50, 15, 7, -13, -9, -16, -12, -22, -58, 12, 1, 3, -5, 5, -15,
-3, -8, -21, 2 },
    }
    }
};
```

Table 20 shows a case in which transform matrix coefficients are multiplied by a scaling value of 128. In Table 20, [4] of the first input in array of g_aiNsst8×8 [4] [2] [16] [64] represents the number of transform sets (here, the transform sets can be identified by indices 0, 1, 2 and 3), [2] of the second input represents the number of transform matrices constituting each transform set, and [16] and [64] of the third and fourth inputs represent rows and columns of a 16×64 RST (Reduced Secondary Transform).

Although Table 20 assumes a case in which a transform set includes two transform matrices, if a transform set includes one transform matrix, it may be configured to use a transform matrix in a specific order for each transform set in Table 20. For example, when a transform set includes one transform matrix, the encoder/decoder can use a predetermined, that is, the first or second transform matrix in each transform set in Table 20.

When applying the RST of Table 20, the encoder/decoder may be configured (defined or set) to output 16 transform coefficients or configured to output only m transform coefficients by applying only an mx64 part of a 16×64 matrix. For example, the encoder/decoder may be configured to output only 8 transform coefficients using only 8×64 matrix from the top by setting m=8. It is possible to reduce the amount of computations by half by applying the reduced secondary transform in this manner. As an embodiment, the encoder/decoder can apply an 8×64 matrix to an 8×8 transform unit (TU) in order to reduce the amount of computations.

The following table 21 shows an example of transform applicable to a 4×4 region.

TABLE 21

```
const int g_aiNsst4x4[4][2][16][16] = {
  { //0
    {
      { 113, -40, -16, 0, -37, 13, 6, 0, -11, 5, 2, 0, -2, 0, 0, 0 },
      { 36, 105, -49, -11, 10, -28, 7, 4, -13, -17, 11, 3, 1, 1, 0, -1 },
      { 23, -26, -2, 6, 108, -14, -29, 1, -47, 12, 13, -2, -6, 2, 2, 0 },
      { -26, -38, -87, 46, -8, -46, 37, 0, 1, 24, 16, -14, 4, 5, -5, 0 },
      { 13, -3, 55, -21, -11, -102, 19, 23, -1, 29, -19, -2, 2, 13, -3, -4 },
      { -20, 4, 15, -2, -37, 9, 7, -2, -102, 6, 28, 0, 52, -6, -16, 1 },
      { 8, 13, 18, 4, 31, 30, 99, -35, -6, 28, -39, 2, -2, -17, -14, 10 },
      { 4, 28, 0, 24, -11, 15, -43, 5, 5, 98, -17, -31, 4, -38, 18, 9 },
      { 14, 19, 42, 108, -4, -12, -9, -24, -2, -35, -4, -17, 0, 13, -1, 1 },
      { -14, 2, 1, 0, -23, 0, 6, -3, -50, 2, 0, 2, -109, 2, 35, -1 },
      { -5, -8, -29, 3, -5, -8, -24, -9, -27, -20, -105, 30, 23, 1, 32, -7 },
      { 0, -5, -1, -18, -9, -30, -25, -109, 8, 8, 22, 32, 0, -17, 2, 26 },
      { 2, -11, 5, 5, 3, -20, 10, 24, 2, -40, 8, -2, 3, -111, 23, 22 },
      { 2, 6, 6, 31, 1, 4, 3, 24, 7, 27, 21, 109, -2, -13, -4, -39 },
      { -2, -1, -9, 3, -6, -4, -26, 10, -8, -3, -30, 8, -33, -20, -111, 27 },
      { 0, -2, -1, -9, -1, -5, -5, -30, -1, -6, -4, -33, -6, -31, -22, -113 },
    },
    {
      { -120, 28, 15, 3, 24, 3, -3, -2, 15, -4, -5, 0, 3, -2, 0, 0 },
      { 31, 84, -27, -8, 77, 1, -26, -2, -16, -24, 5, 5, -8, -3, 6, 1 },
      { 2, 83, -2, -14, -90, 23, 18, -3, 0, -13, 2, 3, 10, -4, -4, 1 },
      { -15, 7, -34, 7, -20, -108, 2, 21, -32, -9, 31, 3, 6, 20, 3, -7 },
      { 19, 18, 108, -14, 15, -39, 34, -2, -11, -16, -20, 4, -2, 6, -6, 0 },
      { 16, 10, -5, -2, -5, -39, -28, 9, 111, -11, -33, 5, 6, -3, 1, 1 },
      { 7, 23, -20, 5, 25, -6, 80, 1, 27, 76, 10, -26, 9, 5, -30, -7 },
      { 3, 20, 26, -2, -13, -9, -77, -3, -20, 87, -18, -15, 11, 21, 2, -5 },
      { -7, -14, -12, -113, 3, -11, 1, -47, 5, 11, 16, 18, -2, 2, 0, 9 },
      { 0, 7, 21, 2, -8, 3, -5, 15, 25, 18, 64, -2, -95, -6, 36, -8 },
      { -7, 3, -25, 6, -10, -24, 14, -29, -24, 9, -82, -11, -68, -37, 4, 23 },
      { 4, 3, 8, 41, -3, -14, -7, -102, 12, -12, 34, -42, 14, 1, 12, 19 },
      { -2, 0, -12, 0, 0, 15, 14, -14, 3, -16, -30, -9, -26, 113, 17, -24 },
      { -2, -5, 1, -21, -4, 0, -24, 10, -2, -28, 6, -78, -23, -6, -80, -36 },
      { 0, 1, 1, 27, -3, 0, -12, -25, 3, 6, 14, 77, -28, 20, -85, 19 },
      { 0, 0, -2, 9, -1, -4, 3, -34, -2, 4, -10, 34, 3, -28, 10, -114 },
    }
  },
  { //1
    {
      { -105, 46, 2, 3, 53, -2, -13, 0, 2, -15, 3, 2, 1, 2, 3, -1 },
      { 55, 35, -20, 1, 71, -67, -6, 5, -34, -13, 26, -2, -5, 12, 1, -5 },
      { 36, -4, 14, -3, 50, 60, -40, -6, 39, -60, -26, 14, -16, -17, 24, 4 },
      { -20, -100, 40, 2, 48, -12, 22, -12, -25, -4, 7, -5, -9, 20, 5, -3 },
      { 14, 11, -6, 2, 53, 27, 40, -17, 4, 64, -55, -24, 14, -31, -37, 22 },
      { 6, 23, 31, -8, -9, 47, -33, -15, -99, 9, -14, 14, 6, 28, -2, 7 },
      { 15, 25, 78, -24, 10, 10, -13, -1, 43, 29, 47, -15, 7, 29, -40, -32 },
      { -1, 6, 64, -17, -15, -65, -22, -23, 4, 0, -45, 30, 22, -48, 17, 22 },
      { -3, -36, -34, -5, 18, 4, -70, 30, 5, 39, 17, 28, 69, -14, -10, -7 },
      { -9, -15, -13, -32, -3, -17, -53, 21, 1, 26, -19, -6, -92, -3, -39, 17 },
      { 3, 7, -11, 10, 8, -7, -1, -25, 31, 51, -29, 51, -16, 73, 52, -6 },
      { 2, 8, 21, 15, 10, 18, 14, 39, -16, 46, 36, 17, -37, -62, 61, -25 },
      { -2, 1, -14, -116, 5, 7, 33, 24, -3, -5, -4, 3, 15, 7, 28, 0 },
      { -4, -5, -29, -26, -2, 5, -17, -105, -2, 11, 41, -7, -11, -33, 8, -18 },
      { 0, 1, -5, -3, 4, 8, 38, -3, -3, -16, 14, 102, -12, -15, -59, -10 },
      { -2, -3, -8, -1, -3, -10, -4, 3, -11, -8, -54, -10, -1, -6, -9, -113 },
    },
    {
```

TABLE 21-continued

```
    { -93, 46, -2, 3, 69, -20, -8, 0, -13, -11, 8, 0, 3, 6, 0, -1 },
    { 61, 24, -20, 1, 36, -75, 18, 1, -52, 31, 17, -8, 9, 8, -15, 0 },
    { 49, -14, 19, -5, 61, 17, -43, 4, 4, -73, 24, 7, -25, 26, 16, -10 },
    { -18, -87, 37, 0, 35, 21, 13, -14, -60, 28, -16, 3, 15, 9, -5, 5 },
    { 29, 20, -22, 11, 51, 29, 16, -20, 12, 5, -74, 15, 12, -56, 29, 18 },
    { 11, 53, 29, -14, -25, 39, -64, 3, -60, 11, -5, 23, 43, -4, -4, -1 },
    { -14, -9, -57, 30, -35, -6, 19, -13, -55, -50, -4, 25, 6, 19, 59, -11 },
    { -8, -25, 42, -13, -10, -69, -33, 3, 21, 1, 1, 34, 20, -49, 54, -21 },
    { 0, -29, -53, 10, 19, 22, -13, 35, 14, -1, 50, -22, 74, -38, -8, -15 },
    { 12, 22, 34, 42, 10, 17, 39, -48, 30, 16, 26, 29, 43, 34, 9, -54 },
    { 1, 8, 40, -15, -14, -19, 41, -21, -5, -73, -8, -29, 54, -14, -27, 42 },
    { -5, -22, -28, 50, -5, -26, -56, -57, 15, -7, -12, 30, 5, 2, -59, 24 },
    { 0, 11, 25, 51, -7, 17, 8, -25, -31, -3, 51, -23, -49, -74, -1, -1 },
    { 4, 4, 23, 68, 0, -6, -22, 27, 13, 20, -4, -44, 17, 35, 48, 59 },
    { 1, 1, -11, -36, 7, 15, 15, -25, 10, 19, 60, 54, 0, 2, 25, 79 },
    { -2, -2, -19, -43, -2, 1, -30, -80, 4, 15, 5, -72, 5, 9, 35, -12 },
  }
},
{ //2
  {
    { -114, 49, -1, 4, 27, -8, -2, 0, 14, -8, 1, 0, 2, 0, 0, 0 },
    { -24, 2, 4, 0, -112, 40, 4, 1, 36, -8, -4, 0, 14, -7, 0, 0 },
    { 35, 93, -66, 11, -21, -16, 11, 1, -27, -8, 15, -4, 7, -2, -1, 0 },
    { -29, -14, 15, -1, -25, 11, 0, -1, -112, 37, 5, 1, 21, -3, -3, 0 },
    { -7, -13, 12, -4, -29, -101, 60, -5, 11, 25, -12, -1, 11, 15, -12, 2 },
    { -9, 2, -5, 3, -20, 0, 2, 1, -13, 15, -3, -1, -119, 34, 9, 0 },
    { 12, 32, 70, -54, -12, -23, -18, 13, -20, -70, 24, 10, -5, 14, 1, -4 },
    { -17, -51, -39, 41, -4, -7, 25, -12, -18, -79, 49, -10, -1, 14, -4, 0 },
    { -5, -17, -17, 20, -18, -44, -85, 61, 8, 18, 27, -18, 10, 20, 8, -15 },
    { -4, -9, -1, -1, -8, -27, -1, 8, -6, -10, 3, -1, -26, -109, 53, -3 },
    { 1, 4, 12, -30, 6, 14, 20, -9, 19, 42, 96, -52, -6, -14, -17, 8 },
    { -15, -29, -66, -96, 3, 5, 10, 30, -1, -3, -4, 26, 2, 5, 1, -5 },
    { -3, -6, -15, -18, -11, -23, -52, -100, 5, 11, 20, 35, 4, 9, 20, 11 },
    { 2, 4, 6, -1, 5, 12, 27, -3, 3, 9, 9, -11, 18, 39, 96, -64 },
    { 2, 4, 11, 27, 3, 6, 17, 26, 10, 20, 49, 105, -3, -7, -11, -20 },
    { -1, -1, -4, -5, -2, -4, -10, -25, -2, -4, -10, -12, -11, -23, -57, -107 },
  },
  {
    { 107, -32, -2, -3, -61, 14, 4, 1, 4, 3, -3, 0, 0, -2, 0, 0 },
    { 54, 7, -7, 0, 81, -33, 0, -2, -74, 14, 7, 0, 9, 3, -4, 0 },
    { -15, -95, 44, -5, 34, 57, -21, -2, -13, -3, -4, 4, -4, -2, 4, -1 },
    { 34, 1, -4, 0, 62, -9, -2, -1, 86, -20, -4, -1, -58, 9, 6, 0 },
    { -13, -45, 7, 0, -4, -62, 36, -6, 20, 86, -28, -2, -5, -18, -1, 5 },
    { 8, 30, 88, -43, -13, -32, -59, 26, 2, 15, 9, 0, -10, 1, 4, -4 },
    { -15, -4, -7, 3, -28, -3, 9, -2, -52, -1, 3, -1, -111, 16, 8, 1 },
    { -9, -42, 13, -2, -13, -65, 21, -3, 1, -57, 21, -2, 18, 72, -19, -2 },
    { 6, 25, 48, -8, 3, 9, 51, -33, -11, -29, -84, 32, 4, 6, 22, -1 },
    { -5, -8, -31, -95, 7, 11, 35, 66, -4, -8, -16, -15, 2, 0, 2, -1 },
    { 3, 21, -4, -2, 5, 42, -6, -1, 7, 60, -13, 2, 5, 99, -21, -1 },
    { 4, 17, 41, -10, 6, 23, 57, -19, 3, 3, 41, -20, -11, -22, -82, 24 },
    { 3, 4, 22, 52, 1, 3, 9, 50, -5, -9, -33, -92, 3, 7, 13, 28 },
    { -2, -8, -26, 2, -4, -14, -52, 8, -5, -17, -67, 14, -8, -11, -83, 25 },
    { -2, -2, -15, -46, -2, -3, -22, -70, 0, -2, 0, -41, 4, 7, 28, 78 },
    { 1, 1, 7, 22, 1, 2, 12, 49, 2, 2, 18, 66, 2, 5, 17, 91 },
  }
},
{ //3
  {
    { -118, 25, 9, 3, 26, -27, 1, 0, 15, 1, -6, 0, 1, 2, 0, -1 },
    { 12, -43, 10, -1, 104, -6, -27, 0, -27, 44, 0, -3, -10, -2, 9, 0 },
    { 34, 99, -35, -1, 39, -38, 28, -3, -16, 4, -6, 4, -7, 3, 3, -1 },
    { 24, -27, 17, -6, -4, -78, 6, 11, 66, 6, -50, 2, -12, 35, 0, -8 },
    { 4, -3, -39, 10, 45, 49, 5, -21, 79, -42, 24, 7, -14, 25, -17, 7 },
    { -2, 30, -19, 3, -26, 30, -46, 0, 38, 77, -3, -30, -25, 8, 49, -3 },
    { -18, -42, -95, 24, -15, -7, 34, -21, -27, 25, -29, 12, 5, 15, 0, -16 },
    { -6, 16, 20, -12, 8, 56, -3, 25, -26, -18, -74, 16, -22, 52, -3, -41 },
    { 4, 9, -30, 16, 4, -16, -80, 13, -6, -32, -12, -33, 73, 18, -15, -12 },
    { -4, -6, -16, 18, -15, -32, -44, 2, -32, -36, 30, -14, -92, 25, -11, 1 },
    { 2, -3, -21, 11, 7, 3, -18, 23, 19, -30, -50, 2, -28, -101, 10, -13 },
    { 3, 17, 12, 42, -11, 5, -28, -12, 7, 46, -10, 51, -6, -11, -89, 8 },
    { -7, -5, -37, -89, -3, -1, -5, 62, 7, 19, 24, 7, -5, -5, -43, -10 },
    { 1, -3, 5, 65, 6, 10, 42, 82, 5, 12, 14, -53, 0, 6, -20, -2 },
    { 1, -1, -3, 29, -1, -10, -14, 46, 6, -5, 39, 87, 13, 7, 50, -34 },
    { -3, -1, -14, 0, 0, 6, -9, 34, -9, -7, -29, 26, 1, 15, 19, 112 },
  },
  {
    { -109, 21, 6, 3, 57, -27, -5, -1, -4, 9, -1, -1, 3, -1, 0, 0 },
    { -36, 45, -8, 1, -86, -25, 23, 1, 55, -33, -15, 2, -3, 13, -4, -2 },
    { 46, 87, -29, -3, 29, -56, 25, 2, -29, 15, -9, 0, 5, 1, 1, 0 },
    { -19, 37, -21, 6, -15, 63, 14, -9, -61, -52, 40, 6, 30, -21, -21, 5 },
```

TABLE 21-continued

```
    { −13, 6, 44, −10, −59, −27, −32, 18, −53, 51, 3, −17, 26, −42, 19, 5 },
    { 2, −46, 25, −5, 0, −52, 29, 7, −42, −52, −39, 17, 42, 24, −35, −16 },
    { 18, 41, 76, −21, 19, 1, −56, 24, 15, −46, 22, −9, −11, 26, −15, 1 },
    { −7, 23, 21, −22, 2, 57, 21, 24, −22, 6, −78, 8, −14, 21, 45, −36 },
    { −2, 1, −52, 25, −7, 1, −68, 0, −6, −3, −16, −39, 50, 59, 18, −15 },
    { 11, 9, 13, −18, 25, 17, 15, 9, 58, 2, −10, −1, 95, −42, 12, 4 },
    { 8, 17, 41, 78, 0, 3, −14, −75, 2, 4, −19, 40, 9, −5, 10, −12 },
    { −5, 10, 17, −29, −12, 21, 21, −16, 1, 65, 26, 31, 28, 71, −46, 4 },
    { 0, −10, 22, −5, 1, −12, 41, −23, −11, −18, 36, −20, 10, 41, 85, 48 },
    { 1, 5, 25, 57, 5, 19, 36, 21, 1, 15, −25, −78, −2, 7, −42, 39 },
    { 1, −4, 9, 55, i, −6, 28, 62, 7, 8, 54, 10, 6, 10, 19, −71 },
    { 1, −1, 12, −35, 1, −4, 18, −63, 2, −1, 16, −70, −4, −9, −8, −74 },
    }
  }
};
```

Table 21 shows a case in which transform matrix coefficients are multiplied by a scaling value of 128. In Table 21, [4] of the first input in array of g_aiNsst4×4 [4] [2] [16] [16] represents the number of transform sets (here, the transform sets can be identified by indices 0, 1, 2 and 3), [2] of the second input represents the number of transform matrices constituting each transform set, and [16] and [16] of the third and fourth inputs represent rows and columns of a 16×16 RST (Reduced Secondary Transform).

Although Table 21 assumes a case in which a transform set includes two transform matrices, if a transform set includes one transform matrix, it may be configured to use a transform matrix in a specific order for each transform set in Table 21. For example, when a transform set includes one transform matrix, the encoder/decoder can use a predetermined, that is, the first or second transform matrix in each transform set in Table 21.

When the RST of Table 21 is applied, the encoder/decoder may be configured (defined or set) to output 16 transform coefficients or configured to output only m transform coefficients by applying only an mx16 part of a 16×16 matrix. For example, the encoder/decoder may be configured to output only 8 transform coefficients using only 8×16 matrix from the top by setting m=8. It is possible to reduce the amount of computations by half by applying the reduced secondary transform in this manner. As an embodiment, the encoder/decoder can apply an 8×64 matrix to an 8×8 transform unit (TU) in order to reduce the amount of computations in the worst case.

In an embodiment, the transform matrices shown in Table 20 and Table 21 may be applied to 4×4, 4×8 and 8×4 left top regions (i.e., TUs) or applied to only the 4×4 left top region according to predefined conditions. In the case of 4×8 TU and 8×4 TU, the encoder/decoder may divide the same into two 4×4 regions and apply a designated transform to each divided region. If secondary transform is defined to be applied to only a 4×4 region, only the transform defined in Table 210 may be applied (or used).

Meanwhile, although transform matrix coefficients are defined on the assumption that the scaling value is 128 in Table 20 and Table 21, the disclosure is not limited thereto. For example, transform matrix coefficients may be defined as shown in Tables 22 and 23 by setting the scaling value in Tables 20 and 21 to 256.

TABLE 22

```
const int g_aiNsst8×8[4][2][16][64] = {
  { //0
    {
      {−220, 84, 27, 1, 4, 1, 2, 1, 87, −37, −11, 0, −2, 0, −1, 0, 17, −7, −2, 0, 0, 0, 0, 0, 4, −1, 0, −1,
0, 0, 0, 0, 4, −2, −1, 0, 0, 0, 0, 2, −1, 0, 0, 0, 0, 0, 0, 1, −1, 0, 0, 0, 0, 0, 0, 1, 0, 0, 0, 0, 0, 0, 0 },
      {−89, −182, 105, 12, 15, 1, 6, 0, −63, 72, −17, −4, −1, 0, 0, 0, 52, 19, −21, −3, −2, −1, −1, 0, −2, −2,
1, 1, 0, 0, 0, 0, 10, 3, −4, −1, −1, 0, 0, 0, 1, 0, 0, 0, 0, 0, 0, 4, 1, −2, 0, 0, 0, 0, 0, 0, 1, 0, 0, 0, 0, 0, 0 },
      {−38, 99, −20, −15, −1, −3, 0, −1, −195, 17, 57, 1, 6, 1, 3, 0, 95, −48, −15, 6, −2, 1, −1, 0, 6, 4, −5, −1,
0, 0, 0, 0, 14, −5, −1, 0, 0, 0, 0, 1, 0, −1, 0, 0, 0, 0, 0, 5, −2, 0, 0, 0, 0, 0, 0, 0, 0, 0, 0, 0, 0, 0 },
      {63, 82, 175, −98, 3, −18, 3, −6, 27, 45, −76, 21, −2, 3, −2, 1, 23, −54, −24, 21, 2, 3, 0, 1, −22,
8, 10, −2, 0, 0, 0, 1, −6, −5, 3, 0, 1, 0, 0, −4, 0, 1, 0, 0, 0, 0, 1, −2, −2, 1, 0, 0, 0, 0, −1,
0, 0, 0, 0, 0, 0, 0 },
      {−23, 23, −77, 21, −1, 4, −1, 1, 26, 206, −52, −38, −5, −6, −2, −2, −27, −78, 58, 9, 0, 1, 1, 0, 6, −17,
−1, 6, 0, 1, 0, 0, −2, −6, 3, −1, 0, 0, 0, 1, −4, 1, 1, 0, 0, 0, 0, −1, −3, 2, 0, 0, 0, 0, 0, 0, −1, 0, 0, 0, 0, 0, 0 },
      {33, −19, −62, 19, 0, 4, 0, 1, 83, −1, −14, −4, −4, 0, −1, 0, 195, −18, −33, −3, −7, −1, −3, −1, −107,
21, 27, −3, 3, 0, 2, 0, 7, −2, 2, 0, 0, 0, 0, −18, 3, 4, 0, 1, 0, 0, 0, 4, −1, 1, 0, 0, 0, 0, 0, −6,
1, 1, 0, 0, 0, 0, 0 },
      {14, −7, 45, −8, −1, −2, 0, −1, 68, 44, 204, −74, −8, −11, 0, −4, −8, −52, −61, 37, 3, 5, 0, 2, 10, 8, −28,
6, 2, 0, 0, 0, −13, 3, 0, −1, 0, 0, 0, 3, −1, −7, 2, 1, 0, 0, 0, −3, 0, −1, 0, 0, 0, 0, 0, 1, 0, −2, 1, 0, 0, 0, 0 },
      {15, 73, 29, 57, −32, 7, −8, 2, 1, 77, 6, −33, 6, −6, 1, −2, 17, 179, −73, −33, 6, −7, 0, −2, −2, −87,
30, 16, −3, 4, 0, 1, −6, −5, −1, 1, 1, 1, 0, 0, 1, −11, 2, 1, 1, 0, 0, 0, −1, 1, −1, 0, 0, 0, 0, 0, 0, −4,
1, 0, 0, 0, 0, 0 },
      {−23, −22, −73, −199, 76, −23, 18, −7, 7, 30, 32, 23, −22, 3, −4, 1, 1, 85, 11, 26, −15, −1, −3, 0, −18,
−34, 5, 4, 6, 1, 1, 0, 6, −6, 1, 8, −3, 1, −1, 0, −3, −3, 0, 1, 1, 0, 0, 0, 2, 0, 1, 3, −1, 0, 0, 0, −1, −1,
0, 0, 0, 0, 0, 0 },
      {−18, 9, 16, 19, −4, 1, −1, 0, −32, 5, 32, −6, −1, −1, 0, 0, −94, 4, 18, 1, 8, 0, 2, 0, −190, 20, 52, −3,
6, 0, 3, 0, 102, −28, −33, 6, −3, 1, −1, 0, −30, 8, 6, −1, 1, 0, 0, 0, 20, −5, −5, 0, −1, 0, 0, 0, −8,
2, 1, 0, 0, 0, 0, 0 },
      {15, 11, 56, 1, −3, −2, 1, −1, 6, −21, 32, −70, 21, −7, 4, −2, 54, 38, 199, −29, −26, −3, −4, −2, −21, −41,
−73, 44, 5, 3, 1, 1, −1, 4, −17, 0, 5, 0, 1, 0, −2, −3, −5, 4, −1, 1, 0, 0, 1, 2, −2, 0, 1, 0, 0, 0, −1, −1, −2,
1, 0, 0, 0, 0, 1 }
```

TABLE 22-continued

```
    {-5, -16, -19, -32, -11, 3, -1, 1, -23, -55, -69, -182, 58, -14, 13, -4, -9, -18, -36, 101, -8, 4, -3,
2, 1, -42, 54, 32, -13, 2, -1, 0, 2, 18, -5, -14, 1, 0, 0, 0, 1, -4, 6, 7, -2, 0, 0, 0, 0, 3, -1, -1, 0, 0, 0, 0, 0, -1,
2, 2, -1, 0, 0, 0 },
    {3, -19, 8, 13, 0, 1, 0, 0, 7, -26, 32, 72, -24, 6, -5, 1, 5, -79, 22, 2, 11, 0, 2, 1, -1, -196, 96, 18, -7,
7, 0, 3, -7, 40, -21, -9, 0, -1, 0, -1, 2, -12, 4, -1, 2, 0, 0, 0, -1, 9, -4, -1, 0, 0, 0, 0, 1, -4, 1, -1, 0, 0, 0, 0 },
    {-17, -25, -16, -80, -213, 59, -29, 12, 5, 11, 14, 38, 56, -18, 6, -3, 5, 4, 13, 4, 45, -13, 4, -1, -6,
5, -5, -1, -17, 3, -1, 0, -4, 0, -2, 4, 7, -2, 1, -1, 0, 0, 0, -2, -1, 1, 0, 0, -2, 0, 0, 2, 3, -1, 0, 0, -1, 0, 0, 0, -1,
0, 0, 0 },
    {17, -6, -8, -3, -4, 2, 0, 1, 29, -5, -5, -4, 2, 0, 0, 0, 29, -7, -11, -5, 5, -1, 0, -1, 107, -23, -18, 6, -5,
2, -2, 0, 193, -67, -62, 23, -5, 2, -3, 1, -55, 20, 17, -5, 1, -1, 1, 0, 26, -8, -7, 2, 0, 0, 0, 0, -9, 3, 2, -1,
0, 0, 0, 0 },
    {0, 5, 1, 43, -30, 10, -6, 3, -6, 0, -15, 48, -94, 23, -14, 5, 8, 33, 9, 191, 4, -6, -1, 0, -16, -21, -83,
7, 59, -8, 6, -1, 5, -6, -13, -35, 7, 4, 0, 0, -3, 2, 1, 0, 2, 0, 0, 0, 1, 1, -1, -6, 1, 0, 0, 0, -1, 0, 0, 0, 1, 0, 0, 0 },
    },
    {
    {228, -78, -23, -6, -4, -2, -2, -1, -75, 16, 10, 2, 2, 1, 1, 0, -24, 14, 4, -1, 0, 0, 0, 0, -7,
3, 0, 0, 0, 0, 0, 0, -4, 2, 0, 0, 0, 0, 0, 0, -2, 1, 0, 0, 0, 0, 0, 0, -2, 1, 0, 0, 0, 0, 0, 0, -1, 0, 0, 0, 0, 0, 0, 0 },
    {-87, -123, 68, 6, 12, 1, 4, 0, -164, 50, 36, -1, 4, 0, 1, 0, 71, 29, -23, -6, -4, -1, -2, -1, 19, -4, -10,
1, -1, 0, 0, 0, 15, 2, -4, 0, -1, 0, 0, 0, 3, -1, -2, 0, 0, 0, 0, 0, 4, 1, -1, 0, 0, 0, 0, 0, 1, 0, -1, 0, 0, 0, 0, 0 },
    {-11, -187, 43, 21, 11, 4, 3, 1, 153, -21, -28, -1, -6, -1, -2, 0, -14, 44, -10, -6, -1, -1, 0, 0, -28,
28, 13, 4, -2, 1, 0, 0, 0, -9, 10, 0, -1, 0, 0, 0, 0, -4, 2, 0, 0, 0, 0, 0, 0, -2, 3, 0, 0, 0, 0, 0, 0, -1,
1, 1, 0, 0, 0, 0, 0, 0 },
    {26, 23, 32, -20, 2, -4, 1, -2, 55, 212, -57, -31, -9, -5, -3, -2, 62, -41, -42, 9, 0, 2, 0, 1, -26, -41,
14, 13, 2, 2, 1, 1, -4, -9, 5, 2, 0, 0, 0, 0, -6, -6, 3, 2, 0, 0, 0, 0, -2, 1, 0, 0, 0, 0, 0, -2, -2,
1, 1, 0, 0, 0, 0 },
    {-56, -34, -93, 32, 4, 6, 0, 2, -23, 109, 5, -15, -2, -4, -1, -1, -175, 34, 74, -12, 4, -1, 2, -1, 31, -9,
0, -2, -2, 0, 0, 0, 12, -8, -3, 0, -1, 0, 0, 0, 9, -4, -1, 1, 0, 0, 0, 0, 1, -1, 0, 0, 0, 0, 0, 0, 3, -1, 0, 0, 0, 0, 0, 0 },
    {17, 37, 197, -55, -4, -12, 1, -4, 3, 4, 49, -22, -3, -2, 0, -1, -130, -13, -18,
18, 13, 10, 3, 3, 1, 16, 8, -18, 5, 2, 0, 0, 0, 6, -3, -14, 3, 0, 0, 0, 0, 6, 0, -4, 1, 0, 0, 0, 0, -1, -4,
1, 0, 0, 0, 0, 2, 0, -1, 0, 0, 0, 0, 0 },
    {-19, -50, 9, -10, 7, -2, 2, -1, -47, -30, -130, 31, 6, 7, 1, 2, -43, -178, 23, 53, 6, 7, 1, 2, -14,
26, 53, -9, -8, -1, -1, -1, 8, 15, 2, -11, -2, -1, 0, 0, 1, 7, 4, -1, 0, 0, 0, 3, 2, 0, -1, 0, 0, 0, 0, 0, 2, 1, -1,
0, 0, 0, 0 },
    {1, 39, 29, -12, 3, -4, 1, -1, -41, -17, -184, 22, 12, 6, 2, 2, -25, 150, -46, -2, 2, -4, 0, -1,
11, 9, 22, -5, -5, -1, -1, 0, 4, -15, 8, 2, -2, 1, 0, 0, 2, -3, 7, 0, -1, 0, 0, 0, 1, -3, 2, 0, 0, 0, 0, 0, 0, -1,
2, 0, 0, 0, 0, 0 },
    {-22, -24, -49, -217, 30, -15, 11, -5, -4, -13, 7, -67, 15, -4, 3, -1, 7, 30, 47, 36, -7, 0, -3, 0, -61,
0, 16, 16, -2, 0, 0, 0, -1, 2, -2, 10, -1, 0, 0, 0, -2, -2, -1, 4, 0, 0, 0, 0, 2, 0, 0, 4, 0, 0, 0, 0, -1,
0, 0, 1, 0, 0, 0, 0 },
    {-8, 28, 35, 60, -8, 2, -3, 1, -31, 8, 17, 18, -8, 1, -2, 0, -11, 27, 59, -26, -3, -3, 0, -1, -222,
14, 52, -17, 8, 0, 4, 0, -5, 12, -5, -7, 2, 0, 1, 0, 0, -3, -5, 0, 0, 0, 0, 0, 8, 0, -3, -1, 0, 0, 0, 0, -2,
0, 0, 0, 0, 0, 0, 0 },
    {18, 12, 55, -17, 2, -4, 2, -1, 21, 34, -22, 60, -11, 5, -3, 2, 65, 20, 189, -12, -21, -4, -4, -1,
63, 77, -18, -58, -7, -3, -1, -1, -2, -14, -33, -2, 6, 1, 1, 0, -2, 2, -1, -1, 1, 0, 0, 0, -2, -4, -4,
1, 1, 0, 0, 0, 0, 1, -1, -1, 0, 0, 0, 0 },
    {-12, -2, -32, -59, -2, -4, 2, -2, 12, 42, 49, 200, 0, 6, -5, 2, -23, 14, -79, 62, -5, 2, -1, 1, -23,
47, -17, -48, -3, 1, 1, 0, -2, 7, 6, -11, 0, 0, 0, 0, 0, -2, -1, -7, 0, 0, 0, 0, 0, 2, -1, 0, 0, 0, 0, 0, 0, 0, -3,
3, 0, 0, 0, 0 },
    {-3, 10, -25, 10, 3, 1, 0, 0, -3, 27, 7, -84, 4, -4, 3, -1, -1, -6, -65, -23, 11, 0, 2, 0, -2, 226, 4, -19,
-1, -9, -1, -3, -5, 21, -6, -5, -2, -1, 0, -1, 0, -3, 6, -1, 1, 0, 0, -4, 0, 1, -1, 0, 0, 0, -1, 2, 1, 2, 0, 0, 0, 0 },
    {-6, -8, -9, -27, 5, -3, 1, -2, -10, -3, -50, 30, -9, 7, -3, 2, -12, -41, -4, -114, 10, -3, 3, -1, -48, 8, -184,
37, 60, -4, 7, 0, 4, -15, -6, 66, 7, -4, 1, 0, -2, 5, 6, -4, -8, 1, 0, 0, 3, -3, 4, 6, 1, 0, 0, 0, -1, 1, 1, -1, -1, 0, 0, 0 },
    {11, 16, 5, 31, 218, -46, 29, -10, 6, 2, 8, 12, 86, -18, 9, -3, -6, -8, -6, -21, -62, 10, -5, 2, -1, -2,
-1, 4, -23, 7, -1, 1, 2, -1, 4, -2, -10, 3, -1, 0, 0, 0, 0, -1, -4, 0, 0, 0, 1, 0, 1, -1, -3, 1, 0, 0, 0, 0, -1, 0, -1, 0, 0, 0 },
    {-2, -6, 2, -57, -12, -2, 0, -1, 4, 0, 14, 42, -14, 8, -3, 2, -9, -24, -23, -193, -12, -2, 2, 0, 34, -11,
129, -30, -1, -1, -1, 0, 7, 1, 38, 25, 0, -3, -1, -1, 0, -2, -6, 0, 2, -1, 1, 0, -1, 0, 1, 5, 1, -1, 0, 0, 0, 0, -1,
0, 0, 0, 0, 0 },
    }
    },
    { //1
    {
    {196, -107, 4, -8, 1, -3, 0, -1, -114, 26, 24, -2, 4, 0, 1, 0, 3, 30, -11, -4, 0, -1, 0, 0, -5, -5, -6,
3, 0, 0, 0, 0, 0, 3, 1, 1, -1, 0, 0, 0, -2, 0, -1, 0, 0, 0, 0, 0, 0, 1, -1, 0, 0, 0, 0, 0, -1, 0, 0, 0, 0, 0, 0 },
    {118, 29, -38, 2, -8, 1, -3, 0, 136, -134, 6, 6, 0, 1, 0, 0, -88, -3, 54, -9, 5, -1, 2, 0, -9, 34, -8, -12,
3, -2, 1, -1, -14, 2, -5, 3, 2, 0, 1, 0, -1, 5, 0, 0, 0, 0, 0, -5, 1, 0, 0, 0, 0, 0, -1, 2, 0, 0, 0, 0, 0, 0 },
    {-58, 47, -28, 5, -4, 2, -1, 1, -118, -85, 73, 5, 10, 1, 4, 0, -70, 133, 28, -31, 4, -6, 1, -2,
45, 24, -67, 0, 1, -1, 0, 0, 5, -16, -3, 16, -2, 2, 0, 1, 12, -2, -2, 1, -2, 0, -1, 0, 1, -3, 1, 10, 0, 0, 0, 5, 0, -1,
0, 0, 0, 0 },
    {72, 180, -92, 1, -14, 1, -5, 0, -67, -6, -46, 32, -3, 5, -1, 2, 75, -35, 2, 12, -10, 2, -2, 1, 13, -58,
14, 0, 0, 3, 0, 1, -2, -8, 24, -3, 1, -1, 0, 0, -2, -1, 1, -5, 1, -1, 0, 0, -1, -2, 4, 0, 1, 0, 0, 0, 0, -1, 1, -2, 0, 0, 0, 0 },
    {22, -1, -23, 5, 0, 2, -1, 1, 99, 20, 49, -28, 3, -8, 1, -2, 35, 94, -122, -24, 4, -4, 0, -1, 37, -110, -55,
66, 2, 7, 0, 3, -12, -25, 55, 15, -11, 3, -2, 1, 1, -3, 5, -9, 1, 0, 0, 0, -7, 0, 6, 3, 0, -1, 0, 0, 0, -2, 0, 0, 0, 0, 0, 0 },
    {-34, -66, -39, 20, -5, 7, -1, 2, -8, -117, 98, 16, -2, 3, 0, 1, 139, -26, 36, -42, -6, -4, -1, -1, -54,
-43, 36, -15, 18, 0, 4, 0, -9, 53, 22, -21, 5, -7, 1, -2, -9, 11, -19, -9, 4, -2, 2, -1, -1, 10, -2, 1, 1, -1,
1, 0, -3, 1, -5, -2, 0, 0, 0, 0 },
    {-21, -4, -28, 21, -3, 4, -1, 2, -44, -32, 24, -21, 3, -3, 2, -1, -127, -33, -71, 52, 6, 8, 2, 3, -7, -59,
123, 49, -22, 7, -4, 2, 1, 63, 55, -68, -14, -3, -3, -1, 2, 11, -23, -20, 12, 0, 2, 0, -2, 9, -3, -4, 1, -1,
1, 0, 2, 0, -5, -3, 1, 1, 1, 0 },
    {18, 68, -47, 28, -3, 4, -3, 2, 12, 78, 104, -54, -8, -6, 0, -2, -11, -2, -48, -47, 30, -7, 5, -3, -123,
82, -3, 18, 10, -8, 4, -2, 21, 55, -65, 3, -7, 1, -1, 0, 1, -25, -15, 26, -1, 4, -1, 2, 8, 0, 1, 2, -4, 0, -1,
```

0, −1, −6, −3, 4, 0, 0, 0, 1 },

{24, 76, 185, −79, 12, −13, 5, −4, −21, −72, −11, −47, 27, −8, 5, −2, 26, 13, −35, 7, 8, −3, 2, −1, −68,
−13, −9, 20, 5, 1, 1, 0, −2, 38, 14, 6, −3, −1, 0, 0, 0, 8, −18, −3, −1, 0, 0, 0, 1, 1, −4, 5, 0, 0, 0, 0, 0, 0, −4,
0, −1, 0, 0, 0 },

{27, 35, 42, 20, −6, 1, −2, 0, 35, 20, 61, −48, −2, −4, 3, −2, 58, 76, 14, 55, −7, 0, −3,
0, 106, 27, 92, −70, −51, −5, −9, −2, −16, 3, −66, −85, 16, 0, 4, −2, −1, −13, −24, 14, 9, 1, 3, 0, −3, −1 , −7, −7,
1, 2, 1, 1, 2, −3, −3, 1, 2, 1, 1, 0 },

{6, 22, 21, −37, −8, −1, 0, −1, 32, 98, 14, 74, −7, 5, −3, 2, −43, 71, 90, −59, −57, 3, −8, −1, −41, −57,
11, −55, 33, 13, 1, 2, −5, 66, 61, −35, 12, −15, 0, −3, −5, 34, −53, −35, 10, −5, 4, −1, −3, 0, −17, 11, 4, −2,
1, 0, 1, 1, −10, −7, 0, 1, 1, 0 },

{13, 29, 56, 8, −1, 4, −1, 2, −14, 25, 104, −51, −16, −1, −3, −1, −42, −128, 24, −87, 18, −1,
2, 1, 102, −44, −10, −19, 58, −3, 9, −1, −18, −32, 12, 25, 24, −13, 4, −4, −3, 22, 13, 3, −5, −5, 1, −3, −5,
2, −5, 0, 0, −1, 0, −1, 1, 4, 1, 1, 0, −2, 0, 0 },

{10, 11, 21, −12, 3, 1, 3, −1, 7, 13, 19, 28, −18, 0, −5, 0, 32, −18, 42, −43, 23, −4, 8, −3, 34, 87, −5,
111, −30, −19, −3, −5, 42, −42, 66, −83, −104, 18, −13, 3, −11, −13, −22, −71, 48, 12, 4, 5, 4, 2, −1, 7, −1,
−6, 6, −2, −4, 3, −8, −15, 5, 8, 0, 1 },

{5, 14, 12, 32, −6, 0, −3, 0, 3, 14, 41, −36, −17, 6, 2, 2, 4, 10, 22, 37, −3, 1, −6, −1, −51, 15, 11, −40,
−58, 11, −9, 6, 28, −33, 72, 31, 28, 24, −1, 6, 39, 22, 121, −108, −36, −20, −8, −4, −16, −2, −46, −78,
46, 1 , 8, 2, −4, 11, −1, 12, 6, −8, 3, −2 },

{3, −1, 19, −26, −3, 1, 1, 0, 9, −15, 19, 31, 1, 0, −1, 0, −17, 1, 3, −18, −41, 7, −5, 1, −9, −49, 35, −15,
26, 19, −1, 4, 161, −39, −20, −14, 10, −12, −3, −1, −12, −143, 44, 22, −2, 1, 4, −1, 6, 19, 57, −21, 2, −2,
1, −1, −5, 3, −5, −5, 3, −1, 2, −1 },

{−2, −2, −4, −7, 9, 7, −2, 2, −6, −5, −6, −12, −8, 1, −3, 4, −7, −10, −10, −22, 18, 16, −7, 2, −32, −8, −35,
−23, −43, 8, −14, 9, 10, −36, 18, −65, 101, 73, 2, 17, 14, 19, 24, 43, 153, −61, −9, −6, −4, 12, −3,
40, −23, −63, 8, −12, −4, 1, −3, 6, −6, −5, 2, −1 },
},
{
{−162, 97, −9, 8, −2, 3, −1, 1, 148, −66, −11, −1, −2, 0, −1 , 0, −46, −8, 22, −3, 3, −1, 1, 0, 13, 14, −8,
−3, 0, −1 , 0, 0, −6, −8, 0, 3, 0, 0, 0, 0, 4, 4, 1, −1 , 0, 0, 0, 0, 0, 0, 0, 0, 1, 1, 0, 0, 0, 0, 0, 0, 0, 0 },

{−116, −19, 34, 0, 6, −1, 2, 0, −26, 128, −52, 4, −8, 2, −3, 1, 107, −113, −4, 16, −3, 4, −2, 1, −45,
17, 44, −16, 4, −3, 2, −1, 17, 9, −26, −1, 2, −1, 0, 0, −7, −8, 10, 6, −2, 0, 0, 0, 6, 2, −3, −5, 1, 0, 0, 0, −3, −1,
1, 3, 1, 0, 1, 0 },

{−110, 23, −24, 8, −1, 3, 0, 1, −87, 24, 58, −12, 8, −3, 3, −1, 25, 103, −94, 8, −6, 1, −2, 0, 58, −109,
17, 32, −10, 7, −3, 3, −17, 26, 33, −29, 4, −3, 1, −1, 10, −8, −21, 8, 5, −1, 1, 0, −3, 2, 11, 1, −4, −1,
0, 0, 5, −3, −4, −1, 0, 1, 0, 0 },

{87, 93, −62, 16, −9, 4, −4, 1, 60, −38, 13, −6, −4, −1, −1, 0, 77, −60, −39, 16, −3, 4, −2, 1, −29, −74,
97, −10, 1, 0, 1, 0, −30, 84, −26, −33, 13, −8, 3, −3, 7, −30, −17, 30, −6, 3, −1, 1, −5, 9, 16, −16, 0, 0, −1,
1, −1, −3, −9, 7, 3, −1, 1, 0 },

{−26, 104, −41, −10, −5, 1, −2, 0, −118, −86, 16, 40, −1, 6, 0, 3, 92, 9, 76, −53, 6, −6, 1, −3, −64,
37, −62, 1, 17, −8, 5, −2, 25, 3, −1, 29, −18, 7, −3, 1, −1, −12, 5, −11, 1, 1, −2, 1, 5, 4, 0, 2, 1, 0, 1, 0, −1, −1,
−2, 0, 0, −1, −1, 0 },

{53, 70, 12, −22, 1, −3, 1, −1, 53, 58, −68, 29, −7, 3, −3, 1, 57, −13, −18, −23, −6, 0, −2, −1, 17, −63,
−64, 58, 0, 6, −1, 3, 18, −69, 113, −15, −22, 8, −4, 2, −26, 42, −31, −43, 40, −11, 5, −2, 2, −13, −2, 49, −19,
−5, 2, −1, −1, 1, 12, −27, −4, 8, −2, 1 },

{−8, −64, −44, −10, 6, 5, 1, 1, 72, 12, 104, 6, −4, −9, 0, −1, 24, 8, −76, −72, 20, −3, 5, −3, −100,
100, 41, −23, 94, 2, −5, 3, 0, 54, −3, 1, −21, −38, 19, −9, 3, −6, −39, 24, 0, 32, −8, −1, 2, 0, 25, −5, −10, −10,
−8, 5, −3, −7, −6, −8, 15, 2, 5, 0, 0 },

{−33, −92, 31, −13, 0, −4, 1, −1, 9, −49, 8, 16, 6, 5, 0, 2, 2, −8, 60, −30, −1, −6, 1, −1, −54, −22, 14, −4,
23, 2, 4, 0, −26, 108, 52, −35, −5, −16, 1, −4, −15, 45, −126, −9, 17, 3, 5, −1, 11, −26, 23, 64, −21, 4, −5,
1, 5, 4, 3, −46, 4, 5, −2, 2 },

{10, −23, 23, 6, −3, −6, 0, −1, 69, 40, 3, −28, 12, 2, 3, −1, 65, 60, −9, −23, −7, −14, −2, −3, −29, −56,
−99, −42, 41, 4, 9, −1, −42, 41, −24, 129, 8, −20, 4, −3, 21, −11, 8, 0, −78, 24, −6, 3, 1, −21, 20, −14,
31, 12, −9, 4, 2, 5, 0, −3, −5, −17, 2, 0 },

{16, 108, 10, −8, 4, −3, 1, −1, −41, 91, −37, −16, 5, −4, 0, −2, −129, 8, −52, −11, 8, −3, 2, −1, −75,
49, −15, 35, 19, 3, 5, 1, 12, 84, −11, 22, −11, −6, −4, −2, 13, −10, −52, 6, −15, 3, −3, 1, 9, −19, 11, 14, −3,
3, −2, 1, 4, −1, −3, −8, 5, −3, 0, 1 },

{−7, −17, −6, 15, −9, 0, −3, 0, −10, −19, −3, 6, −3, 11, 1, 3, −25, −32, 11, 23, −17, 0, −5, 0, −4, −16,
42, 19, −3, 20, 1, 6, 45, 37, 95, 22, −33, −6, −11, 0, 24, −47, 20, −149, −43, 17, −3, 4, −13, −5, −4, −43,
110, 12, 7, −1, −6, 26, −16, 28, 11, −25, 3, −6 },

{0, −13, 53, −75, 22, −1, 6, −4, 6, 10, −61, 93, −22, −3, −4, 3, −15, 11, 42, −67, 3, 16, −3, 2, 48, −37,
−8, 45, 16, −29, 8, −5, −62, 58, −24, −22, −40, 33, −8, 4, 60, −76, 35, 19, 33, −13, −6, 4, −28, 36, 9, −40,
−6, −9, 12, −5, 1, 1, −25, 39, 2, 2, −2, −1 },

{−3, −6, −130, 40, −11, 9, −5, 3, −11, 72, 74, 20, −20, 8, −4, 2, −37, −91, 44, −74, 21, −5, 2, −1,
99, 4, −23, 4, 34, −13, 10, −4, −55, 6, 4, 27, −17, −6, 0, −3, 5, 27, −17, −5, −11, 11, −1, 3, −2, −15,
4, 7, 2, 3, −4, 1, 6, 2, 5, −9, 1, −3, 0, 1 },

{0, −2, 4, −15, 29, −15, 8, −4, 0, −1, −10, 27, −41, 22, −11, 5, 5, −4, 10, −29, 42, −24, 10, −5, −2, 8, −18,
42, −54, 26, −11, 5, 14, −24, 32, −51, 63, −25, 10, −2, −21, 36, −40, 80, −77, 13, −2, −3, 33, −54, 61, −98,
40, 20, −12, 10, −24, 35, −38, 50, 12, −30, 14, −7 },

{27, 52, 48, 13, 2, 3, 1, 1, 49, 90, 82, 19, −1, 4, 1, 1, 60, 99, 74, −1, −11, −3, −3, −1, 55, 82, 33, −37,
−21, −3, −6, −2, 35, 33, −16, −57, −8, −3, −2, −1, 8, −3, −41, −37, 8, 4, 2, 0, 3, −7, −21, −3, 21, 4, 1, −1,
2, 1, −8, 6, 9, −1, 0, −1 },

{2, −8, −7, 10, −8, −1, −3, 0, 3, −3, −5, 6, 3, 8, 2, 1, −1, −9, 5, 13, −18, −3, −5, −1, 43, 9, −7, −3, 0, 14, −1,
6, 65, −30, −19, 6, −7, −8, −6, 0, 4, −135, −22, 13, 5, 11, 8, 4, 15, −14, 158, 34, −14, 2, −7, −2, −8, 25, −15,
−99, 0, 2, −2, 0 },
}
},
{ //2
{
{224, −96, 4, −12, 1, −4, 0, −2, −63, 25, −1, 3, 0, 1, 0, 0, −31, 12, 0, 2, 0, 0, 0, 0, −4,
1, 1, 0, 0, 0, 0, 0, 0, 0, 1, 0, 0, 0, 0, 0, 0, 0, −2, 1, 0, 0, 0, 0, 0, 0, 0, −1, 1, 0, 0, 0, 0, 0, 0, 0, −1, 0, 0, 0, 0, 0, 0, 0, 0, 0 },

TABLE 22-continued

{54, −1, −11, 1, −3, 0, −1, 0, 213, −79, −2, −8, −1, −3, −1, −1, −93, 27, 5, 1, 2, 1, 1, 0, −32,
13, 1, 1, 0, 0, 0, 0, −7, 1, 0, 0, 0, 0, 0, 0, −2, 1, 0, 0, 0, 0, 0, 0, −3, 1, 0, 0, 0, 0, 0, 0, −1, 1, 0, 0, 0, 0, 0, 0 },
{10, −88, 55, −17, 10, −4, 4, −2, 83, 12, −21, 2, −4, 0, −2, 0, 197, −38, −19, −2, −4, −1, −2, 0, −69,
14, 6, 1, 2, 0, 1, 0, −33, 10, 3, 1, 1, 0, 0, 0, −8, 2, 0, 0, 0, 0, 0, 0, 1, −1, 0, 0, 0, 0, 0, 0, −3, 1, 0, 0, 0, 0, 0, 0 },
{91, 161, −119, 31, −22, 6, −9, 3, −1, −31, 20, −6, 3, −1, 1, 0, 82, −75, 24, −8, 3, −2, 1, −1, −29,
3, 5, 0, 1, 0, 0, 0, −19, 6, 2, −1, 1, 0, 0, 0, −2, 0, 0, 0, 0, 0, 0, 0, −2, −2, 1, 0, 0, 0, 0, 0, −1, 0, 0, 0, 0, 0, 0, 0 },
{−22, 10, −4, 2, 1, 0, 0, 0, −25, 72, −32, 9, −6, 2, −2, 1, −64, −31, 22, −2, 3, 0, 1, 0, −217, 34, 23, −1,
6, 0, 2, 0, 57, −2, −5, −1, −1, 0, −1, 0, 10, −5, −1, 0, 0, 0, 0, 0, 11, −4, −1, 0, 0, 0, 0, 0, −4, 0, 1, 0, 0, 0, 0, 0 },
{13, 24, −8, −1, 0, −1, 0, 0, 76, 178, −95, 21, −16, 4, −6, 1, −22, −69, 29, −4, 3, 0, 1, 0, 75, −71,
21, −6, 2, −1, 1, 0, −2, −5, 2, −1, 1, 0, 0, 0, −10, 0, 2, −1, 1, 0, 0, 0, −2, 1, 0, 0, 0, 0, 0, 0, −1, 1, 0, 0, 0, 0, 0, 0 },
{1, −23, 57, −26, 10, −6, 4, −2, 0, −59, 11, 0, 2, 0, 0, 0, −20, −175, 58, −5, 6, 0, 3, 0, 50, 63, −31,
4, −3, −1, −1, 0, 117, 22, −27, 1, −4, 0, −2, 0, −22, 5, 2, 0, 1, 0, 0, 0, 5, −1, −1, 1, 0, 0, 0, 0, −5, 2, 0, 0, 0, 0, 0, 0 },
{15, 11, −34, 14, −5, 3, −2, 1, 27, 15, 4, −3, −1, −1, 0, 0, 62, 93, −32, 2, −5, 0, −2, 0, 16, −30, 7, −1,
1, 0, 0, 0, 207, −56, −5, 0, −4, 0, −2, 0, −41, 4, 3, 0, 1, 0, 1, 0, 5, 1, 1, −2, 0, 0, 0, 0, −9, 1, 1, 0, 0, 0, 0, 0 },
{47, 135, 164, −89, 21, −20, 9, −7, −13, −29, −53, 30, −3, 5, −2, 2, 2, 25, −51, 19, −7, 4, −3, 1, −13,
−27, 9, 0, 1, 0, 0, 0, 2, −10, 3, 0, 0, 0, 0, 0, −1, 0, 0, −1, 0, 0, 0, 0, −2, −2, 1, 0, 0, 0, 0, 0, 0, 0, 0, 0, 0, 0, 0, 0 },
{−7, −31, 7, 4, 0, 1, 1, 0, −7, −50, 61, −21, 6, −3, 3, −2, −13, −60, −25, 6, −2, 2, −1, 1, −36, −209,
63, −2, 6, 0, 2, 1, 22, 47, −4, −4, 2, −2, 0, 0, 32, 12, −15, 1, −2, −1, 0, 0, −3, 8, −2, 0, 0, 0, 0, 0, 0, 0, −1,
1, 0, 0, 0, 0 },
{−10, −7, 0, −2, 1, 0, 1, 0, −15, −17, 4, 1, 1, 0, 0, 0, −17, −9, 13, −4, 1, −1, 1, 0, −24, −33, 2, −1,
1, 0, 1, 0, −43, −28, 12, 1, 1, 0, 1, 0, −240, 33, 19, 0, 5, 0, 2, 0, 24, 7, −4, 0, −1, 0, 13, 0, −2, 0, −1, 0, −1, 0 },
{10, 30, 39, −2, −2, 1, 0, 0, 33, 104, 164, −78, 13, −12, 6, −4, −17, −30, −97, 33, 1, 3, −1, 1, −4,
26, −62, 32, −3, 2, −1, 1, −6, −2, 6, 2, −3, 1, −1, 0, −14, −5, 3, 0, 0, 0, 0, 1, −1, 0, −2, 0, 0, 0, 0, 0, −2, −1,
1, 0, 0, 0, 0, 0 },
{0, −10, 15, −9, 3, −2, 2, −1, 0, −14, 22, −6, 2, 1, 0, 0, 2, −28, 65, −13, 1, −1, 1, −1, −16, −44, −60,
10, 1, 0, −1, 0, −25, −214, 34, 9, 3, 2, 1, 1, 53, 45, 6, −5, 0, −1, 0, 0, 7, 28, −7, −2, −1, −1, 0, 0, −3, 7, −5, −1,
0, 0, 0, 0 },
{−6, −19, −26, 21, −5, 4, −2, 2, −8, −24, −33, 6, −3, 2, 0, 0, −23, −70, −144, 30, 0, 3, −2,
2, 21, 56, 120, −41, 6, −5, 2, −2, 0, −71, 95, −15, −4, 0, 1, 0, 3, 9, −23, 10, −1, 1, 0, 0, 0, 16, −3, −4,
1, 0, 0, 0, 1, 4, −1, 0, 0, 0, 0 },
{10, 8, 81, 114, −139, 59, −24, 9, −3, −6, −22, −5, 15, −3, 1, 0, −2, −1, −22, −96, 91, −34, 12, −5, −1,
−5, −6, 23, −11, 2, 0, 0, 1, 2, 5, 27, −24, 7, −3, 1, 0, 3, 3, −1, −1, 1, −1, 0, 1, 0, −1, −3, 2, −1, 0, 0, −1,
1, 0, 0, 0, 0, 0 },
{−5, −1, 2, 1, 1, 0, 0, 0, −6, 0, 2, 2, 1, 0, −1, 0, −5, −3, 3, 0, 0, −1, 0, −1, −8, −2, −1, 0, 0, 1, 0, 0, −4, −10,
−2, −1, 1, 0, −1, 0, −26, −7, 1, 1, 1, 0, 0, 0, −209, 6, 15, 1, 5, 0, 2, 0, −143, 3, 10, −1, 3, 0, 1, 0 },
},
{
{−202, 68, 2, 8, 1, 3, 0, 1, 135, −40, −5, −4, −2, −1, −1, −1, −20, 0, 5, 0, 1, 0, 0, 0, 3, −1,
0, 0, 0, 0, 0, −1, 0, 0, 0, 0, 0, 0, 0, 2, 0, 0, 0, 0, 0, 0, 0, −1, 0, 0, 0, 0, 0, 0, 0, 1, 0, 0, 0, 0, 0, 0, 0 },
{117, 1, −10, −2, −3, −1, −1, 0, 135, −50, −1, −4, −1, −2, 0, −1, −168, 30, 12, 3, 3, 1, 1, 0, 38, 1, −6,
0, −1, 0, 0, 0, −8, −2, 0, 0, 0, 0, 0, 0, 2, 1, 0, 0, 0, 0, 0, 0, −5, 0, 0, 0, 0, 0, 0, 0, 1, 1, 0, 0, 0, 0, 0, 0 },
{65, −49, 12, −4, 3, −1, 1, −1, 142, 14, −18, −1, −5, −1, −2, 0, 111, −40, −3, −3, −1, −1, 0, 0, −150,
21, 12, 2, 3, 1, 1, 0, 26, 6, −5, 0, −1, 0, 0, 0, −13, −2, 1, 0, 0, 0, 0, 0, 4, 0, 0, 0, 0, 0, 0, 0, −5, 0, 1, 0, 0, 0, 0, 0 },
{−62, −171, 72, −10, 15, −3, 5, −1, 21, 135, −50, 4, −10, 1, −3, 0, −66, −5, 3, 6, 1, 2, 0, 1, 27, −18,
5, −2, 0, 0, 0, 0, 10, 5, −2, 0, 0, 0, 0, 0, −3, −2, 2, 0, 0, 0, 0, 0, 2, 2, −1, 0, 0, 0, 0, 0, −1, −1, 0, 0, 0, 0, 0, 0 },
{27, −26, 6, −1, 1, 0, 0, 0, 71, 0, −4, −2, 0, −1, 0, 0, 114, 12, −11, 0, −3, 0, −1, 0, 134, −41, −6, −3, −2,
−1, −1, 0, −155, 16, 15, 1, 4, 0, 2, 0, 33, 1, −5, 0, −1, 0, −1, 0, −17, 2, 1, 0, 0, 0, 0, 0, 8, 0, −1, 0, 0, 0, 0, 0 },
{23, 79, −10, 1, −3, 0, −1, 0, 11, 82, −45, 10, −8, 3, −3, 1, −14, −189, 61, −7, 9, −1, 3, 0, 56, 77, −14,
−8, 0, −2, 0, −1, −6, 8, −11, 5, 0, 0, 0, 0, −10, −4, 5, 1, 0, 0, 0, 0, 3, −4, −1, −1, 0, 0, 0, 0, −1, 0, 1, 0, 0, 0, 0, 0 },
{−17, 12, −3, 0, −1, 0, 0, 0, −40, 17, −4, 2, 0, 0, 0, 0, −73, −22, 6, 1, 1, 0, 0, 0, −131, 1, 9, −1,
3, 0, 1, 0, −162, 39, 7, 3, 3, 1, 1, 0, 105, −10, −12, 0, −3, 0, −2, 0, −32, −1, 4, 0, 1, 0, 0, 0, 8, 0, 0, 0, 0, 0, 0, 0 },
{11, 24, 149, −49, 17, −12, 7, −4, −26, −84, −141, 39, −11, 8, −4, 3, 15, 37, 65, −7, 0, −1, 0, 0, −4,
39, −11, −9, 2, −2, 0, −1, −14, −44, −13, 9, 0, 1, 0, 0, 8, 14, 8, −3, −1, 0, 0, 0, −2, −2, −3,
0, 0, 0, 0, 0, 0, 3, 1, 0, 0, 0, 0, 0, 0 },
{−24, −96, −33, 8, −1, 2, −1, 0, −7, −59, 64, −16, 7, −4, 2, −1, 2, −16, 0, 2, 2, 0, 1, 0, 11, 169, −36,
2, −6, 0, −2, 0, −33, −118, 9, 5, 1, 2, 0, 1, 23, 27, 1, −1, 0, 0, 0, 0, −5, 3, 0, −2, 0, 0, 0, 0, 4, −1, 1, 0, 0, 0, 0, 0 },
{−6, 14, −5, 3, −1, 0, −1, 0, −11, 18, −1, 1, −1, 0, 0, 0, −24, 7, −1, 0, 0, 0, 0, 0, −41, −17, −5, 0, 0, 0, −1,
0, −111, −48, 12, −2, 3, 0, 1, 0, −203, 39, 16, 1, 4, 0, 2, 0, 66, 2, −9, 0, −3, 0, −1, 0, −10, 1, 1, 1, 0, 0, 0, 0 },
{19, 88, −15, 6, −4, 2, −2, 0, 25, 134, −19, 5, −3, 2, −2, 0, 9, 77, −14, 5, −4, 1, −1, 0, −11, −16, −8, −1,
−1, 0, 0, 0, 9, −162, 21, −1, 2, 1, 0, 0, 58, 35, 0, −4, 0, −1, 0, 0, −18, 8, 2, −2, 1, 0, 0, 0, 3, 5, −3, 1, 0, 0, 0, 0 },
{12, 39, 112, −8, 6, −2, 4, −1, 0, −3, 19, −27, 7, −6, 2, −2, −17, −47, −190, 36, −14, 7, −5,
2, 12, 41, 68, 9, −4, 2, −1, 1, −2, −4, 51, −17, 4, −2, 1, −1, −4, −6, −17, 3, 2, 0, 1, 0, 1, 2, 2, 0, 0, 0, 0, 0, −1, −2,
0, 0, 0, 0, 0, 0 },
{0, −4, 0, 2, 0, 0, 0, 0, 1, −2, 5, −2, 1, −1, 0, −1, 0, −9, 2, 0, −1, 0, 0, 0, 3, −9, 12, −4,
2, 0, 0, 0, 11, 31, 12, 1, 3, −1, 2, 0, 26, 177, −32, −4, −5, 0, −2, −1, 24, −168, −11, 11, −2, 2, −1, 1, −20,
33, 18, −3, 2, 0, 1, 0 },
{2, 2, −2, 0, 1, 0, 0, 0, 3, 0, −1, 0, 0, 0, 0, 0, 1, 4, 0, 1, −1, 0, 0, 0, 6, 0, −2, 1, −1, 1, 0, 0, −7, −4, 2, −1,
1, 0, 0, 0, 69, −35, 2, 3, −1, 1, −1, 1, 198, 18, −15, −3, −5, −1, −2, 0, −140, −7, 12, −1, 3, 0, 1, 0 },
{7, 0, 40, 156, −61, 30, −8, 7, −8, −6, −49, −151, 53, −25, 5, −6, 5, 6, 39, 51, −1, 3, 2, 0, −4, −3, −13,
20, −18, 7, −3, 2, 0, 0, −6, −22, 5, −3, 0, −1, 2, 0, 4, 2, 0, 0, 0, 0, −1, 2, 0, −1, 1, 0, 0, 0, 0, −1, 0, 2, −1, 0, 0, 0 },
{1, 1, 15, −5, 0, 0, 1, 0, 0, 0, −5, 8, 2, 1, −1, 1, −1, −8, 9, −32, 4, −6, 2, −2, −11, −12, −144, 53, −11,
9, −4, 3, 17, 22, 181, −25, 3, 0, 1, 0, −7, −12, −72, −5, 5, −3, 0, −1, 0, 6, 15, 8, −2, 1, 0, 1, 0, −4, 0, −3, −1, 1, 0, 0 },
}
},
{ //3
{
{228, −69, −20, −7, −5, −2, −2, −1, −55, 57, −5, 0, −1, 0, 0, 0, −43, 6, 12, 0, 2, 0, 1, 0, −4, −4,
1, 1, 0, 0, 0, 0, −7, 0, 2, 1, 0, 0, 0, 0, −1, −1, 0, 1, 0, 0, 0, 0, −3, 0, 0, 0, 0, 0, 0, 0, −1, 0, 0, 0, 0, 0, 0, 0 },
{14, −78, 28, −1, 5, 0, 2, 0, 196, −19, −60, 3, −9, 1, −3, 0, −64, 100, −4, −9, −1, −2, 0, −1, −29, −7,
25, −1, 2, 0, 1, 0, −8, 2, 1, 3, 0, 0, 0, 0, −5, −3, 4, 0, 1, 0, 0, 0, −3, 1, 0, 1, 0, 0, 0, 0, −2, −1, 1, 0, 0, 0, 0, 0 },

TABLE 22-continued

{60, −27, 10, −9, 3, −3, 1, −1, 8, −137, 26, 15, 3, 3, 1, 1, 128, 14, −101, 10, −9, 3, −4, 1, −48,
104, −3, −22, 2, −4, 1, −2, −9, −4, 23, −3, 0, 0, 0, 0, −8, 8, 2, 0, 0, −1, −2, 3, 0, 0, 0, 0, 0, −3, 3, 0, 0, 0, 0, 0, 0 },
{−72, −203, 79, 7, 15, 1, 6, 0, −78, 22, −45, 14, −2, 4, −1, 2, 30, −6, −10, −6, −1, 0, 0, 0, 38, −2, −22,
0, −3, 0, −1, 0, 2, 25, −7, −6, 0, −1, 0, 0, 3, 4, 2, −2, 0, 0, 0, 0, 1, 5, 0, −1, 0, 0, 0, 0, 1, 1, 0, 0, 0, 0, 0, 0 },
{18, −28, −9, 7, 0, 1, 0, 0, 100, −2, 49, −20, 2, −5, 0, −2, −11, −143, 18, 56, −3, 10, −1, 4, 54, 30, −129,
10, 3, 2, −1, 0, −26, 68, 7, −33, 3, −5, 1, −2, 2, −1, 8, −2, −1, 0, 0, 0, −7, 7, 4, −4, −1, 0, 0, 0, 1, 0, 0, 1, −1, 0, 0, 0 },
{−17, −13, −64, 24, −8, 6, −2, 2, 44, 155, −40, −39, −1, −7, −1, −2, 128, −4, 38, −13, −7, −3, −2, −1, −57,
72, 10, −2, 1, −2, 0, 0, −22, −23, 53, −3, 1, 0, 1, 0, −1, −18, −1, 14, −2, 2, 0, 1, −2, −5, 3, 1, 0, 0, 1, 0, −1, −2,
−2, 4, 0, 0, 0, 0 },
{−35, 4, −25, 4, 1, 2, 0, 1, −29, 33, −6, 7, −5, 3, −1, 1, −125, 7, −90, 13, 10, 3, 3, 1, 31, 106, −3, −94,
5, −12, 2, −5, −7, −16, 116, −11, −18, 0, −4, 0, 15, −29, −3, 28, −6, 4, −1, 2, −4, 1, 3, 2, −5, −1, 1, 0, 4, −4, −1,
6, 0, −3, 0, 0 },
{−31, −68, −6, −3, 8, −1, 3, −1, 2, 16, 140, −24, −1, −4, 0, −1, −45, −20, 2, 71, −8, 9, −2, 3, −128, −15,
4, 7, 22, −1, 5, 0, 32, −98, −11, 14, 3, 7, 0, 2, −2, 15, −55, −1, 3, 1, 1, 0, 6, 0, −3, −15, 2, −1, 1, 0, 0, 5, −4,
−4, −1, 1, 0, 0 },
{−28, −66, −210, 62, −13, 16, −6, 6, −21, −71, −10, −36, 13, −4, 4, −2, −17, 31, 11, −17, −2, −1, 0, −1,
12, −22, −13, −2, −4, 1, 0, 0, 19, 25, −20, −9, −2, −3, 0, −1, −4, 20, 13, −10, −1, −3, 0, −1, 2, 2, 9, 0, 0, −1,
0, 0, −1, 2, 3, −2, 0, 0, 0, 0 },
{9, −36, −20, −20, 7, −2, 1, −1, 48, −10, 57, −17, −6, −3, 0, −1, 23, −69, 6, −48, 8, −4, 2, −2,
127, 7, 124, −18, −37, 1, −9, 1, −9, −49, 8, 97, −15, 8, −3, 3, −1, 14, −55, 12, 17, −2, 3, 0, −9, 6, −5, −5,
4, 1, 0, 0, 3, 2, −5, −2, 0, 0, −1, 0 },
{−2, −8, 31, 17, −8, 2, −1, 1, −34, −91, −14, −48, 17, −7, 4, −2, −38, 5, 153, −19, −27, −2, −6, −1, −13,
81, 9, 70, 3, 1, 0, 1, −50, −25, 63, −1, 17, 6, 3, 1, 19, −63, −17, 35, −7, 7, −1, 2, −6, 6, −25, −1,
2, 0, 1, 0, 3, −3, −2, 6, 0, 0, 0, 1 },
{4, 1, −1, 35, −8, 9, −3, 3, 5, −31, −126, 36, 13, 4, 3, 1, −41, −149, −22, −65, 28, 1, 5, 0, −98,
2, 14, −12, −29, 8, −2, 2, 8, −50, −28, 11, −3, −5, 2, −1, 6, 20, −30, −14, 0, −3, −1, −1, 3, 5, 4, −13, 0, −3,
0, −1, 1, 6, 3, −6, −2, −1, −1, 0 },
{18, −7, 23, −8, −5, −1, 0, −1, 11, −39, −6, −41, 7, −2, 3, −1, 42, −24, 47, −13, 1, 1, 4, 0, −22, −109, −8,
−99, 4, 0, 2, −1, 97, 12, 111, −24, −66, 1, −15, 0, −12, −4, 9, 75, −16, 6, −3, 2, 7, 5, −12, 15, −7, −2, 2, 0, −6,
1, −7, 17, 2, −5, 0, −1 },
{−14, −22, 1, −25, 6, −4, 1, −1, −1, 7, 67, 1, −13, −1, −1, 0, −29, −42, 8, −49, 12, −6, 3, −2, −69,
69, 24, 81, 6, −33, 3, −7, 1, −4, 91, −4, 12, −3, −11, −1, −3, 20, −11, 137, −8, −8, −1, −3, −1, 15, −54,
15, 88, −8, 7, −2, 3, −11, 1, −31, 22, 11, 1, 3, −1 },
{−4, 11, 7, 27, −5, −3, −2, 0, −15, 2, −13, 6, 3, −3, −3, 0, −8, 16, 8, 37, 0, 0, −2, 0, −46, 4, −22, −1, −22,
0, −10, 0, 7, 105, 23, 140, −17, −23, −6, −8, −28, −4, −40, 24, 131, −10, 18, −5, 9, −31, 17, −59,
24, 22, 2, 6, −6, −5, −14, 4, 1, 10, −2, 1 },
{−6, −11, −21, −1, 0, 2, −1, 0, −5, −8, 22, 18, 2, 3, 1, 1, 19, −4, −43, −9, 14, 3, 4, 0, −36, −108, −1, −30,
−9, 6, −1, 1, −178, 12, 24, 7, −2, −5, 2, −2, 54, −92, −11, 17, 1, 5, 0, 1, −12, 32, −40, −6, 0, −1, 1, 0, 8, −5,
11, −9, −3, −2, 0, −1 },
},
{
{−218, 59, 11, 8, 3, 3, 1, 1, 98, −66, −1, −3, 0, −1, 0, 0, 5, 17, −10, 0, −2, 0, −1, 0, 7, −3, 3, −2, 0, −1,
0, 0, 2, 1, −1, 1, 0, 0, 0, 0, 2, 0, 0, 0, 0, 0, 0, 0, 1, 1, 0, 0, 0, 0, 0, 0, 1, 0, 0, 0, 0, 0, 0, 0 },
{−70, 48, −5, 3, −1, 1, 0, 0, −181, −10, 41, 2, 8, 1, 3, 0, 118, −84, −21, 5, −3, 1, −1, 0, −8, 33, −18, −6,
−1, −1, 0, 0, 16, −9, 5, −3, −1, −1, 0, 0, −1, 6, −3, 1, −1, 0, 0, 0, 6, −2, 1, −1, 0, 0, 0, 0, 2, −1, 0, 0, 0, 0, 0 },
{79, 180, −79, 7, −15, 1, −6, 1, 3, −100, 76, −9, 10, −2, 3, −1, −53, 13, −27, 12, −1, 2, 0, 1, 20, −4,
5, −7, 1, −1, 1, −1, −11, −1, 3, 2, 0, 1, 0, 0, 3, −1, −1, 0, 0, 0, 0, 0, −3, −2, 1, 0, 0, 0, 0, 0, 0, 0, 0, 0, 0, 0, 0, 0 },
{−50, 45, −15, 12, −5, 4, −2, 1, −40, 110, 8, −10, 2, −3, 1, −1, −123, −84, 87, 7, 10, 1, 4, 0, 81, −76,
−48, 21, −2, 4, −1, 2, −13, 29, −15, −12, 2, −1, 0, −1, 14, −11, 1, 0, −2, 1, −1, 0, −4, 5, −2, −1, 1, 0, 0, 0, 5, −4,
−1, 0, 0, 0, 0, 0 },
{19, −57, −6, 7, 1, 1, 1, 0, 69, −36, 38, −14, 5, −4, 2, −1, −6, −114, −45, 43, −6, 10, −2, 4, 52, 99, −113,
−34, 0, −6, −1, −3, −28, 47, 69, −36, −5, −5, −1, −2, 13, −13, 6, 20, −4, 2, 0, 1, −10, 6, 3, −7,
1, 0, 1, 0, 3, −1, 0, 3, −5, −1, −1, 0 },
{−11, −77, 66, −20, 14, −6, 5, −2, −90, −130, −3, 31, −1, 8, 0, 3, −70, 39, −55, −10, 4, −2,
1, 0, 102, −61, 3, −14, −8, 0, −2, 0, −10, 56, −29, 2, −6, −2, −2, −1, 10, 1, 14, −8, 0, −2, 0, −1, −2, 7, −2, 4, −2,
−1, −1, 0, 3, 0, 2, −1, 1, 0, −1, 0 },
{38, 8, 36, 0, −3, 0, 0, −1, 41, −72, 1, −3, 11, −3, 3, −1, 86, −30, 82, 12, −15, 4, −4, 1, −40, −87, −85,
87, 15, 10, 2, 4, 14, 53, −79, −67, 14, −3, 4, −1, −6, 2, 34, −17, −17, −3, −3, −1, 7, 7, −6, 6, −3, −1, 0, 0, −3,
2, 3, 2, 0, −1, 0, 0 },
{−29, −91, −67, 34, 2, 4, 0, 2, −7, −9, 124, −43, 4, −5, 2, −2, −58, −8, −36, 70, 0, 8, 0, 4, −92, −65, −10,
−23, 17, 1, 5, 0, 73, −35, −37, −2, −14, 2, −4, 1, −17, 31, −15, −11, −1, −4, 1, −2, 14, −2, 2, 1, −1, −3, −1,
0, −5, 6, −3, −3, 2, 1, 0, 0 },
{−1, −60, −94, 32, −9, 6, −3, 2, 31, 3, 66, −47, 2, −7, 2, −4, 93, 7, 32, 1, −6, −3, −1, −1 , 126, −12,
65, 42, −10, 2, −4, 2, −74, 2, −41, 58, 17, 4, 3, 2, 9, 4, −21, −23, 11, 1 , 1 , 0, −10, 2, 5, 5, −1,
1, 0, 0, 5, 0, −4, −2, 5, 2, 2, 0 },
{27, 10, 98, −35, 16, −9, 5, −3, 46, −36, 25, 47, −11, 6, −2, 2, −16, −136, 7, −3, 16, 0, 4, 1, 5, −4,
52, 7, −16, 4, −3, 1, 3, −100, −53, 75, 5, 6, 0, 3, −5, 37, −64, −21, 11, −2, 0, −1, 2, 2, −2, −1, 2, −2, −1,
0, 2, 8, −8, −8, 9, 2, 1, 0 },
{−16, −26, 28, 22, −12, 4, −2, 0, −49, −47, 15, −29, 21, −8, 3, −2, −60, 55, 76, 25, −36, 7, −7, 1, −5,
90, −24, 96, 36, −4, 7, 1, −54, −114, 14, −50, 30, 13, 8, 4, 21, −11, −43, 2, −23, −4, −3, −1, −4, 7, 3, −9,
6, −2, 2, −1, 7, 1, −2, 4, −1, −1, −1, 2 },
{10, −7, 23, 14, −11, 4, −3, 0, −1, −38, 9, −20, 14, −7, 3, −2, 26, 7, 73, 7, −19, 0, −3, −2, 13, −59, 9, −4,
14, −8, 2, −2, 55, 18, 103, 50, −36, 9, −10, 2, −26, −17, −77, 134, 38, 3, 7, 3, −15, 2, −37, −62,
41, 7, 7, 0, 0, −9, 0, −4, −12, −6, −3, 1 },
{4, 40, 125, −46, 25, −16, 8, −5, 14, 85, 124, 11, −14, 2, −4, 0, 34, 75, −36, 97, −13, 10, −2,
3, 27, −10, −4, 8, 31, −5, 7, −1, −31, 24, 8, −1, 8, 3, 2, 1, −2, −19, 10, 5, 4, 2, 2, 1, −5, −6, −1, 1, 3, 0, 1, 1, −1,
−5, −1, 2, 2, 0, 0, 1 },
{9, 10, −8, 10, −2, 4, 2, 0, 13, 12, −38, 9, 17, 13, −1, 2, 36, −2, −20, 15, 19, 2, 12, −1, 56, −43, 7, −73,
104, 4, 16, 6, −25, −58, −22, −90, −93, 62, −13, 14, −12, 35, −41, 18, −82, −38, 3, −10, 5, 5, 22, −10,
8, −31, −4, −1, 5, 5, −1, 10, −3, −3, −12, 2 },

TABLE 22-continued

```
    {1, 8, −2, 6, 2, 4, 3, 1, −3, 4, −24, −2, 17, 4, 3, 2, 1, 12, −14, 9, 2, 8, 1, 4, −1, 1, −35, −10,
25, 7, 5, 2, −9, 15, −27, 14, 5, 10, 7, 1, −23, −21, −61, −83, 69, 5, 20, 2, 14, −38, 38, −149, −67, 34, −3,
11, 2, 4, 5, 27, −109, −14, −5, −1 },
    {1, −1, −4, −1, 16, 8, −2, 5, 1, −2, 0, 3, −6, −3, 10, −3, 4, −1, −2, −1, 26, 9, −3, 8, 4, −15, 10, −7, −5, −13,
14, −9, 26, 19, 33, 1, 111, 29, −5, 13, −21, −4, −39, −22, −111, 100, 31, 15, −26, −18, −32, −25, −43, −116,
24, 1, 6, −9, 11, −30, −7, −16, −43, 4 },
    }
  }
};
```

TABLE 23

```
const int g_aiNsst4×4[4][2][16][16] = {
  { //0
    {
      { 227, −80, −31, 1, −73, 26, 12, −1, −22, 10, 5, −1, −4, 1, 0, 0 },
      { 72, 210, −98, −22, 21, −56, 14, 7, −27, −34, 21, 6, 1, 2, −1, −1 },
      { 46, −52, −4, 11, 216, −28, −57, 2, −93, 24, 26, −4, −11, 3, 4, 0 },
      { −53, −76, −173, 93, −16, −92, 74, 0, 1, 47, 32, −27, 9, 10, −11, −1 },
      { 25, −6, 109, −42, −22, −204, 38, 45, −3, 59, −39, −4, 3, 26, −5, −8 },
      { −40, 8, 29, −3, −73, 17, 14, −4, −205, 12, 55, 0, 104, −12, −32, 3 },
      { 16, 27, 35, 9, 63, 59, 198, −71, −12, 57, −77, 3, −4, −35, −28, 19 },
      { 7, 57, −1, 49, −23, 30, −86, 9, 10, 196, −33, −62, 7, −76, 36, 17 },
      { 28, 38, 83, 215, −8, −25, −17, −47, −3, −69, −8, −35, −1, 27, −2, 2 },
      { −27, 4, 1, 0, −46, 1, 13, −6, −99, 3, 1, 4, −218, 4, 70, −2 },
      { −11, −17, −58, 6, −10, −17, −48, −17, −54, −40, −210, 61, 46, 3, 64, −15 },
      { 0, −9, −2, −36, −17, −61, −49, −217, 17, 16, 44, 64, 1, −34, 4, 53 },
      { 3, −22, 9, 10, 5, −39, 21, 48, 4, −81, 16, −4, 6, −223, 47, 44 },
      { 4, 12, 13, 63, 1, 9, 7, 48, 14, 54, 41, 217, −5, −26, −8, −77 },
      { −5, −2, −18, 7, −12, −9, −51, 20, −15, −6, −60, 16, −66, −40, −221, 53 },
      { 0, −3, −3, −19, −2, −10, −10, −60, −2, −12, −9, −65, −12, −62, −44, −226 },
    },
    {
      { −240, 57, 31, 5, 48, 7, −6, −3, 30, −8, −9, 0, 7, −4, −1, 1 },
      { 61, 168, −54, −16, 155, 2, −51, −4, −33, −47, 10, 10, −17, −7, 11, 2 },
      { 4, 166, −4, −27, −181, 46, 35, −6, 0, −26, 4, 6, 21, −8, −7, 2 },
      { −30, 15, −67, 15, −40, −215, 5, 42, −63, −17, 62, 6, 12, 41, 6, −13 },
      { 37, 36, 217, −27, 31, −78, 68, −4, −22, −33, −39, 8, −5, 12, −13, 0 },
      { 32, 19, −11, −4, −9, −79, −56, 19, 222, −22, −67, 10, 12, −5, 1, 1 },
      { 13, 47, −40, 11, 51, −12, 160, 2, 53, 152, 20, −52, 17, 9, −59, −14 },
      { 5, 39, 52, −3, −25, −18, −154, −7, −40, 175, −36, −29, 23, 41, 5, −10 },
      { −14, −28, −24, −227, 5, −22, 2, −94, 10, 22, 32, 36, −4, 5, 0, 18 },
      { 0, 14, 41, 5, −17, 6, −11, 30, 49, 36, 129, −5, −191, −13, 72, −16 },
      { −13, 5, −50, 12, −20, −47, 28, −58, −48, 18, −164, −22, −136, −73, 8, 47 },
      { 8, 5, 15, 82, −5, −27, −14, −204, 25, −25, 68, −83, 29, 1, 24, 39 },
      { −4, 1, −24, −1, −1, 30, 27, −27, 7, −31, −60, −19, −52, 227, 34, −48 },
      { −4, −10, 3, −42, −9, 1, −47, 21, −4, −57, 13, −155, −47, −11, −160, −73 },
      { 0, 3, 3, 55, −6, 0, −25, −51, 6, 12, 27, 154, −55, 39, −169, 37 },
      { 0, 0, −4, 19, −1, −9, 6, −68, −4, 9, −19, 68, 5, −57, 20, −228 },
    }
  },
  { //1
    {
      { −210, 91, 4, 6, 106, −5, −25, 1, 4, −30, 5, 3, 3, 3, 5, −2 },
      { 110, 71, −40, 1, 142, −133, −12, 10, −69, −27, 51, −3, −10, 23, 1, −9 },
      { 72, −7, 28, −6, 100, 120, −80, −11, 77, −121, −52, 29, −31, −33, 49, 7 },
      { −40, −200, 80, 3, 97, −24, 44, −23, −50, −8, 15, −9, −18, 41, 10, −6 },
      { 28, 23, −13, 5, 105, 54, 80, −35, 8, 127, −109, −48, 29, −62, −73, 44 },
      { 12, 46, 63, −16, −18, 95, −65, −29, −198, 18, −29, 28, 11, 55, −5, 14 },
      { 30, 50, 155, −48, 19, 20, −26, −2, 85, 58, 93, −30, 14, 57, −79, −65 },
      { −2, 12, 128, −33, −31, −129, −45, −46, 8, 0, −91, 60, 45, −96, 34, 44 },
      { −7, −72, −69, −11, 35, 8, −140, 60, 9, 78, 34, 57, 137, −29, −20, −13 },
      { −18, −30, −26, −65, −6, −34, −106, 42, 3, 51, −38, −11, −183, −7, −78, 35 },
      { 6, 14, −22, 20, 16, −14, −3, −51, 63, 102, −57, 103, −31, 146, 104, −11 },
      { 4, 16, 42, 30, 20, 37, 29, 77, −33, 92, 73, 34, −75, −123, 122, −50 },
      { −5, 3, −27, −231, 11, 15, 66, 47, −7, −10, −9, 6, 29, 14, 56, 1 },
      { −8, −11, −58, −52, −4, 10, −33, −211, −4, 22, 81, −14, −23, −65, 17, −37 },
      { −1, 1, −11, −5, 7, 16, 76, −7, −6, −33, 28, 203, −25, −30, −119, −21 },
      { −5, −6, −16, −2, −6, −21, −8, 7, −22, −16, −108, −20, −1, −13, −18, −227 },
    },
    {
      { −186, 91, −4, 6, 138, −41, −16, 1, −26, −21, 16, 0, 5, 11, 0, −2 },
      { 121, 48, −40, 2, 73, −151, 36, 1, −104, 62, 34, −16, 19, 15, −29, 1 },
      { 98, −28, 37, −10, 122, 34, −85, 8, 9, −146, 48, 14, −50, 52, 31, −20 },
      { −37, −175, 73, 0, 71, 41, 26, −28, −121, 56, −31, 6, 29, 19, −9, 10 },
      { 57, 40, −45, 23, 102, 59, 32, −41, 24, 10, −149, 30, 24, −112, 59, 36 },
      { 22, 105, 58, −28, −50, 78, −128, 7, −120, 23, −10, 46, 87, −7, −7, −1 },
```

TABLE 23-continued

```
        { -28, -18, -114, 60, -70, -12, 37, -26, -110, -100, -9, 51, 11, 37, 119, -23 },
        { -16, -51, 83, -26, -20, -138, -66, 5, 42, 1, 1, 68, 40, -99, 108, -42 },
        { 1, -57, -106, 19, 37, 44, -26, 71, 27, -2, 100, -44, 149, -75, -16, -30 },
        { 23, 43, 69, 83, 21, 33, 79, -96, 61, 32, 51, 58, 86, 68, 17, -107 },
        { 1, 15, 79, -29, -29, -39, 82, -41, -11, -145, -15, -59, 108, -29, -55, 85 },
        { -9, -44, -56, 99, -11, -52, -113, -114, 31, -15, -25, 61, 10, 4, -119, 48 },
        { 1, 21, 50, 103, -14, 33, 15, -49, -62, -7, 103, -47, -97, -149, -1, -2 },
        { 8, 7, 47, 137, 0, -13, -44, 54, 27, 40, -8, -87, 34, 70, 97, 118 },
        { 1, 3, -22, -73, 13, 29, 30, -50, 20, 38, 120, 108, -1, 4, 49, 158 },
        { -3, -3, -37, -85, -3, 2, -59, -160, 7, 29, 11, -145, 10, 17, 70, -23 },
    }
},
{ //2
    {
        { -228, 97, -3, 9, 54, -17, -4, -1, 28, -16, 2, -1, 4, -1, 0, 0 },
        { -47, 4, 9, -1, -224, 81, 9, 2, 72, -15, -9, 0, 29, -13, 0, 0 },
        { 69, 187, -133, 22, -43, -33, 21, 3, -54, -16, 31, -8, 14, -3, -2, 0 },
        { -58, -28, 30, -2, -50, 23, 1, -1, -224, 74, 11, 2, 42, -5, -7, 1 },
        { -13, -26, 25, -9, -59, -201, 120, -10, 23, 50, -24, -2, 22, 30, -25, 3 },
        { -17, 4, -9, 6, -41, 0, 4, 2, -25, 29, -5, -1, -239, 67, 18, -1 },
        { 25, 64, 141, -107, -24, -46, -35, 26, -40, -140, 49, 21, -11, 29, 1, -8 },
        { -34, -103, -78, 83, -8, -14, 51, -25, -37, -158, 99, -20, -3, 28, -9, 1 },
        { -11, -33, -33, 39, -36, -87, -171, 121, 17, 37, 54, -36, 20, 39, 16, -30 },
        { -7, -17, -2, -2, -15, -54, -3, 15, -13, -21, 6, -2, -51, -217, 106, -5 },
        { 2, 9, 24, -61, 12, 28, 40, -18, 38, 84, 191, -104, -12, -29, -34, 17 },
        { -30, -57, -131, -192, 6, 10, 20, 60, -2, -6, -8, 52, 4, 10, 1, -9 },
        { -6, -12, -29, -35, -23, -47, -105, -200, 10, 22, 39, 70, 9, 17, 41, 23 },
        { 3, 8, 13, -2, 10, 24, 55, -6, 6, 18, 19, -22, 37, 78, 191, -128 },
        { 5, 8, 23, 54, 7, 13, 35, 52, 19, 41, 98, 210, -5, -14, -21, -40 },
        { -1, -3, -8, -11, -4, -7, -21, -50, -4, -8, -20, -25, -21, -46, -114, -214 },
    },
    {
        { 214, -65, -4, -6, -121, 28, 9, 2, 7, 6, -5, 1, 0, -3, 0, 0 },
        { 108, 13, -13, 0, 162, -65, -1, -3, -148, 27, 14, 0, 17, 7, -7, 1 },
        { -30, -191, 88, -11, 68, 113, -43, -4, -26, -6, -7, 9, -7, -5, 7, -2 },
        { 68, 1, -8, 0, 123, -18, -3, -1, 172, -41, -9, -2, -116, 17, 13, -1 },
        { -27, -89, 14, 1, -8, -124, 71, -12, 41, 172, -57, -4, -10, -36, -2, 11 },
        { 16, 60, 175, -86, -27, -65, -119, 52, 5, 29, 18, -1, -20, 1, 8, -7 },
        { -30, -7, -14, 6, -55, -6, 17, -3, -103, -1, 6, -1, -221, 32, 16, 1 },
        { -18, -84, 27, -4, -26, -129, 41, -7, 1, -115, 43, -3, 35, 143, -39, -4 },
        { 12, 50, 96, -16, 6, 18, 102, -66, -23, -58, -167, 64, 8, 12, 45, -3 },
        { -11, -15, -62, -190, 13, 22, 71, 132, -7, -16, -32, -30, 3, 1, 4, -2 },
        { 6, 42, -7, -4, 11, 85, -11, -3, 15, 120, -26, 5, 9, 198, -42, -2 },
        { 8, 34, 82, -20, 11, 46, 114, -38, 7, 6, 83, -40, -22, -45, -165, 48 },
        { 6, 8, 44, 104, 3, 7, 18, 100, -9, -18, -65, -183, 6, 14, 26, 57 },
        { -5, -17, -52, 4, -8, -28, -104, 16, -10, -33, -133, 27, -15, -23, -166, 50 },
        { -3, -4, -30, -91, -5, -6, -45, -140, 0, -3, 0, -83, 8, 13, 55, 157 },
        { 2, 2, 13, 45, 3, 3, 25, 98, 4, 4, 37, 133, 3, 9, 33, 181 },
    }
},
{ //3
    {
        { -237, 49, 17, 6, 51, -55, 2, -1, 29, 2, -11, 0, 2, 3, 0, -1 },
        { 24, -86, 19, -1, 207, -12, -54, 1, -53, 87, -1, -5, -20, -5, 18, -1 },
        { 68, 198, -71, -2, 79, -75, 56, -6, -32, 7, -13, 8, -14, 6, 6, -3 },
        { 48, -53, 35, -11, -8, -157, 13, 22, 133, 13, -101, 4, -23, 71, 0, -16 },
        { 8, -5, -78, 20, 90, 98, 10, -43, 158, -83, 48, 15, -28, 51, -35, 15 },
        { -5, 59, -39, 7, -51, 59, -93, 1, 77, 154, -5, -60, -51, 17, 99, -6 },
        { -35, -85, -190, 48, -29, -13, 68, -41, -53, 51, -59, 24, 11, 29, 1, -33 },
        { -12, 33, 40, -24, 16, 113, -6, 51, -52, -37, -148, 32, -45, 103, -5, -82 },
        { 9, 18, -61, 31, 8, -32, -160, 27, -11, -63, -24, -66, 146, 37, -31, -24 },
        { -9, -13, -32, 37, -29, -64, -87, 4, -65, -71, 61, -28, -183, 50, -21, 1 },
        { 4, -6, -43, 23, 15, 6, -36, 46, 38, -59, -99, 5, -56, -201, 19, -27 },
        { 7, 33, 25, 84, -21, 10, -56, -23, 15, 92, -20, 103, -12, -21, -179, 17 },
        { -14, -10, -73, -179, -6, -3, -9, 125, 14, 38, 48, 13, -11, -9, -86, -20 },
        { 2, -5, 10, 129, 13, 19, 84, 163, 10, 25, 28, -106, -1, 12, -39, -4 },
        { 3, -1, -7, 59, -2, -19, -28, 92, 12, -10, 79, 174, 27, 15, 100, -69 },
        { -6, -2, -29, 0, -1, 13, -19, 69, -18, -15, -58, 52, 2, 30, 38, 225 },
    },
    {
        { -217, 43, 12, 5, 114, -53, -9, -2, -8, 18, -2, -1, 5, -1, 1, 0 },
        { -73, 89, -16, 3, -171, -51, 47, 1, 110, -65, -30, 3, -6, 26, -8, -4 },
        { 92, 174, -59, -5, 58, -112, 51, 4, -57, 31, -18, 0, 9, 1, 2, 0 },
        { -38, 74, -41, 12, -30, 125, 28, -18, -122, -103, 80, 12, 60, -41, -41, 10 },
        { -26, 11, 88, -20, -118, -54, -64, 37, -106, 102, 6, -34, 53, -85, 39, 10 },
        { 4, -92, 50, -10, 0, -104, 58, 14, -85, -104, -78, 34, 83, 47, -69, -31 },
        { 37, 83, 152, -42, 38, 3, -112, 48, 31, -93, 44, -19, -23, 53, -29, 2 },
        { -15, 47, 41, -44, 4, 114, 42, 48, -43, 13, -155, 15, -28, 43, 91, -72 },
        { -3, 1, -104, 50, -14, 2, -137, 0, -12, -5, -31, -78, 101, 118, 36, -31 },
        { 22, 17, 26, -36, 50, 33, 30, 17, 115, 4, -20, -1, 191, -84, 25, 8 },
```

TABLE 23-continued

```
          { 17, 34, 83, 155, −1, 6, −28, −151, 4, 9, −39, 81, 18, −10, 20, −25 },
          { −10, 19, 35, −58, −24, 42, 41, −32, 2, 130, 52, 62, 56, 142, −92, 7 },
          { 0, −20, 45, −10, 2, −23, 82, −45, −21, −36, 72, −41, 20, 83, 170, 96 },
          { 3, 11, 51, 115, 9, 39, 71, 42, 2, 30, −49, −157, −4, 14, −84, 78 },
          { 3, −8, 19, 109, 2, −12, 56, 123, 14, 17, 107, 21, 13, 20, 39, −142 },
          { 2, −3, 23, −69, 2, −7, 36, −126, 4, −1, 31, −139, −9, −18, −15, −148 },
        }
      }
};
```

As described above, four transform sets (or secondary transform sets) may be used for memory efficiency enhancement in application of secondary transform in an embodiment of the disclosure. As an embodiment, the encoder/decoder can allocate indices 0, 1, 2 and 3 to the four transform sets.

5 Furthermore, as described above, each transform set may include a predefined number of transform kernels. As an embodiment, the four transform sets used for secondary transform may be predefined in the encoder and the decoder, and each transform set may include one or two transform matrices (or transform types or transform kernels).

Various secondary transform sets and transform matrices (or transform types or transform kernels) applicable to secondary transform will be described through various examples below. Although various transform matrices different from Tables 20 to 23 may be defined in detail, no-directional modes (e.g., DC mode and planar mode) along with a method of configuring a generalized secondary transform set will be chiefly described using examples in the present embodiment for convenience of description.

First, examples of secondary transforms applicable to a 4×4 region will be described in detail. Among examples below with respect to secondary transform sets that can be Particularly, the transform array (i.e., transform sets) of the second example can be applied to the aforementioned combination D and Case 3 of the embodiment described in Table 15 and also be applied to the combination A and Case 3 of the embodiment described in Table 12, the combination B and Case 3 of the embodiment described in Table 13, the combination C and Case 3 of the embodiment described in Table 14 or the combination E and Case 3 of the embodiment described in Table 16.

Although the aforementioned combinations A, B, C, D and E handle only cases in which the number of MTS candidates are three or less, all of four MTS candidates may be applied to all intra-prediction modes in a primary transform. The first to fourth examples below can be used even when all of four MTS candidates are applied and, particularly, the transform array of the fourth example may be more suitable for a case in which four MTS candidates are applied.

The transform arrays of the subsequent fifth to seventh examples correspond to a case in which 35 transform sets are applied. They can be applied when transform sets are mapped to intra-prediction modes, as shown in Table 24.

TABLE 24

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 1 | 2 | 3 | 4 | 5 | 6 | 7 | 8 | 9 | 10 | 11 | 12 | 13 | 14 | 15 | 16 |
| intra mode | 17 | 18 | 19 | 20 | 21 | 22 | 23 | 24 | 25 | 26 | 27 | 28 | 29 | 30 | 31 | 32 | 33 |
| NSST Set | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 |
| NSST Set | 34 | 33 | 32 | 31 | 30 | 29 | 28 | 27 | 26 | 25 | 24 | 23 | 22 | 21 | 20 | 19 | 18 |
| intra mode | 51 | 52 | 53 | 54 | 55 | 56 | 57 | 58 | 59 | 60 | 61 | 62 | 63 | 64 | 65 | 66 | |
| NSST Set | 17 | 16 | 15 | 14 | 13 | 12 | 11 | 10 | 9 | 8 | 7 | 6 | 5 | 4 | 3 | 2 | | used for secondary transform, transform matrices in first and fourth examples can be applied to an embodiment in which each transform set includes two transform matrices. Transform matrices in second and third examples can be applied to an embodiment in which each transform set includes one transform matrix.

Particularly, the first example can be applied to the aforementioned combination D and Case 1 of the embodiment described in Table 15 and also be applied to the combination A and Case 1 of the embodiment described in Table 12, the combination B and Case 1 of the embodiment described in Table 13, the combination C and Case 1 of the embodiment described in Table 14 or the combination E and Case 1 of the embodiment described in Table 16.

In Table 24, NSST set index represents a transform set index. The aforementioned combinations A to E can be applied even when the mapping method of Table 24 is applied. That is, each combination can be applied to the fifth to eighth examples as in the above-described method.

The transform arrays of the fifth and eighth examples can be applied to an embodiment in which each transform set is composed of two transform matrices and the transform arrays of the sixth and seventh examples can be applied to an embodiment in which each transform set is composed of one transform matrix.

Particularly, the fifth example can be applied to the aforementioned combination D and Case 1 of the embodiment described in Table 15 and also be applied to the combination A and Case 1 of the embodiment described in Table 12, the combination B and Case 1 of the embodiment described in Table 13, the combination C and Case 1 of the embodiment described in Table 14 or the combination E and Case 1 of the embodiment described in Table 16.

Particularly, the transform arrays (i.e., transform sets) of the sixth and seventh examples can be applied to the aforementioned combination D and Case 3 of the embodiment described in Table 15 and also be applied to the combination A and Case 3 of the embodiment described in Table 12, the combination B and Case 3 of the embodiment described in Table 13, the combination C and Case 3 of the embodiment described in Table 14 or the combination E and Case 3 of the embodiment described in Table 16.

Although the aforementioned combinations A, B, C, D and E handle only cases in which the number of MTS candidates are three or less, all of four MTS candidates may be applied to all intra-prediction modes in a primary transform. The fifth to eighth examples below can be used even when all of four MTS candidates are applied and, particularly, the transform array of the eighth example may be more suitable for a case in which four MTS candidates are applied.

Transform examples applicable to a 4×4 region among transform arrays of the first to eighth examples below correspond to transform matrices multiplied by a scaling value of 128. The transform arrays of the examples below can be commonly represented as g_aiNsst4×4 [N1] [N2] [16] [16] array. Here, N1 represents the number of transform sets. Here, N1 is 4 or 35 and can be identified by indices 0, 1, . . . , N1-1. N2 represents the number (1 or 2) of transform matrices constituting each transform set and [16] [16] represents a 16×16 transform matrix.

In the examples below, a transform matrix in a specific order may be used for each transform set when a transform set is composed of one transform. For example, when a transform set includes one transform matrix, the encoder/decoder can use a predefined, that is, the first or second transform matrix in each transform set.

To reduce the amount of computations in a worst case, the encoder/decoder can apply an 8×16 matrix to a 4×4 TU. A transform applicable to a 4×4 region in the examples below may applied to a 4×4 TU, a 4×M TU and an M×4 TU (M>4), and when it is applied to the 4×M TU and the M×4 TU, the TUs may be divided into 4×4 regions and each designated transform may be applied thereto or the transform may be applied to only a 4×8 or 8×4 left top region. Further, the transform may be applied to only a 4×4 left top region.

In an embodiment, the following may be applied in order to reduce the amount of computations in a worst case.

For example, with respect to a block with a width W and a height H, when W>=8 and H>=8, the encoder/decoder can apply transform arrays (or transform matrixes or transform kernels) applicable to an 8×8 region to an 8×8 left top region for the block (e.g., 16×64 matrix). If W=8 and H=8, the encoder/decoder can apply only an 8×64 part of the 16×64 matrix. In this case, an input of a secondary transform can be generated as 8 transform coefficients and the remaining coefficients of the corresponding region can be regarded as 0.

Furthermore, if one of W and H is less than 8 (i.e., it is 4) with respect to a block with the width W and the height H, for example, the encoder/decoder can apply transform arrays applicable to a 4×4 region. If W=4 and H=4, the encoder/decoder can apply on an 8×16 part of a 16×16 matrix. In this case, an input of a secondary transform can be generated as 8 transform coefficients and the remaining coefficients of the corresponding region can be regarded as 0.

In an embodiment, if (W, H)=(4, 8) or (8, 4), the encoder/decoder can apply a secondary transform only to a 4×4 left top region. When W or H is greater than 8, the encoder/decoder applies the secondary transform to only two 4×4 left top blocks. That is, the encoder/decoder can divide at most 4×8 or 8×4 left top region into two 4×4 blocks and apply a designated transform matrix thereto.

First Example

The first example can be defined as the following table 25. Four transform sets can be defined and each transform set can be composed of two transform matrices.

TABLE 25

```
const int g_aiNsst4×4[4][2][16][16] = {
  { //0
    {
      { 112, −41, −16, 1, −40, 14, 7, −1, −12, 5, 2, 0, 0, 0, 0, 0 },
      { −36, −104, 50, 12, −10, 24, −8, −2, 15, 21, −11, −4, −1, −2, 1, 0 },
      { 25, −25, −5, 5, 106, −9, −33, 1, −47, 14, 13, −3, −7, 0, 3, 0 },
      { −20, −33, −61, 35, −10, −81, 39, 10, −3, 36, 9, −14, 6, 9, −6, −2 },
      { 25, 13, 81, −34, −4, −78, 1, 24, −5, 16, −28, 3, 0, 11, 1, −5 },
      { 21, −1, −17, 3, 34, −9, −9, 1, 102, 2, −28, −2, −53, 4, 17, −1 },
      { −7, −3, −18, 0, −36, −22, −107, 33, 8, 0, 33, −10, 7, 6, 19, −6 },
      { 2, 32, 1, 3, −6, 25, −10, −5, −1, 104, −21, −27, 9, −47, 13, 12 },
      { −14, −24, −37, −111, 4, 7, 13, 21, 3, 19, 13, 25, −1, −6, −3, −3 },
      { 10, 9, 33, 0, 8, 2, 19, 0, 35, 18, 104, −24, −6, −2, −41, 10 },
      { −13, 3, 7, 1, −24, 0, 10, 0, −44, 4, 21, −3, −108, −5, 37, 1 },
      { 0, −5, −1, −16, −10, −32, −25, −111, 4, 7, 11, 35, 1, −5, 4, 26 },
      { 2, −12, 3, 3, 4, −24, 8, 16, 6, −42, 9, 4, 9, −111, 20, 24 },
      { 3, 8, 7, 33, 1, 5, 4, 20, 7, 28, 21, 106, 3, −11, 8, −45 },
      { −3, 0, −9, 6, −8, −4, −27, 10, −10, 1, −31, 18, −38, −23, −108, 14 },
      { 0, −2, −1, −11, −1, −7, −4, −33, 0, −7, −2, −37, −5, −29, −15, −112 },
    },
    {
      { −120, 28, 18, 2, 21, 4, −2, −2, 17, −3, −5, 0, 3, −2, 0, 0 },
      { 28, 88, −27, −9, 73, 6, −27, −3, −17, −25, 4, 5, −8, −3, 5, 1 },
      { 4, 78, 7, −15, −91, 26, 25, −5, 0, −16, 1, 3, 11, −3, −5, 1 },
      { −17, 11, −42, 6, −23, −102, 0, 21, −33, −10, 33, 4, 9, 20, 3, −5 },
      { −19, −14, −103, 10, −22, 45, −39, −4, 19, 18, 17, −4, 3, −6, 6, 1 },
      { −18, −14, 0, 2, 7, 44, 32, −9, −105, 5, 40, −4, −6, −2, −1, 0 },
      { −7, −25, 21, −5, −26, 6, −76, −4, −27, −79, −14, 26, −4, −5, 27, 8 },
      { 2, 22, 31, 3, −16, −7, −72, −3, −33, 83, −19, −20, 9, 20, 8, −6 },
```

TABLE 25-continued

```
    { 6, 12, 8, 108, −3, 14, 1, 60, −4, −14, −13, −14, 1, −5, −2, −8 },
    { 5, 7, 31, 4, −5, 7, −15, 12, 34, 10, 94, 5, −57, 4, 38, −9 },
    { 7, −5, 15, −2, 13, 22, −9, 8, 16, −14, 45, 9, 95, 56, −13, −16 },
    { 4, 4, 5, 52, −2, −17, −1, −100, 8, −16, 16, −48, 11, −1, 8, 19 },
    { 3, 1, 13, 0, 1, −13, −18, 8, 1, 15, 34, 15, 44, −104, −26, 25 },
    { −1, −5, 5, −18, −5, 1, −27, 8, 1, −25, 15, −60, −28, −1, −91, −42 },
    { 0, 4, 2, 31, −3, 0, −10, −29, 1, 14, 6, 85, −28, 28, −69, 26 },
    { −1, 2, −14, 0, 5, −4, 33, 2, −6, 8, −40, −5, 27, −14, 111 },
  }
}
```

Second Example

The second example can be defined as the following table 26. Four transform sets can be defined and each transform set can be composed of one transform matrix.

TABLE 26

```
const int g_aiNsst4×4[4][1][16][16] = {
  { //0
    {
      { 111,−44,−13,0,−41,13,7,0,−10,6,1,0,−2,0,0,0 },
      { −44,−95,53,9,−26,28,0,−3,22,17,−15,−2,1,−2,0,1 },
      { 18,−44,7,7,102,−10,−31,0,−45,17,10,−3,−8,2,4,0 },
      { −22,−35,−61,36,−13,−75,43,10,−3,36,12,−16,6,9,−8,−1 },
      { 19,15,80,−35,−8,−80,9,22,−8,16,−26,5,3,12,−2,−5 },
      { −21,4,14,−3,−33,17,10,−4,−102,2,29,2,52,−6,−17,2 },
      { 9,14,15,3,34,28,97,−42,−5,22,−39,0,−8,−17,−14,13 },
      { 2,28,−4,3,−11,16,−39,6,3,100,−22,−27,9,−44,17,9 },
      { −14,−23,−39,−110,7,9,16,17,5,20,11,26,−1,−6,−3,−2 },
      { 9,12,34,−1,7,9,19,6,31,23,102,−32,−18,−2,−36,6 },
      { −15,2,2,−1,−26,−1,6,−2,−46,3,10,−2,−107,−4,42,0 },
      { 0,−4,0,−14,−11,−33,−29,−109,8,9,20,28,3,0,3,29 },
      { −2,13,−5,−2,−4,24,−11,−13,−7,40,−16,−3,−12,109,−28,−24 },
      { 3,8,9,33,2,6,10,13,9,30,24,103,3,−9,15,−47 },
      { 3,1,8,−10,7,6,26,−13,9,1,25,−31,38,29,104,−23 },
      { −1,−3,−3,−11,−2,−8,−7,−35,−2,−9,−7,−35,−7,−33,−24,−109 },
    }
  }
```

Third Example

The third example can be defined as the following table 27. Four transform sets can be defined and each transform set can be composed of one transform matrix.

TABLE 27

```
const int g_aiNsst4×4[4][1][16][16] = {
  { //0
    {
      { 112,−42,−15,0,−39,11,7,0,−12,6,2,0,−1,0,0,0 },
      { −41,−98,51,10,−27,26,1,−3,21,20,−14,−3,1,−2,0,1 },
      { −18,44,−4,−8,−103,10,33,−1,42,−16,−10,3,9,−1,−4,0 },
      { 21,31,58,−33,13,81,−40,−14,4,−35,−13,15,−6,−10,8,2 },
      { −21,−16,−84,35,5,76,−8,−21,11,−11,26,−6,−2,−12,2,5 },
      { 21,−2,−14,2,30,−18,−11,5,103,2,−32,−2,−49,4,18,−1 },
      { −8,−13,−13,−5,−35,−27,−98,39,5,−26,36,4,8,18,16,−13 },
      { −2,−29,2,0,14,−14,40,−5,1,−101,17,29,−12,41,−14,−10 },
      { 14,23,36,111,−6,−6,−15,−11,−4,−21,−14,−28,2,6,4,2 },
      { 10,11,35,0,7,9,18,10,32,19,103,−31,−17,3,−34,2 },
      { −14,2,3,0,−25,−2,6,−1,−44,1,11,−3,−107,−12,44,3 },
      { 1,−3,3,−8,−10,−34,−26,−111,8,7,22,24,2,1,1,31 },
      { 3,−12,5,2,4,−24,8,14,9,−38,15,4,17,−110,18,27 },
      { 3,9,9,34,2,6,10,11,8,31,24,104,5,−9,21,−43 },
```

TABLE 27-continued

```
      { 3,0,7,−10,8,4,26,−12,8,−2,23,−33,40,23,106,−17 },
      { 0,3,2,10,2,8,6,35,2,9,5,32,5,34,20,111 },
    }
}
```

Fourth Example

The fourth example can be defined as the following table 28. Four transform sets can be defined and each transform set can be composed of two transform matrices.

TABLE 28

```
const int g_aiNsst4×4[4][2][16][16] = {
  { //0
    {
      { 110,−43,−15,1,−41,16,7,−1,−10,5,2,−1,−1,0,0,0 },
      { −38,−102,53,13,−7,27,−9,−3,15,19,−11,−3,−1,−2,0,1 },
      { 27,−25,−4,5,104,−12,−31,1,−51,15,14,−2,−6,0,3,0 },
      { −26,−38,−80,45,−7,−53,41,2,2,31,13,−15,3,5,−5,0 },
      { 18,2,61,−23,−9,−96,15,26,−3,28,−26,−1,2,14,−1,−5 },
      { −22,2,15,−2,−38,8,10,−1,−100,4,27,2,55,−7,−18,1 },
      { 7,4,19,−1,35,25,104,−35,−9,−5,−37,12,−8,−6,−18,7 },
      { 4,33,1,9,−4,26,−11,−7,2,101,−27,−28,5,−46,16,13 },
      { −15,−24,−38,−109,5,11,14,26,5,24,12,21,0,−10,−4,−3 },
      { 10,10,34,0,7,0,22,−5,31,20,102,−27,−13,−5,−40,15 },
      { −15,2,4,−1,−26,2,8,0,−48,4,14,−1,−108,2,37,0 },
      { −2,−6,−4,−19,−11,−33,−25,−108,4,9,9,40,1,−5,5,24 },
      { 2,−12,4,4,2,−25,9,16,4,−42,9,4,4,−110,27,24 },
      { 3,8,8,33,2,6,6,23,9,30,23,103,1,−12,5,−47 },
      { 3,0,10,−7,8,5,29,−11,9,0,32,−17,37,25,107,−18 },
      { 0,−2,−1,−12,−1,−7,−4,−34,−1,−8,−2,−38,−6,−31,−18,−110 },
    },
    {
      { 119,−30,−18,−3,−24,−4,3,2,−16,4,5,0,−3,2,0,0 },
      { 30,88,−31,−10,68,0,−26,−2,−19,−27,6,6,−8,−4,6,1 },
      { −2,−76,−4,14,94,−23,−23,4,−4,15,0,−3,−12,5,4,−1 },
      { −20,4,−48,9,−26,−99,2,23,−27,−4,35,3,9,21,3,−7 },
      { 18,17,101,−12,17,−54,33,6,−19,−17,−17,5,−2,7,−6,−1 },
      { −17,−9,3,3,41,36,−11,−106,9,39,−5,−4,0,−2,−1 },
      { 9,24,−21,6,28,−5,82,1,34,69,10,−27,1,0,−28,−8 },
      { 3,25,25,3,−14,−7,−68,−3,−25,91,−15,−23,10,21,6,−7 },
      { 7,13,9,111,−2,12,0,51,−6,−15,−17,−19,−1,−6,−2,−9 },
      { 7,5,35,6,0,14,−15,14,38,3,104,1,−32,13,29,−13 },
      { 6,−5,7,−11,15,23,−5,30,6,−12,19,14,100,48,−29,−22 },
      { 6,2,6,43,1,−16,−4,−100,10,−20,20,−40,37,8,1,18 },
      { −3,1,−11,−1,−2,13,17,−12,2,−16,−30,−17,−41,105,25,−28 },
      { 3,5,−2,20,6,1,27,−6,3,26,−10,64,31,7,89,36 },
      { 1,4,2,31,−3,0,−10,−26,3,14,8,84,−30,28,−71,24 },
      { 0,0,−1,11,−1,−6,2,−34,−1,5,−7,38,3,−30,12,−112 },
    }
  }
}
```

Fifth Example

The fifth example can be defined as the following table 29. 35 transform sets can be defined and each transform set can be composed of two transform matrices.

TABLE 29

```
const int g_aiNsst4x4[35][2][16][16] = {
    {   //0
        {
            { -113,35,20,-1,41,-14,-7,1,12,-4,-3,0,0,0,0,0 },
            { -30,-108,45,17,-7,26,-9,-3,14,22,-9,-5,-1,-2,1,1 },
            { 27,-19,-11,5,106,2,-36,-1,-47,10,16,-2,-8,-2,4,1 },
            { -26,-32,-92,44,-3,-44,31,1,3,25,20,-14,2,4,-4,0 },
            { 18,-7,49,-12,0,-104,7,30,-12,31,-21,-5,3,14,1,-6 },
            { -23,-5,14,2,-32,4,13,-1,-100,-16,32,4,53,1,-21,-1 },
            { 7,2,18,3,37,19,108,-24,-10,6,-37,7,-9,-8,-18,4 },
            { 1,34,7,13,-13,24,-12,-7,-11,100,-6,-34,14,-47,9,16 },
            { 14,23,30,110,-3,-7,-14,-20,-4,-31,-21,-23,-1,11,5,2 },
            { 11,9,37,11,8,-3,22,4,34,7,103,-18,-15,3,-41,8 },
            { 13,1,-5,0,24,4,-8,-7,45,8,-16,2,104,26,-40,-6 },
            { 0,-4,4,-13,-8,-33,-16,-112,2,10,12,38,-4,-1,4,25 },
            { 5,-12,0,4,7,-26,-1,12,15,-43,0,8,23,-109,-6,29 },
            { -3,-8,-8,-35,-1,-6,-6,-23,-6,-28,-19,-102,-7,12,-25,46 },
            { -3,3,-10,8,-10,1,-29,7,-11,13,-30,27,-41,-9,-107,-5 },
            { 0,-2,1,-11,0,-7,-1,-35,1,-8,3,-38,-2,-31,-6,-111 },
        },
        {
            { 122,-24,-19,-2,-15,1,0,1,-19,2,5,0,-3,1,1,0 },
            { -21,-90,25,11,-74,-21,22,6,11,21,-2,-4,10,6,-4,-2 },
            { 3,73,4,-13,-94,22,30,-4,0,-20,4,3,12,-3,-5,1 },
            { -14,13,-59,8,-16,-96,-12,18,-33,-21,28,6,4,17,6,-3 },
            { 19,17,91,-9,24,-56,46,10,-22,-20,-15,9,-4,7,-8,-1 },
            { 21,17,-4,-3,-5,-41,-24,8,106,-1,-44,0,10,10,-3,-2 },
            { -3,-16,31,-9,-24,6,-85,-3,-24,-68,-31,18,-9,-12,22,7 },
            { 3,31,28,6,-16,-12,-55,3,-34,89,-21,-26,12,24,9,-10 },
            { 5,11,7,104,0,18,1,66,0,-16,-8,-10,1,-7,-2,-11 },
            { -6,-5,-36,4,4,-5,22,-17,-36,-3,-96,-8,30,-25,-44,8 },
            { -3,8,-8,7,-15,-18,10,-6,2,22,-21,-9,-105,-54,20,12 },
            { 6,4,13,54,0,-16,-3,-91,7,-20,19,-58,12,-1,5,17 },
            { 5,4,14,-3,2,-18,-19,11,7,21,35,14,48,-100,-17,28 },
            { -1,-3,7,-21,-4,0,-25,15,2,-16,23,-54,-29,-3,-94,-39 },
            { -1,-5,-5,-34,5,0,17,31,-1,-18,-10,-81,25,-28,64,-37 },
            { 1,1,1,17,-1,-5,0,-38,1,5,-1,44,4,-26,8,-109 },
        }
    }
}
```

Sixth Example

The sixth example can be defined as the following table 30. 35 transform sets can be defined and each transform set can be composed of one transform matrix.

TABLE 30

```
const int g_aiNsst4x4[35][1][16][16] = {
    {   //0
        {
            { 112,-38,-18,0,-41,13,7,0,-11,5,3,0,-1,0,0,0 },
            { 36,101,-48,-13,25,-26,1,3,-23,-20,13,4,0,2,0,-1 },
            { 21,-41,-2,8,103,0,-35,-2,-43,15,12,-3,-9,-1,5,0 },
            { -23,-34,-76,41,-8,-65,35,9,-1,32,16,-16,5,8,-6,-2 },
            { 20,3,70,-24,-3,-91,6,27,-17,21,-24,1,4,13,-1,-6 },
            { -23,-3,13,1,-31,15,13,-4,-100,-11,34,4,51,-1,-20,1 },
            { 9,12,17,5,34,24,101,-32,-7,28,-36,-2,-6,-19,-17,11 },
            { 0,31,1,3,-17,18,-38,2,-5,100,-4,-31,16,-43,12,12 },
            { 14,23,33,111,-5,-5,-16,-15,-5,-23,-18,-27,0,7,5,2 },
            { -10,-10,-37,-7,-8,-4,-21,-13,-32,-12,-103,24,21,-6,35,-4 },
            { -14,-1,3,-1,-25,-5,8,-1,-45,-5,11,0,-103,-30,42,8 },
            { 1,-3,5,-10,-9,-33,-20,-112,8,9,21,29,2,5,0,28 },
            { 5,-13,3,3,8,-26,2,11,17,-40,10,8,28,-108,1,29 },
            { -3,-8,-9,-33,-2,-6,-11,-15,-8,-28,-22,-100,-10,8,-35,45 },
            { -3,2,-8,13,-8,-1,-28,10,-8,10,-25,41,-38,-16,-105,1 },
            { 0,-2,0,-11,-1,-7,-3,-35,0,-8,0,-35,-3,-32,-13,-111 },
        }
    }
}
```

Seventh Example

The seventh example can be defined as the following table 31. 35 transform sets can be defined and each transform set can be composed of one transform matrix.

TABLE 31

```
const int g_aiNsst4x4[35][1][16][16] = {
{   //0
    {
        { 112,-38,-18,0,-41,13,7,0,-11,5,3,0,-1,0,0,0 },
        { 36,101,-48,-13,25,-26,1,3,-23,-20,13,4,0,2,0,-1 },
        { 21,-41,-2,8,103,0,-35,-2,-43,15,12,-3,-9,-1,5,0 },
        { -23,-34,-76,41,-8,-65,35,9,-1,32,16,-16,5,8,-6,-2 },
        { 20,3,70,-24,-3,-91,6,27,-17,21,-24,1,4,13,-1,-6 },
        { -23,-3,13,1,-31,15,13,-4,-100,-11,34,4,51,-1,-20,1 },
        { 9,12,17,5,34,24,101,-32,-7,28,-36,-2,-6,-19,-17,11 },
        { 0,31,1,3,-17,18,-38,2,-5,100,-4,-31,16,-43,12,12 },
        { 14,23,33,111,-5,-5,-16,-15,-5,-23,-18,-27,0,7,5,2 },
        { -10,-10,-37,-7,-8,-4,-21,-13,-32,-12,-103,24,21,-6,35,-4 },
        { -14,-1,3,-1,-25,-5,8,-1,-45,-5,11,0,-103,-30,42,8 },
        { 1,-3,5,-10,-9,-33,-20,-112,8,9,21,29,2,5,0,28 },
        { 5,-13,3,3,8,-26,2,11,17,-40,10,8,28,-108,1,29 },
        { -3,-8,-9,-33,-2,-6,-11,-15,-8,-28,-22,-100,-10,8,-35,45 },
        { -3,2,-8,13,-8,-1,-28,10,-8,10,-25,41,-38,-16,-105,1 },
        { 0,-2,0,-11,-1,-7,-3,-35,0,-8,0,-35,-3,-32,-13,-111 },
    }
}
```

Eighth Example

The eighth example can be defined as the following table 32. 35 transform sets can be defined and each transform set can be composed of two transform matrices.

TABLE 32

```
const int g_aiNsst4x4[35][2][16][16] = {
{   //0
    {
        { 114,-33,-23,1,-37,13,7,-1,-13,3,5,-1,0,-1,-1,0 },
        { 25,107,-46,-18,9,-27,9,4,-16,-20,11,6,2,2,-2,-1 },
        { 22,-21,-10,7,107,-3,-34,-2,-47,12,17,-3,-9,-1,5,1 },
        { -30,-32,-97,45,-6,-26,32,-2,8,21,22,-14,3,3,-6,0 },
        { 13,-11,35,-6,-3,-108,15,31,-9,35,-19,-9,4,17,-2,-8 },
        { -24,-5,15,3,-34,6,14,-2,-100,-8,32,3,51,-1,-20,0 },
        { 8,4,17,3,37,20,106,-25,-9,7,-40,5,-8,-9,-20,6 },
        { 4,37,9,23,-11,23,-17,-11,-6,97,-12,-40,11,-40,10,16 },
        { 13,20,27,109,-2,-10,-12,-17,-4,-43,-19,-18,-1,14,4,-1 },
        { -10,-10,-38,-10,-7,1,-24,0,-34,-9,-103,20,17,-4,37,-7 },
        { -13,-1,3,1,-27,-6,9,-1,-44,-2,12,-1,-106,-18,40,6 },
        { -1,4,-3,12,7,36,16,111,-5,-8,-9,-35,-5,-2,-3,-28 },
        { 3,-11,1,4,5,-27,0,16,11,-36,4,8,16,-111,-3,32 },
        { -3,-9,-8,-36,-1,-7,-6,-22,-6,-34,-18,-105,-6,10,-22,35 },
        { -3,2,-9,7,-9,0,-31,5,-9,12,-27,25,-40,-7,-109,-1 },
        { 0,-2,0,-9,-1,-7,-2,-35,1,-7,3,-28,-2,-36,-6,-113 },
    }
}
    {
        { 121,-23,-19,-3,-18,1,0,1,-19,3,6,0,-3,1,1,0 },
        { -21,-92,28,13,-69,-16,20,6,14,24,-5,-5,11,6,-5,-3 },
        { 0,-70,-4,14,96,-19,-30,4,-2,20,-4,-5,-13,5,6,-2 },
        { -14,9,-55,11,-17,-98,-8,22,-29,-17,28,5,6,22,6,-6 },
        { 19,18,94,-10,23,-54,42,11,-21,-18,-20,9,-4,9,-10,-3 },
        { 21,15,-4,-4,-3,-36,-26,9,108,-3,-43,1,5,9,-1,-3 },
        { 4,14,-31,8,26,-4,91,-1,29,58,25,-18,8,7,-29,-5 },
        { -3,-35,-22,-8,14,10,49,-4,28,-94,19,31,-17,-21,-6,11 },
        { 7,13,7,110,1,19,3,52,1,-22,-8,-18,0,-6,-3,-13 },
        { -6,-6,-39,1,2,-6,19,-13,-36,-5,-102,1,24,-24,-36,10 },
        { -4,7,-6,11,-16,-19,11,-13,0,20,-18,-13,-109,-38,27,14 },
        { 5,3,11,41,0,-21,-5,-99,6,-21,14,-51,21,0,1,24 },
        { 4,4,12,2,2,2,-23,-15,16,6,20,29,15,35,-107,-11,31 },
```

US 12,581,069 B2

TABLE 32-continued

```
        { -2,-4,4,-23,-5,0,-28,15,-1,-18,18,-57,-30,-7,-97,-22 },
        { -1,-6,-5,-36,5,0,19,30,-1,-22,-10,-88,22,-25,61,-25 },
        { 0,0,0,9,-1,-6,0,-37,0,3,0,28,1,-33,4,-114 },
    }
}
```

Hereinafter, examples of secondary transforms applicable to an 8×8 region will be described. Among the following examples with respect to secondary transform sets available for secondary transform, the transform matrices in the ninth and twelfth examples can be applied to an embodiment in which each transform set is composed of two transform matrices. The transform matrices in the tenth and eleventh examples can be applied to an embodiment in which each transform set is composed of one transform matrix.

Particularly, the ninth example can be applied to the aforementioned combination D and Case 1 of the embodiment described in Table 15 and also be applied to the combination A and Case 1 of the embodiment described in Table 12, the combination B and Case 1 of the embodiment described in Table 13, the combination C and Case 1 of the embodiment described in Table 14 or the combination E and Case 1 of the embodiment described in Table 16.

Particularly, the transform arrays (i.e., transform sets) of the tenth example can be applied to the aforementioned combination D and Case 3 of the embodiment described in Table 15 and also be applied to the combination A and Case 3 of the embodiment described in Table 12, the combination B and Case 3 of the embodiment described in Table 13, the combination C and Case 3 of the embodiment described in Table 14 or the combination E and Case 3 of the embodiment described in Table 16.

Although the aforementioned combinations A, B, C, D and E handle only cases in which the number of MTS candidates are three or less, all of four MTS candidates may be applied to all intra-prediction modes in a primary transform. The ninth to twelfth examples below can be used even when all of four MTS candidates are applied and, particularly, the transform array of the twelfth example may be more suitable for a case in which four MTS candidates are applied.

The transform arrays of the subsequent thirteenth to sixteenth examples correspond to a case in which 35 transform sets are applied. They can be applied to a case in which transform sets are mapped to respective intra-prediction modes as shown in the aforementioned table 24.

In Table 24, NSST set index represents a transform set index. The aforementioned combinations A to E can be applied even when the mapping method of Table 24 is applied. That is, each combination can be applied to the thirteenth to sixteenth examples as in the above-described method.

The transform arrays of the thirteenth and sixteenth examples can be applied to an embodiment in which each transform set is composed of two transform matrices and the transform arrays of the fourteenth and fifteenth examples can be applied to an embodiment in which each transform set is composed of one transform matrix.

Particularly, the thirteenth example can be applied to the aforementioned combination D and Case 1 of the embodiment described in Table 15 and also be applied to the combination A and Case 1 of the embodiment described in Table 12, the combination B and Case 1 of the embodiment described in Table 13, the combination C and Case 1 of the embodiment described in Table 14 or the combination E and Case 1 of the embodiment described in Table 16.

Particularly, the transform arrays (i.e., transform sets) of the fourteenth and fifteenth examples can be applied to the aforementioned combination D and Case 3 of the embodiment described in Table 15 and also be applied to the combination A and Case 3 of the embodiment described in Table 12, the combination B and Case 3 of the embodiment described in Table 13, the combination C and Case 3 of the embodiment described in Table 14 or the combination E and Case 3 of the embodiment described in Table 16.

Although the aforementioned combinations A, B, C, D and E handle only cases in which the number of MTS candidates are three or less, all of four MTS candidates may be applied to all intra-prediction modes in a primary transform. The thirteenth to sixteenth examples below can be used even when all of four MTS candidates are applied and, particularly, transform array of the eighth example may be more suitable for a case in which four MTS candidates are applied.

Transform examples applicable to an 8×8 region among the transform arrays of the eighth to sixteenth examples below correspond to transform matrices multiplied by a scaling value of 128. The transform arrays of the examples below can be commonly represented as g_aiNsst8×8 [N1] [N2] [16] [64] array. Here, N1 represents the number of transform sets. Here, N1 is 4 or 35 and can be identified by indices 0, 1, . . . , N1-1. N2 represents the number (1 or 2) of transform matrices constituting each transform set and [16] [64] represents a 16×64 reduced secondary transform (RST).

In the examples below, a transform matrix in a specific order may be used for each transform set when a transform set is composed of one transform. For example, when a transform set includes one transform matrix, the encoder/decoder can use a predefined, that is, the first or second transform matrix in each transform set.

Although 16 transform coefficients are output when the RST is applied, only m transform coefficients may be configured to be output when only an m×64 part of a 16×64 matrix is applied. For example, the amount of computations can be reduced by half by setting m to 8, multiplying only an 8×64 matrix from the top to output only 8 transform coefficients.

Ninth Example

The ninth example can be defined as the following table 33. Four transform sets can be defined and each transform set can be composed of two transform matrices.

TABLE 33

```
const int g_aiNsst8x8[4][2][16][64] = {
    {   //0
        {
            {-113,36,14,2,2,1,1,0,41,-18,-4,0,-1,0,0,0,9,-2,-2,0,0,0,0,0,2,-1,0,0,0,0,0,2,-1,
-1,0,0,0,0,0,1,0,0,0,0,0,0,1,0,0,0,0,0,0,0,0,0,0,0,0,0,0,0,0 },
            {39,90,-54,0,-9,0,-3,0,40,-32,7,0,1,0,0,0,-30,-6,9,1,2,0,1,0,3,-1,0,0,0,0,0,0,-6,
-1,2,0,0,0,0,0,-1,0,0,0,0,0,0,-2,-1,1,0,0,0,0,0,0,0,0,0,0,0,0,0 },
            {-16,56,-12,-6,-2,-2,-1,-1,-97,2,28,1,4,0,2,0,44,-24,-7,3,-1,1,0,0,3,3,-2,-1,
0,0,0,0,7,-3,0,0,0,0,0,0,1,0,-1,0,0,0,0,0,3,-1,0,0,0,0,0,0,0,0,0,0,0,0,0,0 },
            {21,47,64,-39,4,-8,1,-3,19,66,-40,3,-4,0,-1,0,4,-38,2,9,1,2,0,1,-8,
1,3,0,0,0,0,0,0,-5,-2,2,0,0,0,0,-2,-1,1,0,0,0,0,0,-2,-1,1,0,0,0,0,-1,0,0,0,0,0,0,0 },
            {-25,-10,-73,30,-2,6,-1,3,4,87,-7,-20,-2,-4,-1,-2,-7,-20,28,-2,0,0,0,0,2,-8,-3,
4,0,1,0,0,0,-2,3,-1,0,0,0,0,1,-2,0,1,0,0,0,0,0,-1,1,0,0,0,0,0,0,-1,0,0,0,0,0,0 },
            {-19,4,25,-6,1,-2,0,-1,-41,4,7,1,2,0,1,0,-99,0,18,1,4,1,2,0,54,-9,-13,1,-2,0,-1,
0,-8,3,0,0,0,0,0,0,10,-1,-2,0,0,0,0,0,-2,1,0,0,0,0,0,0,4,0,-1,0,0,0,0,0 },
            {-8,-23,-26,-15,10,-2,3,0,-15,-44,-68,28,-2,6,0,2,-5,-66,39,3,-1,2,0,1,-4,34,-2,
-7,1,-2,0,-1,6,-1,2,0,-1,0,0,0,0,-2,5,2,-2,0,0,0,0,1,0,1,0,0,0,0,0,0,2,1,-1,0,0,0,0 },
            {-3,23,-8,12,-5,1,-1,0,-29,4,-82,19,2,3,1,1,3,77,7,-23,1,-5,0,-2,-4,-28,19,3,-1,
1,0,0,4,0,-2,1,0,0,0,0,0,-3,4,-1,0,0,0,0,1,0,0,0,0,0,0,0,0,-1,2,0,0,0,0,0 },
            {12,12,39,104,-38,12,-8,3,0,-8,-16,-6,10,-2,2,0,3,-32,-6,-15,7,1,1,0,9,11,-2,-1,
-3,0,0,0,-4,2,0,-4,1,-1,0,0,2,1,0,0,0,0,0,0,-1,0,0,-2,1,0,0,0,1,1,0,0,0,0,0,0 },
            {-9,4,10,11,-3,1,-1,0,-16,0,18,-1,0,0,0,0,-49,-2,12,1,4,0,1,0,-99,
0,25,0,3,0,2,0,41,-13,-15,3,-2,1,-1,0,-14,4,2,-1,1,0,0,0,8,-1,-2,0,0,0,0,0,-3,1,0,0,0,0,0,0 },
            {-4,-6,-15,-8,-6,2,-1,1,-9,-14,-36,-70,19,-4,4,-1,-15,-18,-65,48,5,1,1,1,3,-14,
39,10,-5,-1,-1,0,0,8,-1,-4,-1,-1,0,0,0,-2,4,2,-2,0,0,0,-1,1,0,-1,0,0,0,0,0,-1,1,1,0,0,0,0 },
            {7,1,21,-4,3,-1,1,0,-1,-22,-2,-72,17,-5,3,-1,20,7,81,10,-16,0,-3,0,-6,-29,-23,
30,3,1,1,1,-1,4,-8,-6,4,0,0,0,0,-2,0,4,-2,0,0,0,0,1,-2,-1,1,0,0,0,0,-1,0,1,-1,0,0,0 },
            {2,-10,0,4,-2,1,-1,0,6,-11,12,41,-12,3,-2,1,8,-39,8,4,8,0,2,1,6,-102,38,12,-3,
4,0,2,-5,10,-11,0,-1,-1,0,0,2,-4,1,-3,0,0,0,0,0,3,-1,0,0,0,0,0,0,-1,0,-1,0,0,0,0 },
            {-7,-11,-4,-41,-105,30,-8,4,1,3,3,13,33,-9,1,-1,4,3,11,5,27,-6,0,-1,-4,3,-8,1,-10,
1,0,0,-3,0,0,3,5,-2,0,0,0,-1,0,-1,-1,1,0,0,0,0,0,1,2,-1,0,0,0,0,0,0,-1,0,0,0 },
            {-7,1,4,0,2,-1,0,-1,-11,0,1,2,-1,0,0,0,-8,-1,4,0,-5,2,0,0,-48,2,6,0,2,0,1,0,-101,
22,44,-11,2,-2,1,0,27,-9,-8,2,-2,0,-1,0,-8,1,1,-1,0,0,0,0,2,-1,-1,0,0,0,0,0 },
            {1,-3,1,-18,11,-4,2,-1,3,-2,9,-29,37,-8,4,-2,0,-15,5,-89,4,7,-3,1,10,5,51,-16,-37,
6,-3,0,0,-1,13,23,-8,-4,2,-1,1,0,-1,-1,1,-1,1,0,0,-1,0,3,-2,0,0,0,0,0,0,1,0,0,0,0 },
        },
        {
            {119,-32,-14,-3,-3,-1,-1,0,-27,4,3,1,1,0,0,0,-15,4,3,0,0,0,0,0,-4,1,0,0,0,0,0,0,-3,
1,0,0,0,0,0,0,-1,0,0,0,0,0,0,0,-1,0,0,0,0,0,0,0,0,0,0,0,0,0,0,0 },
            {32,66,-29,-3,-6,-1,-2,0,89,-19,-21,1,-3,0,-1,0,-29,-17,9,3,2,1,1,0,-9,
1,4,0,0,0,0,0,-7,-1,2,0,0,0,0,0,-2,0,1,0,0,0,0,0,-2,-1,1,0,0,0,0,0,-1,0,0,0,0,0,0,0 },
            {-7,-96,19,10,5,2,2,1,75,-13,-12,0,-3,0,-1,0,-4,20,-4,-3,0,-1,0,0,-11,5,2,-1,
0,0,0,0,-5,5,0,-1,0,0,0,0,-2,1,0,0,0,0,0,0,-1,2,0,0,0,0,0,0,-1,0,0,0,0,0,0,0 },
            {13,8,24,-10,1,-3,0,-1,25,106,-23,-16,-4,-3,-1,-1,35,-13,-28,3,0,1,0,0,-14,-20,
4,7,1,1,0,0,-2,-5,2,2,0,0,0,0,-3,-3,1,1,0,0,0,0,-1,0,0,0,0,0,0,-1,-1,1,0,0,0,0,0 },
            {22,23,107,-26,-2,-6,0,-2,8,-37,27,-5,-1,0,0,0,4,-14,-26,6,3,2,0,1,-2,6,-7,
1,1,0,0,0,-2,2,-5,1,0,0,0,0,1,-1,0,0,0,0,0,0,-2,0,0,0,0,0,0,1,0,0,0,0,0,0,0 },
            {-15,-4,24,-3,1,-1,0,0,-5,45,19,-12,-2,-2,0,-1,-110,7,23,-2,5,0,2,0,14,1,-4,
0,0,0,0,0,6,-3,-5,1,0,0,0,0,5,-2,-2,1,0,0,0,0,1,-1,-1,0,0,0,0,0,2,-1,-1,0,0,0,0,0 },
            {8,22,-9,10,-4,2,-1,1,23,12,70,-12,-2,-3,-1,-1,20,88,-3,-26,-3,-4,-1,-2,9,-9,-26,
1,3,1,0,0,-5,-7,-2,4,1,0,0,0,0,-2,-3,1,0,0,0,0,-1,-1,0,1,0,0,0,0,0,-1,-1,0,0,0,0,0 },
            {1,18,17,-17,3,-3,1,-1,-16,-10,-88,2,6,2,1,1,-13,78,-23,0,2,-3,1,-1,15,8,4,0,-3,
-1,-1,0,2,-7,2,3,-1,1,0,0,2,-1,3,1,-1,0,0,0,0,-2,1,1,0,0,0,0,1,0,1,0,0,0,0,0 },
            {8,13,25,111,-12,6,-5,2,-3,6,-11,40,-10,2,-1,0,-7,-7,-23,-19,2,1,1,0,10,2,-2,-7,
2,0,0,0,1,1,1,-5,0,0,0,0,1,0,0,-2,0,0,0,0,0,0,-2,0,0,0,0,1,0,0,-1,0,0,0,0,0 },
            {-7,10,11,9,-1,0,-1,0,-16,-2,2,5,-2,0,0,0,-9,23,20,-6,-2,-1,0,0,-116,-5,31,-3,
3,0,2,0,-13,5,3,-2,1,0,0,0,2,-1,-2,0,0,0,0,0,4,0,-2,0,0,0,0,0,-1,0,0,0,0,0,0,0 },
            {7,6,26,-5,2,-2,1,-1,9,22,-7,41,-5,3,-1,1,30,11,90,10,-14,-2,-2,-1,18,41,9,-34,-9,
-2,-1,-1,2,-3,-18,-9,2,1,0,0,-1,1,-1,-2,1,1,0,0,0,-1,-3,-1,1,0,0,0,0,0,-1,0,0,0,0 },
            {6,3,16,35,3,2,-1,1,-5,-13,-22,-100,-3,-2,2,0,15,-7,47,-34,-1,2,0,0,10,-3,
13,16,1,-1,-1,0,1,-3,-4,3,1,-1,0,0,0,0,1,3,0,0,0,0,0,0,-1,0,0,0,0,0,0,0,0,1,0,0,0,0,0 },
            {-2,4,-15,1,-1,1,0,0,-1,14,9,-27,0,-1,1,0,-2,-4,-38,-11,6,0,1,0,-12,112,1,-14,0,-5,
0,-2,-1,24,-6,-5,-1,-2,0,-1,1,-4,-2,4,0,1,0,0,1,-2,0,1,0,0,0,0,0,1,0,1,0,0,0,0,0 },
            {-5,-7,-2,-14,-102,20,-4,3,-3,-1,-4,-6,-61,13,-2,1,3,3,4,7,31,0,-1,-1,2,-1,4,-4,
16,-1,0,0,0,-1,-2,0,4,-1,0,0,0,0,1,0,2,0,0,0,-1,0,0,0,1,0,0,0,0,0,0,0,0,1,0,0,0 },
            {-2,-3,1,-18,4,-2,1,-1,-4,0,-22,21,-7,2,-3,1,-1,-19,14,-68,-3,-3,-1,-1,-19,7,-75,
7,43,-2,4,0,1,-8,-8,40,5,-6,1,-1,-2,3,3,0,-5,0,-1,0,1,-1,0,4,0,-1,0,0,0,-1,0,0,0,0 },
            {0,-1,1,-26,-4,0,1,-1,2,0,9,20,-8,5,-2,1,-3,-6,-12,-83,-22,3,-2,0,21,-6,74,-17,-6,
-2,-1,0,6,4,32,6,1,-2,0,0,-1,-3,1,2,1,-1,0,0,-1,0,2,1,0,-1,0,0,0,0,1,0,0,0,0,0,0 },
        }
    }
}
```

Tenth Example

The tenth example can be defined as the following table 34. Four transform sets can be defined and each transform set can be composed of one transform matrix.

TABLE 34

```
const int g_aiNsst8x8[4][1][16][64] = {
  {  //0
    {
      {              116,-33,-16,-2,-3,-1,-1,0,-35,13,3,1,1,0,0,0,-12,3,2,0,0,0,0,0,-3,
1,0,0,0,0,0,0,-3,1,1,0,0,0,0,0,-1,0,0,0,0,0,0,0,-1,0,0,0,0,0,0,0,-1,0,0,0,0,0,0,0 },
      {              -34,-81,47,0,9,0,3,0,-61,34,0,0,0,0,0,0,35,5,-11,-1,-2,0,-1,0,-1,0,-1,
0,0,0,0,0,7,1,-2,0,0,0,0,0,0,0,0,0,0,0,0,3,1,-1,0,0,0,0,0,0,0,0,0,0,0,0,0 },
      { 6,-73,19,6,3,1,1,90,-1,-26,0,-4,0,-2,0,-34,22,3,-2,1,0,0,0,-5,0,2,0,0,0,0,0,-6,
3,0,0,0,0,0,0,-1,0,1,0,0,0,0,0,-2,1,0,0,0,0,0,0,0,0,0,0,0,0,0,0 },
      {  -18,-39,-46,28,-2,6,-1,3,-24,-85,42,3,5,1,2,0,-11,39,0,-9,-1,-2,0,-1,10,3,-5,-1,
0,0,0,0,0,6,1,-1,0,0,0,0,3,1,-1,0,0,0,0,0,2,0,-1,0,0,0,0,1,0,0,0,0,0,0,0 },
      {              25,19,89,-37,3,-7,1,-3,-1,-71,4,14,2,3,1,1,6,8,-24,5,1,1,0,0,-3,9,0,-3,
0,0,0,0,1,-3,2,0,0,0,0,0,-1,0,0,0,0,0,0,1,0,0,0,0,0,0,0,0,0,0,0,0,0,0 },
      {  -16,7,26,-8,1,-2,0,-1,-34,16,6,-2,2,-1,1,0,-104,3,18,1,4,1,2,0,48,-9,-11,2,-2,
0,-1,0,-5,1,-2,0,0,0,0,0,9,-1,-2,0,0,0,0,0,-2,0,0,0,0,0,0,0,4,-1,-1,0,0,0,0,0 },
      {   -8,-23,-19,-11,7,-1,2,0,-19,-41,-67,26,0,6,0,2,-10,-73,36,9,0,2,0,1,-4,31,6,-7,
0,-2,0,-1,5,1,1,-1,-1,0,0,0,-1,5,2,-1,0,0,0,0,1,0,0,0,0,0,0,0,0,2,1,-1,0,0,0,0 },
      {   -2,20,-8,6,-2,1,-1,0,-25,-2,-86,23,0,4,0,1,4,78,-1,-15,1,-4,0,-2,0,-23,15,1,-1,
0,0,0,1,0,1,0,0,0,0,0,0,-3,3,-1,0,0,0,0,0,0,0,0,0,0,0,-1,1,0,0,0,0,0,0 },
      { 11,13,39,109,-32,12,-8,3,-2,-4,-13,-2,5,-1,1,0,0,-25,-8,-18,6,0,1,0,8,7,-1,-2,-2,
0,0,0,-2,1,-1,-4,1,-1,0,0,1,1,1,0,0,0,0,0,-1,0,0,-2,0,0,0,0,0,0,0,0,0,0,0,0 },
      {              -10,5,8,9,-2,1,0,0,-15,3,15,-2,0,-1,0,0,-43,8,11,-2,3,0,1,0,-107,5,24,-1,
3,0,2,0,32,-9,-11,2,-1,0,0,0,-12,2,2,0,0,0,0,0,7,-2,-2,0,0,0,0,0,-3,0,0,0,0,0,0,0 },
      {              -4,-6,-14,-1,-6,3,-1,1,-8,-13,-24,-64,17,-5,4,-1,-16,-16,-69,52,8,2,1,1,3,-18,
47,12,-9,-1,-1,0,-1,6,3,-9,-3,1,0,0,1,-2,3,2,0,0,0,0,-1,2,0,-1,0,0,0,0,1,0,1,1,0,0,0,0 },
      {              6,2,19,0,1,0,1,0,-2,-19,-10,-79,17,-6,3,-1,20,6,79,2,-12,-1,-2,0,-3,-31,-15,
28,0,2,0,1,0,5,-9,-3,2,0,0,0,0,-2,0,3,-1,0,0,0,0,1,-2,0,0,0,0,0,0,-1,0,1,0,0,0,0 },
      {   -1,8,-3,-5,0,0,0,0,-4,10,-16,-48,10,-4,2,-1,-4,30,-11,-5,-3,-1,0,0,2,106,-32,-11,
3,-4,0,-2,4,-5,3,3,1,0,0,0,-1,3,0,3,-1,0,0,0,0,1,-3,1,0,0,0,0,0,2,0,1,0,0,0,0 },
      {   7,10,2,34,108,-30,10,-4,-1,-4,-2,-13,-33,8,-2,1,-3,-2,-9,-3,-28,7,-1,0,3,-1,7,-2,
8,-1,-1,0,2,-1,2,-3,-4,2,0,0,0,1,0,1,1,-1,0,0,0,0,0,-1,-2,1,0,0,0,0,0,0,1,0,0,0 },
      {              6,-2,-4,1,-1,0,0,0,10,-2,-1,-1,-1,1,0,0,5,0,-4,2,6,-2,0,0,37,-6,-3,-1,-1,
0,0,0,104,-27,-45,12,-1,1,-2,0,-28,8,8,-2,0,-1,0,0,10,-2,-1,1,0,0,0,0,-2,0,0,0,0,0,0,0 },
      {              1,-2,1,-16,5,-3,1,-1,2,-1,7,-20,25,-5,4,-1,0,-12,1,-87,1,5,0,1,14,6,65,-16,-35,
5,-4,0,1,-5,15,28,-5,-4,0,-1,1,2,0,-1,2,0,1,0,0,-1,1,5,-2,-1,0,0,0,0,0,0,0,0,0,0 },
    }
  }
```

Eleventh Example

The eleventh example can be defined as the following table 35. Four transform sets can be defined and each transform set can be composed of one transform matrix.

TABLE 35

```
const int g_aiNsst8x8[4][1][16][64] = {
  {  //0
    {
      {              115,-35,-14,-2,-3,-1,-1,0,-37,14,3,1,1,0,0,0,-11,3,2,0,0,0,0,0,-3,
1,0,0,0,0,0,0,-2,1,0,0,0,0,0,0,-1,0,0,0,0,0,0,0,-1,0,0,0,0,0,0,0,-1,0,0,0,0,0,0,0 },
      {              -38,-81,47,0,8,0,3,0,-60,32,1,0,1,0,0,0,35,6,-11,-1,-2,0,-1,0,-1,1,-1,
0,0,0,0,0,7,1,-2,0,0,0,0,0,0,0,0,0,0,0,0,3,1,-1,0,0,0,0,0,0,0,0,0,0,0,0,0 },
      {              7,-73,18,7,3,2,1,1,91,-3,-26,0,-4,0,-2,0,-32,23,2,-3,1,-1,0,0,-5,
0,2,0,0,0,0,0,-6,3,0,0,0,0,0,0,-1,0,1,0,0,0,0,0,-2,1,0,0,0,0,0,0,-1,0,0,0,0,0,0,0 },
      {  -18,-37,-50,30,-3,7,-1,3,-25,-83,42,3,4,1,2,1,-11,39,2,-9,-1,-2,0,-1,10,2,-6,-1,
0,0,0,0,0,5,1,-1,0,0,0,0,2,1,-1,0,0,0,0,0,2,0,-1,0,0,0,0,1,0,-1,0,0,0,0,0 },
      {              24,18,87,-35,3,-7,1,-3,-2,-74,6,14,2,3,1,1,5,8,-24,5,0,1,0,0,-2,8,0,-2,0,-1,
0,0,0,1,-3,1,0,0,0,0,0,0,2,0,0,0,0,0,0,0,-1,0,0,0,0,0,0,0,1,0,0,0,0,0,0 },
      {   -17,5,27,-8,1,-2,0,-1,-32,17,8,-2,2,-1,0,0,-105,1,20,1,4,1,2,0,47,-7,-12,2,-2,
0,-1,0,-4,0,-1,0,0,0,0,0,0,9,-1,-2,0,0,0,0,0,-1,0,0,0,0,0,0,0,4,-1,0,0,0,0,0,0 },
      {   9,22,21,10,-6,1,-2,0,21,42,73,-22,0,-5,0,-2,11,71,-31,-12,0,-2,0,-1,5,-28,-10,
6,0,2,0,1,-5,-1,-1,2,1,0,0,0,1,-4,-2,1,0,0,0,0,-1,0,0,0,0,0,0,0,-2,-1,1,0,0,0,0,0 },
      {              2,-22,5,-4,2,0,0,0,26,0,83,-19,0,-3,-1,-1,-2,-83,0,16,0,4,0,2,-1,22,-14,-1,
1,0,0,0,-1,1,0,0,0,0,0,0,0,3,-3,1,0,0,0,0,0,0,0,0,0,0,0,1,-1,0,0,0,0,0,0 },
      {              -11,-14,-38,-110,32,-11,7,-3,2,3,14,0,-4,0,-1,0,-1,24,9,18,-6,0,-1,0,-9,-7,
1,2,2,0,0,0,2,-1,1,4,-1,1,0,0,-1,-1,-1,0,0,0,0,0,0,1,2,-1,0,0,0,-1,0,0,0,0,0,0,0 },
      {              9,-5,-9,-10,2,0,1,0,14,-3,-15,-1,1,0,0,0,42,-6,-11,1,-3,0,-1,0,108,2,-27,1,-3,
0,-2,0,-28,9,10,-2,1,0,0,0,11,-2,-2,0,0,0,0,0,-6,1,2,0,0,0,0,0,3,0,0,0,0,0,0,0 },
      { 4,5,13,-1,7,-2,2,-1,7,10,20,64,-17,5,-3,1,17,11,73,-50,-8,-1,-1,-1,-5,20,-45,-14,
```

TABLE 35-continued 9,0,1,0,0,−7,−3,10,2,0,0,0,−1,3,−3,−1,0,0,0,0,1,−2,0,1,0,0,0,0,−1,1,−1,−1,0,0,0,0 },
    {      −6,−1,−19,−1,−1,0,0,0,2,19,9,80,−19,6,−3,1,−19,−3,−78,−2,12,0,2,1,4,32,14,−30,
0,−1,0,−1,1,−4,9,4,−2,0,0,0,0,2,0,−4,1,0,0,0,0,−1,2,0,−1,0,0,0,0,1,0,−1,0,0,0,0 },
    { −1,8,−2,−4,0,0,0,0,−4,8,−13,−49,12,−4,2,−1,−6,28,−11,−6,−3,−1,−1,−1,−6,106,−32,−10,
3,−4,1,−2,7,−4,3,3,1,0,0,0,−2,2,0,3,−1,0,0,0,1,−3,1,0,0,0,0,0,−1,2,0,1,0,0,0,0 },
    {   6,9,2,33,108,−29,8,−4,−1,−3,−1,−12,−31,7,−1,1,−3,−2,−10,−4,−30,7,0,1,4,−1,7,−3,
10,0,0,0,3,−1,2,−3,−4,1,0,0,0,0,0,0,1,0,0,0,1,0,0,−1,−2,1,0,0,0,0,0,0,1,0,0,0 },
    {     6,−1,−4,0,−2,1,0,0,10,−1,−1,−1,−1,0,−1,0,3,0,−4,2,6,−2,0,0,33,−6,−3,−1,0,0,−1,
0,106,−24,−47,12,−1,1,−1,0,−27,8,8,0,0,0,1,0,8,−2,−1,1,0,0,0,0,−1,0,0,1,0,0,0,0 },
    {       0,2,0,16,−8,3,−1,1,−2,1,−6,20,−32,6,−4,1,1,13,0,87,−6,−6,0,−1,−12,−3,−60,
20,37,−6,4,0,−2,4,−16,−27,7,4,0,0,0,−1,1,−1,0,0,−1,0,−1,1,0,−4,1,1,0,0,0,0,−1,−1,0,0,0,0 },
    }
  }

---

Twelfth Example

The twelfth example can be defined as the following table 36. Four transform sets can be defined and each transform set can be composed of two transform matrices.

TABLE 36

```
const int g_aiNsst8x8[4][2][16][64] = {
  { //0
    {
      { −112,38,14,2,2,1,1,0,43,−20,−4,0,−1,0,0,0,8,−1,−2,0,0,0,0,0,3,
−1,0,0,0,0,0,0,2,−1,−1,0,0,0,0,0,1,0,0,0,0,0,0,0,1,0,0,0,0,0,0,0,1,0,0,0,0,0,0,0 },
      { 41,88,−54,−1,−9,0,−4,0,41,−33,8,−1,1,0,0,0,−31,−5,10,1,2,0,1,0,2,
−1,0,0,0,0,0,0,−6,−1,2,0,0,0,0,0,−1,0,0,0,0,0,0,0,−2,−1,1,0,0,0,0,0,0,0,0,0,0,0,0,0 },
      { −16,58,−14,−5,−2,−1,−1,−1,−95,3,27,0,4,0,2,0,46,−25,−6,2,−1,0,0,0,2,2,
−2,0,0,0,0,0,7,−3,0,0,0,0,0,0,1,0,−1,0,0,0,0,0,3,−1,0,0,0,0,0,0,0,0,0,0,0,0,0 },
      { 23,48,68,−41,4,−9,1,−4,20,60,−42,4,−4,0,−2,0,5,−35,2,8,1,2,0,1,
−8,1,2,0,0,0,0,0,−5,−2,2,0,0,0,0,−2,0,1,0,0,0,0,0,−2,−1,1,0,0,0,0,0,−1,0,0,0,0,0,0,0 },
      { −24,−7,−67,28,−2,6,−1,2,8,91,−10,−19,−2,−4,−1,−2,−10,−22,28,−1,0,0,0,5,−8,
−2,4,0,0,0,0,0,−2,3,−1,0,0,0,0,1,−2,0,1,0,0,0,0,0,−1,1,0,0,0,0,0,0,−1,0,0,0,0,0,0,0 },
      { 18,−7,−27,7,−1,2,0,1,43,−4,−10,−1,−2,0,−1,0,98,−3,−16,−2,−4,−1,−2,0,−54,10,12,
−1,2,0,1,0,7,−3,1,0,0,0,0,0,−10,2,2,0,0,0,0,0,0,2,−1,0,0,0,0,0,0,−4,1,1,0,0,0,0,0 },
      { 8,25,24,15,−10,2,−3,0,13,43,55,−27,2,−6,0,−2,7,74,−42,−3,1,−2,0,−1,3,−37,6,7,
−1,2,0,1,−5,1,−3,0,1,0,0,0,1,−6,−1,1,0,0,0,0,−1,0,−1,0,0,0,0,0,0,−2,0,1,0,0,0,0,0 },
      { 4,−19,13,−11,4,−2,1,−1,30,2,88,−26,−1,−4,0,−2,−3,−69,−10,23,−1,4,0,2,3,23,−18,
−1,1,−1,0,0,−4,0,1,0,0,0,0,0,1,3,−4,1,0,0,0,0,−1,0,0,0,0,0,0,0,0,1,−2,0,0,0,0,0,0 },
      { 13,13,39,104,−37,13,−9,3,0,−9,−17,−10,11,−2,2,0,2,−31,−8,−13,6,0,1,0,9,10,
−2,0,−3,0,0,0,−4,2,0,−4,1,−1,0,0,0,2,1,0,0,0,0,0,0,−1,0,0,−2,0,0,0,0,0,−1,0,0,0,0,0,0 },
      { −10,5,9,12,−3,1,−1,0,−16,2,15,−3,0,0,0,0,−49,2,10,0,4,0,1,0,−99,6,22,
−1,3,0,2,0,45,−14,−14,3,−2,0,−1,0,−16,4,3,−1,1,0,0,0,9,−2,−2,0,0,0,0,0,−4,1,0,0,0,0,0,0 },
      { −5,−7,−17,−14,−6,2,−1,0,−10,−14,−39,−68,20,−4,4,−1,−15,−17,−61,52,4,2,0,1,2,
−10,41,6,−7,−1,−1,0,0,7,−1,−7,−1,0,0,0,1,−2,4,3,0,0,0,0,−1,1,0,−1,0,0,0,0,0,
−1,2,1,0,0,0,0,0 },
      { 6,1,19,−5,2,−1,1,0,−2,−22,−3,−70,17,−5,3,−1,20,10,81,10,−16,−1,−3,0,−7,−33,
−23,32,3,1,1,1,0,6,−9,−7,3,0,0,0,0,−3,−1,4,−1,0,0,0,1,2,−2,−1,1,0,0,0,0,−1,0,1,0,0,0,0,0 },
      { −1,10,−1,−5,2,−1,1,0,−4,10,−13,−42,11,−3,2,−1,−4,40,−5,−5,−8,−1,−1,0,1,102,−39,
−8,4,−4,1,−2,3,−12,12,2,0,0,0,0,0,5,−1,2,−1,0,0,0,0,−4,2,0,0,0,0,0,0,2,−1,1,0,0,0,0,0 },
      { 8,11,4,40,105,−31,12,−5,−2,−4,−5,−15,−33,11,−3,2,−3,−3,−11,−3,−25,6,0,0,4,
−3,9,−1,9,−3,−1,0,2,0,1,−3,−4,1,−1,0,0,0,1,1,1,0,0,0,0,0,−1,−2,1,0,0,0,0,0,0,1,0,0,0,0 },
      { −8,2,4,1,2,−1,0,0,−12,2,2,2,0,0,0,0,−9,0,5,−1,−4,1,0,0,−51,5,8,0,1,0,1,0,
−99,25,41,−13,2,−1,1,0,29,−11,−8,3,−1,0,−1,0,−10,2,2,0,0,0,0,0,2,−1,0,0,0,0,0,0 },
      { −1,2,−2,17,−10,4,−2,1,−3,2,−9,31,−33,8,−5,2,0,14,−7,88,−5,−6,1,−1,−11,−4,
−55,16,34,−7,4,0,0,2,−14,−26,8,3,−1,1,−1,−1,0,0,−1,0,0,0,0,1,−2,−5,2,0,0,0,0,0,
−1,0,0,0,0 },
    },
    {
      { 118,−32,−14,−4,−3,−1,−1,−1,−28,4,3,1,1,0,0,0,−15,4,3,0,0,0,0,0,
−4,2,0,0,0,0,0,0,−3,1,0,0,0,0,0,0,−1,0,0,0,0,0,0,0,−1,0,0,0,0,0,0,0,−1,0,0,0,0,0,0,0 },
      { 32,60,−30,−2,−6,−1,−2,0,92,−23,−20,0,−3,0,−1,0,−31,−16,9,3,2,1,1,0,
−9,2,4,0,0,0,0,0,−8,−1,2,0,0,0,0,0,−2,0,1,0,0,0,0,0,−2,−1,1,0,0,0,0,0,−1,0,0,0,0,0,0,0 },
      { 8,98,−23,−9,−6,−2,−2,−1,−71,13,11,0,3,0,1,0,3,−21,5,2,0,1,0,0,11,−6,−1,1,
−1,0,0,0,5,−5,0,1,0,0,0,0,2,−1,0,0,0,0,0,0,1,−2,0,0,0,0,0,0,1,0,0,0,0,0,0,0 },
      { 14,9,24,−11,1,−3,0,−1,27,104,−25,−15,−5,−3,−2,−1,35,−16,−26,3,0,1,0,0,−13,
−20,4,7,1,1,0,0,−2,−5,3,2,0,0,0,0,−3,−3,1,1,0,0,0,0,−1,0,0,0,0,0,0,−1,−1,0,0,0,0,0,0 },
      { −25,−25,−97,29,2,6,0,3,−7,47,−18,3,−1,−1,0,0,−27,17,29,−7,−2,−2,0,−1,5,−8,6,
−2,−1,0,0,0,3,−3,4,−1,0,0,0,0,1,−1,1,0,0,0,0,0,0,1,0,0,0,0,0,0,1,−1,0,0,0,0,0,0 },
      { −10,2,48,−10,0,−3,0,−1,−4,35,20,−14,−1,−2,0,−1,−107,4,15,0,5,1,2,0,15,0,
−5,1,0,0,0,0,5,−3,−6,1,0,0,0,0,5,−1,−2,1,0,0,0,0,−1,−1,0,0,0,0,0,0,2,0,−1,0,0,0,0,0 },
      { 9,23,−6,11,−4,2,−2,1,24,13,74,−14,−2,−4,0,−1,20,84,−7,−26,−3,−4,−1,−1,7,−11,
−25,1,3,0,1,0,−5,−6,−2,5,1,0,0,0,0,−3,−2,1,0,0,0,0,−1,−1,0,1,0,0,0,0,−1,−1,0,0,0,0,0,0 },
      { −2,−18,−13,17,−3,3,−1,1,16,11,87,−4,−6,−3,−1,−1,9,−82,22,−1,−2,2,0,1,−16,−5,
−2,1,2,1,1,0,−2,−7,−3,−3,1,0,0,0,−1,2,−3,−1,1,0,0,0,0,1,−1,−1,0,0,0,0,0,0,1,−1,0,0,0,0,0 },
```

TABLE 36-continued

```
    { 10,14,28,112,-10,5,-5,2,-3,4,-13,35,-8,2,-1,1,-6,-7,-21,-18,0,1,1,0,10,3,-2,
-8,1,0,0,0,1,0,1,-5,0,0,0,0,0,0,1,-2,0,0,0,0,0,0,0,-2,0,0,0,0,0,0,0,-1,0,0,0,0 },
    { 7,-11,-10,-9,0,0,0,0,16,2,0,-2,1,0,0,0,11,-22,-16,8,1,1,0,0,118,3,-28,3,-3,-1,
-2,0,11,-6,-4,2,0,0,0,0,-2,2,2,-1,0,0,0,0,-5,0,1,0,0,0,0,0,2,0,0,0,0,0,0,0 },
    { 7,8,26,-6,3,-2,1,-1,9,22,-4,41,-5,2,-2,1,28,13,91,5,-14,-2,-2,-1,14,42,6,-35,
-8,-2,-1,-1,1,-3,-17,-9,2,1,1,0,-1,1,-2,-1,2,1,0,0,0,-2,-2,-1,0,0,0,0,1,-1,-1,0,0,0,0 },
    { -6,-2,-15,-30,-2,-1,1,-1,5,14,23,101,2,1,-2,1,-16,5,-49,30,-3,-1,0,0,-10,6,
-13,-16,0,3,1,0,-1,4,4,-3,-1,1,0,0,0,-1,-1,-3,0,0,0,0,0,0,1,0,0,0,0,0,0,0,-1,0,0,0,0 },
    { 3,-4,15,-1,1,-1,0,0,2,-15,-5,30,-1,2,-1,1,2,2,38,9,-8,0,-1,0,9,-112,3,9,
-1,4,0,2,-1,-20,10,4,0,1,0,0,-1,2,1,-4,0,0,0,0,-1,2,0,0,0,0,0,0,0,-1,0,-1,0,0,0,0 },
    { 2,3,0,16,1,1,-1,0,4,1,22,-18,8,-4,3,-2,2,19,-13,65,-3,1,0,0,18,-4,80,-7,
-37,2,-5,0,-1,9,4,-44,-7,4,-1,1,1,-3,-5,0,7,1,1,0,-1,3,0,-4,-1,1,0,0,1,-1,0,-1,1,0,0,0 },
    { 5,7,0,11,106,-25,8,-3,3,0,2,3,49,-17,2,-1,-3,-4,-4,-9,-34,2,1,1,-2,2,-7,5,
-10,4,0,0,0,3,1,-3,1,-1,0,0,0,-1,0,-2,1,0,0,0,0,0,0,-2,1,0,0,0,0,0,0,-1,0,0,0 },
    { 0,-1,2,-24,-4,1,1,-1,2,0,7,17,-9,6,-1,1,-4,-8,-14,-86,-23,-3,-2,0,20,-1,74,-15,
-6,-1,1,0,6,3,28,12,1,-2,0,0,-2,-3,0,1,1,-1,0,0,-1,1,2,1,0,-1,0,0,1,0,0,0,0,0,0,0 },
    }
}
```

Thirteenth Example                                20

The thirteenth example can be defined as the following table 37. 35 transform sets can be defined and each transform set can be composed of two transform matrices.

TABLE 37

```
const int g_aiNsst8x8[35][2][16][64] = {
  { //0
    {
      { -109,45,11,1,2,1,1,0,44,-21,-4,0,-1,0,0,0,6,-3,-1,0,0,0,0,0,3,
-1,0,0,0,0,0,0,2,-1,0,0,0,0,0,0,1,0,0,0,0,0,0,0,1,0,0,0,0,0,0,0,1,0,0,0,0,0,0,0,0 },
      { -47,-89,56,4,9,1,3,0,-30,32,-10,0,0,0,0,0,27,8,-9,-2,-2,0,-1,0,
-2,1,0,0,0,0,0,0,6,2,-2,0,0,0,0,0,0,0,0,0,0,0,0,0,2,1,-1,0,0,0,0,0,0,0,0,0,0,0,0,0 },
      { 18,-49,6,8,1,2,0,1,97,-1,-31,-1,-4,0,-2,0,-49,24,10,-3,1,-1,1,0,-2,
-3,3,1,0,0,0,0,-7,3,0,0,0,0,0,0,-1,0,1,0,0,0,0,0,-3,1,0,0,0,0,0,0,-1,0,0,0,0,0,0,0 },
      { -24,-46,-76,49,-3,10,-1,4,-14,-50,36,-3,2,0,1,0,4,35,4,-12,-1,-2,0,-1,3,-1,
-1,0,0,0,0,0,0,4,2,-2,0,0,0,0,0,1,1,0,0,0,0,0,0,2,1,-1,0,0,0,0,0,0,0,0,0,0,0,0 },
      { 19,-1,62,-24,0,-5,0,-2,-11,-96,12,22,3,4,1,2,-7,29,-26,-1,1,0,0,0,4,7,-1,-4,
-1,0,0,0,-1,3,-2,1,0,0,0,0,1,2,0,-1,0,0,0,0,0,1,-1,0,0,0,0,0,0,1,0,0,0,0,0,0 },
      { -22,0,11,0,0,0,0,0,-41,11,15,-4,2,-1,1,0,-97,-5,23,2,4,1,2,0,56,-8,-17,1,-2,0,
-1,0,-9,3,1,0,0,0,0,0,11,-2,-2,0,0,0,0,0,-2,1,0,0,0,0,0,0,4,-1,-1,0,0,0,0,0 },
      { 10,15,32,23,-13,2,-3,0,27,36,92,-33,-4,-6,-1,-2,0,31,-38,0,4,0,1,0,-2,-16,
-3,6,1,1,0,1,-3,1,-3,0,1,0,0,0,0,-3,-3,1,0,0,0,0,0,-1,0,-1,0,0,0,0,0,0,-1,-1,1,0,0,0,0 },
      { -1,-35,-9,-26,13,-2,3,0,25,-21,52,-5,-6,-1,-1,0,-2,-90,-2,29,0,4,0,2,-2,34,
-16,-8,2,-1,0,-1,1,0,3,0,-2,0,0,0,-1,5,-3,0,0,0,0,0,0,0,0,0,0,0,0,0,-1,2,-1,0,0,0,0,0 },
      { -12,-10,-34,-99,34,-7,8,-2,2,14,24,1,-7,-1,-1,0,1,49,10,12,-8,-2,-2,-1,-5,
-18,2,4,2,1,0,0,2,-1,-1,5,-1,1,0,0,-1,-2,-1,0,0,0,0,0,0,2,0,0,0,0,0,-1,0,0,0,0,0,0 },
      { 10,-2,-7,-5,2,0,1,0,18,3,-11,1,1,0,0,0,48,6,-20,2,-3,0,-1,0,91,3,-31,-5,-2,0,
-1,0,-54,3,21,0,0,0,1,0,14,-3,-2,1,-1,0,0,0,-8,0,2,0,0,0,0,0,3,-1,0,0,0,0,0,0 },
      { -5,-6,-15,-10,-11,5,-2,2,-11,-14,-34,-76,32,-5,5,-1,-13,-3,-56,55,5,-2,0,0,1,
-10,27,6,-9,0,-1,0,0,5,0,-5,0,0,0,0,1,-2,4,3,-1,0,0,0,0,-1,1,0,-1,0,0,0,0,0,0,0,1,1,
-1,0,0,0 },
      { -9,-1,-26,0,6,-1,1,0,-2,23,-5,68,-12,2,-3,0,-27,-4,-90,-7,13,3,3,1,-1,12,19,
-24,-2,-1,0,0,7,-1,10,1,-4,-1,-1,0,-1,0,-1,0,1,-3,1,0,0,0,0,0,2,0,-1,0,0,0,0,2,0,0,0,0 },
      { 7,12,5,34,112,-32,5,-6,-2,-3,-5,-22,0,2,1,1,-5,0,-11,-8,-21,9,0,1,0,5,1,0,1,
-1,0,0,2,-1,1,-1,-6,1,0,0,0,1,0,1,0,0,0,0,0,0,0,-1,-2,0,0,0,0,0,0,0,0,0,0,0 },
      { 3,-7,0,2,9,-2,0,0,5,-12,7,23,-10,1,-1,0,9,-37,0,-5,1,2,0,1,15,-88,42,29,-5,2,
-1,1,-8,48,-26,-11,6,-1,1,-1,4,-12,1,-1,0,1,0,0,0,6,-3,-1,1,0,0,0,1,-2,1,-1,0,0,0,0 },
      { 0,4,2,15,-2,5,-3,0,-9,-5,-12,-8,-108,19,0,3,0,11,1,53,0,-10,-2,-1,0,-1,
-2,0,26,-2,-2,-1,-2,-2,-1,-5,1,2,0,0,0,1,0,0,4,-1,0,0,0,0,0,-1,0,0,0,0,0,0,0,2,0,0,0 },
      { 2,5,6,27,13,-1,-1,1,4,9,11,54,43,-8,0,-1,7,19,25,94,3,-4,-1,-1,-2,-5,1,-1,
-10,2,2,1,-4,-10,-2,-9,-1,3,1,0,1,2,0,-2,-1,0,0,0,0,0,0,-2,0,1,0,0,0,0,-1,-1,0,0,0,0 },
    },
    {
      { 119,-31,-16,-3,-3,-1,-1,0,-25,9,2,1,1,0,0,0,-18,3,4,0,1,0,0,0,
-5,1,1,0,0,0,0,0,-3,1,1,0,0,0,0,0,-1,0,0,0,0,0,0,0,-1,0,0,0,0,0,0,0,0,0,0,0,0,0,0,0 },
      { 29,69,-32,-4,-6,-1,-2,0,89,-12,-18,-2,-3,0,-1,0,-28,-13,8,2,2,1,1,0,-12,
-2,4,1,1,0,0,0,-7,-2,2,0,0,0,0,0,-2,0,1,0,0,0,0,0,-2,-1,1,0,0,0,0,0,-1,0,0,0,0,0,0,0 },
      { -5,-91,21,11,5,3,2,1,75,-16,-21,2,-3,0,-1,0,-4,28,-6,-4,-1,-1,0,0,-13,6,3,
-1,1,0,0,0,-5,4,1,-1,0,0,0,0,-3,1,1,0,0,0,0,0,-1,2,0,0,0,0,0,0,-1,0,0,0,0,0,0,0 },
      { -8,-7,-34,14,-1,3,0,1,-22,-107,19,17,5,3,1,1,-35,4,18,0,1,0,0,0,11,20,-2,-6,
-1,-1,0,0,4,7,-1,-2,0,0,0,0,2,3,-1,-1,0,0,0,0,1,0,-1,0,0,0,0,0,1,1,0,0,0,0,0,0 },
      { -24,-24,-101,29,5,7,1,3,-11,37,-35,-4,4,-1,1,0,3,14,28,-10,-3,-2,0,-1,2,
-6,11,0,-2,0,0,0,2,-2,5,0,-1,0,0,0,0,-1,2,0,0,0,0,0,0,2,0,0,0,0,0,0,0,-1,1,0,0,0,0,0 },
      { 21,9,-21,2,-1,0,0,0,5,-38,-16,10,2,2,0,1,110,-2,-31,-1,-4,0,-2,0,-13,11,3,
-3,0,-1,0,0,-10,1,6,-1,0,0,0,0,-5,1,2,0,0,0,0,0,-2,0,1,0,0,0,0,0,-2,1,1,0,0,0,0,0 },
```

TABLE 37-continued

```
    { −6,−18,9,−12,6,−2,1,−1,−17,−11,−76,14,4,3,1,1,−16,−89,−11,22,5,4,1,2,
−8,1,17,1,−2,0,0,0,4,8,4,−3,−2,−1,0,0,0,3,3,−1,0,0,0,0,1,2,1,−1,0,0,0,0,0,1,1,
−1,0,0,0,0 },
    { −3,−28,−20,16,−1,3,0,1,24,11,79,−7,−6,−3,−2,−1,18,−78,25,15,−4,3,0,1,−14,−8,
−17,6,4,1,1,0,−4,6,−4,−3,2,0,0,0,−1,2,−4,−1,0,0,0,0,0,2,−1,−1,0,0,0,0,−1,1,−1,0,0,0,0,0 },
    { −9,−15,−23,−110,16,−3,6,−1,1,−11,6,−41,3,1,1,0,5,10,20,22,−6,0,−2,0,−11,
−1,5,11,−1,−1,0,0,−2,−1,0,5,0,0,0,0,0,0,0,2,0,0,0,0,0,0,0,0,2,0,0,0,0,0,0,0,1,0,0,0,0 },
    { 8,−8,−9,−11,1,0,1,0,20,6,−6,−6,0,0,0,0,10,−12,−13,5,0,0,0,0,116,14,−33,0,−3,
−1,−2,0,17,6,−7,−1,0,−1,0,0,−6,0,3,0,0,0,0,0,−5,0,2,0,0,0,0,0,1,0,1,0,0,0,0,0 },
    { −6,−7,−28,6,−3,2,−1,1,−5,−11,12,−45,5,−2,1,−1,−27,−5,−98,−9,10,3,3,1,−10,−38,
−18,21,6,1,1,1,−2,0,14,6,−1,−1,0,0,1,0,2,1,−1,0,0,0,0,1,2,1,−1,0,0,0,0,0,1,0,0,0,0 },
    { −8,−5,−25,−31,2,−2,2,−1,5,20,19,97,−4,−1,−3,0,−12,13,−38,41,8,−2,1,0,−8,−5,
−16,−20,5,2,1,0,0,−1,2,−5,−2,1,0,0,0,0,0,−4,0,0,0,0,1,0,1,0,0,0,0,0,0,0,0,−2,0,0,0,0 },
    { 5,−3,11,2,−1,0,−1,0,1,−23,−12,19,0,1,−1,0,13,7,31,9,−2,−1,−1,0,16,−112,
−6,21,1,5,0,2,2,−22,−8,6,1,1,0,1,−1,5,1,−3,0,0,0,0,−1,2,−1,0,0,0,0,0,1,−1,0,0,0,0,0,0 },
    { −6,−8,−3,−14,−107,25,−6,4,−4,−1,−6,−7,−46,10,0,0,3,1,5,6,36,−7,0,−2,1,2,4,
−2,12,−2,0,0,0,0,−4,0,3,−2,0,0,−1,0,0,0,2,−1,0,0,0,0,0,0,2,0,0,0,0,0,0,1,0,0,0 },
    { −2,−2,−2,−19,7,−3,1,−1,−4,−1,−19,16,−13,5,−2,1,−2,−12,12,−69,1,1,1,0,−23,6,−83,
−5,33,−2,4,0,2,−9,−19,30,10,−3,1,0,−2,2,7,1,−5,0,0,0,1,−1,1,3,1,−1,0,0,−1,1,0,0,0,0,0,0 },
    { −1,−6,−3,−27,−1,−1,0,−1,6,1,22,25,−11,5,−1,1,−1,−20,−11,−82,−4,1,1,1,19,
−17,67,−27,−13,2,−2,1,6,1,25,19,−6,−2,0,0,−1,−2,−3,3,2,−1,0,0,0,0,3,0,0,0,0,0,
−1,0,0,0,0,0,0 },
        }
    }
```

Fourteenth Example

The fourteenth example can be defined as the following table 38. 35 transform sets can be defined and each transform set can be composed of one transform matrix.

TABLE 38

```
const int g_aiNsst8x8[35][1][16][64] = {
    { //0
        {
            { 115,−34,−17,−2,−3,−1,−1,0,−37,14,4,1,1,0,0,0,−12,2,2,0,0,0,0,0,
−3,1,0,0,0,0,0,0,−2,1,1,0,0,0,0,0,−1,0,0,0,0,0,0,0,−1,0,0,0,0,0,0,0,−1,0,0,0,0,0,0,0 },
            { −35,−88,50,3,9,0,3,0,−51,32,−2,0,0,0,0,0,32,8,−10,−1,−2,0,−1,0,−1,1,
−1,0,0,0,0,0,6,2,−2,0,0,0,0,0,0,0,0,0,0,2,1,−1,0,0,0,0,0,0,0,0,0,0,0,0 },
            { 11,−64,12,8,2,2,1,1,95,−3,−30,−1,−4,0,−2,0,−37,24,6,−3,1,−1,0,0,−5,
−1,3,0,0,0,0,0,−6,3,0,0,0,0,0,0,−1,0,1,0,0,0,0,0,−2,1,0,0,0,0,0,0,−1,0,0,0,0,0,0,0 },
            { 21,41,68,−41,2,−8,1,−3,20,68,−37,−2,−3,−1,−1,0,2,−35,−4,10,1,2,0,1,−6,
−2,3,2,0,0,0,0,0,−5,−2,1,0,0,0,0,−2,−1,1,0,0,0,0,0,−2,−1,1,0,0,0,0,−1,0,0,0,0,0,0,0 },
            { −20,−8,−76,29,0,6,0,2,9,88,−12,−19,−2,−4,−1,−1,9,−17,23,−3,−1,0,0,0,−5,
−9,3,4,0,0,0,0,1,−3,3,−1,0,0,0,0,−1,−2,1,1,0,0,0,0,−1,1,0,0,0,0,0,0,−1,0,0,0,0,0,0 },
            { 21,0,−13,2,0,0,0,0,33,−18,−14,4,−2,1,0,0,104,2,−24,−1,−4,−1,−2,0,−48,8,14,
−1,2,0,1,0,5,−2,1,0,0,0,0,0,−10,1,2,0,0,0,0,0,2,0,0,0,0,0,0,0,−4,1,1,0,0,0,0,0 },
            { −9,−16,−25,−17,10,−1,3,0,−26,−37,−92,28,4,5,1,2,−6,−46,32,8,0,1,0,0,1,19,7,
−6,−2,−1,0,−1,4,1,2,−1,−1,0,0,0,0,4,2,−1,−1,0,0,0,1,0,1,0,1,0,0,0,0,0,1,1,0,0,0,0 },
            { 0,29,1,4,−4,0,−1,0,−24,13,−58,6,4,1,1,0,2,99,1,−22,−1,−4,0,−2,3,−28,13,4,
−1,1,0,0,−1,−3,−1,3,1,0,0,0,1,−4,3,0,0,0,0,0,0,0,0,0,0,0,0,0,−2,1,0,0,0,0,0 },
            { 12,16,37,108,−32,8,−8,2,−5,−4,−23,2,7,0,1,0,−2,−26,−9,−15,8,1,2,0,5,8,1,−3,
−2,0,0,0,−1,1,−1,−5,1,0,0,0,1,1,1,−1,0,0,0,0,−1,0,0,−2,0,0,0,0,0,0,0,0,0,0,0 },
            { 10,−3,−8,−5,1,0,0,0,16,2,−13,−2,2,0,0,0,41,0,−19,3,−3,0,−1,0,103,7,−33,−5,−2,
−1,−1,0,−39,6,17,−1,1,0,0,0,11,−2,−1,2,−1,0,0,0,−7,0,2,0,0,0,0,0,3,0,0,0,0,0,0,0 },
            { −4,−5,−13,−6,−11,4,−2,1,−10,−12,−26,−80,27,−6,5,−1,−17,−6,−66,44,6,0,1,0,0,
−7,29,11,−9,−1,−1,0,3,7,−2,−5,−2,0,0,0,0,−2,3,3,−1,0,0,0,0,1,0,−1,0,0,0,0,0,−1,1,1,
−1,0,0,0 },
            { −7,0,−22,0,6,−1,0,0,−1,22,0,73,−19,3,−3,1,−25,0,−86,2,17,−1,3,0,−2,16,17,−
25,6,0,0,0,4,1,6,−2,−3,1,−1,0,−1,0,1,−2,0,0,0,0,0,1,0,0,0,0,0,0,1,−1,0,0,0,0 },
            { 7,12,4,33,114,−31,8,−4,−1,−3,−3,−16,−5,1,−1,1,−4,0,−10,−3,−22,9,−1,1,0,3,2,1,2,
−1,0,0,1,0,1,−2,−5,1,0,0,0,1,0,1,0,0,0,0,0,0,−1,−2,0,0,0,0,0,0,0,0,0,0,0 },
            { 3,−7,1,3,6,−2,0,0,3,−10,8,27,−11,2,−1,0,9,−27,4,5,5,0,1,1,18,−98,48,22,−7,3,
−1,2,−10,29,−20,−7,0,−1,1,0,4,−8,1,−1,1,0,0,0,0,4,−3,−1,0,0,0,0,1,−2,0,−1,1,0,0,0 },
            { 1,1,2,8,12,3,0,0,8,10,11,43,103,−19,2,−2,3,9,10,45,−7,−6,−2,0,−4,−2,−8,3,
−27,1,1,1,0,−5,3,−2,−2,0,0,1,0,1,0,−3,−3,1,0,0,0,0,0,0,0,0,0,0,0,−1,−2,1,0,0 },
            { 1,4,4,20,3,0,−2,1,−3,−1,−4,8,−45,2,−2,0,6,20,18,99,23,−11,2,−2,−8,−11,−31,
−8,32,1,0,1,−3,−8,−4,−17,−1,5,0,1,0,1,−2,−1,0,0,0,0,0,1,0,−3,−1,1,0,0,0,0,0,0,0,0,0 },
        }
    }
```

Fifteenth Example

The fifteenth example can be defined as the following table 39. 35 transform sets can be defined and each transform set can be composed of one transform matrix.

TABLE 39

```
const int g_aiNsst8x8[35][1][16][64] = {
  { //0
    {
      { 114,-36,-16,-2,-3,-1,-1,0,-38,15,4,1,1,0,0,0,-11,2,2,0,0,0,0,0,
-3,1,0,0,0,0,0,0,-2,1,1,0,0,0,0,0,-1,0,0,0,0,0,0,0,-1,0,0,0,0,0,0,0,-1,0,0,0,0,0,0,0 },
      { -37,-89,51,3,9,0,3,0,-47,30,-2,0,0,0,0,0,31,9,-11,-1,-2,0,-1,0,-1,1,
-1,0,0,0,0,0,6,2,-2,0,0,0,0,0,0,0,0,0,0,0,0,2,1,-1,0,0,0,0,0,0,0,0,0,0,0,0,0,0 },
      { 12,-61,12,8,2,2,1,1,96,-5,-30,0,-4,0,-2,0,-38,24,5,-3,1,-1,0,0,-5,
-1,3,0,0,0,0,0,-7,3,0,0,0,0,0,0,-1,0,1,0,0,0,0,0,-2,1,0,0,0,0,0,0,-1,0,0,0,0,0,0,0 },
      { 21,40,67,-41,3,-8,1,-3,20,69,-38,-3,-3,-1,-1,0,3,-35,-6,11,1,2,0,1,-7,
-3,4,1,0,0,0,0,0,-5,-2,1,0,0,0,0,-2,-1,1,0,0,0,0,0,-2,-1,1,0,0,0,0,0,-1,0,0,0,0,0,0,0 },
      { -20,-10,-76,30,0,6,0,2,10,87,-13,-18,-2,-4,-1,-1,10,-15,23,-3,-1,-1,0,0,-5,
-9,2,4,1,1,0,0,1,-3,3,-1,0,0,0,0,-1,-2,1,1,0,0,0,0,0,-1,1,0,0,0,0,0,0,-1,0,0,0,0,0,0,0 },
      { 21,0,-13,2,-1,1,0,0,33,-19,-14,4,-1,1,0,0,104,3,-27,-1,-3,-1,-2,0,-46,10,13,
-2,1,0,1,0,3,-2,1,0,0,0,0,0,-9,2,2,0,0,0,0,0,1,0,0,0,0,0,0,0,-4,1,1,0,0,0,0,0 },
      { -10,-15,-25,-16,10,-2,3,0,-28,-37,-95,27,4,5,1,2,-7,-43,26,8,-2,0,0,0,1,19,8,
-5,-1,-2,0,-1,4,1,3,-1,-1,0,0,0,0,3,3,-1,0,0,0,0,0,1,0,1,0,0,0,0,0,1,1,-1,0,0,0,0,0 },
      { 0,28,1,1,-2,-1,0,0,-23,13,-54,9,2,1,1,0,3,100,-1,-22,-1,-4,0,-2,-6,-30,14,5,
-1,1,0,0,-3,-3,-1,2,1,0,0,0,2,-4,3,0,0,0,0,0,0,0,0,0,0,0,0,0,-2,1,0,0,0,0,0,0 },
      { 11,18,37,108,-32,8,-8,2,-6,-2,-24,5,6,1,1,0,-2,-22,-10,-17,7,1,2,0,4,8,0,-2,
-1,0,0,0,-1,1,-1,-5,1,0,0,0,1,1,1,0,0,0,0,0,0,-2,0,0,0,0,0,0,0,0,0,0,0,0,0,0,0 },
      { 9,-3,-9,-5,1,0,0,0,16,3,-12,-2,2,0,0,0,37,0,-22,1,-4,1,-1,0,104,14,-38,-5,-1,
-1,-1,0,-31,7,16,-1,1,0,0,0,10,-2,-2,1,0,0,0,0,-7,0,3,0,0,0,0,0,2,0,0,0,0,0,0,0 },
      { -4,-4,-13,-2,-11,4,-2,1,-9,-12,-23,-78,25,-5,4,-1,-18,-5,-70,41,5,-2,1,0,1,
-12,29,15,-9,0,-1,0,1,7,-2,-5,-1,0,0,0,1,-2,3,3,-1,0,0,0,0,-1,1,0,-1,0,0,0,0,0,
-1,1,1,0,0,0,0 },
      { -8,-1,-23,-2,6,-1,0,0,0,22,6,75,-18,3,-3,1,-26,-3,-84,-2,18,1,3,0,-3,12,19,
-25,-1,0,0,0,5,2,5,2,-2,0,-1,0,-1,0,1,-4,1,0,0,0,1,0,1,0,-1,0,0,0,0,0,0,-1,0,0,0,0 },
      { 7,11,4,33,115,-28,7,-5,0,-3,-1,-14,-3,0,1,2,-4,0,-10,-3,-24,8,0,1,0,3,1,3,3,0,
-1,0,1,0,0,-2,-5,1,0,0,0,1,0,0,0,0,0,0,0,0,-1,-2,0,0,0,0,0,0,0,0,0,0,0,0 },
      { 4,-8,3,5,6,-1,-1,0,6,-13,8,27,-12,1,-1,0,15,-30,10,7,4,1,0,1,26,-100,46,19,
-8,4,-2,2,-9,13,-10,-7,0,0,0,0,5,-4,1,-2,0,0,0,0,-1,4,-2,-1,0,0,0,0,1,-1,0,0,1,0,0,0 },
      { 1,2,2,9,7,3,2,2,7,10,10,42,99,-14,1,-2,4,12,12,55,-8,-7,-3,0,-4,-1,-8,1,
-27,0,1,1,-1,-4,0,-3,-3,1,1,0,1,1,-1,-1,-4,1,1,0,0,1,1,-1,0,0,0,0,0,0,-1,-1,0,0,0 },
      { 0,4,1,18,-5,1,-2,1,-4,0,-5,16,-57,3,-3,1,1,17,4,93,-14,-17,1,-2,-7,-1,
-29,19,38,-6,1,1,-2,-3,-5,-17,4,4,0,1,0,2,0,0,1,0,-1,0,0,0,0,
-2,0,1,0,0,0,0,0,0,1,0,0,0 },
    }
  }
}
```

Sixteenth Example

The sixteenth example can be defined as the following table 40. 35 transform sets can be defined and each transform set can be composed of two transform matrices.

TABLE 40

```
const int g_aiNsst8x8[35][2][16][64] = {
  { //0
    {
      { -107,48,9,1,1,1,1,0,45,-23,-4,0,-1,0,0,0,6,-3,-1,0,0,0,0,0,3,-1,0,0,0,0,0,0,1,
-1,0,0,0,0,0,0,1,0,0,0,0,0,0,0,1,0,0,0,0,0,0,0,1,0,0,0,0,0,0,0 },
      { 50,89,-57,-4,-9,-1,-4,0,26,-30,10,0,1,0,0,0,-27,-8,9,2,2,0,1,0,2,
-1,0,0,0,0,0,0,-5,-2,2,0,0,0,0,0,0,-1,0,0,0,0,0,0,-2,-1,1,0,0,0,0,0,0,0,0,0,0,0,0,0 },
      { 19,-48,5,9,1,2,0,1,97,-4,-29,-1,-4,-1,-2,0,-50,24,10,-2,1,-1,1,0,-1,
-3,2,1,0,0,0,0,-8,3,1,0,0,0,0,0,1,0,0,0,0,0,0,-3,1,0,0,0,0,0,0,0,0,0,0,0,0,0,0,0 },
      { -25,-45,-77,50,-2,10,-1,4,-15,-47,37,-4,2,0,1,0,5,33,3,-11,-1,-2,0,-1,3,-1,
-1,0,0,0,0,0,0,4,2,-2,0,0,0,0,0,1,0,0,0,0,0,0,0,2,1,-1,0,0,0,0,0,0,0,0,0,0,0,0 },
      { 18,-1,59,-22,-1,-4,0,-2,-12,-97,14,23,3,4,1,2,-6,32,-26,-2,1,0,0,0,4,6,0,-4,
-1,0,0,0,-1,3,-2,-1,0,0,0,0,1,2,-1,-1,0,0,0,0,0,1,-1,0,0,0,0,0,0,1,0,0,0,0,0,0,0 },
      { -23,1,11,-1,-1,0,0,0,-43,11,16,-4,2,-1,1,0,-97,-3,22,2,4,1,2,0,55,-9,-16,1,
-2,0,-1,0,-8,3,1,0,0,0,0,0,11,-2,-2,0,0,0,0,0,-2,1,0,0,0,0,0,0,4,-1,-1,0,0,0,0,0 },
      { 10,15,32,21,-14,2,-3,0,27,36,90,-38,-3,-6,0,-2,1,29,-40,1,4,0,1,0,-3,-16,
-3,6,1,1,0,1,-3,1,-3,0,1,0,0,0,0,-3,-2,1,0,0,0,0,0,-1,0,-1,0,0,0,0,0,0,-1,1,0,0,0,0 },
      { -1,-34,-8,-30,15,-2,3,-1,24,-22,52,-4,-7,0,-1,0,-3,-88,0,31,-1,4,0,2,-1,34,
-17,-8,2,-1,0,-1,0,1,4,0,-1,0,0,0,0,-1,5,-3,0,0,0,0,0,0,0,1,0,0,0,0,0,0,2,-1,0,0,0,0,0 },
      { -12,-10,-35,-98,33,-7,8,-2,2,15,22,4,-8,0,-1,0,2,51,8,11,-7,-2,-2,-1,-5,
-20,2,4,2,1,0,0,2,-1,-1,4,-1,0,0,0,-1,-2,0,0,0,0,0,0,1,0,0,2,-1,0,0,0,0,-1,0,0,0,0,0,0 },
      { 10,-2,-7,-5,1,0,0,0,17,2,-12,1,1,0,0,0,48,3,-19,2,-3,0,-1,0,93,-4,-29,-5,-2,0,
```

TABLE 40-continued

```
-1,0,-51,5,20,0,0,0,1,0,17,-3,-4,1,0,0,0,0,-9,1,3,0,0,0,0,0,3,-1,0,0,0,0,0,0 },
    { -5,-6,-14,-14,-12,5,-1,1,-12,-17,-36,-81,33,-5,6,-2,-13,-3,-49,53,-1,1,-2,1,0,
-6,26,3,-9,0,-1,0,0,3,0,-6,2,1,0,0,1,-1,3,3,-1,0,0,0,-1,1,0,-1,0,0,0,0,0,-1,1,1,0,0,0,0 },
    { 9,0,25,-1,-4,0,0,0,2,-23,8,-60,13,-2,3,-1,28,5,93,3,-16,-1,-3,-1,0,-15,
-21,25,2,-1,0,0,-5,0,-9,-2,6,0,0,0,1,0,-1,2,-1,1,0,0,0,0,-2,0,1,0,0,0,0,0,-1,1,0,0,0,0 },
    { -8,-13,-6,-34,-112,35,-6,6,2,4,6,21,7,-2,0,-1,4,-2,11,4,20,-9,0,-1,-1,-4,-2,-2,
-2,1,1,0,-1,1,-1,2,4,-1,0,0,0,0,0,0,0,0,0,0,0,0,2,0,0,0,0,0,0,0,0,0,0,0 },
    { -3,7,-1,-2,-6,1,0,0,-4,11,-7,-21,9,-1,1,0,-5,37,2,2,-1,-1,-1,-1,-11,90,-49,
-24,8,-3,1,-2,3,-43,24,12,-6,2,0,1,-2,13,-6,0,0,-1,0,0,0,-6,3,0,0,0,0,0,0,2,-1,1,
-1,0,0,0 },
    { 0,3,2,8,-9,10,-3,1,-10,-7,-13,-19,-113,19,0,3,0,8,1,37,-1,-14,5,-1,1,
-1,1,1,23,-5,0,-1,-1,-2,2,0,-1,-1,0,0,0,1,-1,1,4,-1,-1,0,0,0,0,-1,
-1,0,0,0,0,0,0,0,0,2,0,0,0 },
    { 1,6,7,28,6,0,0,0,2,9,10,50,25,-4,0,-1,6,21,23,102,-14,2,-4,-1,-2,-8,4,-12,
-2,1,1,1,-4,-11,3,-12,5,3,0,1,1,3,-2,-2,-1,0,0,0,-1,0,0,-2,0,0,0,0,0,0,0,-1,0,0,0,0 },
    },
    {
    { 119,-30,-17,-4,-3,-1,-1,-1,-23,9,1,1,0,0,0,0,-20,4,4,0,1,0,0,0,
-5,1,1,0,0,0,0,0,-4,1,1,0,0,0,0,0,-1,0,0,0,0,0,0,0,-1,0,0,0,0,0,0,0,-1,0,0,0,0,0,0,0 },
    { 26,67,-33,-3,-6,-1,-2,0,91,-16,-17,-2,-3,-1,-1,0,-28,-12,8,3,2,1,1,0,-12,
-2,4,1,1,0,0,0,-7,-2,2,0,0,0,0,0,-2,0,1,0,0,0,0,0,-2,-1,1,0,0,0,0,0,-1,0,0,0,0,0,0,0 },
    { -6,-92,22,11,5,2,2,1,74,-14,-21,2,-3,0,-1,0,-4,28,-7,-4,-1,-1,0,0,-13,7,3,
-1,1,0,0,0,-5,5,1,-1,0,0,0,0,-2,1,1,0,0,0,0,0,-1,2,0,0,0,0,0,0,-1,0,0,0,0,0,0,0 },
    { -9,-10,-31,14,-1,3,0,1,-23,-107,21,16,5,3,2,1,-34,8,18,0,1,0,0,0,12,20,-2,
-6,-1,-1,0,0,4,7,-2,-2,0,0,0,0,3,3,-1,-1,0,0,0,0,0,2,0,-1,0,0,0,0,1,1,0,0,0,0,0,0 },
    { -25,-24,-101,29,4,7,0,3,-10,40,-29,-5,3,-1,0,0,-4,16,31,-11,-3,-2,0,-1,3,
-7,11,0,-3,0,0,0,2,-2,5,0,0,0,0,0,1,-1,2,0,0,0,0,0,1,0,2,0,0,0,0,0,0,-1,1,0,0,0,0,0 },
    { 19,5,-29,5,0,1,0,1,5,-36,-16,9,2,2,0,1,110,-4,-27,-1,-4,-1,-2,0,-15,11,3,
-3,0,0,0,0,-9,1,7,-1,0,0,0,0,-5,2,2,0,0,0,0,0,-1,0,1,0,0,0,0,0,-2,1,1,0,0,0,0,0 },
    { -6,-17,6,-13,6,-2,2,-1,-18,-11,-80,16,4,4,1,1,-18,-86,-5,22,5,3,1,1,-6,5,16,0,
-2,0,0,0,5,8,5,-4,-2,0,0,0,0,3,3,-1,-1,0,0,0,1,1,1,-1,0,0,0,0,0,1,1,0,0,0,0,0 },
    { -3,-30,-18,12,-1,2,0,1,23,10,78,-13,-5,-3,-1,-1,15,-81,26,14,-2,3,0,1,-10,-6,
-18,6,3,1,1,0,-3,6,-4,-2,1,0,0,0,-1,3,-3,-1,0,0,0,0,0,2,-1,-1,0,0,0,0,0,-1,1,-1,0,0,0,0,0 },
    { -10,-14,-24,-111,17,-4,7,-1,0,-11,5,-38,3,1,1,0,6,14,19,20,-5,-1,-2,0,-11,
-1,6,10,-2,0,0,0,-1,-2,0,5,-1,0,0,0,0,0,2,0,0,0,0,1,0,2,0,0,0,0,0,0,0,1,0,0,0,0 },
    { -8,7,8,12,-1,0,0,0,-19,-4,8,6,0,0,0,0,-10,9,14,-6,-1,-1,0,0,-117,
-10,30,1,4,1,2,1,-14,-4,5,1,1,0,0,0,4,0,-2,0,0,0,0,0,5,0,-2,0,0,0,0,0,-1,0,-1,0,0,0,0,0 },
    { 7,8,30,-4,1,-3,1,-1,6,10,-9,38,-6,2,-2,-1,27,6,102,1,-12,-3,-2,-1,12,37,17,
-19,-8,-2,-1,-1,1,-2,-9,-5,1,1,0,0,-1,0,-3,-1,1,1,0,0,0,-1,-2,-1,1,0,0,0,0,0,-1,
-1,0,0,0,0 },
    { 8,4,23,28,-1,3,-1,1,-6,-20,-21,-101,4,-1,4,-1,9,-12,29,-44,
-5,3,0,0,8,3,18,18,-5,-1,-1,0,0,1,1,7,0,-2,0,0,0,0,0,4,0,0,0,0,0,0,
-1,1,0,0,0,0,0,0,0,0,2,0,0,0,0 },
    { 5,-4,10,3,-2,0,0,0,1,-23,-11,19,-1,1,-1,0,13,4,30,4,-2,-1,-1,0,14,-114,
-1,22,0,5,0,2,3,-19,-10,5,2,1,0,0,-1,5,0,-4,1,0,0,0,0,2,-2,0,0,0,0,0,0,-1,0,-1,0,0,0,0,0 },
    { -6,-7,-3,-15,-106,28,-5,5,-4,-2,-6,-5,-54,13,0,1,2,0,3,1,21,-4,0,-1,1,2,4,
-2,17,-2,-1,0,1,1,-1,0,6,-1,0,0,0,0,1,0,2,-1,0,0,0,0,0,0,2,0,0,0,0,0,0,0,1,0,0,0,0 },
    { 1,1,3,16,-7,3,-2,1,3,2,20,-13,5,-2,2,-1,2,10,-11,63,-1,-2,0,0,22,-8,90,1,-27,
-2,-3,0,-5,17,19,-29,-11,4,-1,0,3,-6,-5,0,3,0,1,0,-2,3,0,-4,-1,0,1,0,1,-1,0,0,0,0,0,0,0 },
    { 1,6,4,29,2,2,-1,1,-6,-2,-22,-33,3,-4,1,-1,5,21,18,88,16,-4,-1,-1,-16,9,
-59,13,13,1,1,0,-4,-4,-21,-19,0,4,0,0,0,4,1,-2,-2,0,0,0,0,0,0,-1,
-2,0,1,0,0,0,0,0,0,0,0,0,0 },
    }
    }
```

FIG. 27 is a flowchart showing a method for transforming a video signal according to an embodiment to which the disclosure is applied.

Referring to FIG. 27, although description will focus on a decoder for convenience of description, the disclosure is not limited thereto and the method for transforming a video signal according to the present embodiment can be equally applied to an encoder. The flowchart of FIG. 27 can be executed by a decoding apparatus 200 or an inverse transform unit 230.

The decoding apparatus 200 determines a secondary transform set applied to a current block from among predefined secondary transform sets on the basis of an intra-prediction mode of the current block (S2701).

The decoding apparatus 200 acquires a first syntax element indicating a secondary transform matrix applied to the current block in the determined secondary transform set (S2702).

The decoding apparatus 200 derives a secondary inverse-transformed block by performing a secondary inverse trans-form on a left top region of the current block using a secondary transform matrix specified by the first syntax element (S2703).

The decoding apparatus 200 derives a residual block of the current block by performing a primary inverse transform on the secondary inverse-transformed block using a primary transform matrix of the current block (S2704).

As described above, each of the predefined secondary transform sets can include two secondary transform matrices.

As described above, step S2704 may further include the step of determining an input length and an output length of the secondary inverse transform on the basis of the width and the height of the current block. As described above, when each of the height and the width of the current block is 4, the input length of the non-separable transform can be determined as 8 and the output length thereof can be determined as 16.

As described above, the decoding apparatus 200 can parse a second syntax element indicating a primary transform matrix applied to a primary transform of the current block. In addition, the decoding apparatus 200 can determine whether a secondary transform is applicable to the current block on the basis of the second syntax element.

As described above, the step of determining whether the secondary transform is applicable can be executed by determining that the secondary transform is applicable to the current block when the second syntax element indicates a predefined specific transform type.

As described above, the predefined specific transform type may be DCT2.

FIG. 28 is an exemplary block diagram of an apparatus for processing video signals as an embodiment to which the present disclosure is applied. The video signal processing apparatus shown in FIG. 28 may correspond to the encoding apparatus of FIG. 1 or the decoding apparatus of FIG. 2.

A video processing apparatus 2800 for processing video signals includes a memory 2820 which stores video signals and a processor 2810 which is combined with the memory and processes video signals.

The processor 2810 according to an embodiment of the present disclosure may be configured as at least one processing circuit for video signal processing and may process video signals by executing commands for encoding or decoding the video signals. That is, the processor 2810 may encode original video data or decode encoded video signals by performing the above-described encoding or decoding methods.

Furthermore, the processing methods to which the present disclosure is applied may be manufactured in the form of a program executed by a computer and stored in computer-readable recording media. Multimedia data having the data structure according to the present disclosure may also be stored in computer-readable recording media. The computer-readable recording media include all types of storage devices and distributed storage devices in which data readable by a computer is stored. The computer-readable recording media may include a Blueray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

Moreover, embodiments of the present disclosure may be implemented as computer program products according to program code and the program code may be executed in a computer according to embodiment of the present disclosure. The program code may be stored on computer-readable carriers.

As described above, the embodiments of the present disclosure may be implemented and executed on a processor, a microprocessor, a controller or a chip. For example, functional units shown in each figure may be implemented and executed on a computer, a processor, a microprocessor, a controller or a chip.

Furthermore, the decoder and the encoder to which the present disclosure is applied may be included in multimedia broadcast transmission/reception apparatuses, mobile communication terminals, home cinema video systems, digital cinema video systems, monitoring cameras, video conversation apparatuses, real-time communication apparatuses such as video communication, mobile streaming devices, storage media, camcorders, video-on-demand (VOD) service providing apparatuses, over the top video (OTT) video systems, Internet streaming service providing apparatuses, 3D video systems, video phone video systems, medical video systems, etc. and may be used to process video signals or data signals. For example, OTT video systems may include game consoles, Blueray players, Internet access TVs, home theater systems, smartphones, tablet PCs, digital video recorders (DVRs), etc.

Furthermore, the processing methods to which the present disclosure is applied may be manufactured in the form of a program executed by a computer and stored in computer-readable recording media. Multimedia data having the data structure according to the present disclosure may also be stored in computer-readable recording media. The computer-readable recording media include all types of storage devices and distributed storage devices in which data readable by a computer is stored. The computer-readable recording media may include a Blueray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

Moreover, embodiments of the present disclosure may be implemented as computer program products according to program code and the program code may be executed in a computer according to embodiment of the present disclosure. The program code may be stored on computer-readable carriers.

Embodiments described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment or included as a new claim by a subsequent amendment after the application is filed.

The implementations of the present disclosure may be achieved by various means, for example, hardware, firmware, software, or a combination thereof. In a hardware configuration, the methods according to the implementations of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

Those skilled in the art will appreciate that the present disclosure may be carried out in other specific ways than those set forth herein without departing from the spirit and essential characteristics of the present disclosure. Accordingly, the above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

INDUSTRIAL APPLICABILITY

Although exemplary aspects of the present disclosure have been described for illustrative purposes, those skilled in the art will appreciate that various modifications, additions and substitutions are possible, without departing from essential characteristics of the disclosure.

The invention claimed is:

1. An apparatus for decoding an image, comprising:
a memory; and
at least one processor connected to the memory, the at least one processor being configured to:
determine a secondary transform set among a pre-determined number of secondary transform sets based on an intra prediction mode of a current block,
obtain a first syntax element related to a secondary transform matrix to be applied to the current block among secondary transform matrices included in the secondary transform set,
perform a secondary inverse-transform on secondary transformed coefficients of the current block based on the secondary transform matrix specified by the first syntax element to obtain primary transformed coefficients, the secondary inverse-transform being a non-separable transform,
perform a primary inverse-transform on the primary transformed coefficients based on a primary transform matrix of the current block to obtain residual samples of the current block, and
generate reconstructed samples of the current block based on the residual samples,
wherein a number of input coefficients of the secondary inverse-transform and a number of output coefficients of the secondary inverse-transform are respectively determined as 8 and 16 based on the current block having a 4×4 size, and
wherein the number of the input coefficients of the secondary inverse-transform for the current block having the 4×4 size is not equal to a number of the input coefficients of the secondary inverse-transform for the current block having a 4×8 size or an 8×4 size, while the number of the output coefficients of the secondary inverse-transform for the current block having the 4×4 size is equal to a number of the output coefficients of the secondary inverse-transform for the current block having the 4×8 size or the 8×4 size.

2. The apparatus for decoding the image of claim 1, wherein each of the secondary transform sets comprises two secondary transform matrices.

3. The apparatus for decoding the image of claim 1, further comprising:
parsing a second syntax element related to the primary transform matrix; and
determining whether to perform the secondary inverse-transform based on the second syntax element.

4. The apparatus for decoding the image of claim 3, wherein the determining whether to perform the secondary inverse-transform comprises determining to perform the secondary inverse-transform based on the second syntax element related to information for a pre-determined transform type.

5. The apparatus for decoding the image of claim 4, wherein the pre-determined transform type is defined as DCT-2.

6. The apparatus for decoding the image of claim 1, wherein the number of the input coefficients of the secondary inverse-transform and the number of the output coefficients of the secondary inverse-transform are respectively determined as 16 and 16 based on the current block having the 4×8 size or the 8×4 size.

7. An apparatus for encoding an image, comprising:
a memory; and
at least one processor connected to the memory, the at least one processor being configured to:
generate prediction samples of a current block based on an intra prediction mode,
derive residual samples of the current block based on the prediction samples,
perform a primary transform on the residual samples to obtain primary-transformed coefficients of the current block,
determine a secondary transform set among a pre-determined number of secondary transform sets based on the intra prediction mode,
generate a first syntax element related to a secondary transform matrix to be applied to the current block among secondary transform matrices included in the determined secondary transform set, and
perform a secondary transform on the primary-transformed coefficients based on the secondary transform matrix, the secondary transform being a non-separable transform,
wherein a number of input coefficients of the secondary transform and a number of output coefficients of the secondary transform are respectively determined as 16 and 8 based on the current block having a 4×4 size, and
wherein the number of the input coefficients of the secondary transform for the current block having the 4×4 size is equal to a number of the input coefficients of the secondary transform for the current block having a 4×8 size or an 8×4 size, while the number of the output coefficients of the secondary transform for the current block having the 4×4 size is not equal to the number of a output coefficients of the secondary transform for the current block having the 4×8 size or the 8×4 size.

8. The apparatus for encoding the image of claim 7, wherein each of the secondary transform sets comprises two secondary transform matrices.

9. A transmission apparatus of data for an image, comprising:
at least one processor configured to obtain a bitstream for the image, wherein the bitstream is generated based on generating prediction samples of a current block based on an intra prediction mode, deriving residual samples of the current block based on the prediction samples, performing a primary transform on the residual samples to obtain primary-transformed coefficients of the current block, determining a secondary transform set among a pre-determined number of secondary transform sets based on the intra prediction mode, generating a first syntax element related to a secondary transform matrix to be applied to the current block among secondary transform matrices included in the determined secondary transform set, and performing a secondary transform on the primary-transformed coefficients based on the secondary transform matrix, the secondary transform being a non-separable transform; 5 and a transmitter configured to transmit the data comprising the bitstream, wherein a number of input coefficients of the secondary transform and a number of output coefficients of the 10 secondary transform are respectively determined as 16 and 8 based on the current block having a 4×4 size, and wherein the number of the input coefficients of the secondary transform for the current block having the 4×4 size is equal to a number of the input coefficients of the 15 secondary transform for the current block having a 4×8 size or an 8×4 size, while the number of the output coefficients of the secondary transform for the current block having the 4×4 size is not equal to a number of the output coefficients of the secondary transform for 20 the current block having the 4×8 size or the 8×4 size.

* * * * *